(12) United States Patent
Clerckx et al.

(10) Patent No.: US 8,494,074 B2
(45) Date of Patent: Jul. 23, 2013

(54) MULTIPLE-INPUT MULTIPLE-OUTPUT COMMUNICATION SYSTEM USING EXPLICIT FEEDBACK

(75) Inventors: Bruno Clerckx, Seoul (KR); Sae hyung Park, Seoul (KR); Junil Choi, Seoul (KR); David Mazzarese, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 12/852,741

(22) Filed: Aug. 9, 2010

(65) Prior Publication Data

US 2011/0080971 A1  Apr. 7, 2011

(30) Foreign Application Priority Data

Oct. 1, 2009 (KR) .................. 10-2009-0094003

(51) Int. Cl.
*H04B 7/02* (2006.01)
(52) U.S. Cl.
USPC .......................................... 375/267; 375/349
(58) Field of Classification Search
USPC .................... 375/267, 299, 346–349
See application file for complete search history.

(56) References Cited

U.S. PATENT DOCUMENTS

| | | | |
|---|---|---|---|
| 2003/0031264 A1* | 2/2003 | Barry et al. | 375/259 |
| 2005/0041750 A1* | 2/2005 | Lau | 375/267 |
| 2007/0115909 A1* | 5/2007 | Wang et al. | 370/342 |
| 2008/0207238 A1 | 8/2008 | Tosato | |
| 2008/0219373 A1* | 9/2008 | Zhang et al. | 375/262 |
| 2008/0279125 A1* | 11/2008 | Hottinen | 370/281 |
| 2009/0143008 A1* | 6/2009 | Hottinen et al. | 455/11.1 |
| 2009/0161646 A1 | 6/2009 | Li et al. | |
| 2012/0057643 A1* | 3/2012 | Lin et al. | 375/267 |
| 2012/0076033 A1* | 3/2012 | Mundarath et al. | 370/252 |
| 2012/0213300 A1* | 8/2012 | Yamaura | 375/260 |

FOREIGN PATENT DOCUMENTS

| | | |
|---|---|---|
| KR | 10-2007-0112421 | 11/2007 |
| KR | 10-2008-0114486 | 12/2008 |
| KR | 10-2009-0014370 | 2/2009 |
| WO | WO 2009/075662 | 6/2009 |

OTHER PUBLICATIONS

Chae et al., "Coordinated Beamforming with Limited Feedback in the MIMO Broadcast Channel," *IEEE Journal on Selected Areas in Communications*, Oct. 2008, vol. 26, No. 8, pp. 1505-1515.

* cited by examiner

*Primary Examiner* — Emmanuel Bayard
(74) *Attorney, Agent, or Firm* — NSIP Law

(57) ABSTRACT

A multiple input multiple output (MIMO) communication system using an explicit feedback is provided. In the MIMO communication system using the explicit feedback, a receiver may generate an explicit feedback vector by calculating an explicit channel matrix, and by vectorizing the explicit channel matrix or an explicit channel matrix processed using a predefined function. Feedback information generated based on the explicit feedback vector may be provided to a transmitter. The transmitter may reconfigure the explicit channel matrix or the processed explicit channel matrix based on the feedback information. The transmitter and the receiver may share the explicit channel matrix or the processed explicit channel matrix using an adaptively transformed codebook.

18 Claims, 8 Drawing Sheets

US 8,494,074 B2

MULTIPLE-INPUT MULTIPLE-OUTPUT COMMUNICATION SYSTEM USING EXPLICIT FEEDBACK

CROSS-REFERENCE TO RELATED APPLICATION(S)

This application claims the benefit under 35 U.S.C. §119(a) of Korean Patent Application No. 10-2009-0094003, filed on Oct. 1, 2009, in the Korean Intellectual Property Office, the entire disclosure of which is incorporated herein by reference for all purposes.

BACKGROUND

1. Field

The following description relates to a multiple input multiple output (MIMO) communication system, and more particularly, to a technology of sharing channel information using a codebook in a limited feedback environment.

2. Description of the Related Art

Research is being conducted to provide various types of multimedia services and to support high quality and high speed data transmission in a wireless communication environment. Technologies associated with a multiple input multiple output (MIMO) communication system using multiple channels are in development.

In a MIMO communication system, a base station and terminals may use a codebook in order to securely and efficiently manage a channel environment. A particular space may be quantized into a plurality of codewords. The plurality of codewords that is generated by quantizing the particular space may be stored in the base station and the terminals. Each of the codewords may be a vector or a matrix.

For example, in a downlink, a terminal functioning as a receiver may select, as a preferred codeword, one codeword from codewords included in a codebook according to a channel formed between the base station and the terminal. The receiver may provide the base station with feedback information associated with the preferred codeword. The base station may also receive the feedback information to verify the preferred codeword from the codebook. The preferred codeword may be used for the base station to perform precoding.

SUMMARY

In one general aspect, a method of operating a receiver includes calculating an explicit channel matrix between a transmitter and the receiver, vectorizing the explicit channel matrix or an explicit channel matrix processed using a predefined function, to generate an explicit feedback vector, and generating feedback information based on the explicit feedback vector and a predefined codebook.

The predefined codebook may include a plurality of codewords as candidates with respect to the explicit feedback vector. The generating of feedback information may include selecting, from the plurality of codewords, a codeword corresponding to the explicit feedback vector to generate the feedback information.

The vectorizing may include vectorizing at least one of the explicit channel matrix, a covariance of the explicit channel matrix, an upper triangular matrix of the covariance, an R matrix obtained by performing QR decomposition of the explicit channel matrix, and eigen vectors of the covariance.

The calculating of the explicit channel matrix may include calculating the explicit channel matrix using a signal transmitted from the transmitter.

The generating of feedback information may include generating the feedback information including information associated with a direction of the explicit feedback vector and information associated with a quality of the explicit feedback vector.

Information associated with the quality of the explicit feedback vector may be generated based on interference or noise occurring in the receiver.

The vectorizing may include stacking up, into a single vector form, column vectors or row vectors included in the explicit channel matrix.

In another general aspect, a method of operating a transmitter includes receiving feedback information from a receiver, recognizing, based on the feedback information and a predefined codebook, an explicit feedback vector that is generated by vectorizing an explicit channel matrix between the transmitter and the receiver or an explicit channel matrix processed using a predefined function, and reconfiguring, from the explicit feedback vector, the explicit channel matrix or the processed explicit channel matrix.

The predefined codebook may include a plurality of codewords as candidates with respect to the explicit feedback vector. The feedback information may be generated based on a codeword corresponding to the explicit feedback vector among the plurality of codewords.

The explicit feedback vector may be generated by vectorizing at least one of the explicit channel matrix, a covariance of the explicit channel matrix, an upper triangular matrix of the covariance, an R matrix obtained by performing QR decomposition of the explicit channel matrix, and eigen vectors of the covariance.

In still another general aspect, a method of operating a receiver includes calculating a correlation matrix based on an explicit channel matrix between a transmitter and the receiver, transforming a first codebook to a second codebook based on the correlation matrix, and generating feedback based on the second codebook and the explicit channel matrix.

The method may further include at least one of generating an explicit feedback vector by vectorizing the explicit channel matrix or an explicit channel matrix processed using a predefined function, and determining, as an explicit feedback matrix, the explicit channel matrix or the processed explicit channel matrix. The generating of the feedback information may include generating the feedback information including information associated with a direction and a quality of the explicit feedback vector, or information associated with a direction and a quality of the explicit feedback matrix.

The method may further include providing, by the receiver to the transmitter, information used to verify the correlation matrix.

The generating of the explicit feedback vector may include generating the explicit feedback vector by vectorizing at least one of the explicit channel matrix, a covariance of the explicit channel matrix, an upper triangular matrix of the covariance, an R matrix obtained by performing QR decomposition of the explicit channel matrix, and eigen vectors of the covariance.

The calculating of the correlation matrix may include calculating at least two correlation matrices corresponding to at least two subchannel matrices included in the explicit channel matrix. The transforming of the first codebook to the second codebook may include transforming the first codebook to the second codebook based on the at least two correlation matrices.

In yet another general aspect, a method of operating a transmitter includes recognizing a correlation matrix corresponding to an explicit channel matrix between a receiver and the transmitter, transforming a first codebook to a second codebook based on the correlation matrix, receiving feedback information from the receiver, and reconfiguring the explicit channel matrix or an explicit channel matrix processed using a predefined function, based on the feedback information and the second codebook.

The recognizing of the correlation matrix may include recognizing at least two correlation matrices corresponding to at least two subchannel matrices included in the explicit channel matrix. The transforming of the first codebook to the second codebook may include transforming the first codebook to the second codebook based on the at least two correlation matrices.

A computer-readable storage medium may store a program to implement one of these methods.

Other features and aspects will be apparent from the following detailed description, the drawings, and the claims.

Figure 1:
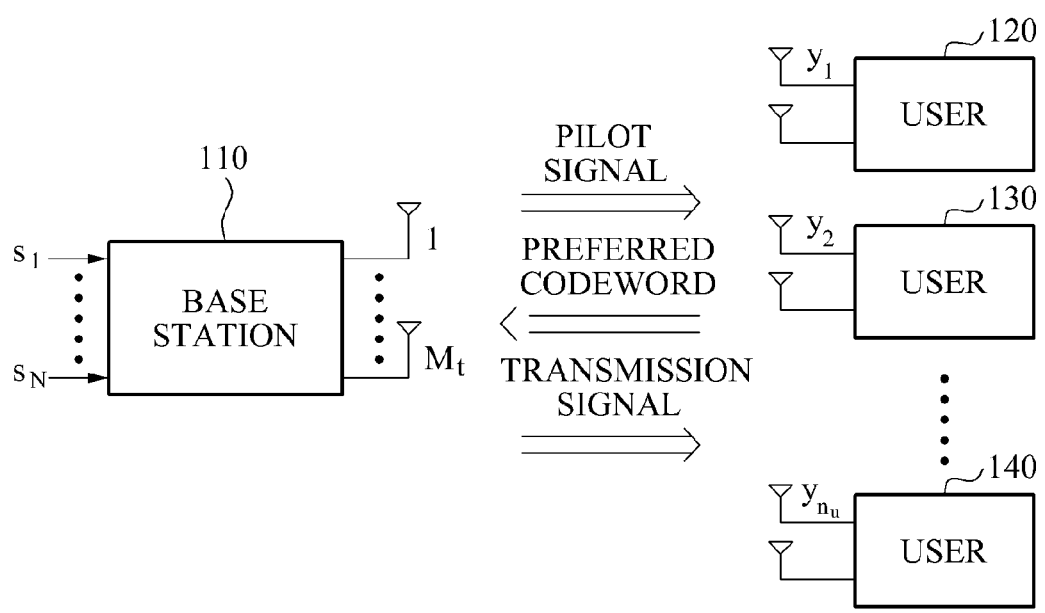
FIG. 1 is a diagram illustrating an example of a multiple input multiple output (MIMO) communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF EMBODIMENTS

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of a multiple input multiple output (MIMO) communication system.

Referring to the example in FIG. 1, a closed-loop MIMO communication system includes a base station 110 and users 120, 130, and 140. The closed-loop MIMO communication system may be a multi-user MIMO communication system. Examples may also be applicable to a single-user MIMO communication system. The term "closed-loop" indicates, for example, that in a downlink, the users 120, 130, and 140 provide feedback information to the base station 110, and the base station 110 performs precoding based on the feedback information to generate a transmission signal.

One or more antennas may be installed in the base station 110. A single or a plurality of antennas may be installed in the users 120, 130, and 140. A channel may be formed between the base station and the users 120, 130, and 140. Signals may be transmitted and received via each formed channel.

The base station 110 may transmit pilot signals to the users 120, 130, and 140 via downlink channels. The pilot signals may be well known to the base station 110 and the users 120, 130, and 140.

Each of the users 120, 130, and 140 may estimate a channel that is formed between the base station 110 and each of the users 120, 130, and 140 using a pilot signal. Each of the users 120, 130, and 140 may select, as a preferred codeword, at least one codeword from codewords included in a pre-stored codebook. The preferred codeword may be referred to as a preferred vector or a preferred matrix.

The base station 110 may transmit a single data stream or at least two data streams to the users 120, 130, and 140. For example, the base station 110 may adopt a spatial division multiplex access (SDMA) scheme or an SDM scheme. The base station 110 may generate a precoding matrix based on the codewords included in the codebook, particularly, from the preferred codeword, and generate a transmission signal using the generated precoding matrix.

Each of the users 120, 130, and 140 may provide the base station 110 with information associated with a corresponding channel as feedback information, so that the base station 110 may generate the transmission signal. The feedback information provided from each of the users 120, 130, and 140 to the base station 110 may be different depending on whether the feedback information corresponds to an intrinsic feedback or an explicit feedback. The intrinsic feedback and the explicit feedback denote two types of the feedback information.

According to the intrinsic feedback, each of the users 120, 130, and 140 may determine the preferred codeword after applying, to a received signal, a predetermined reception filter. Examples of a predetermined reception may include, but are not limited to, a reception filter corresponding to a zero-forcing beamforming (ZF) scheme, a minimum mean square error (MMSE) reception filter, and the like. For example, when each of the users 120, 130, and 140 employs a ZF receiver, each of the users 120, 130, and 140 may estimate a corresponding channel based on assumptions that the received signal passes through the reception filter corresponding to the ZF scheme, and may determine the preferred codeword based on the estimated corresponding channel. According to the above intrinsic feedback, each of the users 120, 130, and 140 may also determine information associated with an index or a direction of the preferred codeword, information associated with the quality of the corresponding channel, and a preferred transmission rank.

In the MIMO communication system using the intrinsic feedback, the base station 110 may have relatively many limitations. For example, since each of the users 120, 130, and 140 determines the preferred transmission rank, the base station 110 may not readily determine a transmission rank. Since a channel is not verified, for example, because the base station 110 may be simply aware of only a channel after the reception filter of each of the users 120, 130, and 140 is applied, the base station 110 may not readily determine a transmission mode such as a multi-user MIMO transmission mode, a single-user MIMO transmission mode, a transmission diversity mode, and the like.

The limitations of the base station 110 caused by the intrinsic feedback may be overcome by the explicit feedback. For example, in the MIMO communication system using the explicit feedback, the base station 110 may be aware of channels and thus may more readily determine the transmission rank and the transmission mode. In the MIMO communication system using the explicit feedback, each of the users 120, 130, and 140 may need to feed back the corresponding channel. Accordingly, great feedback overhead may occur.

A channel environment between the base station 110 and each of the users 120, 130, and 140 may be variable over time. When the base station 110 and the users 120, 130, and 140 use a fixed codebook, it may be difficult to adapt to the varying channel environment. The base station 110 and the users 120, 130, and 140 may adaptively transform the codebook and use the transformed codebook to reduce a quantization error. When the base station 110 and the users 120, 130, and 140 adaptively transform the codebook, the transformed codebook may quantize a relatively small space compared to a previous codebook and thus may have a low quantization error.

In a downlink, the base station 110 functions as a transmitter and the users 120, 130, and 140 function as receivers. Conversely, in an uplink, the base station 110 functions as a receiver and the users 120, 130, and 140 function as transmitters. The terms "transmitter" and "receiver" may be used instead of the base station 110 and the users 120, 130, and 140, respectively.

The transmitter and the receiver may operate in a base mode using a fixed codebook. For example, the receiver may generate feedback information using the fixed codebook. The transmitter may verify information associated with a channel or a preferred codeword based on the feedback information and the fixed codebook.

$H_k$ denotes an explicit channel matrix between a $k^{th}$ receiver and the transmitter. When the explicit channel matrix $H_k$ is calculated, the $k^{th}$ receiver may vectorize the explicit channel matrix $H_k$ or an explicit channel matrix processed using a predefined function. The explicit channel matrix processed using the predefined function may correspond to one of a covariance $H_k^H H_k$ of the explicit channel matrix $H_k$, an upper triangular matrix uppertriang($H_k^H H_k$) of the covariance $H_k^H H_k$, an R matrix obtained by performing QR decomposition of the explicit channel matrix $H_k$, and eigen vectors of the covariance $H_k^H H_k$. $X^H$ denotes a Hermitian of X.

Figure 2:
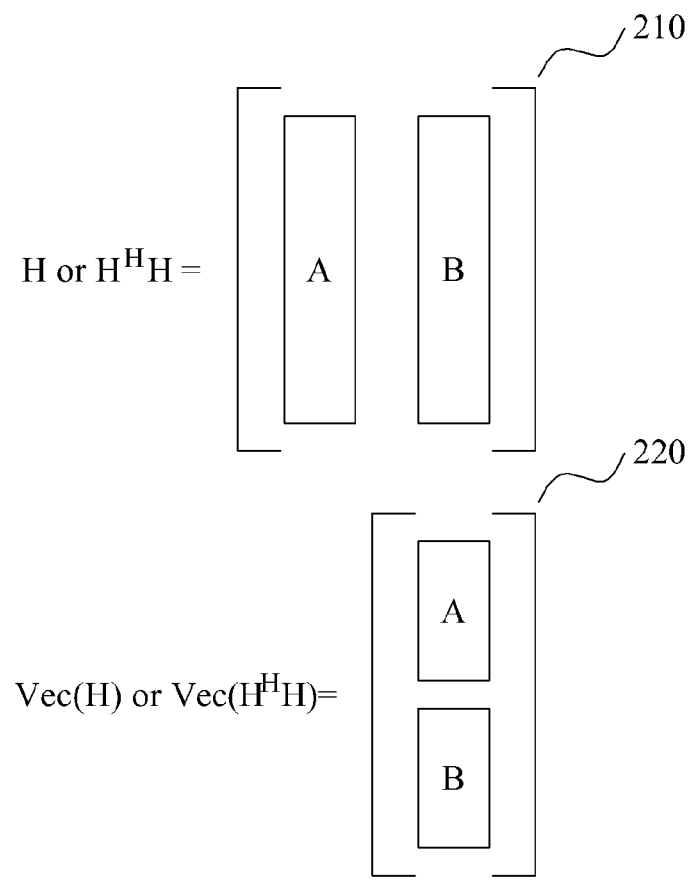
FIG. 2 is a diagram illustrating an example of a process of vectorizing an explicit channel matrix or a processed explicit channel matrix.

FIG. 2 illustrates an example of a process of vectorizing an explicit channel matrix or a processed explicit channel matrix.

Referring to FIG. 2, a $k^{th}$ receiver generates an explicit feedback vector vec(H) or vec($H^H H$) 220 by vectorizing the explicit channel matrix H or the processed explicit channel matrix $H^H H$ 210 including column vectors A and B. For example, the column vectors A and B included in the explicit channel matrix H or the processed explicit channel matrix $H^H H$ 210 may be stacked up in a single vector form.

Generally, in the example of FIG. 2, all column vectors included in the explicit channel matrix or the processed explicit channel matrix may be transformed to an explicit channel vector having a single form through a vectorization process.

When the explicit feedback vector h is generated, the $k^{th}$ receiver using the explicit feedback may provide a transmitter with information associated with a direction and a quality of the explicit feedback vector h, for example, information associated with a signal-to-noise ratio (SNR) or a signal-to-interference and noise ratio (SINR). The transmitter may verify the explicit feedback vector h based on information associated with the direction and the quality of the explicit feedback vector h, and then may verify the explicit channel matrix H or the processed explicit channel matrix $H^H H$. The explicit channel matrix H or the processed explicit channel matrix $H^H H$ verified by the transmitter may be used when the transmitter performs precoding or determines a transmission rank or a transmission mode.

According to one example, information associated with the direction and the quality of the explicit feedback vector h may be generated using various types as follows:

(1) The $k^{th}$ receiver may calculate $v=h/|vec(H_k)|_2$ to generate information associated with the direction of $h=vec(H_k)$. In this example, $|a|_2$ denotes a 2-norm of a. Among codewords included in a codebook, information associated with a codeword corresponding to v or an index of a codeword closest to v may be generated as information associated with the direction of h.

The $k^{th}$ receiver may generate information associated with the quality of h as $$|vec(H_k)|_2 = \|H_k\|_F \text{ or } \frac{|vec(H_k)|_2}{|I+N|} = \frac{\|H_k\|_F}{|I+N|}.$$

In this example, $\|a\|_F$ denotes a Frobenius norm of a, I denotes interference of the $k^{th}$ receiver, and N denotes the noise of the $k^{th}$ receiver.

(2) The $k^{th}$ receiver may calculate $v=h/|vec(H_k^H H_k)|_2$ to generate information associated with the direction of $h=vec(H_k^H H_k)$.

The $k^{th}$ receiver may generate information associated with the quality of h as $$|vec(H_k^H H_k)|_2 = \|H_k^H H_k\|_F$$

or $$\frac{|vec(H_k^H H_k)|_2}{|I+N|} = \frac{\|H_k^H H_k\|_F}{|I+N|}.$$

(3) The $k^{th}$ receiver may calculate $v=h/|vec(\text{uppertriang}(H_k^H H_k))|_2$ to generate information associated with the direction of $h=vec(\text{uppertriang}(H_k^H H_k))$.

The $k^{th}$ receiver may generate information associated with the quality of h as $$|vec(uppertriang(H_k^H H_k))|_2 = \|uppertriang(H_k^H H_k)\|_F$$

or $$\frac{|vec(uppertriang(H_k^H H_k))|_2}{|I+N|} = \frac{\|uppertriang(H_k^H H_k)\|_F}{|I+N|}.$$

(4) The $k^{th}$ receiver may calculate $v=h/|vec(R)|_2$ to generate information associated with the direction of $h=vec(R)$. In this example, R denotes an R matrix obtained by performing QR decomposition of the explicit channel matrix $H_k$, and h may be replaced with $h_{reduced}$ by removing "zero" columns from columns of h.

Accordingly, $v=h/|vec(R)|_2$ may be replaced with $v=h_{reduced}/|vec(R)|_2$.

The $k^{th}$ receiver may generate information associated with the quality of h as $$|vec(R)|_2 = \|R\|_F \text{ or } \frac{|vec(R)|_2}{|I+N|} = \frac{\|R\|_F}{|I+N|}.$$

(5) The $k^{th}$ receiver may calculate $v=h/|vec(V_k)|_2$ to generate information associated with the direction of $h=vec(V_k)$. In this example, $H_k^H H_k = V_k L_k V_k^H$, and diagonal entries of L denote eigen values of $H_k^H H_k$.

The $k^{th}$ receiver may generate information associated with the quality of h as $$|vec(V_k)|_2 = \|V_k\|_F \text{ or } \frac{|vec(V_k)|_2}{|I+N|} = \frac{\|V_k\|_F}{|I+N|}.$$

Examples of codebooks used by the $k^{th}$ receiver and the transmitter may follow as:

(1) When the $k^{th}$ receiver calculates an explicit feedback vector as $h=vec(H_k^H H_k)$, and uses $v=h/|vec(H_k^H H_k)|_2$ to generate information associated with the direction of the explicit feedback vector:

The following Wi denotes a quantized version of a space spanned by all available matrices $H_k^H H_k$, and may be defined as $wi=vec(Wi)$. A codebook $\{W_i\}_{i=1}^{2^B}$ where B denotes a number of feedback bits may be given as a set of matrices Wi, and may be expressed by $\{W_i\}_{i=1}^{2^B}$ that is a set of equivalent vectors wi. The $k^{th}$ receiver and the transmitter may store, as a codebook, a reduced version of $\{W_i\}_{i=1}^{2^B}$ or $\{w_i\}_{i=1}^{2^B}$ using a symmetry. For example, a lower triangular portion of a particular matrix Wi corresponds to a transpose conjugate of an upper triangular portion.

1) When a number of transmit antennas Nt=2, a number of receive antennas Nr=2, and the number of feedback bits B=2:

| W1 = | |
|---|---|
| −0.5283 + 0.0000i | −0.3287 + 0.0064i |
| −0.3287 − 0.0064i | −0.7104 − 0.0000i |

In this example, W1 may be written in an equivalent vector forms: w1=vec(W1), and w1 may follow a

| w1 = |
|---|
| −0.5283 + 0.0000i |
| −0.3287 − 0.0064i |
| −0.3287 + 0.0064i |
| −0.7104 − 0.0000i |

| W2 = | |
|---|---|
| −0.5371 + 0.0000i | 0.1410 − 0.2969i |
| 0.1410 + 0.2969i | −0.7039 + 0.0000i |

| W3 = | |
|---|---|
| −0.9566 − 0.0000i | 0.0154 + 0.0463i |
| 0.0154 − 0.0463i | −0.2831 + 0.0000i |

| W4 = | |
|---|---|
| −0.4590 + 0.0000i | 0.1597 + 0.2580i |
| 0.1597 − 0.2580i | −0.7780 + 0.0000i |

2) When Nt=2, Nr=2, and B=3:

| W1 = | |
|---|---|
| −0.3970 + 0.0000i | 0.0935 + 0.3086i |
| 0.0935 − 0.3086i | −0.7965 + 0.0000i |

| W2 = | |
|---|---|
| −0.5849 − 0.0000i | −0.1988 − 0.3314i |
| −0.1988 + 0.3314i | −0.5994 + 0.0000i |

| W3 = | |
|---|---|
| −0.9487 − 0.0000i | −0.0157 − 0.1392i |
| −0.0157 + 0.1392i | −0.2463 + 0.0000i |

| W4 = | |
|---|---|
| −0.8307 + 0.0000i | −0.0652 + 0.2995i |
| −0.0652 − 0.2995i | −0.3492 − 0.0000i |

| W5 = | |
|---|---|
| −0.7043 + 0.0000i | 0.3509 + 0.1126i |
| 0.3509 − 0.1126i | −0.4820 − 0.0000i |

| W6 = | |
|---|---|
| −0.5690 + 0.0000i | −0.3548 + 0.1110i |
| −0.3548 − 0.1110i | −0.6323 + 0.0000i |

| W7 = | |
|---|---|
| −0.2268 + 0.0000i | −0.0532 − 0.0723i |
| −0.0532 + 0.0723i | −0.9656 + 0.0000i |

| W8 = | |
|---|---|
| −0.4936 + 0.0000i | 0.2629 − 0.2613i |
| 0.2629 + 0.26131 | −0.6940 − 0.0000i |

3) When Nt=2, Nr=2, and B=4:

| W1 = | |
|---|---|
| −0.5938 + 0.0000i | 0.1908 − 0.3548i |
| 0.1908 + 0.3548i | −0.5681 − 0.0000i |

| W2 = | |
|---|---|
| −0.7023 − 0.0000i | 0.0025 + 0.0256i |
| 0.0025 − 0.0256i | −0.7109 + 0.0000i |

| W3 = | |
|---|---|
| −0.3883 − 0.0000i | 0.1550 + 0.3314i |
| 0.1550 − 0.3314i | −0.7626 + 0.0000i |

| W4 = | |
|---|---|
| −0.5448 − 0.0000i | 0.4164 − 0.0134i |
| 0.4164 + 0.0134i | −0.5967 + 0.0000i |

| W5 = | |
|---|---|
| −0.6855 + 0.0000i | −0.0999 + 0.3853i |
| −0.0999 − 0.3853i | −0.4618 + 0.0000i |

| W6 = | |
|---|---|
| −0.1935 + 0.0000i | −0.0925 + 0.1228i |
| −0.0925 − 0.1228i | −0.9567 − 0.0000i |

| W7 = | |
|---|---|
| −0.4326 − 0.0000i | −0.3695 − 0.0754i |
| −0.3695 + 0.0754i | −0.7269 − 0.0000i |

| W8 = | |
|---|---|
| −0.2697 + 0.0000i | −0.0496 − 0.2650i |
| −0.0496 + 0.2650i | −0.8842 − 0.0000i |

| W9 = | |
|---|---|
| −0.9613 + 0.0000i | −0.0204 + 0.1431i |
| −0.0204 − 0.1431i | −0.1844 + 0.0000i |

$$W10 =$$

| −0.2700 + 0.0000i | 0.2477 − 0.0454i |
| 0.2477 + 0.0454i | −0.8946 + 0.0000i |

$$W11 =$$

| −0.7469 − 0.0000i | 0.2576 + 0.2689i |
| 0.2576 − 0.2689i | −0.4060 + 0.0000i |

$$W12 =$$

| −0.9086 − 0.0000i | −0.0679 − 0.2261i |
| −0.0679 + 0.2261i | −0.2508 + 0.0000i |

$$W13 =$$

| −0.8873 − 0.0000i | 0.2534 − 0.0835i |
| 0.2534 + 0.0835i | −0.2652 + 0.0000i |

$$W14 =$$

| −0.4571 − 0.0000i | −0.2987 + 0.2645i |
| −0.2987 − 0.2645i | −0.6875 + 0.0000i |

$$W15 =$$

| −0.6247 + 0.0000i | −0.2197 − 0.3417i |
| −0.2197 + 0.3417i | −0.5288 − 0.0000i |

$$W16 =$$

| −0.7895 − 0.0000i | −0.3439 + 0.0469i |
| −0.3439 − 0.0469i | −0.3685 + 0.0000i |

4) When Nt=2, Nr=2, and B=5:

$$W1 =$$

| −0.5344 − 0.0000i | 0.1465 + 0.0325i |
| 0.1465 − 0.0325i | −0.8182 − 0.0000i |

$$W2 =$$

| −0.7800 − 0.0000i | 0.0220 − 0.1690i |
| 0.0220 + 0.1690i | −0.5775 + 0.0000i |

$$W3 =$$

| −0.9416 − 0.0000i | 0.1924 + 0.0190i |
| 0.1924 − 0.0190i | −0.1964 + 0.0000i |

$$W4 =$$

| −0.7495 + 0.0000i | 0.3555 + 0.1203i |
| 0.3555 − 0.1203i | −0.3956 − 0.0000i |

$$W5 =$$

| −0.4553 − 0.0000i | −0.3839 − 0.1582i |
| −0.3839 + 0.1582i | −0.6692 − 0.0000i |

$$W6 =$$

| −0.7395 − 0.0000i | −0.3430 − 0.1686i |
| −0.3430 + 0.1686i | −0.4012 + 0.0000i |

$$W7 =$$

| −0.9524 + 0.0000i | −0.1497 − 0.0860i |
| −0.1497 + 0.0860i | −0.1823 − 0.0000i |

$$W8 =$$

| −0.4726 − 0.0000i | 0.2179 − 0.3475i |
| 0.2179 + 0.3475i | −0.6634 + 0.0000i |

$$W9 =$$

| −0.9023 − 0.0000i | 0.1188 − 0.2337i |
| 0.1188 + 0.2337i | −0.2200 − 0.0000i |

$$W10 =$$

| −0.3658 − 0.0000i | −0.0189 − 0.3627i |
| −0.0189 + 0.3627i | −0.7761 + 0.0000i |

$$W11 =$$

| −0.5579 + 0.0000i | −0.2093 − 0.3687i |
| −0.2093 + 0.3687i | −0.5737 − 0.0000i |

$$W12 =$$

| −0.5105 − 0.0000i | −0.0022 + 0.4216i |
| −0.0022 − 0.4216i | −0.6196 − 0.0000i |

$$W13 =$$

| −0.6696 − 0.0000i | 0.0896 − 0.4047i |
| 0.0896 + 0.4047i | −0.4561 + 0.0000i |

$$W14 =$$

| −0.7815 − 0.0000i | 0.1282 + 0.3438i |
| 0.1282 − 0.3438i | −0.3466 − 0.0000i |

$$W15 =$$

| −0.6496 − 0.0000i | −0.2437 + 0.3401i |
| −0.2437 − 0.3401i | −0.4773 − 0.0000i |

$$W16 =$$

| −0.5456 + 0.0000i | 0.2733 + 0.3272i |
| 0.2733 − 0.3272i | −0.5822 + 0.0000i |

$$W17 =$$

| −0.3448 − 0.0000i | −0.3592 + 0.1316i |
| −0.3592 − 0.1316i | −0.7670 + 0.0000i |

$$W18 =$$

| −0.2067 − 0.0000i | 0.1052 − 0.1633i |
| 0.1052 + 0.1633i | −0.9390 − 0.0000i |

$$W19 =$$

| −0.5686 − 0.0000i | −0.1713 + 0.0198i |
| −0.1713 − 0.0198i | −0.7856 − 0.0000i |

$$W20 =$$

| −0.6024 − 0.0000i | −0.4165 + 0.0784i |
| −0.4165 − 0.0784i | −0.5271 + 0.0000i |

$$W21 =$$

| −0.9302 − 0.0000i | −0.0280 + 0.2186i |
| −0.0280 − 0.2186i | −0.1942 + 0.0000i |

$$W22 =$$

| −0.8296 − 0.0000i | −0.3019 + 0.1470i |
| −0.3019 − 0.1470i | −0.2938 + 0.0000i |

$$W23 =$$

| −0.3171 − 0.0000i | −0.1782 + 0.3021i |
| −0.1782 − 0.3021i | −0.8083 − 0.0000i |

$$W24 =$$

| −0.2800 − 0.0000i | 0.1213 + 0.2948i |
| 0.1213 − 0.2948i | −0.8476 + 0.0000i |

$$W25 =$$

| −0.4732 − 0.0000i | 0.4077 + 0.0789i |
| 0.4077 − 0.0789i | −0.6567 − 0.0000i |

$$W26 =$$

| −0.7053 + 0.0000i | 0.3540 − 0.1783i |
| 0.3540 + 0.1783i | −0.4341 + 0.0000i |

$$W27 =$$

| −0.3819 − 0.0000i | 0.3568 − 0.1735i |
| 0.3568 + 0.1735i | −0.7344 + 0.0000i |

$$W28 =$$

| −0.7826 − 0.0000i | −0.0017 + 0.1543i |
| −0.0017 − 0.1543i | −0.5830 − 0.0000i |

$$W29 =$$

| −0.1605 + 0.0000i | −0.0886 + 0.0770i |
| −0.0886 − 0.0770i | −0.9730 − 0.0000i |

$$W30 =$$

| −0.2210 − 0.0000i | 0.2628 + 0.0600i |
| 0.2628 − 0.0600i | −0.8976 − 0.0000i |

$$W31 =$$

| −0.8225 − 0.0000i | −0.1280 − 0.3171i |
| −0.1280 + 0.3171i | −0.2994 + 0.0000i |

$$W32 = \begin{pmatrix} -0.2343 - 0.0000i & -0.2135 - 0.1749i \\ -0.2135 + 0.1749i & -0.8903 - 0.0000i \end{pmatrix}$$

5) When Nt=2, Nr=2, and B=6:

$$W1 = \begin{pmatrix} -0.7368 + 0.0000i & -0.0000 - 0.0304i \\ -0.0000 + 0.0304i & -0.6748 - 0.0000i \end{pmatrix}$$

$$W2 = \begin{pmatrix} -0.8400 + 0.0000i & -0.1797 + 0.0924i \\ -0.1797 - 0.0924i & -0.4612 - 0.0000i \end{pmatrix}$$

$$W3 = \begin{pmatrix} -0.1193 - 0.0000i & -0.0595 + 0.0314i \\ -0.0595 - 0.0314i & -0.9883 - 0.0000i \end{pmatrix}$$

$$W4 = \begin{pmatrix} -0.4447 + 0.0000i & 0.0266 + 0.4231i \\ 0.0266 - 0.4231i & -0.6655 - 0.0000i \end{pmatrix}$$

$$W5 = \begin{pmatrix} -0.3894 - 0.0000i & -0.1798 + 0.3627i \\ -0.1798 - 0.3627i & -0.7215 + 0.0000i \end{pmatrix}$$

$$W6 = \begin{pmatrix} -0.9440 + 0.0000i & -0.0254 + 0.2030i \\ -0.0254 - 0.2030i & -0.1589 - 0.0000i \end{pmatrix}$$

$$W7 = \begin{pmatrix} -0.8110 - 0.0000i & 0.0948 + 0.2144i \\ 0.0948 - 0.2144i & -0.4821 - 0.0000i \end{pmatrix}$$

$$W8 = \begin{pmatrix} -0.9074 + 0.0000i & 0.2515 - 0.0791i \\ 0.2515 + 0.0791i & -0.1937 - 0.0000i \end{pmatrix}$$

$$W9 = \begin{pmatrix} -0.8021 + 0.0000i & -0.0854 + 0.3371i \\ -0.0854 - 0.3371i & -0.3388 + 0.0000i \end{pmatrix}$$

$$W10 = \begin{pmatrix} -0.5105 + 0.0000i & -0.4370 - 0.0269i \\ -0.4370 + 0.0269i & -0.5966 - 0.0000i \end{pmatrix}$$

$$W11 = \begin{pmatrix} -0.9192 + 0.0000i & -0.2036 - 0.1454i \\ -0.2036 + 0.1454i & -0.1728 - 0.0000i \end{pmatrix}$$

$$W12 = \begin{pmatrix} -0.9928 + 0.0000i & -0.0025 - 0.0013i \\ -0.0025 + 0.0013i & -0.1193 - 0.0000i \end{pmatrix}$$

$$W13 = \begin{pmatrix} -0.3312 - 0.0000i & 0.3438 - 0.1392i \\ 0.3438 + 0.1392i & -0.7843 + 0.0000i \end{pmatrix}$$

$$W14 = \begin{pmatrix} -0.2438 - 0.0000i & -0.2268 + 0.1678i \\ -0.2268 - 0.1678i & -0.8840 - 0.0000i \end{pmatrix}$$

$$W15 = \begin{pmatrix} -0.8587 - 0.0000i & -0.1244 - 0.1307i \\ -0.1244 + 0.1307i & -0.4445 + 0.0000i \end{pmatrix}$$

$$W16 = \begin{pmatrix} -0.6996 - 0.0000i & 0.2481 - 0.0065i \\ 0.2481 + 0.0065i & -0.6224 - 0.0000i \end{pmatrix}$$

$$W17 = \begin{pmatrix} -0.6063 + 0.0000i & -0.1822 - 0.4043i \\ -0.1822 + 0.4043i & -0.4890 + 0.0000i \end{pmatrix}$$

$$W18 = \begin{pmatrix} -0.4322 + 0.0000i & -0.0599 - 0.1630i \\ -0.0599 + 0.1630i & -0.8677 - 0.0000i \end{pmatrix}$$

$$W19 = \begin{pmatrix} -0.1892 + 0.0000i & -0.0347 + 0.2421i \\ -0.0347 - 0.2421i & -0.9190 + 0.0000i \end{pmatrix}$$

$$W20 = \begin{pmatrix} -0.7692 + 0.0000i & -0.2773 - 0.2631i \\ -0.2773 + 0.2631i & -0.3408 - 0.0000i \end{pmatrix}$$

$$W21 = \begin{pmatrix} -0.5073 + 0.0000i & -0.2619 - 0.2961i \\ -0.2619 + 0.2961i & -0.6558 - 0.0000i \end{pmatrix}$$

$$W22 = \begin{pmatrix} -0.5943 - 0.0000i & -0.1117 + 0.4281i \\ -0.1117 - 0.4281i & -0.5053 - 0.0000i \end{pmatrix}$$

$$W23 = \begin{pmatrix} -0.5529 - 0.0000i & 0.4203 + 0.1188i \\ 0.4203 - 0.1188i & -0.5593 - 0.0000i \end{pmatrix}$$

$$W24 = \begin{pmatrix} -0.5914 - 0.0000i & 0.3020 + 0.3157i \\ 0.3020 - 0.3157i & -0.5181 + 0.0000i \end{pmatrix}$$

$$W25 = \begin{pmatrix} -0.7064 - 0.0000i & 0.0378 - 0.2555i \\ 0.0378 + 0.2555i & -0.6062 - 0.0000i \end{pmatrix}$$

$$W26 = \begin{pmatrix} -0.7620 - 0.0000i & 0.1765 - 0.3506i \\ 0.1765 + 0.3506i & -0.3333 - 0.0000i \end{pmatrix}$$

$$W27 = \begin{pmatrix} -0.5062 - 0.0000i & 0.2144 + 0.0895i \\ 0.2144 - 0.0895i & -0.7974 - 0.0000i \end{pmatrix}$$

$$W28 = \begin{pmatrix} -0.2943 - 0.0000i & 0.3592 + 0.0771i \\ 0.3592 - 0.0771i & -0.8021 + 0.0000i \end{pmatrix}$$

$$W29 = \begin{pmatrix} -0.9097 + 0.0000i & 0.2126 + 0.1494i \\ 0.2126 - 0.1494i & -0.1933 - 0.0000i \end{pmatrix}$$

$$W30 = \begin{pmatrix} -0.3651 - 0.0000i & -0.3442 - 0.1809i \\ -0.3442 + 0.1809i & -0.7512 - 0.0000i \end{pmatrix}$$

$$W31 = \begin{pmatrix} -0.2328 - 0.0000i & 0.2246 - 0.2508i \\ 0.2246 + 0.2508i & -0.8480 - 0.0000i \end{pmatrix}$$

$$W32 = \begin{pmatrix} -0.6075 + 0.0000i & -0.2735 + 0.3161i \\ -0.2735 - 0.3161i & -0.5307 - 0.0000i \end{pmatrix}$$

$$W33 = \begin{pmatrix} -0.8075 - 0.0000i & 0.1164 + 0.3458i \\ 0.1164 - 0.3458i & -0.2857 + 0.0000i \end{pmatrix}$$

$$W34 = \begin{pmatrix} -0.9359 + 0.0000i & 0.0574 - 0.2127i \\ 0.0574 + 0.2127i & -0.1643 - 0.0000i \end{pmatrix}$$

$$W35 = \begin{pmatrix} -0.5104 - 0.0000i & 0.1607 - 0.1848i \\ 0.1607 + 0.1848i & -0.7871 + 0.0000i \end{pmatrix}$$

$$W36 = \begin{pmatrix} -0.6059 - 0.0000i & -0.0408 + 0.2285i \\ -0.0408 - 0.2285i & -0.7247 + 0.0000i \end{pmatrix}$$

$$W37 = \begin{pmatrix} -0.2836 + 0.0000i & 0.0485 - 0.3366i \\ 0.0485 + 0.3366i & -0.8297 + 0.0000i \end{pmatrix}$$

| W38 = | |
|---|---|
| −0.4461 − 0.0000i | 0.1601 − 0.3888i |
| 0.1601 + 0.3888i | −0.6688 − 0.0000i |

| W39 = | |
|---|---|
| −0.7759 + 0.0000i | −0.2816 + 0.2631i |
| −0.2816 − 0.2631i | −0.3177 − 0.0000i |

| W40 = | |
|---|---|
| −0.6506 − 0.0000i | −0.3957 + 0.1424i |
| −0.3957 − 0.1424i | −0.4722 − 0.0000i |

| W41 = | |
|---|---|
| −0.1847 − 0.0000i | −0.2391 − 0.0675i |
| −0.2391 + 0.0675i | −0.9178 − 0.0000i |

| W42 = | |
|---|---|
| −0.5379 + 0.0000i | 0.3221 − 0.2873i |
| 0.3221 + 0.2873i | −0.5814 − 0.0000i |

| W43 = | |
|---|---|
| −0.8241 − 0.0000i | −0.0710 − 0.3386i |
| −0.0710 + 0.3386i | −0.2854 − 0.0000i |

| W44 = | |
|---|---|
| −0.2590 + 0.0000i | −0.1623 − 0.3087i |
| −0.1623 + 0.3087i | −0.8305 − 0.0000i |

| W45 = | |
|---|---|
| −0.3227 + 0.0000i | 0.1162 + 0.3337i |
| 0.1162 − 0.3337i | −0.8039 − 0.0000i |

| W46 = | |
|---|---|
| −0.1730 + 0.0000i | 0.1632 + 0.1707i |
| 0.1632 − 0.1707i | −0.9266 − 0.0000i |

| W47 = | |
|---|---|
| −0.6203 + 0.0000i | −0.3887 − 0.1922i |
| −0.3887 + 0.1922i | −0.4890 − 0.0000i |

| W48 = | |
|---|---|
| −0.6316 − 0.0000i | 0.0692 − 0.4335i |
| 0.0692 + 0.4335i | −0.4644 − 0.0000i |

| W49 = | |
|---|---|
| −0.7547 − 0.0000i | 0.3083 − 0.2100i |
| 0.3083 + 0.2100i | −0.3899 + 0.0000i |

| W50 = | |
|---|---|
| −0.1737 + 0.0000i | 0.1928 − 0.0395i |
| 0.1928 + 0.0395i | −0.9447 + 0.0000i |

| W51 = | |
|---|---|
| −0.4166 + 0.0000i | 0.0066 + 0.0791i |
| 0.0066 − 0.0791i | −0.9022 − 0.0000i |

| W52 = | |
|---|---|
| −0.3842 + 0.0000i | 0.3031 + 0.2728i |
| 0.3031 − 0.2728i | −0.7209 − 0.0000i |

| W53 = | |
|---|---|
| −0.8948 + 0.0000i | 0.1121 − 0.0191i |
| 0.1121 + 0.0191i | −0.4165 − 0.0000i |

| W54 = | |
|---|---|
| −0.7412 − 0.0000i | 0.3973 − 0.0375i |
| 0.3973 + 0.0375i | −0.3635 − 0.0000i |

| W55 = | |
|---|---|
| −0.4121 − 0.0000i | −0.3677 + 0.1983i |
| −0.3677 − 0.1983i | −0.6937 + 0.0000i |

| W56 = | |
|---|---|
| −0.5982 − 0.0000i | −0.2200 + 0.0295i |
| −0.2200 − 0.0295i | −0.7374 − 0.0000i |

| W57 = | |
|---|---|
| −0.9091 + 0.0000i | −0.2427 + 0.1056i |
| −0.2427 − 0.1056i | −0.1829 + 0.0000i |

| W58 = | |
|---|---|
| −0.1475 − 0.0000i | 0.0030 − 0.1891i |
| 0.0030 + 0.1891i | −0.9522 − 0.0000i |

| W59 = | |
|---|---|
| −0.5033 − 0.0000i | 0.4278 − 0.0873i |
| 0.4278 + 0.0873i | −0.6045 − 0.0000i |

| W60 = | |
|---|---|
| −0.4658 − 0.0000i | −0.0703 − 0.4030i |
| −0.0703 + 0.4030i | −0.6696 − 0.0000i |

| W61 = | |
|---|---|
| −0.7433 − 0.0000i | 0.3533 + 0.1825i |
| 0.3533 − 0.1825i | −0.3621 − 0.0000i |

| W62 = | |
|---|---|
| −0.6377 − 0.0000i | 0.1127 + 0.4146i |
| 0.1127 − 0.4146i | −0.4735 − 0.0000i |

| W63 = | |
|---|---|
| −0.3200 − 0.0000i | −0.3751 + 0.0192i |
| −0.3751 − 0.0192i | −0.7845 − 0.0000i |

| W64 = | |
|---|---|
| −0.7756 − 0.0000i | −0.3776 − 0.0384i |
| −0.3776 + 0.0384i | −0.3320 + 0.0000i |

6) When Nt=4, Nr=2, and B=2:

| W1 = | | | |
|---|---|---|---|
| −0.5493 + 0.0000i | −0.1031 + 0.0361i | −0.0282 + 0.0124i | −0.1482 − 0.1605i |
| −0.1031 − 0.0361i | −0.3785 − 0.0000i | −0.0256 + 0.0146i | −0.0337 − 0.1004i |
| −0.0282 − 0.0124i | −0.0256 − 0.0146i | −0.3532 − 0.0000i | −0.0076 − 0.0387i |
| −0.1482 + 0.1605i | −0.0337 + 0.1004i | −0.0076 + 0.0387i | −0.5308 − 0.0000i |

| W2 = | | | |
|---|---|---|---|
| −0.4543 − 0.0000i | −0.0324 − 0.0848i | 0.1219 + 0.0668i | 0.0495 + 0.1013i |
| −0.0324 + 0.0848i | −0.4165 − 0.0000i | 0.1041 − 0.0483i | 0.1058 + 0.0077i |
| 0.1219 − 0.0668i | 0.1041 + 0.0483i | −0.4991 − 0.0000i | −0.1278 − 0.0773i |
| 0.0495 − 0.1013i | 0.1058 − 0.0077i | −0.1278 + 0.07731 | −0.4439 − 0.0000i |

| W3 = | | | |
|---|---|---|---|
| −0.4281 − 0.0000i | 0.0512 − 0.0208i | −0.1132 − 0.1217i | 0.0438 + 0.0841i |
| 0.0512 + 0.0208i | −0.3743 + 0.0000i | 0.0409 + 0.0919i | 0.0021 − 0.0543i |
| −0.1132 + 0.1217i | 0.0409 − 0.0919i | −0.5822 − 0.0000i | 0.1454 + 0.0519i |
| 0.0438 − 0.0841i | 0.0021 + 0.0543i | 0.1454 − 0.0519i | −0.4295 + 0.0000i |

-continued

| W4 = | | | |
|---|---|---|---|
| −0.3679 + 0.0000i | 0.0773 + 0.0558i | 0.0144 + 0.0460i | 0.0411 − 0.0249i |
| 0.0773 − 0.0558i | −0.6491 + 0.0000i | −0.1232 − 0.0627i | −0.0850 + 0.1406i |
| 0.0144 − 0.0460i | −0.1232 + 0.0627i | −0.3942 + 0.0000i | −0.0129 + 0.0671i |
| 0.0411 + 0.0249i | −0.0850 − 0.1406i | −0.0129 − 0.0671i | −0.3986 − 0.0000i |

7) When Nt=4, Nr=2, and B=3:

| W1 = | | | |
|---|---|---|---|
| −0.3701 − 0.0000i | −0.0496 − 0.1926i | −0.0049 + 0.0630i | 0.0060 + 0.0774i |
| −0.0496 + 0.1926i | −0.6864 + 0.0000i | 0.1027 + 0.0691i | 0.1339 + 0.0224i |
| −0.0049 − 0.0630i | 0.1027 − 0.0691i | −0.3185 + 0.0000i | −0.0475 + 0.0115i |
| 0.0060 − 0.0774i | 0.1339 − 0.0224i | −0.0475 − 0.0115i | −0.3450 + 0.0000i |

| W2 = | | | |
|---|---|---|---|
| −0.6237 + 0.0000i | 0.1225 + 0.0218i | −0.1176 + 0.2280i | 0.0034 − 0.0857i |
| 0.1225 − 0.0218i | −0.3197 + 0.0000i | 0.0247 − 0.0803i | 0.0158 + 0.0256i |
| −0.1176 − 0.2280i | 0.0247 + 0.0803i | −0.4714 + 0.0000i | 0.0425 − 0.0319i |
| 0.0034 + 0.0857i | 0.0158 − 0.0256i | 0.0425 + 0.0319i | −0.2961 + 0.0000i |

| W3 = | | | |
|---|---|---|---|
| −0.4332 + 0.0000i | 0.0146 − 0.0879i | −0.1872 − 0.1575i | −0.0991 − 0.0368i |
| 0.0146 + 0.0879i | −0.3049 − 0.0000i | −0.0547 + 0.1051i | −0.0112 + 0.0478i |
| −0.1872 + 0.1575i | −0.0547 − 0.1051i | −0.6026 − 0.0000i | −0.1285 + 0.0435i |
| −0.0991 + 0.0368i | −0.0112 − 0.0478i | −0.1285 − 0.0435i | −0.3585 − 0.0000i |

| W4 = | | | |
|---|---|---|---|
| −0.3931 − 0.0000i | −0.1322 + 0.1680i | −0.0620 + 0.0779i | −0.0474 + 0.0831i |
| −0.1322 − 0.1680i | −0.5969 + 0.0000i | −0.1565 − 0.0316i | −0.1312 − 0.0070i |
| −0.0620 − 0.0779i | −0.1565 + 0.0316i | −0.3605 + 0.0000i | −0.0757 + 0.0060i |
| −0.0474 − 0.0831i | −0.1312 + 0.0070i | −0.0757 − 0.0060i | −0.3643 + 0.0000i |

| W5 = | | | |
|---|---|---|---|
| −0.5682 + 0.0000i | −0.0285 + 0.0633i | 0.2161 − 0.0349i | 0.1774 − 0.0866i |
| −0.0285 − 0.0633i | −0.3055 − 0.0000i | 0.0070 + 0.0344i | 0.0319 + 0.0184i |
| 0.2161 + 0.0349i | 0.0070 − 0.0344i | −0.4232 − 0.0000i | −0.1391 + 0.0362i |
| 0.1774 + 0.0866i | 0.0319 − 0.0184i | −0.1391 − 0.0362i | −0.4181 − 0.0000i |

| W6 = | | | |
|---|---|---|---|
| −0.3340 − 0.0000i | 0.0817 − 0.0612i | −0.0356 − 0.0165i | 0.1549 − 0.0134i |
| 0.0817 + 0.0612i | −0.4153 + 0.0000i | 0.0336 + 0.0293i | −0.1992 − 0.1130i |
| −0.0356 + 0.0165i | 0.0336 − 0.0293i | −0.3044 − 0.0000i | 0.0621 − 0.0322i |
| 0.1549 + 0.0134i | −0.1992 + 0.1130i | 0.0621 + 0.0322i | −0.6575 + 0.0000i |

| W7 = | | | |
|---|---|---|---|
| −0.4002 − 0.0000i | 0.0710 + 0.0856i | 0.0989 − 0.0278i | −0.1996 − 0.0100i |
| 0.0710 − 0.0856i | −0.3758 − 0.0000i | −0.0249 + 0.0953i | 0.1144 − 0.1018i |
| 0.0989 + 0.0278i | −0.0249 − 0.0953i | −0.3681 + 0.0000i | 0.1401 + 0.0749i |
| −0.1996 + 0.0100i | 0.1144 + 0.1018i | 0.1401 − 0.0749i | −0.5662 + 0.0000i |

| W8 = | | | |
|---|---|---|---|
| −0.3134 + 0.0000i | −0.0628 − 0.0033i | 0.0440 − 0.1106i | 0.0111 + 0.0576i |
| −0.0628 + 0.0033i | −0.4047 + 0.0000i | 0.0544 − 0.2010i | 0.0320 + 0.09321 |
| 0.0440 + 0.1106i | 0.0544 + 0.2010i | −0.6045 − 0.0000i | 0.1506 − 0.1112i |
| 0.0111 − 0.0576i | 0.0320 − 0.0932i | 0.1506 + 0.1112i | −0.3913 − 0.0000i |

8) When Nt=4, Nr=2, and B=4:

| W1 = | | | |
|---|---|---|---|
| −0.3619 + 0.0000i | 0.0330 − 0.0459i | 0.0086 − 0.0784i | −0.2117 + 0.1303i |
| 0.0330 + 0.0459i | −0.2544 − 0.0000i | −0.0367 + 0.0216i | 0.0945 + 0.0395i |
| 0.0086 + 0.0784i | −0.0367 − 0.0216i | −0.2781 − 0.0000i | 0.1043 + 0.1147i |
| −0.2117 − 0.1303i | 0.0945 − 0.0395i | 0.1043 − 0.1147i | −0.7155 − 0.0000i |

| W2 = | | | |
|---|---|---|---|
| −0.3482 − 0.0000i | −0.0761 − 0.0722i | 0.1279 + 0.1056i | −0.0431 + 0.1485i |
| −0.0761 + 0.0722i | −0.3271 − 0.0000i | 0.1600 − 0.0194i | 0.0567 + 0.1320i |

| | | | |
|---|---|---|---|
| 0.1279 − 0.1056i | 0.1600 + 0.0194i | −0.4808 + 0.0000i | −0.0932 − 0.2279i |
| −0.0431 − 0.1485i | 0.0567 − 0.1320i | −0.0932 + 0.2279i | −0.4485 + 0.0000i |

W3 =

| | | | |
|---|---|---|---|
| −0.5400 + 0.0000i | 0.0227 + 0.0928i | −0.1038 − 0.0054i | 0.3001 + 0.0448i |
| 0.0227 − 0.0928i | −0.2679 − 0.0000i | 0.0136 − 0.0452i | −0.0438 + 0.1008i |
| −0.1038 + 0.0054i | 0.0136 + 0.0452i | −0.2826 − 0.0000i | 0.1035 + 0.0049i |
| 0.3001 − 0.0448i | −0.0438 − 0.1008i | 0.1035 − 0.0049i | −0.5316 − 0.0000i |

W4 =

| | | | |
|---|---|---|---|
| −0.4010 + 0.0000i | −0.0946 − 0.2070i | −0.1189 + 0.1145i | 0.0579 + 0.0356i |
| −0.0946 + 0.2070i | −0.5647 − 0.0000i | 0.1010 + 0.2073i | 0.0682 − 0.0524i |
| −0.1189 − 0.1145i | 0.1010 − 0.2073i | −0.3988 − 0.0000i | 0.0271 + 0.0552i |
| 0.0579 − 0.0356i | 0.0682 + 0.0524i | 0.0271 − 0.0552i | −0.2555 − 0.0000i |

W5 =

| | | | |
|---|---|---|---|
| −0.2934 + 0.0000i | −0.0247 + 0.1425i | 0.0511 − 0.0008i | −0.0495 + 0.0900i |
| −0.0247 − 0.1425i | −0.5505 − 0.0000i | 0.0506 + 0.1248i | −0.2836 − 0.0785i |
| 0.0511 + 0.0008i | 0.0506 − 0.1248i | −0.2870 − 0.0000i | 0.0724 − 0.0914i |
| −0.0495 − 0.0900i | −0.2836 + 0.0785i | 0.0724 + 0.0914i | −0.4731 + 0.0000i |

W6 =

| | | | |
|---|---|---|---|
| −0.2910 − 0.0000i | 0.0055 + 0.0470i | −0.0277 + 0.1407i | 0.0536 + 0.0677i |
| 0.0055 − 0.0470i | −0.2776 − 0.0000i | −0.1368 − 0.0168i | −0.0607 + 0.0601i |
| −0.0277 − 0.1407i | −0.1368 + 0.0168i | −0.6293 + 0.0000i | −0.1567 + 0.2323i |
| 0.0536 − 0.0677i | −0.0607 − 0.0601i | −0.1567 − 0.2323i | −0.4149 + 0.0000i |

W7 =

| | | | |
|---|---|---|---|
| −0.5727 − 0.0000i | 0.2497 + 0.0541i | −0.1629 + 0.0846i | −0.0915 + 0.0325i |
| 0.2497 − 0.0541i | −0.4483 − 0.0000i | 0.1198 − 0.0989i | 0.0750 − 0.0538i |
| −0.1629 − 0.0846i | 0.1198 + 0.0989i | −0.3398 − 0.0000i | −0.0712 − 0.0079i |
| −0.0915 − 0.0325i | 0.0750 + 0.0538i | −0.0712 + 0.0079i | −0.2513 + 0.0000i |

W8 =

| | | | |
|---|---|---|---|
| −0.2652 − 0.0000i | −0.0682 − 0.0294i | 0.0392 − 0.0148i | 0.0923 − 0.0768i |
| −0.0682 + 0.0294i | −0.4034 − 0.0000i | 0.0542 − 0.0849i | 0.0518 − 0.2750i |
| 0.0392 + 0.0148i | 0.0542 + 0.0849i | −0.2820 − 0.0000i | −0.1260 + 0.0561i |
| 0.0923 + 0.0768i | 0.0518 + 0.2750i | −0.1260 − 0.0561i | −0.6550 + 0.0000i |

W9 =

| | | | |
|---|---|---|---|
| −0.5266 − 0.0000i | −0.2797 + 0.0184i | −0.1254 − 0.1101i | −0.0928 + 0.0452i |
| −0.2797 − 0.0184i | −0.4946 + 0.0000i | −0.1135 − 0.1162i | −0.0793 + 0.0388i |
| −0.1254 + 0.1101i | −0.1135 + 0.1162i | −0.3088 + 0.0000i | −0.0315 + 0.0407i |
| −0.0928 − 0.0452i | −0.0793 − 0.0388i | −0.0315 − 0.0407i | −0.2737 + 0.0000i |

W10 =

| | | | |
|---|---|---|---|
| −0.3654 + 0.0000i | 0.0147 + 0.0510i | −0.0141 − 0.2740i | 0.0149 + 0.0321i |
| 0.0147 − 0.0510i | −0.2694 − 0.0000i | 0.0970 + 0.0497i | 0.0033 − 0.0133i |
| −0.0141 + 0.2740i | 0.0970 − 0.0497i | −0.7399 − 0.0000i | 0.0621 + 0.0122i |
| 0.0149 − 0.0321i | 0.0033 + 0.0133i | 0.0621 − 0.0122i | −0.2359 − 0.0000i |

W11 =

| | | | |
|---|---|---|---|
| −0.5102 + 0.0000i | 0.1691 − 0.1568i | 0.1296 − 0.1145i | 0.1019 + 0.1056i |
| 0.1691 + 0.1568i | −0.4611 − 0.0000i | −0.1698 + 0.0031i | −0.0109 − 0.1344i |
| 0.1296 + 0.1145i | −0.1698 − 0.0031i | −0.3307 − 0.0000i | −0.0074 − 0.0954i |
| 0.1019 − 0.1056i | −0.0109 + 0.1344i | −0.0074 + 0.0954i | −0.3101 − 0.0000i |

W12 =

| | | | |
|---|---|---|---|
| −0.2620 − 0.0000i | 0.0549 + 0.1234i | 0.0345 − 0.0104i | 0.0253 − 0.0716i |
| 0.0549 − 0.1234i | −0.7260 − 0.0000i | −0.0339 + 0.0882i | 0.2057 + 0.1527i |
| 0.0345 + 0.0104i | −0.0339 − 0.0882i | −0.2598 − 0.0000i | −0.0155 + 0.0529i |
| 0.0253 + 0.0716i | 0.2057 − 0.1527i | −0.0155 − 0.0529i | −0.3619 + 0.0000i |

W13 =

| | | | |
|---|---|---|---|
| −0.6582 − 0.0000i | −0.1013 + 0.0996i | 0.2339 + 0.1128i | −0.0059 − 0.1294i |
| −0.1013 − 0.0996i | −0.2839 + 0.0000i | 0.0389 + 0.0874i | 0.0301 − 0.0409i |
| 0.2339 − 0.1128i | 0.0389 − 0.0874i | −0.4002 + 0.0000i | 0.0481 + 0.0730i |
| −0.0059 + 0.1294i | 0.0301 + 0.0409i | 0.0481 − 0.0730i | −0.2801 + 0.0000i |

W14 =

| | | | |
|---|---|---|---|
| −0.4209 + 0.0000i | 0.0693 − 0.0953i | −0.0923 − 0.1210i | −0.0599 − 0.2232i |
| 0.0693 + 0.0953i | −0.3079 − 0.0000i | −0.0242 + 0.1000i | −0.1081 + 0.1179i |
| −0.0923 + 0.1210i | −0.0242 − 0.1000i | −0.3654 − 0.0000i | −0.1695 − 0.0791i |
| −0.0599 + 0.2232i | −0.1081 − 0.1179i | −0.1695 + 0.0791i | −0.5208 − 0.0000i |

W15 =

| | | | |
|---|---|---|---|
| −0.2810 + 0.0000i | 0.0004 − 0.1137i | 0.1097 + 0.0270i | −0.0435 − 0.0572i |
| 0.0004 + 0.1137i | −0.5332 − 0.0000i | 0.0599 − 0.2616i | −0.1187 + 0.0957i |
| 0.1097 − 0.0270i | 0.0599 + 0.2616i | −0.4805 − 0.0000i | 0.1302 + 0.0850i |
| −0.0435 + 0.0572i | −0.1187 − 0.0957i | 0.1302 − 0.0850i | −0.3244 − 0.0000i |

-continued

| W16 = | | | |
|---|---|---|---|
| −0.2973 − 0.0000i | −0.0197 + 0.0575i | −0.0863 + 0.1260i | −0.0476 − 0.1078i |
| −0.0197 − 0.0575i | −0.2987 + 0.0000i | −0.1506 − 0.0355i | 0.0703 − 0.0855i |
| −0.0863 − 0.1260i | −0.1506 + 0.0355i | −0.5957 + 0.0000i | 0.1411 − 0.2151i |
| −0.0476 + 0.1078i | 0.0703 + 0.0855i | 0.1411 + 0.2151i | −0.4255 + 0.0000i |

9) When Nt=4, Nr=2, and B=5:

| W1 = | | | |
|---|---|---|---|
| −0.2754 + 0.0000i | −0.0299 − 0.1255i | 0.1664 + 0.0743i | 0.0582 − 0.0738i |
| −0.0299 + 0.1255i | −0.3822 − 0.0000i | 0.1105 − 0.2191i | −0.0861 − 0.0857i |
| 0.1664 − 0.0743i | 0.1105 + 0.2191i | −0.6056 − 0.0000i | −0.0468 + 0.1731i |
| 0.0582 + 0.0738i | −0.0861 + 0.0857i | −0.0468 − 0.1731i | −0.2822 + 0.0000i |

| W2 = | | | |
|---|---|---|---|
| −0.2563 − 0.0000i | −0.0765 + 0.0609i | 0.1159 − 0.0697i | 0.0830 − 0.0527i |
| −0.0765 − 0.0609i | −0.3663 − 0.0000i | 0.2246 + 0.0142i | 0.1764 + 0.0084i |
| 0.1159 + 0.0697i | 0.2246 − 0.0142i | −0.5430 + 0.0000i | −0.2434 − 0.0269i |
| 0.0830 + 0.0527i | 0.1764 − 0.0084i | −0.2434 + 0.0269i | −0.3830 + 0.0000i |

| W3 = | | | |
|---|---|---|---|
| −0.4780 − 0.0000i | −0.1213 + 0.0521i | −0.2056 + 0.1839i | 0.1470 − 0.0959i |
| −0.1213 − 0.0521i | −0.2641 − 0.0000i | −0.1417 + 0.0391i | 0.0898 − 0.0195i |
| −0.2056 − 0.1839i | −0.1417 − 0.0391i | −0.4858 + 0.0000i | 0.1752 + 0.0200i |
| 0.1470 + 0.0959i | 0.0898 + 0.0195i | 0.1752 − 0.0200i | −0.3080 + 0.0000i |

| W4 = | | | |
|---|---|---|---|
| −0.7030 + 0.0000i | 0.1723 + 0.2485i | 0.0426 − 0.1463i | −0.0419 − 0.0231i |
| 0.1723 − 0.2485i | −0.3836 − 0.0000i | 0.0533 + 0.0784i | 0.0218 − 0.0029i |
| 0.0426 + 0.1463i | 0.0533 − 0.0784i | −0.2634 − 0.0000i | −0.0025 + 0.0028i |
| −0.0419 + 0.0231i | 0.0218 + 0.0029i | −0.0025 − 0.0028i | −0.1907 − 0.0000i |

| W5 = | | | |
|---|---|---|---|
| −0.3151 − 0.0000i | −0.0588 − 0.2430i | 0.0425 + 0.0272i | 0.0035 + 0.0937i |
| −0.0588 + 0.2430i | −0.7147 + 0.0000i | 0.0787 − 0.0609i | 0.1951 + 0.0661i |
| 0.0425 − 0.0272i | 0.0787 + 0.0609i | −0.2130 − 0.0000i | −0.0251 − 0.0322i |
| 0.0035 − 0.0937i | 0.1951 − 0.0661i | −0.0251 + 0.0322i | −0.2980 − 0.0000i |

| W6 = | | | |
|---|---|---|---|
| −0.3942 + 0.0000i | 0.0957 − 0.1592i | −0.1050 − 0.0474i | 0.1828 − 0.1268i |
| 0.0957 + 0.1592i | −0.4058 − 0.0000i | 0.0269 + 0.1300i | −0.2090 − 0.1031i |
| −0.1050 + 0.0474i | 0.0269 − 0.1300i | −0.2922 − 0.0000i | 0.0898 − 0.1165i |
| 0.1828 + 0.1268i | −0.2090 + 0.1031i | 0.0898 + 0.1165i | −0.4614 + 0.0000i |

| W7 = | | | |
|---|---|---|---|
| −0.2298 − 0.0000i | 0.0701 + 0.0328i | −0.0007 − 0.0778i | −0.0667 + 0.0217i |
| 0.0701 − 0.0328i | −0.4401 − 0.0000i | 0.1814 + 0.1703i | 0.0834 − 0.2009i |
| −0.0007 + 0.0778i | 0.1814 − 0.1703i | −0.4797 − 0.0000i | 0.0810 + 0.2162i |
| −0.0667 − 0.0217i | 0.0834 + 0.2009i | 0.0810 − 0.2162i | −0.4055 + 0.0000i |

| W8 = | | | |
|---|---|---|---|
| −0.4640 − 0.0000i | 0.0814 − 0.0066i | 0.0203 + 0.2851i | −0.1712 + 0.1040i |
| 0.0814 + 0.0066i | −0.2377 − 0.0000i | 0.0111 − 0.0850i | 0.0592 − 0.0166i |
| 0.0203 − 0.2851i | 0.0111 + 0.0850i | −0.4790 + 0.0000i | −0.0880 − 0.1850i |
| −0.1712 − 0.1040i | 0.0592 + 0.0166i | −0.0880 + 0.1850i | −0.3681 − 0.0000i |

| W9 = | | | |
|---|---|---|---|
| −0.4214 − 0.0000i | −0.2023 + 0.0784i | 0.0860 + 0.0797i | −0.1971 − 0.1040i |
| −0.2023 − 0.0784i | −0.4250 − 0.0000i | 0.0545 + 0.1002i | −0.1507 − 0.1649i |
| 0.0860 − 0.0797i | 0.0545 − 0.1002i | −0.2664 − 0.0000i | 0.1030 − 0.0355i |
| −0.1971 + 0.1040i | −0.1507 + 0.1649i | 0.1030 + 0.0355i | −0.4477 + 0.0000i |

| W10 = | | | |
|---|---|---|---|
| −0.4772 − 0.0000i | −0.2506 + 0.0655i | −0.1106 − 0.2128i | −0.0705 − 0.0688i |
| −0.2506 − 0.0655i | −0.4425 − 0.0000i | −0.0216 + 0.1979i | −0.0265 − 0.0711i |
| −0.1106 + 0.2128i | −0.0216 + 0.1979i | −0.3906 − 0.0000i | −0.0799 + 0.0253i |
| −0.0705 + 0.0688i | −0.0265 + 0.0711i | −0.0799 − 0.0253i | −0.2246 − 0.0000i |

| W11 = | | | |
|---|---|---|---|
| −0.4226 − 0.0000i | 0.0585 − 0.0148i | −0.1285 − 0.0776i | −0.1901 − 0.2038i |
| 0.0585 + 0.0148i | −0.2259 + 0.0000i | 0.0461 + 0.0309i | 0.0459 + 0.0745i |

-continued

| | | | |
|---|---|---|---|
| −0.1285 + 0.0776i | 0.0461 − 0.0309i | −0.2819 + 0.0000i | −0.1874 − 0.0882i |
| −0.1901 + 0.2038i | 0.0459 − 0.0745i | −0.1874 + 0.0882i | −0.6131 + 0.0000i |

W12 =

| | | | |
|---|---|---|---|
| −0.1750 + 0.0000i | 0.0251 − 0.0383i | 0.0228 − 0.0098i | 0.0120 + 0.0379i |
| 0.0251 + 0.0383i | −0.4643 − 0.0000i | −0.1357 − 0.1082i | 0.1771 − 0.2563i |
| 0.0228 + 0.0098i | −0.1357 + 0.1082i | −0.3283 − 0.0000i | −0.0165 − 0.1955i |
| 0.0120 − 0.0379i | 0.1771 + 0.2563i | −0.0165 + 0.1955i | −0.5533 − 0.0000i |

W13 =

| | | | |
|---|---|---|---|
| −0.2434 − 0.0000i | −0.0132 + 0.0159i | −0.0051 + 0.0108i | 0.1692 + 0.0109i |
| −0.0132 − 0.0159i | −0.1984 + 0.0000i | 0.0068 + 0.0008i | −0.0002 + 0.0062i |
| −0.0051 − 0.0108i | 0.0068 − 0.0008i | −0.2137 + 0.0000i | 0.0002 + 0.0802i |
| 0.1692 − 0.0109i | −0.0002 − 0.0062i | 0.0002 − 0.0802i | −0.8855 + 0.0000i |

W14 =

| | | | |
|---|---|---|---|
| −0.6632 + 0.0000i | −0.0866 − 0.2617i | −0.1276 + 0.1286i | −0.1115 + 0.0363i |
| −0.0866 + 0.2617i | −0.3694 − 0.0000i | 0.0726 + 0.1092i | 0.0035 + 0.0572i |
| −0.1276 − 0.1286i | 0.0726 − 0.1092i | −0.2925 − 0.0000i | −0.0289 − 0.0130i |
| −0.1115 − 0.0363i | 0.0035 − 0.0572i | −0.0289 + 0.0130i | −0.2238 + 0.0000i |

W15 =

| | | | |
|---|---|---|---|
| −0.4884 + 0.0000i | 0.2103 + 0.0543i | −0.2498 + 0.1398i | 0.0377 + 0.0573i |
| 0.2103 − 0.0543i | −0.3683 − 0.0000i | 0.1642 − 0.1328i | −0.0360 − 0.0430i |
| −0.2498 − 0.1398i | 0.1642 + 0.1328i | −0.4463 − 0.0000i | −0.0066 + 0.0683i |
| 0.0377 − 0.0573i | −0.0360 + 0.0430i | −0.0066 − 0.0683i | −0.2326 − 0.0000i |

W16 =

| | | | |
|---|---|---|---|
| −0.3103 − 0.0000i | 0.0559 + 0.1875i | −0.0833 + 0.0198i | 0.0408 − 0.1572i |
| 0.0559 − 0.1875i | −0.5042 + 0.0000i | −0.0030 − 0.1368i | 0.2421 + 0.1401i |
| −0.0833 − 0.0198i | −0.0030 + 0.1368i | −0.2652 + 0.0000i | 0.0672 − 0.1122i |
| 0.0408 + 0.1572i | 0.2421 − 0.1401i | 0.0672 + 0.1122i | −0.4549 + 0.0000i |

W17 =

| | | | |
|---|---|---|---|
| −0.5210 − 0.0000i | −0.1726 + 0.1368i | −0.0026 + 0.1127i | 0.1055 + 0.2408i |
| −0.1726 − 0.1368i | −0.3640 − 0.0000i | −0.0603 + 0.0634i | −0.0576 + 0.1677i |
| −0.0026 − 0.1127i | −0.0603 − 0.0634i | −0.2424 + 0.0000i | −0.1008 + 0.0381i |
| 0.1055 − 0.2408i | −0.0576 − 0.1677i | −0.1008 − 0.0381i | −0.4186 + 0.0000i |

W18 =

| | | | |
|---|---|---|---|
| −0.2081 − 0.0000i | −0.0202 + 0.0576i | 0.0156 − 0.0258i | 0.0115 + 0.0454i |
| −0.0202 − 0.0576i | −0.5510 + 0.0000i | 0.1837 − 0.0208i | −0.2044 + 0.2567i |
| 0.0156 + 0.0258i | 0.1837 + 0.0208i | −0.2801 − 0.0000i | 0.0947 − 0.1104i |
| 0.0115 − 0.0454i | −0.2044 − 0.2567i | 0.0947 + 0.1104i | −0.4846 − 0.0000i |

W19 =

| | | | |
|---|---|---|---|
| −0.3199 + 0.0000i | 0.0132 + 0.0573i | −0.1434 − 0.1923i | 0.0601 + 0.0970i |
| 0.0132 − 0.0573i | −0.2175 − 0.0000i | 0.1013 − 0.0372i | −0.0640 + 0.0142i |
| −0.1434 + 0.1923i | 0.1013 + 0.0372i | −0.6851 + 0.0000i | 0.2299 + 0.0204i |
| 0.0601 − 0.0970i | −0.0640 − 0.0142i | 0.2299 − 0.0204i | −0.3075 − 0.0000i |

W20 =

| | | | |
|---|---|---|---|
| −0.1893 + 0.0000i | −0.0134 − 0.0033i | −0.0056 + 0.0007i | −0.0046 + 0.0241i |
| −0.0134 + 0.0033i | −0.4036 − 0.0000i | −0.1966 − 0.1275i | 0.0274 + 0.2235i |
| −0.0056 − 0.0007i | −0.1966 + 0.1275i | −0.4692 + 0.0000i | 0.1902 + 0.2016i |
| −0.0046 − 0.0241i | 0.0274 − 0.2235i | 0.1902 − 0.2016i | −0.4632 + 0.0000i |

W21 =

| | | | |
|---|---|---|---|
| −0.4013 + 0.0000i | 0.1285 + 0.0953i | 0.2471 + 0.1043i | 0.0937 + 0.0002i |
| 0.1285 − 0.0953i | −0.3325 − 0.0000i | −0.2066 + 0.0576i | −0.0491 + 0.0298i |
| 0.2471 − 0.1043i | −0.2066 − 0.0576i | −0.5696 + 0.0000i | −0.1017 + 0.0620i |
| 0.0937 − 0.0002i | −0.0491 − 0.0298i | −0.1017 − 0.0620i | −0.2536 − 0.0000i |

W22 =

| | | | |
|---|---|---|---|
| −0.3218 − 0.0000i | −0.0359 − 0.0003i | −0.1824 − 0.0063i | −0.1368 + 0.1483i |
| −0.0359 + 0.0003i | −0.1884 + 0.0000i | −0.0412 − 0.0129i | −0.0482 + 0.0248i |
| −0.1824 + 0.0063i | −0.0412 + 0.0129i | −0.4840 + 0.0000i | −0.1869 + 0.2452i |
| −0.1368 − 0.1483i | −0.0482 − 0.0248i | −0.1869 − 0.2452i | −0.5258 + 0.0000i |

W23 =

| | | | |
|---|---|---|---|
| −0.3895 − 0.0000i | 0.1221 − 0.1741i | −0.0455 − 0.2313i | −0.0874 − 0.0257i |
| 0.1221 + 0.1741i | −0.4158 − 0.0000i | −0.1750 + 0.1744i | 0.0381 + 0.1150i |
| −0.0455 + 0.2313i | −0.1750 − 0.1744i | −0.4657 + 0.0000i | −0.0745 + 0.0902i |
| −0.0874 + 0.0257i | 0.0381 − 0.1150i | −0.0745 − 0.0902i | −0.2481 + 0.0000i |

W24 =

| | | | |
|---|---|---|---|
| −0.4674 − 0.0000i | −0.1232 − 0.0396i | 0.2054 − 0.1436i | 0.0192 + 0.1990i |
| −0.1232 + 0.0396i | −0.2747 − 0.0000i | 0.0721 − 0.1064i | 0.0478 + 0.1094i |
| 0.2054 + 0.1436i | 0.0721 + 0.1064i | −0.4096 + 0.0000i | 0.1031 − 0.1841i |
| 0.0192 − 0.1990i | 0.0478 − 0.1094i | 0.1031 + 0.1841i | −0.3856 − 0.0000i |

-continued

W25 =

| | | | |
|---|---|---|---|
| −0.1990 − 0.0000i | 0.0007 − 0.0085i | −0.0194 − 0.0004i | 0.0023 − 0.0020i |
| 0.0007 + 0.0085i | −0.2770 − 0.0000i | −0.0019 + 0.2046i | −0.1019 + 0.0370i |
| −0.0194 + 0.0004i | −0.0019 − 0.2046i | −0.7173 − 0.0000i | −0.0869 − 0.2587i |
| 0.0023 + 0.0020i | −0.1019 − 0.0370i | −0.0869 + 0.2587i | −0.3349 − 0.0000i |

W26 =

| | | | |
|---|---|---|---|
| −0.4242 + 0.0000i | 0.0539 + 0.0102i | 0.2095 + 0.0085i | −0.2354 − 0.0883i |
| 0.0539 − 0.0102i | −0.1980 − 0.0000i | −0.0561 + 0.0040i | 0.0603 − 0.0021i |
| 0.2095 − 0.0085i | −0.0561 − 0.0040i | −0.4396 − 0.0000i | 0.2353 + 0.0771i |
| −0.2354 + 0.0883i | 0.0603 + 0.0021i | 0.2353 − 0.0771i | −0.4807 − 0.0000i |

W27 =

| | | | |
|---|---|---|---|
| −0.2358 − 0.0000i | −0.1382 + 0.0062i | 0.0034 + 0.0958i | 0.0577 − 0.0169i |
| −0.1382 − 0.0062i | −0.6600 + 0.0000i | −0.0426 + 0.2917i | 0.1492 − 0.0375i |
| 0.0034 − 0.0958i | −0.0426 − 0.2917i | −0.3840 + 0.0000i | 0.0419 + 0.0824i |
| 0.0577 + 0.0169i | 0.1492 + 0.0375i | 0.0419 − 0.0824i | −0.2435 + 0.0000i |

W28 =

| | | | |
|---|---|---|---|
| −0.5722 − 0.0000i | 0.1258 − 0.0783i | −0.0039 − 0.0738i | 0.0440 + 0.3227i |
| 0.1258 + 0.0783i | −0.2674 − 0.0000i | −0.0265 + 0.0290i | 0.0532 − 0.1356i |
| −0.0039 + 0.0738i | −0.0265 − 0.0290i | −0.2057 − 0.0000i | 0.0699 − 0.0094i |
| 0.0440 − 0.3227i | 0.0532 + 0.1356i | 0.0699 + 0.0094i | −0.4861 + 0.0000i |

W29 =

| | | | |
|---|---|---|---|
| −0.2330 + 0.0000i | −0.1321 − 0.0143i | −0.0823 − 0.0102i | −0.0580 − 0.0261i |
| −0.1321 + 0.0143i | −0.5690 − 0.0000i | −0.2730 − 0.0246i | −0.2129 − 0.0558i |
| −0.0823 + 0.0102i | −0.2730 + 0.0246i | −0.3989 − 0.0000i | −0.1519 − 0.0464i |
| −0.0580 + 0.0261i | −0.2129 + 0.0558i | −0.1519 + 0.0464i | −0.3287 + 0.0000i |

W30 =

| | | | |
|---|---|---|---|
| −0.4201 + 0.0000i | 0.2269 − 0.1312i | 0.0877 + 0.0614i | −0.0377 − 0.1812i |
| 0.2269 + 0.1312i | −0.5141 − 0.0000i | −0.0485 − 0.1007i | −0.0887 + 0.2077i |
| 0.0877 − 0.0614i | −0.0485 + 0.1007i | −0.2514 − 0.0000i | 0.0399 + 0.0484i |
| −0.0377 + 0.1812i | −0.0887 − 0.2077i | 0.0399 − 0.0484i | −0.3637 − 0.0000i |

W31 =

| | | | |
|---|---|---|---|
| −0.2745 − 0.0000i | 0.1234 + 0.1645i | −0.0227 + 0.0122i | −0.0234 + 0.0746i |
| 0.1234 − 0.1645i | −0.7549 − 0.0000i | 0.0161 − 0.0955i | −0.1570 − 0.1649i |
| −0.0227 − 0.0122i | 0.0161 + 0.0955i | −0.2013 + 0.0000i | −0.0306 + 0.0147i |
| −0.0234 − 0.0746i | −0.1570 + 0.1649i | −0.0306 − 0.0147i | −0.3022 + 0.0000i |

W32 =

| | | | |
|---|---|---|---|
| −0.7053 + 0.0000i | −0.0563 − 0.0999i | 0.1494 − 0.0650i | 0.2153 − 0.1684i |
| −0.0563 + 0.0999i | −0.2224 − 0.0000i | −0.0068 − 0.0413i | −0.0033 − 0.0685i |
| 0.1494 + 0.0650i | −0.0068 + 0.0413i | −0.2509 − 0.0000i | −0.0784 + 0.0014i |
| 0.2153 + 0.1684i | −0.0033 + 0.0685i | −0.0784 − 0.0014i | −0.3689 + 0.0000i |

10) When Nt=4, Nr=2, and B=6:

W1 =

| | | | |
|---|---|---|---|
| −0.3603 + 0.0000i | 0.2493 − 0.1193i | 0.0580 − 0.1438i | 0.0737 + 0.0862i |
| 0.2493 + 0.1193i | −0.5870 − 0.0000i | −0.1506 + 0.1594i | −0.0173 − 0.1459i |
| 0.0580 + 0.1438i | −0.1506 − 0.1594i | −0.2912 − 0.0000i | 0.0475 − 0.0677i |
| 0.0737 − 0.0862i | −0.0173 + 0.1459i | 0.0475 + 0.0677i | −0.2474 − 0.0000i |

W2 =

| | | | |
|---|---|---|---|
| −0.2819 + 0.0000i | −0.0722 + 0.0240i | −0.1878 − 0.1114i | 0.1321 − 0.0372i |
| −0.0722 − 0.0240i | −0.2482 + 0.0000i | −0.1145 − 0.1207i | 0.1175 − 0.0141i |
| −0.1878 + 0.1114i | −0.1145 + 0.1207i | −0.6009 − 0.0000i | 0.1762 − 0.1937i |
| 0.1321 + 0.0372i | 0.1175 + 0.0141i | 0.1762 + 0.1937i | −0.3643 − 0.0000i |

W3 =

| | | | |
|---|---|---|---|
| −0.5673 + 0.0000i | −0.2094 + 0.0003i | 0.2742 − 0.0515i | 0.1509 + 0.0214i |
| −0.2094 − 0.0003i | −0.2992 − 0.0000i | 0.1589 − 0.0257i | 0.0853 + 0.0193i |
| 0.2742 + 0.0515i | 0.1589 + 0.0257i | −0.4031 + 0.0000i | −0.1016 − 0.0210i |
| 0.1509 − 0.0214i | 0.0853 − 0.0193i | −0.1016 + 0.0210i | −0.2183 + 0.0000i |

W4 =

| | | | |
|---|---|---|---|
| −0.2492 − 0.0000i | 0.0392 + 0.1072i | −0.0665 + 0.1598i | 0.0890 − 0.1024i |
| 0.0392 − 0.1072i | −0.3331 + 0.0000i | −0.1513 − 0.1583i | 0.0754 + 0.1343i |
| −0.0665 − 0.1598i | −0.1513 + 0.1583i | −0.5308 − 0.0000i | 0.2482 + 0.1005i |
| 0.0890 + 0.1024i | 0.0754 − 0.1343i | 0.2482 − 0.1005i | −0.3683 + 0.0000i |

-continued

| | W5 = | | |
|---|---|---|---|
| −0.2470 + 0.0000i | 0.1368 − 0.0909i | −0.0531 + 0.0564i | −0.0756 + 0.0231i |
| 0.1368 + 0.0909i | −0.6847 + 0.0000i | 0.2224 − 0.0754i | 0.2045 + 0.0845i |
| −0.0531 − 0.0564i | 0.2224 + 0.0754i | −0.2571 + 0.0000i | −0.0838 − 0.0934i |
| −0.0756 − 0.0231i | 0.2045 − 0.0845i | −0.0838 + 0.0934i | −0.2931 + 0.0000i |
| | W6 = | | |
| −0.2898 − 0.0000i | 0.1328 + 0.0096i | 0.2010 + 0.0755i | −0.0028 + 0.0499i |
| 0.1328 − 0.0096i | −0.3699 + 0.0000i | −0.2647 − 0.1396i | −0.0197 − 0.0667i |
| 0.2010 − 0.0755i | −0.2647 + 0.1396i | −0.6264 + 0.0000i | −0.0852 − 0.0500i |
| −0.0028 − 0.0499i | −0.0197 + 0.0667i | −0.0852 + 0.0500i | −0.2142 + 0.0000i |
| | W7 = | | |
| −0.8103 + 0.0000i | 0.1740 + 0.0938i | −0.0039 + 0.1905i | 0.1028 − 0.0311i |
| 0.1740 − 0.0938i | −0.2596 − 0.0000i | −0.0193 − 0.0659i | −0.0179 + 0.0308i |
| −0.0039 − 0.1905i | −0.0193 + 0.0659i | −0.2272 + 0.0000i | 0.0034 + 0.0430i |
| 0.1028 + 0.0311i | −0.0179 − 0.0308i | 0.0034 − 0.0430i | −0.1870 − 0.0000i |
| | W8 = | | |
| −0.6717 + 0.0000i | 0.1314 − 0.2852i | −0.0299 + 0.0033i | −0.1896 − 0.0618i |
| 0.1314 + 0.2852i | −0.3870 + 0.0000i | 0.0087 + 0.0188i | 0.0209 + 0.1195i |
| −0.0299 − 0.0033i | 0.0087 − 0.0188i | −0.1785 + 0.0000i | −0.0113 − 0.0203i |
| −0.1896 + 0.0618i | 0.0209 − 0.1195i | −0.0113 + 0.0203i | −0.2392 + 0.0000i |
| | W9 = | | |
| −0.2318 − 0.0000i | −0.0178 − 0.0773i | 0.0977 − 0.0303i | 0.1318 − 0.0825i |
| −0.0178 + 0.0773i | −0.2948 + 0.0000i | −0.0104 − 0.1817i | −0.0925 − 0.1941i |
| 0.0977 + 0.0303i | −0.0104 + 0.1817i | −0.4103 + 0.0000i | −0.2653 + 0.0949i |
| 0.1318 + 0.0825i | −0.0925 + 0.1941i | −0.2653 − 0.0949i | −0.5400 + 0.0000i |
| | W10 = | | |
| −0.3708 − 0.0000i | 0.0438 − 0.1728i | 0.1759 − 0.1182i | −0.0546 − 0.1632i |
| 0.0438 + 0.1728i | −0.3592 − 0.0000i | −0.1329 − 0.1604i | −0.1642 + 0.0757i |
| 0.1759 + 0.1182i | −0.1329 + 0.1604i | −0.4109 + 0.0000i | −0.0407 + 0.1935i |
| −0.0546 + 0.1632i | −0.1642 − 0.0757i | −0.0407 − 0.1935i | −0.3488 + 0.0000i |
| | W11 = | | |
| −0.3784 − 0.0000i | −0.1844 + 0.1851i | 0.0648 − 0.0963i | −0.0732 − 0.1820i |
| −0.1844 − 0.1851i | −0.4977 + 0.0000i | 0.1251 − 0.0210i | 0.0786 − 0.2328i |
| 0.0648 + 0.0963i | 0.1251 + 0.0210i | −0.2343 + 0.0000i | −0.0661 + 0.0855i |
| −0.0732 + 0.1820i | 0.0786 + 0.2328i | −0.0661 − 0.0855i | −0.3708 + 0.0000i |
| | W12 = | | |
| −0.2229 − 0.0000i | −0.0029 − 0.0909i | −0.0905 − 0.0065i | 0.0814 − 0.0415i |
| −0.0029 + 0.0909i | −0.4130 + 0.0000i | 0.0252 + 0.2736i | −0.0459 − 0.2213i |
| −0.0905 + 0.0065i | 0.0252 − 0.2736i | −0.4570 + 0.0000i | 0.2481 − 0.0243i |
| 0.0814 + 0.0415i | −0.0459 + 0.2213i | 0.2481 + 0.0243i | −0.3792 + 0.0000i |
| | W13 = | | |
| −0.2790 − 0.0000i | −0.0271 + 0.2347i | −0.0955 + 0.0077i | −0.0239 + 0.0647i |
| −0.0271 − 0.2347i | −0.6911 + 0.0000i | −0.0439 − 0.2387i | −0.1167 − 0.0887i |
| −0.0955 − 0.0077i | −0.0439 + 0.2387i | −0.2975 + 0.0000i | −0.0410 + 0.0432i |
| −0.0239 − 0.0647i | −0.1167 + 0.0887i | −0.0410 − 0.0432i | −0.2205 − 0.0000i |
| | W14 = | | |
| −0.1617 + 0.0000i | 0.0668 − 0.0174i | 0.0399 − 0.0032i | −0.0273 − 0.0302i |
| 0.0668 + 0.0174i | −0.6268 − 0.0000i | −0.2592 − 0.0105i | 0.1551 + 0.2301i |
| 0.0399 + 0.0032i | −0.2592 − 0.0105i | −0.3138 + 0.0000i | 0.1016 + 0.1169i |
| −0.0273 + 0.0302i | 0.1551 − 0.2301i | 0.1016 − 0.1169i | −0.3604 + 0.0000i |
| | W15 = | | |
| −0.1685 − 0.0000i | −0.0121 + 0.0079i | 0.0260 − 0.0090i | −0.0113 − 0.0016i |
| −0.0121 − 0.0079i | −0.3288 + 0.0000i | 0.2007 + 0.1616i | 0.1327 + 0.0944i |
| 0.0260 + 0.0090i | 0.2007 − 0.1616i | −0.6241 − 0.0000i | −0.2793 + 0.0174i |
| −0.0113 + 0.0016i | 0.1327 − 0.0944i | −0.2793 − 0.0174i | −0.3596 + 0.0000i |
| | W16 = | | |
| −0.4364 + 0.0000i | −0.0057 − 0.0498i | 0.1847 + 0.3155i | 0.0215 − 0.0266i |
| −0.0057 + 0.0498i | −0.1821 + 0.0000i | 0.0646 + 0.0054i | 0.0085 + 0.0153i |
| 0.1847 − 0.3155i | 0.0646 − 0.0054i | −0.6714 + 0.0000i | 0.0091 + 0.0475i |
| 0.0215 + 0.0266i | 0.0085 − 0.0153i | 0.0091 − 0.0475i | −0.1933 + 0.0000i |
| | W17 = | | |
| −0.1759 − 0.0000i | 0.0073 + 0.0295i | −0.0506 − 0.0938i | 0.0056 + 0.0009i |
| 0.0073 − 0.0295i | −0.2468 + 0.0000i | 0.1440 − 0.1450i | −0.0573 − 0.0190i |
| −0.0506 + 0.0938i | 0.1440 + 0.1450i | −0.8491 − 0.0000i | 0.0401 + 0.1083i |
| 0.0056 − 0.0009i | −0.0573 + 0.0190i | 0.0401 − 0.1083i | −0.2123 + 0.0000i |

-continued

| W18 = | | | |
|---|---|---|---|
| −0.5195 + 0.0000i | 0.2279 + 0.0300i | −0.2263 − 0.2164i | 0.0538 + 0.0733i |
| 0.2279 − 0.0300i | −0.3034 − 0.0000i | 0.1438 + 0.0985i | −0.0535 − 0.0412i |
| −0.2263 + 0.2164i | 0.1438 − 0.0985i | −0.4408 − 0.0000i | 0.0779 − 0.0021i |
| 0.0538 − 0.0733i | −0.0535 + 0.0412i | 0.0779 + 0.0021i | −0.2082 − 0.0000i |

| W19 = | | | |
|---|---|---|---|
| −0.3225 + 0.0000i | −0.0099 + 0.0260i | −0.1670 + 0.0469i | −0.1859 + 0.1596i |
| −0.0099 − 0.0260i | −0.1902 − 0.0000i | −0.0212 − 0.0514i | −0.0544 − 0.0368i |
| −0.1670 − 0.0469i | −0.0212 + 0.0514i | −0.3853 − 0.0000i | −0.2664 + 0.1011i |
| −0.1859 − 0.1596i | −0.0544 + 0.0368i | −0.2664 − 0.1011i | −0.5936 + 0.0000i |

| W20 = | | | |
|---|---|---|---|
| −0.2391 − 0.0000i | −0.0666 − 0.0501i | 0.0088 + 0.0068i | 0.1892 − 0.0076i |
| −0.0666 + 0.0501i | −0.3156 + 0.0000i | −0.0168 + 0.0075i | 0.2143 − 0.1714i |
| 0.0088 − 0.0068i | −0.0168 − 0.0075i | −0.1718 − 0.0000i | 0.0179 − 0.0000i |
| 0.1892 + 0.0076i | 0.2143 + 0.1714i | 0.0179 + 0.0000i | −0.7589 − 0.0000i |

| W21 = | | | |
|---|---|---|---|
| −0.4223 − 0.0000i | −0.0652 − 0.1820i | −0.1513 − 0.0966i | 0.0312 + 0.2382i |
| −0.0652 + 0.1820i | −0.3431 − 0.0000i | −0.1095 + 0.1156i | 0.1894 + 0.0353i |
| −0.1513 + 0.0966i | −0.1095 − 0.1156i | −0.3114 − 0.0000i | 0.1082 + 0.1371i |
| 0.0312 − 0.2382i | 0.1894 − 0.0353i | 0.1082 − 0.1371i | −0.4079 − 0.0000i |

| W22 = | | | |
|---|---|---|---|
| −0.2539 − 0.0000i | −0.0308 − 0.0632i | 0.0797 − 0.0028i | 0.0696 + 0.2072i |
| −0.0308 + 0.0632i | −0.2412 − 0.0000i | 0.0775 − 0.0564i | 0.1762 + 0.0469i |
| 0.0797 + 0.0028i | 0.0775 + 0.0564i | −0.3060 + 0.0000i | −0.1038 − 0.2167i |
| 0.0696 − 0.2072i | 0.1762 − 0.0469i | −0.1038 + 0.2167i | −0.6821 + 0.0000i |

| W23 = | | | |
|---|---|---|---|
| −0.3721 + 0.0000i | −0.0793 + 0.2481i | −0.0645 − 0.1222i | 0.1676 − 0.0623i |
| −0.0793 − 0.2481i | −0.4841 − 0.0000i | 0.1156 − 0.1023i | 0.1457 + 0.2011i |
| −0.0645 + 0.1222i | 0.1156 + 0.1023i | −0.2548 − 0.0000i | −0.0064 − 0.1185i |
| 0.1676 + 0.0623i | 0.1457 − 0.2011i | −0.0064 + 0.1185i | −0.3540 + 0.0000i |

| W24 = | | | |
|---|---|---|---|
| −0.3326 + 0.0000i | 0.2619 + 0.0012i | −0.0145 + 0.1557i | 0.1015 + 0.0173i |
| 0.2619 − 0.0012i | −0.5938 − 0.0000i | −0.0147 − 0.2407i | −0.1498 − 0.0049i |
| −0.0145 − 0.1557i | −0.0147 + 0.2407i | −0.3272 − 0.0000i | −0.0011 + 0.0845i |
| 0.1015 − 0.0173i | −0.1498 + 0.0049i | −0.0011 − 0.0845i | −0.2164 − 0.0000i |

| W25 = | | | |
|---|---|---|---|
| −0.2367 − 0.0000i | 0.0673 − 0.0936i | −0.0140 + 0.1189i | 0.0280 − 0.1364i |
| 0.0673 + 0.0936i | −0.3317 + 0.0000i | 0.1853 − 0.0901i | −0.2181 + 0.0466i |
| −0.0140 − 0.1189i | 0.1853 + 0.0901i | −0.4094 − 0.0000i | 0.2483 + 0.0461i |
| 0.0280 + 0.1364i | −0.2181 − 0.0466i | 0.2483 − 0.0461i | −0.5102 − 0.0000i |

| W26 = | | | |
|---|---|---|---|
| −0.3835 − 0.0000i | 0.1724 + 0.2663i | 0.1149 + 0.0703i | −0.0929 − 0.0275i |
| 0.1724 − 0.2663i | −0.6262 − 0.0000i | −0.1666 + 0.0684i | 0.0833 − 0.0755i |
| 0.1149 − 0.0703i | −0.1666 − 0.0684i | −0.2416 − 0.0000i | 0.0259 − 0.0245i |
| −0.0929 + 0.0275i | 0.0833 + 0.0755i | 0.0259 + 0.0245i | −0.2310 − 0.0000i |

| W27 = | | | |
|---|---|---|---|
| −0.2632 + 0.0000i | 0.0618 − 0.0030i | 0.0074 + 0.0755i | −0.1933 − 0.1498i |
| 0.0618 + 0.0030i | −0.2254 − 0.0000i | −0.0141 − 0.0533i | 0.0962 + 0.1139i |
| 0.0074 − 0.0755i | −0.0141 + 0.0533i | −0.2164 − 0.0000i | 0.1289 − 0.1369i |
| −0.1933 + 0.1498i | 0.0962 − 0.1139i | 0.1289 + 0.1369i | −0.7570 − 0.0000i |

| W28 = | | | |
|---|---|---|---|
| −0.3258 − 0.0000i | −0.2108 − 0.1373i | −0.0438 − 0.0968i | 0.0810 + 0.0076i |
| −0.2108 + 0.1373i | −0.6821 − 0.0000i | −0.1566 − 0.1319i | 0.1491 − 0.1004i |
| −0.0438 + 0.0968i | −0.1566 + 0.1319i | −0.2400 − 0.0000i | 0.0103 − 0.0612i |
| 0.0810 − 0.0076i | 0.1491 + 0.1004i | 0.0103 + 0.0612i | −0.2291 − 0.0000i |

| W29 = | | | |
|---|---|---|---|
| −0.2646 + 0.0000i | −0.0848 + 0.0325i | 0.0633 + 0.1726i | −0.0969 + 0.1039i |
| −0.0848 − 0.0325i | −0.2599 − 0.0000i | 0.0002 + 0.1707i | −0.1390 + 0.0425i |
| 0.0633 − 0.1726i | 0.0002 − 0.1707i | −0.5328 − 0.0000i | −0.1065 − 0.2850i |
| −0.0969 − 0.1039i | −0.1390 − 0.0425i | −0.1065 + 0.2850i | −0.4103 − 0.0000i |

| W30 = | | | |
|---|---|---|---|
| −0.4282 − 0.0000i | 0.0072 − 0.2068i | −0.2277 + 0.1921i | −0.0231 + 0.0092i |
| 0.0072 + 0.2068i | −0.3566 + 0.0000i | 0.1646 + 0.1763i | −0.0155 + 0.0240i |
| −0.2277 − 0.1921i | 0.1646 − 0.1763i | −0.5210 + 0.0000i | −0.0072 − 0.0264i |
| −0.0231 − 0.0092i | −0.0155 − 0.0240i | −0.0072 + 0.0264i | −0.1849 + 0.0000i |

-continued

| | W31 = | | |
|---|---|---|---|
| −0.4121 + 0.0000i | 0.2882 + 0.0245i | −0.0390 − 0.0339i | 0.1038 − 0.1732i |
| 0.2882 − 0.0245i | −0.5362 − 0.0000i | 0.0538 + 0.0449i | −0.1122 + 0.2342i |
| −0.0390 + 0.0339i | 0.0538 − 0.0449i | −0.1688 − 0.0000i | −0.0075 − 0.0491i |
| 0.1038 + 0.1732i | −0.1122 − 0.2342i | −0.0075 + 0.0491i | −0.3320 − 0.0000i |
| | W32 = | | |
| −0.5786 + 0.0000i | −0.0881 + 0.1693i | −0.0884 − 0.2862i | −0.1375 + 0.0817i |
| −0.0881 − 0.1693i | −0.2502 + 0.0000i | 0.0965 − 0.1068i | −0.0709 − 0.0257i |
| −0.0884 + 0.2862i | 0.0965 + 0.1068i | −0.3895 − 0.0000i | 0.0304 + 0.1062i |
| −0.1375 − 0.0817i | −0.0709 + 0.0257i | 0.0304 − 0.1062i | −0.2649 − 0.0000i |
| | W33 = | | |
| −0.2965 − 0.0000i | −0.0137 + 0.0165i | 0.1720 − 0.1359i | −0.0623 + 0.1435i |
| −0.0137 − 0.0165i | −0.1801 + 0.0000i | 0.0667 + 0.0370i | −0.0587 + 0.0115i |
| 0.1720 + 0.1359i | 0.0667 − 0.0370i | −0.5937 + 0.0000i | 0.2650 − 0.1668i |
| −0.0623 − 0.1435i | −0.0587 − 0.0115i | 0.2650 + 0.1668i | −0.4077 + 0.0000i |
| | W34 = | | |
| −0.4130 − 0.0000i | 0.1669 + 0.0154i | 0.0353 − 0.1855i | −0.1434 − 0.2048i |
| 0.1669 − 0.0154i | −0.2589 − 0.0000i | −0.0185 + 0.1175i | 0.1152 + 0.1733i |
| 0.0353 + 0.1855i | −0.0185 − 0.1175i | −0.3300 − 0.0000i | −0.1364 + 0.1332i |
| −0.1434 + 0.2048i | 0.1152 − 0.1733i | −0.1364 − 0.1332i | −0.4619 − 0.0000i |
| | W35 = | | |
| −0.2506 − 0.0000i | −0.0665 − 0.1543i | −0.1039 − 0.0032i | −0.1046 − 0.0796i |
| −0.0665 + 0.1543i | −0.5682 − 0.0000i | −0.0961 + 0.1563i | −0.2615 + 0.1193i |
| −0.1039 + 0.0032i | −0.0961 − 0.1563i | −0.2590 + 0.0000i | −0.1161 − 0.0702i |
| −0.1046 + 0.0796i | −0.2615 − 0.1193i | −0.1161 + 0.0702i | −0.4066 + 0.0000i |
| | W36 = | | |
| −0.1953 + 0.0000i | −0.0188 + 0.0269i | 0.0666 + 0.0157i | −0.0244 − 0.0720i |
| −0.0188 − 0.0269i | −0.2441 − 0.0000i | 0.0443 + 0.1375i | 0.0997 − 0.0851i |
| 0.0666 − 0.0157i | 0.0443 − 0.1375i | −0.5053 − 0.0000i | 0.1198 + 0.3252i |
| −0.0244 + 0.0720i | 0.0997 + 0.0851i | 0.1198 − 0.3252i | −0.5546 − 0.0000i |
| | W37 = | | |
| −0.3234 − 0.0000i | 0.0584 + 0.1119i | −0.0620 + 0.0355i | 0.2302 + 0.1256i |
| 0.0584 − 0.1119i | −0.2731 − 0.0000i | 0.0268 − 0.0815i | −0.2072 + 0.1034i |
| −0.0620 − 0.0355i | 0.0268 + 0.0815i | −0.2368 − 0.0000i | 0.0885 + 0.1327i |
| 0.2302 − 0.1256i | −0.2072 − 0.1034i | 0.0885 − 0.1327i | −0.6421 − 0.0000i |
| | W38 = | | |
| −0.2524 + 0.0000i | −0.0030 + 0.1545i | 0.0589 − 0.0855i | 0.0220 + 0.0575i |
| −0.0030 − 0.1545i | −0.5951 − 0.0000i | 0.2477 + 0.1657i | −0.1879 + 0.0565i |
| 0.0589 + 0.0855i | 0.2477 − 0.1657i | −0.3723 − 0.0000i | 0.0783 − 0.1055i |
| 0.0220 − 0.0575i | −0.1879 − 0.0565i | 0.0783 + 0.1055i | −0.2783 + 0.0000i |
| | W39 = | | |
| −0.3834 − 0.0000i | 0.1960 + 0.0645i | −0.0159 − 0.0686i | −0.2287 + 0.0737i |
| 0.1960 − 0.0645i | −0.4107 + 0.0000i | 0.0435 + 0.0760i | 0.2559 − 0.1346i |
| −0.0159 + 0.0686i | 0.0435 − 0.0760i | −0.2105 + 0.0000i | 0.0096 + 0.0934i |
| −0.2287 − 0.0737i | 0.2559 + 0.1346i | 0.0096 − 0.0934i | −0.4789 + 0.0000i |
| | W40 = | | |
| −0.2501 + 0.0000i | 0.0630 − 0.0906i | −0.0758 − 0.1672i | −0.0182 − 0.0169i |
| 0.0630 + 0.0906i | −0.3374 − 0.0000i | −0.1823 + 0.2543i | −0.0061 + 0.0381i |
| −0.0758 + 0.1672i | −0.1823 − 0.2543i | −0.7014 − 0.0000i | −0.0560 + 0.0351i |
| −0.0182 + 0.0169i | −0.0061 − 0.0381i | −0.0560 − 0.0351i | −0.1764 − 0.0000i |
| | W41 = | | |
| −0.5666 + 0.0000i | −0.0453 + 0.0543i | −0.3020 + 0.0668i | 0.1904 + 0.1375i |
| −0.0453 − 0.0543i | −0.1860 − 0.0000i | −0.0412 − 0.0140i | 0.0060 + 0.0483i |
| −0.3020 − 0.0668i | −0.0412 + 0.0140i | −0.4146 − 0.0000i | 0.1030 + 0.1314i |
| 0.1904 − 0.1375i | 0.0060 − 0.0483i | 0.1030 − 0.1314i | −0.3107 − 0.0000i |
| | W42 = | | |
| −0.2619 − 0.0000i | 0.0700 − 0.0904i | −0.0924 + 0.1150i | 0.0875 + 0.1536i |
| 0.0700 + 0.0904i | −0.4034 + 0.0000i | 0.2166 − 0.0130i | 0.1103 − 0.1996i |
| −0.0924 − 0.1150i | 0.2166 + 0.0130i | −0.3972 − 0.0000i | −0.1100 + 0.2113i |
| 0.0875 − 0.1536i | 0.1103 + 0.1996i | −0.1100 − 0.2113i | −0.4088 − 0.0000i |
| | W43 = | | |
| −0.2267 − 0.0000i | −0.0261 + 0.0814i | −0.0086 + 0.0059i | −0.1375 + 0.0501i |
| −0.0261 − 0.0814i | −0.4055 + 0.0000i | −0.0645 + 0.0212i | −0.1988 − 0.2809i |
| −0.0086 − 0.0059i | −0.0645 − 0.0212i | −0.2001 + 0.0000i | −0.0183 − 0.0779i |
| −0.1375 − 0.0501i | −0.1988 + 0.2809i | −0.0183 + 0.0779i | −0.6540 + 0.0000i |

-continued

W44 =

| | | | |
|---|---|---|---|
| −0.4826 − 0.0000i | 0.2267 − 0.0761i | 0.0792 + 0.0951i | −0.0839 + 0.2671i |
| 0.2267 + 0.0761i | −0.3360 − 0.0000i | −0.0165 − 0.0959i | 0.1149 − 0.1875i |
| 0.0792 − 0.0951i | −0.0165 + 0.0959i | −0.2227 − 0.0000i | −0.0747 − 0.0676i |
| −0.0839 − 0.2671i | 0.1149 + 0.1875i | −0.0747 + 0.0676i | −0.4085 − 0.0000i |

W45 =

| | | | |
|---|---|---|---|
| −0.4366 + 0.0000i | 0.1392 + 0.1154i | 0.1073 − 0.0352i | 0.1819 + 0.1933i |
| 0.1392 − 0.1154i | −0.3437 − 0.0000i | −0.0783 + 0.0834i | −0.2460 − 0.0323i |
| 0.1073 + 0.0352i | −0.0783 − 0.0834i | −0.2458 − 0.0000i | −0.0752 − 0.1179i |
| 0.1819 − 0.1933i | −0.2460 + 0.0323i | −0.0752 + 0.1179i | −0.4590 − 0.0000i |

W46 =

| | | | |
|---|---|---|---|
| −0.2757 + 0.0000i | −0.1660 − 0.1378i | 0.1206 + 0.0303i | −0.0274 − 0.0764i |
| −0.1660 + 0.1378i | −0.6484 − 0.0000i | 0.2345 − 0.0949i | −0.1516 − 0.0771i |
| 0.1206 − 0.0303i | 0.2345 + 0.0949i | −0.3208 − 0.0000i | 0.0625 + 0.0904i |
| −0.0274 + 0.0764i | −0.1516 + 0.0771i | 0.0625 − 0.0904i | −0.2313 − 0.0000i |

W47 =

| | | | |
|---|---|---|---|
| −0.6316 + 0.0000i | −0.0458 − 0.1525i | 0.0610 − 0.2786i | 0.1870 − 0.0389i |
| −0.0458 + 0.1525i | −0.2440 − 0.0000i | −0.0965 − 0.0567i | 0.0122 − 0.0742i |
| 0.0610 + 0.2786i | −0.0965 + 0.0567i | −0.3439 − 0.0000i | −0.0620 − 0.0940i |
| 0.1870 + 0.0389i | 0.0122 + 0.0742i | −0.0620 + 0.0940i | −0.2742 + 0.0000i |

W48 =

| | | | |
|---|---|---|---|
| −0.2838 + 0.0000i | 0.0340 + 0.1111i | 0.1003 + 0.1768i | −0.1328 − 0.0418i |
| 0.0340 − 0.1111i | −0.2906 − 0.0000i | −0.1995 + 0.0757i | 0.1008 − 0.1391i |
| 0.1003 − 0.1768i | −0.1995 − 0.0757i | −0.5396 − 0.0000i | 0.2064 − 0.1332i |
| −0.1328 + 0.0418i | 0.1008 + 0.1391i | 0.2064 + 0.1332i | −0.3532 − 0.0000i |

W49 =

| | | | |
|---|---|---|---|
| −0.3699 + 0.0000i | −0.0437 − 0.0610i | 0.0622 − 0.1337i | −0.2436 + 0.1309i |
| −0.0437 + 0.0610i | −0.1773 − 0.0000i | −0.0078 − 0.0576i | −0.0297 + 0.0810i |
| 0.0622 + 0.1337i | −0.0078 + 0.0576i | −0.2798 − 0.0000i | 0.1911 + 0.1445i |
| −0.2436 − 0.1309i | −0.0297 − 0.0810i | 0.1911 − 0.1445i | −0.6398 − 0.0000i |

W50 =

| | | | |
|---|---|---|---|
| −0.4141 + 0.0000i | 0.1246 + 0.1173i | −0.2088 + 0.1597i | −0.1497 − 0.1195i |
| 0.1246 − 0.1173i | −0.2880 − 0.0000i | 0.0360 − 0.1748i | 0.1228 − 0.0203i |
| −0.2088 − 0.1597i | 0.0360 + 0.1748i | −0.4567 − 0.0000i | −0.0702 − 0.1823i |
| −0.1497 + 0.1195i | 0.1228 + 0.0203i | −0.0702 + 0.1823i | −0.3094 + 0.0000i |

W51 =

| | | | |
|---|---|---|---|
| −0.7398 + 0.0000i | −0.1285 + 0.1128i | −0.0273 + 0.1547i | −0.1365 + 0.2215i |
| −0.1285 − 0.1128i | −0.2525 + 0.0000i | −0.0417 + 0.0164i | −0.0671 + 0.0236i |
| −0.0273 − 0.1547i | −0.0417 − 0.0164i | −0.2064 + 0.0000i | −0.0645 − 0.0282i |
| −0.1365 − 0.2215i | −0.0671 − 0.0236i | −0.0645 + 0.0282i | −0.2812 + 0.0000i |

W52 =

| | | | |
|---|---|---|---|
| −0.3726 + 0.0000i | −0.1917 + 0.0273i | −0.2461 − 0.0636i | −0.0601 + 0.0150i |
| −0.1917 − 0.0273i | −0.3562 − 0.0000i | −0.2645 − 0.0807i | −0.0712 − 0.0033i |
| −0.2461 + 0.0636i | −0.2645 + 0.0807i | −0.5654 − 0.0000i | −0.0833 + 0.0027i |
| −0.0601 − 0.0150i | −0.0712 + 0.0033i | −0.0833 − 0.0027i | −0.1606 − 0.0000i |

W53 =

| | | | |
|---|---|---|---|
| −0.5751 + 0.0000i | 0.0423 + 0.1380i | 0.3163 − 0.1432i | −0.0895 − 0.0242i |
| 0.0423 − 0.1380i | −0.2478 − 0.0000i | 0.0160 + 0.1294i | 0.0123 − 0.0272i |
| 0.3163 + 0.1432i | 0.0160 − 0.1294i | −0.4702 − 0.0000i | 0.0565 + 0.0643i |
| −0.0895 + 0.0242i | 0.0123 + 0.0272i | 0.0565 − 0.0643i | −0.1906 − 0.0000i |

W54 =

| | | | |
|---|---|---|---|
| −0.3390 − 0.0000i | −0.0652 + 0.1653i | 0.1486 + 0.0590i | 0.1897 + 0.0511i |
| −0.0652 − 0.1653i | −0.3805 − 0.0000i | −0.0265 + 0.2056i | 0.0025 + 0.2272i |
| 0.1486 − 0.0590i | −0.0265 − 0.2056i | −0.3333 − 0.0000i | −0.1914 + 0.0332i |
| 0.1897 − 0.0511i | 0.0025 − 0.2272i | −0.1914 − 0.0332i | −0.4160 − 0.0000i |

W55 =

| | | | |
|---|---|---|---|
| −0.2887 + 0.0000i | 0.0338 + 0.0113i | −0.0663 − 0.1414i | 0.0777 − 0.2050i |
| 0.0338 − 0.0113i | −0.1867 − 0.0000i | 0.0485 + 0.0309i | −0.0173 − 0.0490i |
| −0.0663 + 0.1414i | 0.0485 − 0.0309i | −0.4336 − 0.0000i | −0.2051 − 0.2497i |
| 0.0777 + 0.2050i | −0.0173 + 0.0490i | −0.2051 + 0.2497i | −0.5705 − 0.0000i |

W56 =

| | | | |
|---|---|---|---|
| −0.2252 − 0.0000i | −0.1284 + 0.0514i | 0.0245 + 0.0492i | 0.0488 − 0.0290i |
| −0.1284 − 0.0514i | −0.7420 + 0.0000i | 0.0442 + 0.2065i | 0.2405 + 0.0180i |
| 0.0245 − 0.0492i | 0.0442 − 0.2065i | −0.2395 − 0.0000i | −0.0198 + 0.0773i |
| 0.0488 + 0.0290i | 0.2405 − 0.0180i | −0.0198 − 0.0773i | −0.2691 − 0.0000i |

| W57 = | | | |
|---|---|---|---|
| −0.5551 − 0.0000i | −0.1680 − 0.0286i | 0.1514 + 0.1069i | −0.2123 − 0.1941i |
| −0.1680 + 0.0286i | −0.2375 − 0.0000i | 0.0713 + 0.0342i | −0.1286 − 0.0707i |
| 0.1514 − 0.1069i | 0.0713 − 0.0342i | −0.2555 − 0.0000i | 0.1400 + 0.0430i |
| −0.2123 + 0.1941i | −0.1286 + 0.0707i | 0.1400 − 0.0430i | −0.4236 − 0.0000i |

| W58 = | | | |
|---|---|---|---|
| −0.2452 + 0.0000i | −0.0275 + 0.0838i | −0.0738 + 0.1445i | 0.0585 + 0.1209i |
| −0.0275 − 0.0838i | −0.3152 + 0.0000i | −0.2051 − 0.0118i | −0.1072 + 0.1332i |
| −0.0738 − 0.1445i | −0.2051 + 0.0118i | −0.5073 − 0.0000i | −0.1430 + 0.2560i |
| 0.0585 − 0.1209i | −0.1072 − 0.1332i | −0.1430 − 0.2560i | −0.4050 − 0.0000i |

| W59 = | | | |
|---|---|---|---|
| −0.4405 + 0.0000i | −0.3117 − 0.0135i | −0.0990 + 0.1721i | −0.0169 − 0.0787i |
| −0.3117 + 0.0135i | −0.4935 − 0.0000i | −0.1004 + 0.1900i | −0.0267 − 0.0924i |
| −0.0990 − 0.1721i | −0.1004 − 0.1900i | −0.3381 − 0.0000i | 0.0364 − 0.0368i |
| −0.0169 + 0.0787i | −0.0267 + 0.0924i | 0.0364 + 0.0368i | −0.2135 − 0.0000i |

| W60 = | | | |
|---|---|---|---|
| −0.2055 + 0.0000i | 0.0200 − 0.0917i | 0.0766 + 0.0353i | −0.0254 + 0.0311i |
| 0.0200 + 0.0917i | −0.4414 − 0.0000i | 0.0117 − 0.3252i | 0.1684 + 0.0544i |
| 0.0766 − 0.0353i | 0.0117 + 0.3252i | −0.5415 − 0.0000i | 0.0292 − 0.1920i |
| −0.0254 − 0.0311i | 0.1684 − 0.0544i | 0.0292 + 0.1920i | −0.2913 + 0.0000i |

| W61 = | | | |
|---|---|---|---|
| −0.5558 + 0.0000i | 0.0237 − 0.2891i | 0.0173 + 0.1126i | 0.2468 − 0.0055i |
| 0.0237 + 0.2891i | −0.3857 − 0.0000i | 0.0670 − 0.0105i | −0.0458 − 0.1809i |
| 0.0173 − 0.1126i | 0.0670 + 0.0105i | −0.2011 − 0.0000i | −0.0028 + 0.0695i |
| 0.2468 + 0.0055i | −0.0458 + 0.1809i | −0.0028 − 0.0695i | −0.3119 − 0.0000i |

| W62 = | | | |
|---|---|---|---|
| −0.2939 + 0.0000i | −0.1968 − 0.0779i | 0.0518 − 0.0529i | −0.0723 + 0.1322i |
| −0.1968 + 0.0779i | −0.5446 − 0.0000i | 0.0380 − 0.1159i | −0.0610 + 0.3108i |
| 0.0518 + 0.0529i | 0.0380 + 0.1159i | −0.2388 − 0.0000i | 0.0907 − 0.0061i |
| −0.0723 − 0.1322i | −0.0610 − 0.3108i | 0.0907 + 0.0061i | −0.4088 − 0.0000i |

| W63 = | | | |
|---|---|---|---|
| −0.6630 + 0.0000i | −0.1371 + 0.0047i | −0.2218 − 0.0848i | −0.1087 − 0.2349i |
| −0.1371 − 0.0047i | −0.2348 − 0.0000i | −0.0479 − 0.0337i | −0.0371 − 0.0727i |
| −0.2218 + 0.0848i | −0.0479 + 0.0337i | −0.2678 − 0.0000i | −0.0880 − 0.1047i |
| −0.1087 + 0.2349i | −0.0371 + 0.0727i | −0.0880 + 0.1047i | −0.3027 − 0.0000i |

| W64 = | | | |
|---|---|---|---|
| −0.5777 − 0.0000i | −0.0480 + 0.1319i | 0.0034 + 0.1164i | 0.1656 − 0.3077i |
| −0.0480 − 0.1319i | −0.2562 − 0.0000i | −0.0583 + 0.0346i | 0.1072 + 0.0066i |
| 0.0034 − 0.1164i | −0.0583 − 0.0346i | −0.1855 − 0.0000i | 0.0734 + 0.0415i |
| 0.1656 + 0.3077i | 0.1072 − 0.0066i | 0.0734 − 0.0415i | −0.4572 + 0.0000i |

11) When Nt=4, Nr=4, and B=2:

| W1 = | | | |
|---|---|---|---|
| −0.3820 − 0.0000i | −0.0017 − 0.0238i | 0.0113 + 0.0068i | 0.0130 + 0.0168i |
| −0.0017 + 0.0238i | −0.5290 − 0.0000i | 0.0194 − 0.0666i | 0.1435 − 0.0685i |
| 0.0113 − 0.0068i | 0.0194 + 0.0666i | −0.4320 − 0.0000i | −0.0603 − 0.0475i |
| 0.0130 − 0.0168i | 0.1435 + 0.0685i | −0.0603 + 0.0475i | −0.5597 − 0.0000i |

| W2 = | | | |
|---|---|---|---|
| −0.5187 + 0.0000i | −0.0492 + 0.0379i | 0.0916 − 0.0913i | −0.0955 + 0.0239i |
| −0.0492 − 0.0379i | −0.4242 − 0.0000i | 0.0573 − 0.0122i | −0.0435 − 0.0110i |
| 0.0916 + 0.0913i | 0.0573 + 0.0122i | −0.5039 − 0.0000i | 0.0837 + 0.0415i |
| −0.0955 − 0.0239i | −0.0435 + 0.0110i | 0.0837 − 0.0415i | −0.4563 + 0.0000i |

| W3 = | | | |
|---|---|---|---|
| −0.5578 − 0.0000i | 0.0302 + 0.0765i | −0.0487 + 0.1214i | 0.0761 + 0.0110i |
| 0.0302 − 0.0765i | −0.4174 − 0.0000i | −0.0484 − 0.0455i | −0.0102 + 0.0349i |
| −0.0487 − 0.1214i | −0.0484 + 0.0455i | −0.4998 − 0.0000i | 0.0201 + 0.0566i |
| 0.0761 − 0.0110i | −0.0102 − 0.0349i | 0.0201 − 0.0566i | −0.4319 − 0.0000i |

| W4 = | | | |
|---|---|---|---|
| −0.4368 − 0.0000i | 0.0172 − 0.0837i | −0.0598 − 0.0303i | −0.0083 − 0.0520i |
| 0.0172 + 0.0837i | −0.5343 − 0.0000i | −0.0262 + 0.1225i | −0.0824 + 0.0478i |
| −0.0598 + 0.0303i | −0.0262 − 0.1225i | −0.4788 − 0.0000i | −0.0441 − 0.0480i |
| −0.0083 + 0.0520i | −0.0824 − 0.0478i | −0.0441 + 0.0480i | −0.4554 − 0.0000i |

12) When Nt=4, Nr=4, and B=3:

| W1 = | | | |
|---|---|---|---|
| −0.6082 + 0.0000i | −0.0344 + 0.1130i | 0.1556 − 0.0462i | 0.0904 + 0.0009i |
| −0.0344 − 0.1130i | −0.4284 − 0.0000i | 0.0177 + 0.0696i | 0.0088 + 0.0559i |
| 0.1556 + 0.0462i | 0.0177 − 0.0696i | −0.4249 − 0.0000i | −0.0538 − 0.0058i |
| 0.0904 − 0.0009i | 0.0088 − 0.0559i | −0.0538 + 0.0058i | −0.3827 + 0.0000i |

| W2 = | | | |
|---|---|---|---|
| −0.3402 − 0.0000i | −0.0000 + 0.0379i | −0.0412 − 0.0393i | 0.0048 − 0.0183i |
| −0.0000 − 0.0379i | −0.4583 + 0.0000i | 0.1335 − 0.1083i | 0.0345 + 0.0403i |
| −0.0412 + 0.0393i | 0.1335 + 0.1083i | −0.6466 + 0.0000i | −0.0071 − 0.0917i |
| 0.0048 + 0.0183i | 0.0345 − 0.0403i | −0.0071 + 0.0917i | −0.4055 − 0.0000i |

| W3 = | | | |
|---|---|---|---|
| −0.4981 − 0.0000i | 0.0006 − 0.1332i | 0.0930 + 0.0684i | 0.0148 − 0.1095i |
| 0.0006 + 0.1332i | −0.4794 − 0.0000i | 0.0693 − 0.0783i | −0.0908 − 0.0369i |
| 0.0930 − 0.0684i | 0.0693 + 0.0783i | −0.4402 − 0.0000i | 0.0594 + 0.0802i |
| 0.0148 + 0.1095i | −0.0908 + 0.0369i | 0.0594 − 0.0802i | −0.4251 − 0.0000i |

| W4 = | | | |
|---|---|---|---|
| −0.4071 − 0.0000i | −0.0602 − 0.1032i | −0.0710 − 0.0715i | −0.0298 − 0.0242i |
| −0.0602 + 0.1032i | −0.5462 + 0.0000i | −0.1621 + 0.0331i | −0.0604 + 0.0553i |
| −0.0710 + 0.0715i | −0.1621 − 0.0331i | −0.5068 + 0.0000i | −0.0545 + 0.0179i |
| −0.0298 + 0.0242i | −0.0604 − 0.0553i | −0.0545 − 0.0179i | −0.3905 + 0.0000i |

| W5 = | | | |
|---|---|---|---|
| −0.5033 − 0.0000i | −0.0231 + 0.0875i | 0.0023 + 0.1520i | −0.1308 − 0.0102i |
| −0.0231 − 0.0875i | −0.3959 − 0.0000i | −0.0693 + 0.0233i | −0.0194 − 0.0722i |
| 0.0023 − 0.1520i | −0.0693 − 0.0233i | −0.4906 − 0.0000i | 0.0254 − 0.1040i |
| −0.1308 + 0.0102i | −0.0194 + 0.0722i | 0.0254 + 0.1040i | −0.4555 − 0.0000i |

| W6 = | | | |
|---|---|---|---|
| −0.3547 + 0.0000i | 0.0133 − 0.0236i | 0.0143 − 0.0091i | −0.0107 + 0.001i |
| 0.0133 + 0.0236i | −0.6251 − 0.0000i | −0.0200 + 0.0427i | 0.2073 − 0.0327i |
| 0.0143 + 0.0091i | −0.0200 − 0.0427i | −0.3685 − 0.0000i | 0.0445 + 0.0285i |
| −0.0107 − 0.0101i | 0.2073 + 0.0327i | 0.0445 − 0.0285i | −0.4971 − 0.0000i |

| W7 = | | | |
|---|---|---|---|
| −0.3590 − 0.0000i | 0.0160 + 0.0189i | −0.0016 + 0.0149i | 0.0481 + 0.0825i |
| 0.0160 − 0.0189i | −0.3810 + 0.0000i | −0.0171 − 0.0285i | −0.0820 + 0.0074i |
| −0.0016 − 0.0149i | −0.0171 + 0.0285i | −0.3652 − 0.0000i | −0.0571 − 0.0423i |
| 0.0481 − 0.0825i | −0.0820 − 0.0074i | −0.0571 + 0.0423i | −0.7395 − 0.0000i |

| W8 = | | | |
|---|---|---|---|
| −0.6423 − 0.0000i | 0.1087 − 0.0100i | −0.1493 − 0.0701i | 0.0055 + 0.0770i |
| 0.1087 + 0.0100i | −0.3778 − 0.0000i | 0.0474 + 0.0370i | 0.0038 − 0.0292i |
| −0.1493 + 0.0701i | 0.0474 − 0.0370i | −0.4410 − 0.0000i | 0.0346 + 0.0411i |
| 0.0055 − 0.0770i | 0.0038 + 0.0292i | 0.0346 − 0.0411i | −0.3812 + 0.0000i |

13) When Nt=4, Nr=4, and B=4:

| W1 = | | | |
|---|---|---|---|
| −0.4900 − 0.0000i | 0.2152 + 0.0723i | 0.0904 − 0.0008i | 0.0359 + 0.0446i |
| 0.2152 − 0.0723i | −0.6007 − 0.0000i | −0.0922 + 0.0320i | −0.0586 − 0.0373i |
| 0.0904 + 0.0008i | −0.0922 − 0.0320i | −0.3528 − 0.0000i | −0.0212 − 0.0217i |
| 0.0359 − 0.0446i | −0.0586 + 0.0373i | −0.0212 + 0.0217i | −0.3435 − 0.0000i |

| W2 = | | | |
|---|---|---|---|
| −0.3121 + 0.0000i | 0.0085 − 0.0266i | −0.0326 + 0.0108i | 0.0273 + 0.0147i |
| 0.0085 + 0.0266i | −0.5017 − 0.0000i | 0.0683 + 0.1160i | 0.0016 − 0.1973i |
| −0.0326 − 0.0108i | 0.0683 − 0.1160i | −0.4308 − 0.0000i | 0.1467 + 0.0921i |
| 0.0273 − 0.0147i | 0.0016 + 0.1973i | 0.1467 − 0.0921i | −0.5342 − 0.0000i |

| W3 = | | | |
|---|---|---|---|
| −0.4027 + 0.0000i | 0.1185 + 0.0322i | −0.1332 − 0.0008i | −0.0028 − 0.0096i |
| 0.1185 − 0.0322i | −0.5055 − 0.0000i | 0.2063 + 0.0816i | 0.0261 + 0.0350i |
| −0.1332 + 0.0008i | 0.2063 − 0.0816i | −0.5620 − 0.0000i | −0.0140 − 0.0319i |
| −0.0028 + 0.0096i | 0.0261 − 0.0350i | −0.0140 + 0.0319i | −0.3097 + 0.0000i |

| W4 = | | | |
|---|---|---|---|
| −0.3325 − 0.0000i | 0.0016 + 0.0286i | −0.0226 + 0.0284i | 0.0273 + 0.0203i |
| 0.0016 − 0.0286i | −0.3835 + 0.0000i | −0.1420 + 0.0032i | 0.0249 + 0.1019i |

| | | | |
|---|---|---|---|
| −0.0226 − 0.0284i | −0.1420 − 0.0032i | −0.6396 − 0.0000i | 0.0247 + 0.1933i |
| 0.0273 − 0.0203i | 0.0249 − 0.1019i | 0.0247 − 0.1933i | −0.4340 + 0.0000i |

W5 =

| | | | |
|---|---|---|---|
| −0.3512 + 0.0000i | −0.0069 − 0.0606i | 0.0362 − 0.0862i | 0.0412 + 0.0053i |
| −0.0069 + 0.0606i | −0.4147 − 0.0000i | −0.1324 − 0.0990i | 0.0260 − 0.1118i |
| 0.0362 + 0.0862i | −0.1324 + 0.0990i | −0.5993 − 0.0000i | −0.0355 − 0.1503i |
| 0.0412 − 0.0053i | 0.0260 + 0.1118i | −0.0355 + 0.1503i | −0.4341 − 0.0000i |

W6 =

| | | | |
|---|---|---|---|
| −0.5200 − 0.0000i | −0.0827 − 0.0531i | 0.1429 + 0.1328i | 0.1456 − 0.0009i |
| −0.0827 + 0.0531i | −0.3815 − 0.0000i | 0.0879 + 0.0127i | 0.0489 − 0.0420i |
| 0.1429 − 0.1328i | 0.0879 − 0.0127i | −0.4609 − 0.0000i | −0.1141 + 0.0745i |
| 0.1456 + 0.0009i | 0.0489 + 0.0420i | −0.1141 − 0.0745i | −0.4154 − 0.0000i |

W7 =

| | | | |
|---|---|---|---|
| −0.4628 + 0.0000i | −0.0633 + 0.1148i | −0.1083 + 0.0054i | −0.1302 + 0.0898i |
| −0.0633 − 0.1148i | −0.4306 − 0.0000i | −0.0444 − 0.0767i | −0.1255 − 0.0742i |
| −0.1083 − 0.0054i | −0.0444 + 0.0767i | −0.3882 − 0.0000i | −0.0990 + 0.0757i |
| −0.1302 − 0.0898i | −0.1255 + 0.0742i | −0.0990 − 0.0757i | −0.5024 − 0.0000i |

W8 =

| | | | |
|---|---|---|---|
| −0.4861 − 0.0000i | 0.0171 + 0.0583i | −0.0498 − 0.0519i | 0.2159 − 0.0013i |
| 0.0171 − 0.0583i | −0.3334 − 0.0000i | 0.0278 − 0.0147i | −0.0403 + 0.0825i |
| −0.0498 + 0.0519i | 0.0278 + 0.0147i | −0.3399 + 0.0000i | 0.0719 − 0.0777i |
| 0.2159 + 0.0013i | −0.0403 − 0.0825i | 0.0719 + 0.0777i | −0.6203 − 0.0000i |

W9 =

| | | | |
|---|---|---|---|
| −0.5056 − 0.0000i | 0.0382 + 0.0306i | 0.0272 − 0.1414i | −0.0677 − 0.1884i |
| 0.0382 − 0.0306i | −0.3199 + 0.0000i | 0.0245 + 0.0424i | 0.0541 + 0.0147i |
| 0.0272 + 0.1414i | 0.0245 − 0.0424i | −0.4227 − 0.0000i | −0.1249 − 0.0693i |
| −0.0677 + 0.1884i | 0.0541 − 0.0147i | −0.1249 + 0.0693i | −0.5339 + 0.0000i |

W10 =

| | | | |
|---|---|---|---|
| −0.3682 + 0.0000i | −0.0931 + 0.1151i | −0.0365 − 0.0066i | 0.0342 − 0.0512i |
| −0.0931 − 0.1151i | −0.6972 − 0.0000i | −0.0349 − 0.0576i | 0.1562 − 0.0064i |
| −0.0365 + 0.0066i | −0.0349 + 0.0576i | −0.3290 − 0.0000i | 0.0133 − 0.0301i |
| 0.0342 + 0.0512i | 0.1562 + 0.0064i | 0.0133 + 0.0301i | −0.3948 − 0.0000i |

W11 =

| | | | |
|---|---|---|---|
| −0.3719 − 0.0000i | −0.0472 − 0.0543i | −0.0735 + 0.0585i | −0.0409 − 0.0219i |
| −0.0472 + 0.0543i | −0.4578 + 0.0000i | −0.0187 + 0.1915i | −0.1041 + 0.0650i |
| −0.0735 − 0.0585i | −0.0187 − 0.1915i | −0.5503 + 0.0000i | −0.0822 − 0.1238i |
| −0.0409 + 0.0219i | −0.1041 − 0.0650i | −0.0822 + 0.1238i | −0.4107 − 0.0000i |

W12 =

| | | | |
|---|---|---|---|
| −0.3946 − 0.0000i | −0.0143 − 0.1533i | 0.0462 − 0.0112i | −0.0290 − 0.1057i |
| −0.0143 + 0.1533i | −0.6004 + 0.0000i | −0.0192 − 0.0842i | −0.1849 + 0.0584i |
| 0.0462 + 0.0112i | −0.0192 + 0.0842i | −0.3415 + 0.0000i | 0.0118 + 0.0619i |
| −0.0290 + 0.1057i | −0.1849 − 0.0584i | 0.0118 − 0.0619i | −0.4396 + 0.0000i |

W13 =

| | | | |
|---|---|---|---|
| −0.3940 + 0.0000i | 0.0318 − 0.1102i | 0.0258 + 0.0326i | −0.1190 + 0.1106i |
| 0.0318 + 0.1102i | −0.4513 − 0.0000i | 0.0241 − 0.0197i | 0.1442 + 0.1158i |
| 0.0258 − 0.0326i | 0.0241 + 0.0197i | −0.3250 + 0.0000i | −0.0179 − 0.0550i |
| −0.1190 − 0.1106i | 0.1442 − 0.1158i | −0.0179 + 0.0550i | −0.6130 − 0.0000i |

W14 =

| | | | |
|---|---|---|---|
| −0.4896 + 0.0000i | −0.0915 + 0.0683i | 0.1692 − 0.1102i | −0.0666 + 0.0790i |
| −0.0915 − 0.0683i | −0.3921 − 0.0000i | 0.1056 + 0.0001i | −0.0545 + 0.0272i |
| 0.1692 + 0.1102i | 0.1056 − 0.0001i | −0.5341 − 0.0000i | 0.0937 − 0.0297i |
| −0.0666 − 0.0790i | −0.0545 − 0.0272i | 0.0937 + 0.0297i | −0.3783 − 0.0000i |

W15 =

| | | | |
|---|---|---|---|
| −0.7484 + 0.0000i | −0.0195 − 0.1319i | −0.0945 − 0.0563i | 0.0215 + 0.0854i |
| −0.0195 + 0.1319i | −0.3565 − 0.0000i | −0.0212 + 0.0298i | 0.0273 − 0.0174i |
| −0.0945 + 0.0563i | −0.0212 − 0.0298i | −0.3517 − 0.0000i | 0.0109 + 0.0250i |
| 0.0215 − 0.0854i | 0.0273 + 0.0174i | 0.0109 − 0.0250i | −0.3279 − 0.0000i |

W16 =

| | | | |
|---|---|---|---|
| −0.5797 − 0.0000i | 0.0145 + 0.0828i | 0.0121 + 0.1940i | −0.0870 − 0.1291i |
| 0.0145 − 0.0828i | −0.3364 − 0.0000i | −0.0573 − 0.0104i | 0.0328 − 0.0144i |
| 0.0121 − 0.1940i | −0.0573 + 0.0104i | −0.4394 − 0.0000i | 0.1190 − 0.0585i |
| −0.0870 + 0.1291i | 0.0328 + 0.0144i | 0.1190 + 0.0585i | −0.4183 − 0.0000i |

14) When Nt=4, Nr=4, and B=5:

| W1 = | | | |
|---|---|---|---|
| −0.3409 + 0.0000i | 0.0296 + 0.0308i | 0.0241 − 0.0864i | −0.0725 + 0.0029i |
| 0.0296 − 0.0308i | −0.3357 − 0.0000i | 0.1165 + 0.0743i | 0.0535 − 0.0845i |
| 0.0241 + 0.0864i | 0.1165 − 0.0743i | −0.5826 − 0.0000i | 0.0225 + 0.2449i |
| −0.0725 − 0.0029i | 0.0535 + 0.0845i | 0.0225 − 0.2449i | −0.4713 + 0.0000i |

| W2 = | | | |
|---|---|---|---|
| −0.3595 − 0.0000i | 0.1212 − 0.0094i | 0.0623 − 0.0675i | −0.0409 − 0.1074i |
| 0.1212 + 0.0094i | −0.5146 − 0.0000i | −0.1109 + 0.1510i | 0.0612 + 0.1455i |
| 0.0623 + 0.0675i | −0.1109 − 0.1510i | −0.4324 − 0.0000i | −0.0700 + 0.1121i |
| −0.0409 + 0.1074i | 0.0612 − 0.1455i | −0.0700 − 0.1121i | −0.4370 + 0.0000i |

| W3 = | | | |
|---|---|---|---|
| −0.5016 − 0.0000i | 0.0654 − 0.0666i | 0.0263 − 0.1457i | 0.2011 − 0.0810i |
| 0.0654 + 0.0666i | −0.3496 − 0.0000i | −0.0563 + 0.0227i | −0.0544 − 0.0586i |
| 0.0263 + 0.1457i | −0.0563 − 0.0227i | −0.3880 + 0.0000i | −0.0731 − 0.1275i |
| 0.2011 + 0.0810i | −0.0544 + 0.0586i | −0.0731 + 0.1275i | −0.5070 − 0.0000i |

| W4 = | | | |
|---|---|---|---|
| −0.3473 + 0.0000i | 0.0147 − 0.0392i | 0.1709 + 0.0077i | 0.0504 + 0.0050i |
| 0.0147 + 0.0392i | −0.3075 − 0.0000i | −0.0679 − 0.0822i | −0.0358 − 0.0157i |
| 0.1709 − 0.0077i | −0.0679 + 0.0822i | −0.7220 + 0.0000i | −0.1439 + 0.0081i |
| 0.0504 − 0.0050i | −0.0358 + 0.0157i | −0.1439 − 0.0081i | −0.3591 − 0.0000i |

| W5 = | | | |
|---|---|---|---|
| −0.4341 + 0.0000i | 0.0506 + 0.0535i | −0.2276 + 0.0167i | −0.0988 − 0.0549i |
| 0.0506 − 0.0535i | −0.3577 − 0.0000i | 0.0755 − 0.0710i | 0.0487 − 0.0158i |
| −0.2276 − 0.0167i | 0.0755 + 0.0710i | −0.5794 + 0.0000i | −0.1480 − 0.0527i |
| −0.0988 + 0.0549i | 0.0487 + 0.0158i | −0.1480 + 0.0527i | −0.3623 + 0.0000i |

| W6 = | | | |
|---|---|---|---|
| −0.3607 + 0.0000i | 0.1236 + 0.0032i | 0.0050 + 0.0749i | 0.0655 + 0.1068i |
| 0.1236 − 0.0032i | −0.4871 − 0.0000i | 0.0137 − 0.0836i | −0.1247 − 0.1925i |
| 0.0050 − 0.0749i | 0.0137 + 0.0836i | −0.3438 + 0.0000i | −0.0688 + 0.0660i |
| 0.0655 − 0.1068i | −0.1247 + 0.1925i | −0.0688 − 0.0660i | −0.5509 − 0.0000i |

| W7 = | | | |
|---|---|---|---|
| −0.3157 − 0.0000i | −0.0246 + 0.0698i | −0.0691 − 0.0347i | 0.0181 + 0.0168i |
| −0.0246 − 0.0698i | −0.5842 − 0.0000i | 0.0328 − 0.2726i | 0.0164 + 0.0669i |
| −0.0691 + 0.0347i | 0.0328 + 0.2726i | −0.5047 − 0.0000i | 0.0824 − 0.0247i |
| 0.0181 − 0.0168i | 0.0164 − 0.0669i | 0.0824 + 0.0247i | −0.3242 − 0.0000i |

| W8 = | | | |
|---|---|---|---|
| −0.3844 + 0.0000i | 0.0947 − 0.0021i | 0.0981 − 0.0702i | −0.0937 + 0.1071i |
| 0.0947 + 0.0021i | −0.3841 − 0.0000i | −0.0994 + 0.0827i | 0.0987 − 0.0978i |
| 0.0981 + 0.0702i | −0.0994 − 0.0827i | −0.4365 + 0.0000i | 0.1828 − 0.0311i |
| −0.0937 − 0.1071i | 0.0987 + 0.0978i | 0.1828 + 0.0311i | −0.5346 − 0.0000i |

| W9 = | | | |
|---|---|---|---|
| −0.5357 + 0.0000i | −0.1227 + 0.0888i | 0.1802 + 0.0567i | −0.1465 − 0.0379i |
| −0.1227 − 0.0888i | −0.3907 − 0.0000i | 0.0843 + 0.1028i | −0.0563 − 0.0835i |
| 0.1802 − 0.0567i | 0.0843 − 0.1028i | −0.4169 − 0.0000i | 0.1009 + 0.0134i |
| −0.1465 + 0.0379i | −0.0563 + 0.0835i | 0.1009 − 0.0134i | −0.3835 − 0.0000i |

| W10 = | | | |
|---|---|---|---|
| −0.2976 + 0.0000i | 0.0040 − 0.0124i | 0.0033 + 0.0128i | −0.0015 − 0.0026i |
| 0.0040 + 0.0124i | −0.4423 − 0.0000i | 0.2289 + 0.0392i | −0.0734 + 0.0280i |
| 0.0033 − 0.0128i | 0.2289 − 0.0392i | −0.6630 − 0.0000i | 0.1223 − 0.0702i |
| −0.0015 + 0.0026i | −0.0734 − 0.0280i | 0.1223 + 0.0702i | −0.3399 − 0.0000i |

| W11 = | | | |
|---|---|---|---|
| −0.4180 + 0.0000i | −0.0912 − 0.1559i | 0.1159 + 0.0830i | 0.0485 + 0.0258i |
| −0.0912 + 0.1559i | −0.6171 − 0.0000i | 0.1459 − 0.0719i | 0.0906 − 0.0591i |
| 0.1159 − 0.0830i | 0.1459 + 0.0719i | −0.3892 − 0.0000i | −0.0595 − 0.0060i |
| 0.0485 − 0.0258i | 0.0906 + 0.0591i | −0.0595 + 0.0060i | −0.3124 − 0.0000i |

| W12 = | | | |
|---|---|---|---|
| −0.5416 + 0.0000i | −0.0216 − 0.0050i | −0.0577 + 0.0090i | −0.2509 + 0.1078i |
| −0.0216 + 0.0050i | −0.2964 − 0.0000i | −0.0002 + 0.0171i | −0.0198 + 0.0154i |
| −0.0577 − 0.0090i | −0.0002 − 0.0171i | −0.3197 − 0.0000i | −0.0576 + 0.0085i |
| −0.2509 − 0.1078i | −0.0198 − 0.0154i | −0.0576 − 0.0085i | −0.5925 − 0.0000i |

| W13 = | | | |
|---|---|---|---|
| −0.4122 − 0.0000i | 0.1072 − 0.0538i | 0.0451 + 0.1147i | 0.0293 − 0.1390i |
| 0.1072 + 0.0538i | −0.4039 − 0.0000i | 0.0135 − 0.1254i | −0.1049 + 0.1283i |
| 0.0451 − 0.1147i | 0.0135 + 0.1254i | −0.4310 + 0.0000i | 0.1257 + 0.0958i |
| 0.0293 + 0.1390i | −0.1049 − 0.1283i | 0.1257 − 0.0958i | −0.4950 + 0.0000i |

-continued

W14 =

| −0.3290 + 0.0000i | −0.0768 + 0.0003i | −0.0198 + 0.0488i | 0.1098 + 0.0840i |
|---|---|---|---|
| −0.0768 − 0.0003i | −0.4114 − 0.0000i | 0.0048 + 0.0689i | 0.1662 + 0.0620i |
| −0.0198 − 0.0488i | 0.0048 − 0.0689i | −0.3682 − 0.0000i | −0.0750 + 0.1400i |
| 0.1098 − 0.0840i | 0.1662 − 0.0620i | −0.0750 − 0.1400i | −0.6391 − 0.0000i |

W15 =

| −0.7838 − 0.0000i | 0.0150 + 0.0219i | −0.0666 + 0.0595i | 0.1566 + 0.0559i |
|---|---|---|---|
| 0.0150 − 0.0219i | −0.2869 − 0.0000i | 0.0196 − 0.0041i | −0.0123 + 0.0148i |
| −0.0666 − 0.0595i | 0.0196 + 0.0041i | −0.3263 − 0.0000i | 0.0125 + 0.0425i |
| 0.1566 − 0.0559i | −0.0123 − 0.0148i | 0.0125 − 0.0425i | −0.3445 − 0.0000i |

W16 =

| −0.5572 − 0.0000i | −0.1706 + 0.0758i | 0.1227 − 0.1628i | 0.0463 − 0.0682i |
|---|---|---|---|
| −0.1706 − 0.0758i | −0.4502 − 0.0000i | 0.1205 − 0.0640i | 0.0475 − 0.0137i |
| 0.1227 + 0.1628i | 0.1205 + 0.0640i | −0.4156 − 0.0000i | −0.0535 − 0.0110i |
| 0.0463 + 0.0682i | 0.0475 + 0.0137i | −0.0535 + 0.0110i | −0.3155 + 0.0000i |

W17 =

| −0.3393 + 0.0000i | −0.0372 − 0.0198i | 0.0143 − 0.0604i | −0.0623 − 0.1484i |
|---|---|---|---|
| −0.0372 + 0.0198i | −0.3427 − 0.0000i | 0.0010 − 0.0266i | −0.0478 − 0.1084i |
| 0.0143 + 0.0604i | 0.0010 + 0.0266i | −0.3710 + 0.0000i | −0.1653 + 0.0687i |
| −0.0623 + 0.1484i | −0.0478 + 0.1084i | −0.1653 − 0.0687i | −0.6879 − 0.0000i |

W18 =

| −0.4951 − 0.0000i | −0.0479 + 0.1633i | 0.0002 + 0.0791i | 0.0188 − 0.2113i |
|---|---|---|---|
| −0.0479 − 0.1633i | −0.4701 − 0.0000i | −0.0692 + 0.0067i | 0.1461 − 0.0475i |
| 0.0002 − 0.0791i | −0.0692 − 0.0067i | −0.3115 + 0.0000i | 0.0705 − 0.0205i |
| 0.0188 + 0.2113i | 0.1461 + 0.0475i | 0.0705 + 0.0205i | −0.4569 + 0.0000i |

W19 =

| −0.3245 + 0.0000i | −0.0093 + 0.0276i | 0.0260 − 0.0145i | 0.0447 + 0.0299i |
|---|---|---|---|
| −0.0093 − 0.0276i | −0.4375 − 0.0000i | 0.1073 + 0.0774i | −0.0032 + 0.2230i |
| 0.0260 + 0.0145i | 0.1073 − 0.0774i | −0.4046 − 0.0000i | −0.1131 − 0.1526i |
| 0.0447 − 0.0299i | −0.0032 − 0.2230i | −0.1131 + 0.1526i | −0.5690 − 0.0000i |

W20 =

| −0.5057 + 0.0000i | −0.0185 + 0.2315i | 0.0771 + 0.1010i | 0.0668 + 0.1027i |
|---|---|---|---|
| −0.0185 − 0.2315i | −0.5292 − 0.0000i | −0.1007 + 0.0517i | −0.0657 + 0.0726i |
| 0.0771 − 0.1010i | −0.1007 − 0.0517i | −0.3553 − 0.0000i | −0.0531 + 0.0105i |
| 0.0668 − 0.1027i | −0.0657 − 0.0726i | −0.0531 − 0.0105i | −0.3422 + 0.0000i |

W21 =

| −0.5400 + 0.0000i | −0.1565 − 0.1650i | −0.0313 − 0.0572i | −0.0090 + 0.1445i |
|---|---|---|---|
| −0.1565 + 0.1650i | −0.4884 − 0.0000i | −0.0719 + 0.0111i | 0.0809 + 0.1161i |
| −0.0313 + 0.0572i | −0.0719 − 0.0111i | −0.3100 − 0.0000i | 0.0302 + 0.0443i |
| −0.0090 − 0.1445i | 0.0809 − 0.1161i | 0.0302 − 0.0443i | −0.4044 − 0.0000i |

W22 =

| −0.3316 − 0.0000i | −0.0644 − 0.0555i | −0.0342 − 0.0540i | −0.0097 + 0.0031i |
|---|---|---|---|
| −0.0644 + 0.0555i | −0.6701 + 0.0000i | −0.2517 − 0.0749i | −0.0463 − 0.0065i |
| −0.0342 + 0.0540i | −0.2517 + 0.0749i | −0.4311 + 0.0000i | −0.0263 + 0.0079i |
| −0.0097 − 0.0031i | −0.0463 + 0.0065i | −0.0263 − 0.0079i | −0.2976 + 0.0000i |

W23 =

| −0.3632 + 0.0000i | −0.0739 + 0.1022i | −0.0369 − 0.0453i | −0.0383 + 0.1263i |
|---|---|---|---|
| −0.0739 − 0.1022i | −0.4694 − 0.0000i | 0.0189 − 0.0878i | −0.2276 + 0.0553i |
| −0.0369 + 0.0453i | 0.0189 + 0.0878i | −0.3485 − 0.0000i | 0.0469 + 0.1115i |
| −0.0383 − 0.1263i | −0.2276 − 0.0553i | 0.0469 − 0.1115i | −0.5457 − 0.0000i |

W24 =

| −0.6200 + 0.0000i | 0.1835 − 0.1158i | 0.1003 + 0.0883i | −0.1215 + 0.0664i |
|---|---|---|---|
| 0.1835 + 0.1158i | −0.4361 − 0.0000i | −0.0190 − 0.0860i | 0.0712 + 0.0053i |
| 0.1003 − 0.0883i | −0.0190 + 0.0860i | −0.3517 − 0.0000i | −0.0023 − 0.0520i |
| −0.1215 − 0.0664i | 0.0712 − 0.0053i | −0.0023 + 0.0520i | −0.3200 − 0.0000i |

W25 =

| −0.4975 + 0.0000i | 0.2212 + 0.1164i | −0.0444 − 0.0770i | −0.0146 − 0.0295i |
|---|---|---|---|
| 0.2212 − 0.1164i | −0.6360 − 0.0000i | 0.0957 + 0.0354i | 0.0332 + 0.0008i |
| −0.0444 + 0.0770i | 0.0957 − 0.0354i | −0.3078 − 0.0000i | −0.0099 − 0.0071i |
| −0.0146 + 0.0295i | 0.0332 − 0.0008i | −0.0099 + 0.0071i | −0.2949 − 0.0000i |

W26 =

| −0.4272 − 0.0000i | −0.0625 + 0.0237i | −0.0962 + 0.2139i | −0.0154 + 0.0145i |
|---|---|---|---|
| −0.0625 − 0.0237i | −0.3284 − 0.0000i | −0.0939 + 0.0831i | 0.0063 + 0.0150i |
| −0.0962 − 0.2139i | −0.0939 − 0.0831i | −0.6887 + 0.0000i | −0.0151 − 0.0034i |
| −0.0154 − 0.0145i | 0.0063 − 0.0150i | −0.0151 + 0.0034i | −0.2883 + 0.0000i |

-continued

| | W27 = | | |
|---|---|---|---|
| −0.5535 + 0.0000i | −0.0691 − 0.1768i | −0.0792 + 0.0510i | −0.0591 − 0.1873i |
| −0.0691 + 0.1768i | −0.4499 − 0.0000i | 0.0133 + 0.0564i | −0.1488 + 0.0117i |
| −0.0792 − 0.0510i | 0.0133 − 0.0564i | −0.3123 + 0.0000i | 0.0017 − 0.0613i |
| −0.0591 + 0.1873i | −0.1488 − 0.0117i | 0.0017 + 0.0613i | −0.4098 + 0.0000i |
| | W28 = | | |
| −0.3175 − 0.0000i | 0.0323 + 0.0069i | 0.0082 + 0.0272i | −0.0456 − 0.0018i |
| 0.0323 − 0.0069i | −0.3999 + 0.0000i | −0.0496 − 0.1352i | 0.1381 − 0.0721i |
| 0.0082 − 0.0272i | −0.0496 + 0.1352i | −0.4618 + 0.0000i | −0.0477 − 0.2398i |
| −0.0456 + 0.0018i | 0.1381 + 0.0721i | −0.0477 + 0.2398i | −0.5554 + 0.0000i |
| | W29 = | | |
| −0.3978 − 0.0000i | −0.0103 + 0.0238i | −0.0924 − 0.0615i | 0.1676 + 0.0201i |
| −0.0103 − 0.0238i | −0.2833 + 0.0000i | −0.0082 − 0.0312i | 0.0311 + 0.0031i |
| −0.0924 + 0.0615i | −0.0082 + 0.0312i | −0.4259 + 0.0000i | 0.2035 − 0.0602i |
| 0.1676 − 0.0201i | 0.0311 − 0.0031i | 0.2035 + 0.0602i | −0.6349 + 0.0000i |
| | W30 = | | |
| −0.5190 − 0.0000i | −0.0126 − 0.0161i | −0.0472 − 0.2578i | −0.0689 + 0.0126i |
| −0.0126 + 0.0161i | −0.2680 − 0.0000i | −0.0591 − 0.0246i | −0.0073 + 0.0224i |
| −0.0472 + 0.2578i | −0.0591 + 0.0246i | −0.6330 + 0.0000i | −0.0002 + 0.0585i |
| −0.0689 − 0.0126i | −0.0073 − 0.0224i | −0.0002 − 0.0585i | −0.3065 + 0.0000i |
| | W31 = | | |
| −0.4169 + 0.0000i | 0.0194 − 0.1739i | −0.1580 + 0.0223i | 0.0822 + 0.0427i |
| 0.0194 + 0.1739i | −0.5107 + 0.0000i | 0.0517 + 0.1710i | 0.0468 − 0.1031i |
| −0.1580 − 0.0223i | 0.0517 − 0.1710i | −0.4467 + 0.0000i | 0.0816 + 0.0686i |
| 0.0822 − 0.0427i | 0.0468 + 0.1031i | 0.0816 − 0.0686i | −0.3525 − 0.0000i |
| | W32 = | | |
| −0.2839 + 0.0000i | −0.0380 + 0.0331i | 0.0031 + 0.0206i | −0.0473 + 0.0134i |
| −0.0380 − 0.0331i | −0.5940 − 0.0000i | −0.0558 + 0.1859i | −0.1589 − 0.1077i |
| 0.0031 − 0.0206i | −0.0558 − 0.1859i | −0.4151 − 0.0000i | 0.0259 − 0.1445i |
| −0.0473 − 0.0134i | −0.1589 + 0.1077i | 0.0259 + 0.1445i | −0.4375 − 0.0000i |

15) When Nt=4, Nr=4, and B=6:

| | W1 = | | |
|---|---|---|---|
| −0.3400 + 0.0000i | 0.0187 − 0.1683i | −0.0133 + 0.0386i | 0.0817 − 0.0013i |
| 0.0187 + 0.1683i | −0.6539 + 0.0000i | 0.1037 + 0.0103i | 0.0261 − 0.2236i |
| −0.0133 − 0.0386i | 0.1037 − 0.0103i | −0.3154 − 0.0000i | 0.0019 + 0.0594i |
| 0.0817 + 0.0013i | 0.0261 + 0.2236i | 0.0019 − 0.0594i | −0.3914 + 0.0000i |
| | W2 = | | |
| −0.3435 − 0.0000i | −0.0316 − 0.1129i | −0.0117 + 0.0673i | −0.0298 + 0.1178i |
| −0.0316 + 0.1129i | −0.5515 − 0.0000i | 0.1189 + 0.0052i | 0.2249 + 0.1209i |
| −0.0117 − 0.0673i | 0.1189 − 0.0052i | −0.3030 + 0.0000i | −0.1079 − 0.0289i |
| −0.0298 − 0.1178i | 0.2249 − 0.1209i | −0.1079 + 0.0289i | −0.4857 + 0.0000i |
| | W3 = | | |
| −0.5204 + 0.0000i | −0.1266 − 0.0228i | 0.0616 − 0.2193i | −0.0018 − 0.1355i |
| −0.1266 + 0.0228i | −0.3370 − 0.0000i | 0.0209 − 0.1094i | −0.0044 − 0.0749i |
| 0.0616 + 0.2193i | 0.0209 + 0.1094i | −0.5032 − 0.0000i | −0.1249 + 0.0557i |
| −0.0018 + 0.1355i | −0.0044 + 0.0749i | −0.1249 − 0.0557i | −0.3397 + 0.0000i |
| | W4 = | | |
| −0.3467 + 0.0000i | 0.0294 − 0.1747i | −0.0901 + 0.0322i | −0.0178 − 0.0899i |
| 0.0294 + 0.1747i | −0.6308 − 0.0000i | 0.1175 + 0.1068i | −0.1580 + 0.0606i |
| −0.0901 − 0.0322i | 0.1175 − 0.1068i | −0.3709 − 0.0000i | 0.0468 − 0.0862i |
| −0.0178 + 0.0899i | −0.1580 − 0.0606i | 0.0468 + 0.0862i | −0.3457 − 0.0000i |
| | W5 = | | |
| −0.4732 − 0.0000i | −0.2883 + 0.0249i | −0.0488 − 0.0375i | 0.0190 + 0.0180i |
| −0.2883 − 0.0249i | −0.6527 + 0.0000i | −0.0250 − 0.0255i | 0.0309 + 0.0215i |
| −0.0488 + 0.0375i | −0.0250 + 0.0255i | −0.2899 + 0.0000i | 0.0173 + 0.0003i |
| 0.0190 − 0.0180i | 0.0309 − 0.0215i | 0.0173 − 0.0003i | −0.2892 + 0.0000i |
| | W6 = | | |
| −0.4889 − 0.0000i | 0.0215 + 0.1792i | −0.2183 − 0.0231i | −0.0176 + 0.1035i |
| 0.0215 − 0.1792i | −0.4417 − 0.0000i | 0.0408 − 0.1453i | −0.1003 − 0.0236i |
| −0.2183 + 0.0231i | 0.0408 + 0.1453i | −0.4385 − 0.0000i | 0.0074 + 0.0997i |
| −0.0176 − 0.1035i | −0.1003 + 0.0236i | 0.0074 − 0.0997i | −0.3213 + 0.0000i |

-continued

| | W7 = | | |
|---|---|---|---|
| −0.3961 − 0.0000i | 0.1498 − 0.0073i | 0.0857 − 0.0625i | 0.0968 − 0.1110i |
| 0.1498 + 0.0073i | −0.5030 + 0.0000i | −0.1516 + 0.0683i | −0.1350 + 0.1087i |
| 0.0857 + 0.0625i | −0.1516 − 0.0683i | −0.3717 + 0.0000i | −0.1448 − 0.0254i |
| 0.0968 + 0.1110i | −0.1350 − 0.1087i | −0.1448 − 0.0254i | −0.4272 + 0.0000i |
| | W8 = | | |
| −0.3994 − 0.0000i | 0.1663 + 0.0182i | 0.1605 + 0.0045i | −0.0838 + 0.0374i |
| 0.1663 − 0.0182i | −0.4524 + 0.0000i | −0.1945 + 0.0345i | 0.0906 − 0.0669i |
| 0.1605 − 0.0045i | −0.1945 − 0.0345i | −0.4951 + 0.0000i | 0.1322 − 0.0573i |
| −0.0838 − 0.0374i | 0.0906 + 0.0669i | 0.1322 + 0.0573i | −0.3483 + 0.0000i |
| | W9 = | | |
| −0.7212 − 0.0000i | 0.0951 − 0.2380i | −0.0443 + 0.0162i | 0.0288 + 0.0417i |
| 0.0951 + 0.2380i | −0.3907 + 0.0000i | 0.0222 + 0.0153i | 0.0261 − 0.0392i |
| −0.0443 − 0.0162i | 0.0222 − 0.0153i | −0.2842 − 0.0000i | 0.0040 + 0.0094i |
| 0.0288 − 0.0417i | 0.0261 + 0.0392i | 0.0040 − 0.0094i | −0.3154 + 0.0000i |
| | W10 = | | |
| −0.2640 − 0.0000i | 0.0050 − 0.0176i | 0.0330 − 0.0029i | −0.0421 + 0.0051i |
| 0.0050 + 0.0176i | −0.3933 + 0.0000i | −0.0999 − 0.0392i | 0.2156 + 0.0132i |
| 0.0330 + 0.0029i | −0.0999 + 0.0392i | −0.3205 + 0.0000i | 0.1566 − 0.0269i |
| −0.0421 − 0.0051i | 0.2156 − 0.0132i | 0.1566 + 0.0269i | −0.7068 + 0.0000i |
| | W11 = | | |
| −0.4796 − 0.0000i | 0.0300 + 0.0217i | 0.1162 − 0.0885i | 0.2309 + 0.1004i |
| 0.0300 − 0.0217i | −0.2892 − 0.0000i | −0.0021 + 0.0414i | −0.0707 + 0.0238i |
| 0.1162 + 0.0885i | −0.0021 − 0.0414i | −0.3340 − 0.0000i | −0.0929 − 0.1366i |
| 0.2309 − 0.1004i | −0.0707 − 0.0238i | −0.0929 + 0.1366i | −0.5775 − 0.0000i |
| | W12 = | | |
| −0.3975 − 0.0000i | −0.0347 + 0.1548i | 0.0782 − 0.1149i | −0.0619 + 0.1371i |
| −0.0347 − 0.1548i | −0.4113 + 0.0000i | 0.1699 + 0.0742i | −0.1352 − 0.0446i |
| 0.0782 + 0.1149i | 0.1699 − 0.0742i | −0.4479 + 0.0000i | 0.1509 + 0.0016i |
| −0.0619 − 0.1371i | −0.1352 + 0.0446i | 0.1509 − 0.0016i | −0.4279 − 0.0000i |
| | W13 = | | |
| −0.3517 + 0.0000i | −0.1311 + 0.0027i | 0.0647 − 0.1228i | −0.0047 + 0.0585i |
| −0.1311 − 0.0027i | −0.4974 − 0.0000i | 0.1235 − 0.2119i | −0.0288 + 0.1033i |
| 0.0647 + 0.1228i | 0.1235 + 0.2119i | −0.5243 − 0.0000i | 0.0957 − 0.0188i |
| −0.0047 − 0.0585i | −0.0288 − 0.1033i | 0.0957 + 0.0188i | −0.3346 − 0.0000i |
| | W14 = | | |
| −0.4677 + 0.0000i | −0.1136 − 0.0805i | 0.0907 − 0.0442i | −0.2231 − 0.0374i |
| −0.1136 + 0.0805i | −0.3650 + 0.0000i | 0.0099 − 0.0491i | −0.1511 + 0.0462i |
| 0.0907 + 0.0442i | 0.0099 + 0.0491i | −0.3268 − 0.0000i | 0.0825 + 0.0816i |
| −0.2231 + 0.0374i | −0.1511 − 0.0462i | 0.0825 − 0.0816i | −0.5458 + 0.0000i |
| | W15 = | | |
| −0.5714 − 0.0000i | −0.1177 − 0.0717i | 0.0174 + 0.0971i | −0.0182 − 0.2569i |
| −0.1177 + 0.0717i | −0.3003 − 0.0000i | 0.0144 + 0.0492i | −0.0367 − 0.0848i |
| 0.0174 − 0.0971i | 0.0144 − 0.0492i | −0.3119 + 0.0000i | 0.0738 − 0.0033i |
| −0.0182 + 0.2569i | −0.0367 + 0.0848i | 0.0738 + 0.0033i | −0.5125 − 0.0000i |
| | W16 = | | |
| −0.6563 − 0.0000i | −0.2068 − 0.0982i | −0.0319 + 0.1562i | −0.1088 + 0.0240i |
| −0.2068 + 0.0982i | −0.4081 − 0.0000i | 0.0460 + 0.0775i | −0.0611 + 0.0112i |
| −0.0319 − 0.1562i | 0.0460 − 0.0775i | −0.3300 + 0.0000i | −0.0245 − 0.0421i |
| −0.1088 − 0.0240i | −0.0611 − 0.0112i | −0.0245 + 0.0421i | −0.2908 + 0.0000i |
| | W17 = | | |
| −0.4586 + 0.0000i | −0.0720 + 0.0652i | −0.0748 + 0.2268i | 0.0062 + 0.1230i |
| −0.0720 − 0.0652i | −0.3272 + 0.0000i | −0.1008 + 0.0701i | −0.0366 + 0.0597i |
| −0.0748 − 0.2268i | −0.1008 − 0.0701i | −0.5395 − 0.0000i | −0.1510 + 0.0590i |
| 0.0062 − 0.1230i | −0.0366 − 0.0597i | −0.1510 − 0.0590i | −0.3684 − 0.0000i |
| | W18 = | | |
| −0.4174 − 0.0000i | −0.0294 + 0.0915i | 0.1816 + 0.0819i | −0.0379 + 0.0916i |
| −0.0294 − 0.0915i | −0.3501 − 0.0000i | −0.0294 + 0.1522i | −0.0696 − 0.0131i |
| 0.1816 − 0.0819i | −0.0294 − 0.1522i | −0.5776 − 0.0000i | 0.0241 − 0.1804i |
| −0.0379 − 0.0916i | −0.0696 + 0.0131i | 0.0241 + 0.1804i | −0.3575 − 0.0000i |
| | W19 = | | |
| −0.3064 − 0.0000i | 0.0278 − 0.0201i | −0.0571 − 0.0465i | −0.0041 − 0.0043i |
| 0.0278 + 0.0201i | −0.5018 + 0.0000i | −0.0870 + 0.2593i | −0.0639 + 0.0595i |
| −0.0571 + 0.0465i | −0.0870 − 0.2593i | −0.6118 + 0.0000i | −0.0839 − 0.0359i |
| −0.0041 + 0.0043i | −0.0639 − 0.0595i | −0.0839 + 0.0359i | −0.2919 − 0.0000i |

-continued

W20 =

| | | | |
|---|---|---|---|
| −0.4558 − 0.0000i | 0.1417 − 0.1810i | 0.0500 − 0.0887i | −0.1092 − 0.0555i |
| 0.1417 + 0.1810i | −0.5581 − 0.0000i | −0.1020 + 0.0031i | 0.0533 + 0.1607i |
| 0.0500 + 0.0887i | −0.1020 − 0.0031i | −0.3276 + 0.0000i | 0.0202 + 0.0604i |
| −0.1092 + 0.0555i | 0.0533 − 0.1607i | 0.0202 − 0.0604i | −0.3616 + 0.0000i |

W21 =

| | | | |
|---|---|---|---|
| −0.3693 − 0.0000i | −0.0091 − 0.0508i | −0.0705 − 0.2224i | 0.0903 + 0.0054i |
| −0.0091 + 0.0508i | −0.2976 − 0.0000i | −0.0922 − 0.0022i | −0.0044 − 0.0325i |
| −0.0705 + 0.2224i | −0.0922 + 0.0022i | −0.6600 + 0.0000i | 0.0530 − 0.1616i |
| 0.0903 − 0.0054i | −0.0044 + 0.0325i | 0.0530 + 0.1616i | −0.3631 − 0.0000i |

W22 =

| | | | |
|---|---|---|---|
| −0.4486 + 0.0000i | 0.1799 − 0.0303i | 0.0662 + 0.1406i | 0.0544 − 0.1346i |
| 0.1799 + 0.0303i | −0.4702 − 0.0000i | −0.0193 − 0.1385i | −0.0715 + 0.1387i |
| 0.0662 − 0.1406i | −0.0193 + 0.1385i | −0.3722 + 0.0000i | 0.0871 + 0.0782i |
| 0.0544 + 0.1346i | −0.0715 − 0.1387i | 0.0871 − 0.0782i | −0.4085 + 0.0000i |

W23 =

| | | | |
|---|---|---|---|
| −0.2923 + 0.0000i | −0.0551 + 0.0145i | −0.0061 + 0.0199i | −0.0014 + 0.0058i |
| −0.0551 − 0.0145i | −0.7483 − 0.0000i | −0.1876 + 0.1138i | 0.1316 + 0.0115i |
| −0.0061 − 0.0199i | −0.1876 − 0.1138i | −0.3470 − 0.0000i | 0.0277 + 0.0518i |
| −0.0014 − 0.0058i | 0.1316 − 0.0115i | 0.0277 − 0.0518i | −0.2977 − 0.0000i |

W24 =

| | | | |
|---|---|---|---|
| −0.4201 − 0.0000i | 0.0299 − 0.1199i | 0.0611 − 0.0346i | 0.0512 + 0.2450i |
| 0.0299 + 0.1199i | −0.3267 + 0.0000i | −0.0451 − 0.0285i | 0.1197 − 0.0738i |
| 0.0611 + 0.0346i | −0.0451 + 0.0285i | −0.3474 + 0.0000i | 0.0019 − 0.1226i |
| 0.0512 − 0.2450i | 0.1197 + 0.0738i | 0.0019 + 0.1226i | −0.5959 + 0.0000i |

W25 =

| | | | |
|---|---|---|---|
| −0.3422 − 0.0000i | 0.0481 + 0.0157i | −0.0504 − 0.1021i | 0.0401 + 0.1278i |
| 0.0481 − 0.0157i | −0.2560 − 0.0000i | 0.0263 + 0.0040i | −0.0477 − 0.0331i |
| −0.0504 + 0.1021i | 0.0263 − 0.0040i | −0.4783 + 0.0000i | 0.2268 + 0.0782i |
| 0.0401 − 0.1278i | −0.0477 + 0.0331i | 0.2268 − 0.0782i | −0.6312 + 0.0000i |

W26 =

| | | | |
|---|---|---|---|
| −0.4509 − 0.0000i | 0.1222 + 0.0538i | −0.0413 − 0.0079i | −0.1603 − 0.1876i |
| 0.1222 − 0.0538i | −0.3485 + 0.0000i | 0.0320 − 0.0169i | 0.1081 + 0.1183i |
| −0.0413 + 0.0079i | 0.0320 + 0.0169i | −0.2740 + 0.0000i | −0.0095 − 0.0285i |
| −0.1603 + 0.1876i | 0.1081 − 0.1183i | −0.0095 + 0.0285i | −0.6192 + 0.0000i |

W27 =

| | | | |
|---|---|---|---|
| −0.2866 − 0.0000i | −0.0127 + 0.0110i | −0.0609 − 0.1153i | −0.0950 − 0.0291i |
| −0.0127 − 0.0110i | −0.2653 + 0.0000i | −0.0273 − 0.0545i | −0.0303 − 0.0235i |
| −0.0609 + 0.1153i | −0.0273 + 0.0545i | −0.6458 + 0.0000i | −0.1430 + 0.2066i |
| −0.0950 + 0.0291i | −0.0303 + 0.0235i | −0.1430 − 0.2066i | −0.4894 + 0.0000i |

W28 =

| | | | |
|---|---|---|---|
| −0.3017 + 0.0000i | −0.0378 − 0.0038i | 0.0643 + 0.0340i | 0.1201 − 0.0057i |
| −0.0378 + 0.0038i | −0.3031 − 0.0000i | 0.0377 + 0.0149i | 0.0822 + 0.0034i |
| 0.0643 − 0.0340i | 0.0377 − 0.0149i | −0.4079 − 0.0000i | −0.1628 + 0.1481i |
| 0.1201 + 0.0057i | 0.0822 − 0.0034i | −0.1628 − 0.1481i | −0.7033 − 0.0000i |

W29 =

| | | | |
|---|---|---|---|
| −0.3829 − 0.0000i | −0.1310 − 0.0140i | −0.1243 − 0.0350i | −0.0778 − 0.0720i |
| −0.1310 + 0.0140i | −0.4528 − 0.0000i | −0.1763 − 0.0477i | −0.0947 − 0.1278i |
| −0.1243 + 0.0350i | −0.1763 + 0.0477i | −0.4585 + 0.0000i | −0.1471 − 0.0783i |
| −0.0778 + 0.0720i | −0.0947 + 0.1278i | −0.1471 + 0.0783i | −0.4181 + 0.0000i |

W30 =

| | | | |
|---|---|---|---|
| −0.2899 − 0.0000i | −0.0043 + 0.0419i | −0.0256 + 0.0532i | 0.0249 + 0.0048i |
| −0.0043 − 0.0419i | −0.4637 + 0.0000i | −0.1874 − 0.1777i | −0.0250 + 0.0910i |
| −0.0256 − 0.0532i | −0.1874 + 0.1777i | −0.6054 + 0.0000i | 0.0877 + 0.1337i |
| 0.0249 − 0.0048i | −0.0250 − 0.0910i | 0.0877 − 0.1337i | −0.3468 + 0.0000i |

W31 =

| | | | |
|---|---|---|---|
| −0.3025 − 0.0000i | 0.0415 + 0.0182i | −0.0632 − 0.0124i | 0.1065 − 0.0977i |
| 0.0415 − 0.0182i | −0.3286 − 0.0000i | 0.0679 − 0.0198i | −0.0832 + 0.1077i |
| −0.0632 + 0.0124i | 0.0679 + 0.0198i | −0.4155 − 0.0000i | 0.1731 − 0.1451i |
| 0.1065 + 0.0977i | −0.0832 − 0.1077i | 0.1731 + 0.1451i | −0.6517 + 0.0000i |

W32 =

| | | | |
|---|---|---|---|
| −0.5748 + 0.0000i | 0.0499 + 0.0887i | −0.0474 − 0.0126i | −0.2298 + 0.1122i |
| 0.0499 − 0.0887i | −0.3333 − 0.0000i | 0.0063 − 0.0011i | 0.0196 − 0.1485i |
| −0.0474 + 0.0126i | 0.0063 + 0.0011i | −0.2531 + 0.0000i | −0.0438 + 0.0193i |
| −0.2298 − 0.1122i | 0.0196 + 0.1485i | −0.0438 − 0.0193i | −0.5372 − 0.0000i |

-continued

W33 =

| | | | |
|---|---|---|---|
| −0.3263 − 0.0000i | −0.0241 + 0.1687i | 0.0503 − 0.0050i | 0.0493 + 0.0639i |
| −0.0241 − 0.1687i | −0.6870 + 0.0000i | 0.0183 + 0.0975i | −0.1310 + 0.1844i |
| 0.0503 + 0.0050i | 0.0183 − 0.0975i | −0.2941 − 0.0000i | −0.0289 − 0.0391i |
| 0.0493 − 0.0639i | −0.1310 − 0.1844i | −0.0289 + 0.0391i | −0.3634 + 0.0000i |

W34 =

| | | | |
|---|---|---|---|
| −0.3697 + 0.0000i | −0.0008 − 0.0486i | 0.0289 + 0.1300i | −0.1854 + 0.0459i |
| −0.0008 + 0.0486i | −0.2663 − 0.0000i | 0.0488 − 0.0163i | 0.0082 + 0.0654i |
| 0.0289 − 0.1300i | 0.0488 + 0.0163i | −0.4410 − 0.0000i | −0.0066 − 0.2248i |
| −0.1854 − 0.0459i | 0.0082 − 0.0654i | −0.0066 + 0.2248i | −0.6079 − 0.0000i |

W35 =

| | | | |
|---|---|---|---|
| −0.3898 + 0.0000i | −0.0896 + 0.1531i | −0.0261 − 0.0382i | −0.0271 − 0.1722i |
| −0.0896 − 0.1531i | −0.5054 − 0.0000i | 0.0446 − 0.0271i | 0.1887 − 0.1621i |
| −0.0261 + 0.0382i | 0.0446 + 0.0271i | −0.3048 − 0.0000i | −0.0554 − 0.0215i |
| −0.0271 + 0.1722i | 0.1887 + 0.1621i | −0.0554 + 0.0215i | −0.4853 − 0.0000i |

W36 =

| | | | |
|---|---|---|---|
| −0.4669 + 0.0000i | 0.0180 − 0.1462i | −0.1639 − 0.0270i | −0.1978 + 0.0419i |
| 0.0180 + 0.1462i | −0.3629 − 0.0000i | −0.0083 + 0.1355i | 0.0403 + 0.1241i |
| −0.1639 + 0.0270i | −0.0083 − 0.1355i | −0.4320 − 0.0000i | −0.1143 + 0.0944i |
| −0.1978 − 0.0419i | 0.0403 − 0.1241i | −0.1143 − 0.0944i | −0.4105 − 0.0000i |

W37 =

| | | | |
|---|---|---|---|
| −0.3756 + 0.0000i | −0.0299 − 0.1035i | 0.0536 + 0.1500i | −0.0551 − 0.0844i |
| −0.0299 + 0.1035i | −0.3854 − 0.0000i | 0.1797 + 0.0123i | −0.1144 + 0.0124i |
| 0.0536 − 0.1500i | 0.1797 − 0.0123i | −0.5516 − 0.0000i | 0.2080 + 0.0087i |
| −0.0551 + 0.0844i | −0.1144 − 0.0124i | 0.2080 − 0.0087i | −0.3657 + 0.0000i |

W38 =

| | | | |
|---|---|---|---|
| −0.3191 + 0.0000i | 0.0452 − 0.0471i | −0.0209 + 0.0211i | 0.0930 − 0.0184i |
| 0.0452 + 0.0471i | −0.4397 − 0.0000i | 0.0464 − 0.0254i | −0.2502 − 0.1434i |
| −0.0209 − 0.0211i | 0.0464 + 0.0254i | −0.3023 − 0.0000i | 0.0448 + 0.0472i |
| 0.0930 + 0.0184i | −0.2502 + 0.1434i | 0.0448 − 0.0472i | −0.6362 − 0.0000i |

W39 =

| | | | |
|---|---|---|---|
| −0.5452 − 0.0000i | −0.1424 − 0.1257i | −0.1395 − 0.0622i | 0.2008 + 0.0127i |
| −0.1424 + 0.1257i | −0.3936 − 0.0000i | −0.0965 + 0.0121i | 0.0760 − 0.0968i |
| −0.1395 + 0.0622i | −0.0965 − 0.0121i | −0.3022 − 0.0000i | 0.0763 − 0.0374i |
| 0.2008 − 0.0127i | 0.0760 + 0.0968i | 0.0763 + 0.0374i | −0.4393 + 0.0000i |

W40 =

| | | | |
|---|---|---|---|
| −0.3756 + 0.0000i | −0.0049 − 0.0239i | 0.2036 + 0.0587i | 0.0415 − 0.0067i |
| −0.0049 + 0.0239i | −0.2706 + 0.0000i | 0.0204 − 0.0345i | −0.0090 − 0.0061i |
| 0.2036 − 0.0587i | 0.0204 + 0.0345i | −0.7658 − 0.0000i | −0.0738 + 0.0290i |
| 0.0415 + 0.0067i | −0.0090 + 0.0061i | −0.0738 − 0.0290i | −0.2977 + 0.0000i |

W41 =

| | | | |
|---|---|---|---|
| −0.4068 − 0.0000i | 0.1260 + 0.0780i | −0.0368 + 0.1220i | −0.0803 + 0.0651i |
| 0.1260 − 0.0780i | −0.4803 + 0.0000i | 0.0070 − 0.1618i | 0.0745 − 0.1559i |
| −0.0368 − 0.1220i | 0.0070 + 0.1618i | −0.4191 − 0.0000i | −0.1692 − 0.0333i |
| −0.0803 − 0.0651i | 0.0745 + 0.1559i | −0.1692 + 0.0333i | −0.3985 + 0.0000i |

W42 =

| | | | |
|---|---|---|---|
| −0.2811 − 0.0000i | −0.0782 − 0.0038i | 0.0635 + 0.0554i | 0.0601 − 0.0073i |
| −0.0782 + 0.0038i | −0.5452 − 0.0000i | 0.2403 + 0.1400i | 0.0854 − 0.0338i |
| 0.0635 − 0.0554i | 0.2403 − 0.1400i | −0.5476 − 0.0000i | −0.0830 + 0.0567i |
| 0.0601 + 0.0073i | 0.0854 + 0.0338i | −0.0830 − 0.0567i | −0.3135 + 0.0000i |

W43 =

| | | | |
|---|---|---|---|
| −0.5315 − 0.0000i | −0.1736 + 0.0359i | 0.1542 − 0.0260i | 0.2024 + 0.0198i |
| −0.1736 − 0.0359i | −0.3780 + 0.0000i | 0.0912 + 0.0047i | 0.1184 + 0.0309i |
| 0.1542 + 0.0260i | 0.0912 − 0.0047i | −0.3665 + 0.0000i | −0.1051 − 0.0354i |
| 0.2024 − 0.0198i | 0.1184 − 0.0309i | −0.1051 + 0.0354i | −0.4178 + 0.0000i |

W44 =

| | | | |
|---|---|---|---|
| −0.3029 − 0.0000i | −0.0559 + 0.1005i | 0.0192 − 0.0415i | −0.0499 − 0.0010i |
| −0.0559 − 0.1005i | −0.6583 − 0.0000i | 0.1408 − 0.1268i | −0.1139 − 0.1564i |
| 0.0192 + 0.0415i | 0.1408 + 0.1268i | −0.3652 − 0.0000i | −0.0095 + 0.1207i |
| −0.0499 + 0.0010i | −0.1139 + 0.1564i | −0.0095 − 0.1207i | −0.3606 + 0.0000i |

W45 =

| | | | |
|---|---|---|---|
| −0.2865 + 0.0000i | −0.0167 − 0.0033i | 0.0158 − 0.0166i | 0.0332 − 0.0025i |
| −0.0167 + 0.0033i | −0.4399 − 0.0000i | −0.0807 − 0.2197i | 0.1395 − 0.0449i |
| 0.0158 + 0.0166i | −0.0807 + 0.2197i | −0.5667 − 0.0000i | 0.0037 − 0.1875i |
| 0.0332 + 0.0025i | 0.1395 + 0.0449i | 0.0037 + 0.1875i | −0.4201 − 0.0000i |

-continued

W46 =

| −0.3627 + 0.0000i | 0.0545 + 0.0592i | −0.0930 − 0.1181i | 0.0246 − 0.0941i |
| --- | --- | --- | --- |
| 0.0545 − 0.0592i | −0.3334 + 0.0000i | 0.1383 + 0.0206i | 0.0612 + 0.0848i |
| −0.0930 + 0.1181i | 0.1383 − 0.0206i | −0.5835 − 0.0000i | −0.1433 − 0.1691i |
| 0.0246 + 0.0941i | 0.0612 − 0.0848i | −0.1433 + 0.1691i | −0.4250 + 0.0000i |

W47 =

| −0.3074 + 0.0000i | −0.0279 + 0.0722i | 0.0404 + 0.0378i | −0.0686 + 0.0269i |
| --- | --- | --- | --- |
| −0.0279 − 0.0722i | −0.5340 + 0.0000i | −0.0794 + 0.1338i | −0.1259 − 0.2159i |
| 0.0404 − 0.0378i | −0.0794 − 0.1338i | −0.3460 − 0.0000i | 0.0765 − 0.1404i |
| −0.0686 − 0.0269i | −0.1259 + 0.2159i | 0.0765 + 0.1404i | −0.4972 − 0.0000i |

W48 =

| −0.7012 + 0.0000i | 0.0659 + 0.0536i | −0.1762 − 0.1283i | 0.0896 − 0.1248i |
| --- | --- | --- | --- |
| 0.0659 − 0.0536i | −0.3022 + 0.0000i | 0.0580 + 0.0161i | −0.0217 + 0.0340i |
| −0.1762 + 0.1283i | 0.0580 − 0.0161i | −0.3682 + 0.0000i | 0.0070 − 0.0673i |
| 0.0896 + 0.1248i | −0.0217 − 0.0340i | 0.0070 + 0.0673i | −0.3241 + 0.0000i |

W49 =

| −0.4248 − 0.0000i | 0.0202 − 0.1850i | 0.0839 − 0.0727i | 0.0587 − 0.0143i |
| --- | --- | --- | --- |
| 0.0202 + 0.1850i | −0.6318 − 0.0000i | −0.1099 − 0.1801i | −0.0606 − 0.0571i |
| 0.0839 + 0.0727i | −0.1099 + 0.1801i | −0.3734 + 0.0000i | −0.0344 − 0.0072i |
| 0.0587 + 0.0143i | −0.0606 + 0.0571i | −0.0344 + 0.0072i | −0.2729 + 0.0000i |

W50 =

| −0.4282 − 0.0000i | −0.0609 + 0.0157i | −0.1411 + 0.1903i | −0.0037 − 0.0963i |
| --- | --- | --- | --- |
| −0.0609 − 0.0157i | −0.3028 + 0.0000i | −0.1038 + 0.0341i | 0.0209 − 0.0533i |
| −0.1411 − 0.1903i | −0.1038 − 0.0341i | −0.6147 + 0.0000i | 0.1166 − 0.1163i |
| −0.0037 + 0.0963i | 0.0209 + 0.0533i | 0.1166 + 0.1163i | −0.3518 + 0.0000i |

W51 =

| −0.5387 + 0.0000i | −0.0014 − 0.1630i | 0.2049 + 0.0993i | −0.0562 + 0.1035i |
| --- | --- | --- | --- |
| −0.0014 + 0.1630i | −0.4233 − 0.0000i | 0.0653 − 0.1321i | 0.0841 + 0.0340i |
| 0.2049 − 0.0993i | 0.0653 + 0.1321i | −0.4302 + 0.0000i | 0.0163 − 0.0756i |
| −0.0562 − 0.1035i | 0.0841 − 0.0340i | 0.0163 + 0.0756i | −0.2987 − 0.0000i |

W52 =

| −0.3536 − 0.0000i | 0.0245 − 0.0715i | −0.1652 − 0.0046i | 0.0251 + 0.1102i |
| --- | --- | --- | --- |
| 0.0245 + 0.0715i | −0.3304 − 0.0000i | 0.0483 + 0.1164i | 0.0625 − 0.0839i |
| −0.1652 + 0.0046i | 0.0483 − 0.1164i | −0.5894 + 0.0000i | 0.0604 + 0.2109i |
| 0.0251 − 0.1102i | 0.0625 + 0.0839i | 0.0604 − 0.2109i | −0.4206 − 0.0000i |

W53 =

| −0.3762 + 0.0000i | 0.1907 + 0.0404i | −0.0774 − 0.1094i | −0.0804 + 0.0065i |
| --- | --- | --- | --- |
| 0.1907 − 0.0404i | −0.5757 + 0.0000i | 0.1369 + 0.0930i | 0.0997 − 0.0796i |
| −0.0774 + 0.1094i | 0.1369 − 0.0930i | −0.4026 − 0.0000i | −0.0682 + 0.0754i |
| −0.0804 − 0.0065i | 0.0997 + 0.0796i | −0.0682 − 0.0754i | −0.3634 − 0.0000i |

W54 =

| −0.3373 − 0.0000i | −0.0798 + 0.0904i | 0.0595 + 0.0852i | 0.0087 − 0.0609i |
| --- | --- | --- | --- |
| −0.0798 − 0.0904i | −0.4577 + 0.0000i | −0.0238 + 0.2074i | 0.0932 − 0.1154i |
| 0.0595 − 0.0852i | −0.0238 − 0.2074i | −0.5221 + 0.0000i | 0.1519 + 0.1009i |
| 0.0087 + 0.0609i | 0.0932 + 0.1154i | 0.1519 − 0.1009i | −0.3850 + 0.0000i |

W55 =

| −0.5196 − 0.0000i | −0.0158 + 0.0697i | −0.0957 + 0.0941i | 0.2655 − 0.0172i |
| --- | --- | --- | --- |
| −0.0158 − 0.0697i | −0.3035 + 0.0000i | −0.0218 − 0.0008i | 0.0428 + 0.0762i |
| −0.0957 − 0.0941i | −0.0218 + 0.0008i | −0.3030 + 0.0000i | 0.0893 + 0.0758i |
| 0.2655 + 0.0172i | 0.0428 − 0.0762i | 0.0893 − 0.0758i | −0.5610 + 0.0000i |

W56 =

| −0.4610 + 0.0000i | 0.1353 − 0.0177i | −0.1759 + 0.1152i | −0.0134 − 0.0277i |
| --- | --- | --- | --- |
| 0.1353 + 0.0177i | −0.3860 − 0.0000i | 0.1763 − 0.0831i | 0.0071 + 0.0503i |
| −0.1759 − 0.1152i | 0.1763 + 0.0831i | −0.5883 − 0.0000i | 0.0196 − 0.0537i |
| −0.0134 + 0.0277i | 0.0071 − 0.0503i | 0.0196 + 0.0537i | −0.2778 − 0.0000i |

W57 =

| −0.2727 − 0.0000i | −0.0488 + 0.0146i | −0.0345 + 0.0256i | −0.0360 + 0.0573i |
| --- | --- | --- | --- |
| −0.0488 − 0.0146i | −0.3715 + 0.0000i | −0.0584 + 0.0824i | −0.1859 + 0.0947i |
| −0.0345 − 0.0256i | −0.0584 − 0.0824i | −0.3487 − 0.0000i | −0.1606 − 0.0617i |
| −0.0360 − 0.0573i | −0.1859 − 0.0947i | −0.1606 + 0.0617i | −0.6938 − 0.0000i |

W58 =

| −0.5184 − 0.0000i | 0.2590 + 0.1288i | 0.0212 + 0.0088i | 0.0821 + 0.1032i |
| --- | --- | --- | --- |
| 0.2590 − 0.1288i | −0.5675 − 0.0000i | −0.0130 + 0.0109i | −0.1014 − 0.0092i |
| 0.0212 − 0.0088i | −0.0130 − 0.0109i | −0.2735 − 0.0000i | 0.0043 + 0.0002i |
| 0.0821 − 0.1032i | −0.1014 + 0.0092i | 0.0043 − 0.0002i | −0.3315 + 0.0000i |

-continued

| W59 = | | | |
|---|---|---|---|
| −0.2990 + 0.0000i | 0.0029 + 0.1161i | −0.0549 + 0.0242i | 0.0292 − 0.0511i |
| 0.0029 − 0.1161i | −0.6510 + 0.0000i | 0.0626 − 0.1684i | 0.1660 + 0.1362i |
| −0.0549 − 0.0242i | 0.0626 + 0.1684i | −0.3580 − 0.0000i | 0.0573 − 0.0857i |
| 0.0292 + 0.0511i | 0.1660 − 0.1362i | 0.0573 + 0.0857i | −0.3734 − 0.0000i |

| W60 = | | | |
|---|---|---|---|
| −0.7389 − 0.0000i | −0.0212 + 0.0413i | 0.0987 − 0.1600i | −0.1024 + 0.1525i |
| −0.0212 − 0.0413i | −0.2831 + 0.0000i | −0.0002 + 0.0137i | −0.0116 + 0.0197i |
| 0.0987 + 0.1600i | −0.0002 − 0.0137i | −0.3530 − 0.0000i | 0.0567 − 0.0002i |
| −0.1024 − 0.1525i | −0.0116 − 0.0197i | 0.0567 + 0.0002i | −0.3146 + 0.0000i |

| W61 = | | | |
|---|---|---|---|
| −0.7145 − 0.0000i | 0.0226 + 0.2377i | 0.0803 + 0.0875i | 0.0075 − 0.0746i |
| 0.0226 − 0.2377i | −0.3632 + 0.0000i | −0.0517 + 0.0344i | 0.0332 + 0.0038i |
| 0.0803 − 0.0875i | −0.0517 − 0.0344i | −0.3164 − 0.0000i | 0.0152 + 0.0202i |
| 0.0075 + 0.0746i | 0.0332 − 0.0038i | 0.0152 − 0.0202i | −0.3046 + 0.0000i |

| W62 = | | | |
|---|---|---|---|
| −0.5794 − 0.0000i | 0.0684 − 0.0473i | 0.0346 + 0.1679i | 0.1621 + 0.1585i |
| 0.0684 + 0.0473i | −0.3098 − 0.0000i | 0.0377 − 0.0772i | −0.0254 − 0.0691i |
| 0.0346 − 0.1679i | 0.0377 + 0.0772i | −0.4090 + 0.0000i | −0.0891 + 0.0806i |
| 0.1621 − 0.1585i | −0.0254 + 0.0691i | −0.0891 − 0.0806i | −0.4138 − 0.0000i |

| W63 = | | | |
|---|---|---|---|
| −0.3873 − 0.0000i | −0.1141 − 0.0196i | −0.0712 − 0.0397i | −0.0333 + 0.1897i |
| −0.1141 + 0.0196i | −0.4148 − 0.0000i | −0.0964 − 0.0165i | 0.0279 + 0.2030i |
| −0.0712 + 0.0397i | −0.0964 + 0.0165i | −0.3185 + 0.0000i | 0.0332 + 0.1007i |
| −0.0333 − 0.1897i | 0.0279 − 0.2030i | 0.0332 − 0.1007i | −0.5802 + 0.0000i |

| W64 = | | | |
|---|---|---|---|
| −0.4220 + 0.0000i | 0.0779 + 0.0459i | 0.1444 − 0.1315i | −0.1122 − 0.1039i |
| 0.0779 − 0.0459i | −0.3238 − 0.0000i | −0.0566 + 0.1085i | 0.1034 + 0.0166i |
| 0.1444 + 0.1315i | −0.0566 − 0.1085i | −0.4928 − 0.0000i | 0.0340 + 0.1998i |
| −0.1122 + 0.1039i | 0.1034 − 0.0166i | 0.0340 − 0.1998i | −0.4481 − 0.0000i |

(2) When the $k^{th}$ receiver calculates an explicit feedback vector as $h = vec(R)$ and uses $v = h/|vec(R)|_2$ to generate information associated with the direction of the explicit feedback vector where R denotes an R matrix obtained by performing QR decomposition of an explicit channel matrix $H_k$:

A definition may be made as $ri = vec(Ri)$. A codebook $\{R_i\}_{i=1}^{2^B}$ where B denotes a number of feedback bits may be given as a set of matrices Ri and may also be expressed by $\{r_i\}_{i=1}^{2^B}$ that is a set of equivalent vectors ri.

1) When Nt=2, Nr=2, and B=2:

| R1 = | |
|---|---|
| −0.7659 − 0.0000i | 0.3490 + 0.1813i |
| 0 | 0.5087 − 0.0008i | r1 may be equivalently expressed by:

| r1 = |
|---|
| −0.7659 − 0.0000i |
| 0 |
| 0.3490 + 0.1813i |
| 0.5087 − 0.0008i. |

In this example, "0" is removed and thus r1_reduced may be expressed as follows:

| r1_reduced = |
|---|
| −0.7659 − 0.0000i |
| 0.3490 + 0.1813i |
| 0.5087 − 0.0008i |

| R2 = | |
|---|---|
| −0.7694 − 0.0000i | −0.0245 + 0.3825i |
| 0 | −0.5110 − 0.0021i |

| R3 = | |
|---|---|
| −0.7701 − 0.0000i | −0.3642 − 0.1678i |
| 0 | 0.4962 − 0.0040i |

| R4 = | |
|---|---|
| −0.7657 − 0.0000i | 0.0253 − 0.3959i |
| 0 | −0.5062 − 0.0022i |

2) When Nt=2, Nr=2, and B=3:

| R1 = | |
|---|---|
| −0.6775 + 0.0000i | −0.5342 + 0.2455i |
| 0 | 0.4421 + 0.0009i |

| R2 = | |
|---|---|
| −0.6722 − 0.0000i | 0.5913 + 0.0972i |
| 0 | 0.4349 − 0.0020i |

| R3 = | |
|---|---|
| −0.6803 + 0.0000i | −0.2690 + 0.4147i |
| 0 | −0.5411 + 0.0018i |

| R4 = | |
|---|---|
| −0.8235 + 0.0000i | 0.0161 + 0.1819i |
| 0 | 0.5371 − 0.0000i |

| R5 = | |
|---|---|
| −0.9174 + 0.0000i | 0.0194 − 0.0211i |
| 0 | −0.3970 − 0.0001i |

| R6 = | |
|---|---|
| −0.6845 + 0.0000i | −0.2368 − 0.4753i |
| 0 | −0.4995 + 0.0005i |

| R7 = | |
|---|---|
| −0.6625 − 0.0000i | 0.5254 + 0.0153i |
| 0 | −0.5337 − 0.0003i |

| R8 = | |
|---|---|
| −0.7326 + 0.0000i | −0.0456 − 0.4543i |
| 0 | 0.5048 − 0.0011i |

3) When Nt=2, Nr=2, and B=4:

| R1 = | |
|---|---|
| −0.6128 − 0.0000i | 0.5327 − 0.3700i |
| 0 | 0.4515 + 0.0023i |

| R2 = | |
|---|---|
| −0.6754 − 0.0000i | −0.5822 − 0.0504i |
| 0 | 0.4498 + 0.0011i |

| R3 = | |
|---|---|
| −0.8914 + 0.0000i | 0.0221 − 0.2721i |
| 0 | −0.3617 − 0.0000i |

| R4 = | |
|---|---|
| −0.7086 − 0.0000i | −0.4995 + 0.2184i |
| 0 | −0.4479 − 0.0018i |

| R5 = | |
|---|---|
| −0.7062 + 0.0000i | 0.4574 + 0.3189i |
| 0 | 0.4364 + 0.0017i |

| R6 = | |
|---|---|
| −0.6339 − 0.0000i | −0.4678 − 0.4270i |
| 0 | −0.4438 + 0.0014i |

| R7 = | |
|---|---|
| −0.6275 − 0.0000i | 0.0640 + 0.6128i |
| 0 | −0.4760 − 0.0003i |

| R8 = | |
|---|---|
| −0.5909 − 0.0000i | −0.2036 + 0.6513i |
| 0 | 0.4303 + 0.0000i |

| R9 = | |
|---|---|
| −0.6195 − 0.0000i | −0.0136 + 0.0336i |
| 0 | 0.7842 + 0.0000i |

| R10 = | |
|---|---|
| −0.6159 − 0.0000i | 0.0124 − 0.0200i |
| 0 | −0.7874 + 0.000i |

| R11 = | |
|---|---|
| −0.6114 − 0.0000i | 0.3253 − 0.5542i |
| 0 | −0.4618 + 0.0005i |

| R12 = | |
|---|---|
| −0.8976 + 0.0000i | 0.1246 − 0.1850i |
| 0 | 0.3803 − 0.0002i |

| R13 = | |
|---|---|
| −0.8949 + 0.0000i | −0.1206 + 0.2310i |
| 0 | 0.3623 + 0.0004i |

| R14 = | |
|---|---|
| −0.9088 − 0.0000i | 0.0323 + 0.1857i |
| 0 | −0.3722 − 0.0001i |

| R15 = | |
|---|---|
| −0.6848 + 0.0000i | 0.5626 + 0.1195i |
| 0 | −0.4475 + 0.0016i |

| R16 = | |
|---|---|
| −0.6409 − 0.0000i | −0.1444 − 0.5774i |
| 0 | 0.4847 − 0.0001i |

4) When Nt=2, Nr=2, and B=5:

| R1 = | |
|---|---|
| −0.8851 + 0.0000i | −0.0441 + 0.3047i |
| 0 | −0.3489 + 0.0001i |

| R2 = | |
|---|---|
| −0.8146 + 0.0000i | −0.2062 − 0.3493i |
| 0 | 0.4147 + 0.0015i |

| R3 = | |
|---|---|
| −0.8246 + 0.0000i | −0.4449 + 0.1130i |
| 0 | −0.3306 + 0.0006i |

| R4 = | |
|---|---|
| −0.8608 − 0.0000i | −0.2145 + 0.3489i |
| 0 | 0.3022 + 0.0016i |

| R5 = | |
|---|---|
| −0.5542 − 0.0000i | −0.3036 + 0.0528i |
| 0 | −0.7732 − 0.0005i |

| R6 = | |
|---|---|
| −0.5659 − 0.0000i | −0.6687 − 0.2356i |
| 0 | −0.4208 − 0.0040i |

| R7 = | |
|---|---|
| −0.8496 + 0.0000i | 0.2592 + 0.2895i |
| 0 | 0.3565 − 0.0012i |

| R8 = | |
|---|---|
| −0.8486 + 0.0000i | 0.3142 − 0.2715i |
| 0 | 0.3278 + 0.0011i |

| R9 = | |
|---|---|
| −0.7886 + 0.0000i | 0.4268 + 0.2229i |
| 0 | −0.3823 − 0.0013i |

| R10 = | |
|---|---|
| −0.5151 + 0.0000i | −0.7467 − 0.1386i |
| 0 | 0.3974 − 0.0043i |

| R11 = | |
|---|---|
| −0.8752 − 0.0000i | −0.2445 − 0.3441i |
| 0 | −0.2361 + 0.0002i |

| R12 = | |
|---|---|
| −0.5321 − 0.0000i | 0.0583 + 0.4585i |
| 0 | 0.7094 + 0.0036i |

| R13 = | |
|---|---|
| −0.6146 − 0.0000i | 0.5953 + 0.3385i |
| 0 | 0.3916 − 0.0040i |

| R14 = | |
|---|---|
| −0.6024 − 0.0000i | −0.0616 + 0.7309i |
| 0 | 0.3147 + 0.0017i |

-continued

R15 =

| | |
|---|---|
| −0.8212 − 0.0000i | −0.4383 − 0.0129i |
| 0 | 0.3652 + 0.0003i |

R16 =

| | |
|---|---|
| −0.9635 + 0.0000i | 0.0261 − 0.0274i |
| 0 | 0.2650 − 0.0000i |

R17 =

| | |
|---|---|
| −0.5588 + 0.0000i | −0.1281 − 0.5779i |
| 0 | −0.5808 + 0.0030i |

R18 =

| | |
|---|---|
| −0.5439 + 0.0000i | 0.7239 − 0.1426i |
| 0 | −0.3996 + 0.0074i |

R19 =

| | |
|---|---|
| −0.6182 + 0.0000i | 0.1418 + 0.2892i |
| 0 | −0.7170 + 0.0005i |

R20 =

| | |
|---|---|
| −0.5922 + 0.0000i | 0.2557 + 0.6658i |
| 0 | −0.3749 − 0.0048i |

R21 =

| | |
|---|---|
| −0.5561 − 0.0000i | 0.3364 − 0.1766i |
| 0 | −0.7392 − 0.0023i |

R22 =

| | |
|---|---|
| −0.5455 + 0.0000i | 0.6503 − 0.3567i |
| 0 | 0.3903 + 0.0004i |

R23 =

| | |
|---|---|
| −0.5890 + 0.0000i | −0.4358 + 0.3562i |
| 0 | 0.5799 + 0.0009i |

R24 =

| | |
|---|---|
| −0.5989 − 0.0000i | −0.0733 − 0.7344i |
| 0 | 0.3108 − 0.0001i |

R25 =

| | |
|---|---|
| −0.7540 + 0.0000i | 0.2572 − 0.4890i |
| 0 | −0.3552 + 0.0007i |

R26 =

| | |
|---|---|
| −0.7778 − 0.0000i | −0.0369 + 0.0339i |
| 0 | 0.6265 + 0.0000i |

R27 =

| | |
|---|---|
| −0.6288 + 0.0000i | 0.3789 − 0.0141i |
| 0 | 0.6788 − 0.0002i |

R28 =

| | |
|---|---|
| −0.4988 + 0.0000i | −0.2687 − 0.1058i |
| 0 | 0.8172 − 0.0000i |

R29 =

| | |
|---|---|
| −0.5759 − 0.0000i | −0.4105 + 0.5297i |
| 0 | −0.4682 − 0.0001i |

R30 =

| | |
|---|---|
| −0.9215 − 0.0000i | 0.2142 − 0.0759i |
| 0 | −0.3150 + 0.0004i |

R31 =

| | |
|---|---|
| −0.5677 − 0.0000i | 0.0815 − 0.4604i |
| 0 | 0.6776 + 0.0017i |

R32 =

| | |
|---|---|
| −0.7828 + 0.0000i | −0.0721 − 0.1326i |
| 0 | −0.6037 + 0.0005i |

5) When Nt=2, Nr=2, and B=6:

R1 =

| | |
|---|---|
| −0.4966 − 0.0000i | −0.6509 − 0.4931i |
| 0 | −0.2943 − 0.0045i |

R2 =

| | |
|---|---|
| −0.4387 − 0.0000i | −0.3630 + 0.2516i |
| 0 | −0.7825 + 0.0023i |

R3 =

| | |
|---|---|
| −0.7564 + 0.0000i | 0.2267 − 0.2676i |
| 0 | −0.5522 + 0.0007i |

R4 =

| | |
|---|---|
| −0.4088 − 0.0000i | −0.2155 + 0.8514i |
| 0 | 0.2481 + 0.0078i |

R5 =

| | |
|---|---|
| −0.8451 + 0.0000i | 0.0442 − 0.4792i |
| 0 | −0.2331 + 0.0006i |

R6 =

| | |
|---|---|
| −0.6655 + 0.0000i | −0.0106 − 0.5289i |
| 0 | −0.5266 − 0.0005i |

R7 =

| | |
|---|---|
| −0.4600 − 0.0000i | −0.3867 − 0.4181i |
| 0 | −0.6812 − 0.0020i |

R8 =

| | |
|---|---|
| −0.5392 − 0.0000i | 0.5841 + 0.2887i |
| 0 | 0.5336 + 0.0005i |

R9 =

| | |
|---|---|
| −0.5207 − 0.0000i | −0.4315 − 0.0922i |
| 0 | 0.7309 + 0.0010i |

R10 =

| | |
|---|---|
| −0.5846 − 0.0000i | −0.2864 − 0.4561i |
| 0 | 0.6067 − 0.0012i |

R11 =

| | |
|---|---|
| −0.7546 + 0.0000i | −0.1091 − 0.0472i |
| 0 | 0.6454 + 0.0000i |

R12 =

| | |
|---|---|
| −0.6433 + 0.0000i | 0.4464 + 0.5764i |
| 0 | 0.2338 + 0.0029i |

R13 =

| | |
|---|---|
| −0.7433 − 0.0000i | 0.5843 − 0.0973i |
| 0 | 0.3109 − 0.0007i |

R14 =

| | |
|---|---|
| −0.7526 − 0.0000i | 0.3735 + 0.1343i |
| 0 | −0.5254 + 0.0000i |

R15 =

| | |
|---|---|
| −0.4192 + 0.0000i | −0.0738 − 0.0722i |
| 0 | −0.9020 + 0.0004i |

R16 =

| | |
|---|---|
| −0.9043 + 0.0000i | 0.2961 − 0.1225i |
| 0 | −0.2822 + 0.0004i |

R17 =

| | |
|---|---|
| −0.5269 + 0.0000i | 0.4759 − 0.1481i |
| 0 | 0.6884 − 0.0001i |

R18 =

| | |
|---|---|
| −0.8264 + 0.0000i | 0.0156 + 0.2327i |
| 0 | 0.5126 + 0.0004i |

R19 =

| | |
|---|---|
| −0.8715 − 0.0000i | −0.0526 − 0.2888i |
| 0 | 0.3929 + 0.0000i |

R20 =

| −0.8246 + 0.0000i | 0.3488 + 0.2338i |
| 0 | 0.3791 − 0.0008i |

R21 =

| −0.6192 − 0.0000i | 0.1013 − 0.3232i |
| 0 | 0.7084 + 0.0006i |

R22 =

| −0.8868 + 0.0000i | 0.0002 + 0.3978i |
| 0 | 0.2352 − 0.0001i |

R23 =

| −0.4710 + 0.0000i | 0.5313 + 0.6092i |
| 0 | −0.3531 − 0.0035i |

R24 =

| −0.7864 + 0.0000i | −0.5300 + 0.2114i |
| 0 | 0.2365 − 0.0007i |

R25 =

| −0.5260 + 0.0000i | −0.7731 + 0.0218i |
| 0 | 0.3539 − 0.0026i |

R26 =

| −0.7139 − 0.0000i | −0.3915 + 0.2567i |
| 0 | 0.5207 − 0.0017i |

R27 =

| −0.9527 − 0.0000i | −0.1780 + 0.0181i |
| 0 | 0.2457 + 0.0003i |

R28 =

| −0.5110 − 0.0000i | 0.1071 − 0.7790i |
| 0 | −0.3471 + 0.0045i |

R29 =

| −0.9423 − 0.0000i | 0.1975 − 0.0393i |
| 0 | 0.2673 − 0.0001i |

R30 =

| −0.4916 + 0.0000i | 0.0351 + 0.0170i |
| 0 | 0.8699 + 0.0001i |

R31 =

| −0.6376 − 0.0000i | −0.4779 − 0.1294i |
| 0 | −0.5902 − 0.0010i |

R32 =

| −0.8141 + 0.0000i | −0.3047 + 0.4419i |
| 0 | −0.2216 − 0.0002i |

R33 =

| −0.8109 + 0.0000i | −0.3511 − 0.0492i |
| 0 | 0.4656 − 0.0002i |

R34 =

| −0.4785 + 0.0000i | −0.4813 − 0.6447i |
| 0 | 0.3517 − 0.0041i |

R35 =

| −0.5197 + 0.0000i | 0.2353 − 0.6111i |
| 0 | 0.5486 + 0.0021i |

R36 =

| −0.9436 − 0.0000i | 0.1495 + 0.1453i |
| 0 | −0.2571 − 0.0001i |

R37 =

| −0.4278 + 0.0000i | −0.4155 + 0.5081i |
| 0 | 0.6215 − 0.0008i |

R38 =

| −0.9080 − 0.0000i | −0.2781 + 0.1005i |
| 0 | −0.2968 + 0.0000i |

R39 =

| −0.4808 − 0.0000i | 0.6728 − 0.1432i |
| 0 | −0.5437 − 0.0036i |

R40 =

| −0.8474 + 0.0000i | 0.0135 + 0.0171i |
| 0 | −0.5305 − 0.0000i |

R41 =

| −0.6381 + 0.0000i | 0.0539 + 0.0931i |
| 0 | −0.7624 − 0.0001i |

R42 =

| −0.7899 + 0.0000i | −0.3816 − 0.3539i |
| 0 | −0.3243 + 0.0009i |

R43 =

| −0.7928 + 0.0000i | −0.0031 + 0.3591i |
| 0 | −0.4925 − 0.0003i |

R44 =

| −0.5772 + 0.0000i | −0.2042 + 0.7108i |
| 0 | −0.3463 + 0.0038i |

R45 =

| −0.7933 − 0.0000i | −0.4530 − 0.3052i |
| 0 | 0.2690 − 0.0006i |

R46 =

| −0.7176 − 0.0000i | −0.3296 + 0.2012i |
| 0 | −0.5796 − 0.0009i |

R47 =

| −0.7014 − 0.0000i | −0.3148 + 0.5828i |
| 0 | 0.2633 − 0.0021i |

R48 =

| −0.4813 − 0.0000i | −0.6693 + 0.2941i |
| 0 | −0.4837 + 0.0030i |

R49 =

| −0.7931 + 0.0000i | 0.2218 + 0.5002i |
| 0 | −0.2676 − 0.0003i |

R50 =

| −0.6132 − 0.0000i | −0.1675 + 0.2836i |
| 0 | 0.7180 − 0.0006i |

R51 =

| −0.7587 − 0.0000i | 0.2505 − 0.0349i |
| 0 | 0.6003 − 0.0007i |

R52 =

| −0.6237 − 0.0000i | 0.0582 + 0.5911i |
| 0 | 0.5081 − 0.0002i |

R53 =

| −0.7457 + 0.0000i | 0.5621 + 0.2235i |
| 0 | −0.2794 + 0.0000i |

R54 =

| −0.9215 + 0.0000i | −0.1471 − 0.1726i |
| 0 | −0.3154 + 0.0000i |

R55 =

| −0.7420 + 0.0000i | −0.6099 + 0.0732i |
| 0 | −0.2685 − 0.0006i |

R56 =

| −0.7515 + 0.0000i | −0.0374 − 0.5974i |
| 0 | 0.2776 + 0.0005i |

R57 =

| −0.5269 + 0.0000i | 0.1101 + 0.5418i |
| 0 | −0.6455 + 0.0024i |

R58 =

| −0.7211 − 0.0000i | −0.1540 − 0.2196i |
| 0 | −0.6389 + 0.0004i |

R59 =

| −0.5274 + 0.0000i | 0.2457 + 0.3866i |
| 0 | 0.7155 − 0.0001i |

| R60 = | |
|---|---|
| −0.7898 − 0.0000i | 0.3182 − 0.3883i |
| 0 | 0.3525 − 0.0004i |

| R61 = | |
|---|---|
| −0.4900 − 0.0000i | 0.3866 + 0.1913i |
| 0 | −0.7575 − 0.0007i |

| R62 = | |
|---|---|
| −0.4938 + 0.0000i | 0.2726 − 0.3804i |
| 0 | −0.7329 − 0.0019i |

| R63 = | |
|---|---|
| −0.6822 − 0.0000i | 0.5857 − 0.3348i |
| 0 | −0.2818 − 0.0015i |

| R64 = | |
|---|---|
| −0.4577 − 0.0000i | 0.7103 − 0.4109i |
| 0 | 0.3420 − 0.0097i |

6) When Nt=4, Nr=2, and B=2:

| R1 = | | | |
|---|---|---|---|
| −0.7687 − 0.0000i | −0.0421 + 0.0795i | −0.1967 − 0.0415i | 0.0909 + 0.2216i |
| 0 | −0.5071 + 0.0000i | −0.0653 + 0.1298i | −0.1364 + 0.0802i |

| R2 = | | | |
|---|---|---|---|
| −0.7572 − 0.0000i | 0.0581 − 0.0587i | 0.2342 + 0.0286i | −0.0874 − 0.2749i |
| 0 | −0.4777 − 0.0033i | 0.0597 − 0.1583i | 0.1357 − 0.0758i |

| R3 = | | | |
|---|---|---|---|
| −0.7506 − 0.0000i | −0.1352 + 0.2314i | 0.0454 − 0.0383i | 0.0159 + 0.1504i |
| 0 | 0.4639 + 0.0005i | 0.0485 + 0.0107i | 0.3263 − 0.1191i |

| R4 = | | | |
|---|---|---|---|
| −0.7693 + 0.0000i | 0.1044 − 0.1753i | −0.0312 + 0.0273i | −0.0245 − 0.1098i |
| 0 | 0.5284 + 0.0002i | −0.0248 + 0.0025i | −0.2562 + 0.0812i |

7) When Nt=4, Nr=2, and B=3:

| R1 = | | | |
|---|---|---|---|
| −0.7085 + 0.0000i | −0.0524 + 0.0978i | 0.1640 + 0.0750i | −0.1825 + 0.1645i |
| 0 | 0.4886 + 0.0013i | −0.2666 − 0.0053i | 0.0293 − 0.2865i |

| R2 = | | | |
|---|---|---|---|
| −0.7035 + 0.0000i | 0.2376 − 0.0939i | −0.1389 + 0.1162i | 0.0187 − 0.1759i |
| 0 | −0.4477 − 0.0010i | −0.0776 − 0.1723i | 0.2075 − 0.3108i |

| R3 = | | | |
|---|---|---|---|
| −0.7027 + 0.0000i | 0.0379 − 0.3642i | 0.1493 − 0.2191i | 0.0203 − 0.2584i |
| 0 | 0.4470 + 0.0036i | 0.0983 + 0.1228i | 0.0932 + 0.0361i |

| R4 = | | | |
|---|---|---|---|
| −0.7015 − 0.0000i | −0.2801 − 0.0800i | 0.0967 + 0.1961i | 0.1360 + 0.0038i |
| 0 | −0.4355 + 0.0026i | −0.1781 − 0.1603i | −0.0751 + 0.3225i |

| R5 = | | | |
|---|---|---|---|
| −0.6765 + 0.0000i | −0.1459 + 0.0585i | −0.2585 + 0.1120i | 0.4630 + 0.1558i |
| 0 | 0.4270 + 0.0025i | 0.0843 − 0.0077i | 0.1001 + 0.0101i |

| R6 = | | | |
|---|---|---|---|
| −0.6958 − 0.0000i | 0.0841 + 0.1170i | −0.0988 − 0.4191i | 0.0393 + 0.0798i |
| 0 | −0.4577 + 0.0006i | −0.1460 + 0.1343i | −0.2294 − 0.0172i |

| R7 = | | | |
|---|---|---|---|
| −0.6841 − 0.0000i | 0.1479 + 0.2274i | −0.1513 + 0.0123i | −0.2466 − 0.0699i |
| 0 | 0.4556 + 0.0025i | 0.1117 − 0.1019i | −0.2466 + 0.2800i |

| R8 = | | | |
|---|---|---|---|
| −0.6999 − 0.0000i | −0.0214 + 0.0601i | 0.2199 + 0.1018i | −0.2360 + 0.1152i |
| 0 | −0.4174 + 0.0036i | 0.3904 + 0.2104i | 0.0864 − 0.0005i |

8) When Nt=4, Nr=2, and B=4:

| R1 = | | | |
|---|---|---|---|
| −0.6457 − 0.0000i | 0.1572 − 0.1426i | −0.0694 − 0.1885i | −0.2010 + 0.1288i |
| 0 | 0.4211 + 0.0038i | −0.2134 + 0.0172i | 0.4648 − 0.0390i |

| R2 = | | | |
|---|---|---|---|
| −0.6193 + 0.0000i | −0.0255 − 0.2168i | −0.3786 − 0.0253i | 0.2631 − 0.4035i |
| 0 | −0.3767 − 0.0004i | 0.0650 + 0.0028i | 0.1870 + 0.1082i |

| R3 = | | | |
|---|---|---|---|
| −0.6309 + 0.0000i | −0.3621 + 0.2903i | −0.2254 − 0.0210i | 0.1386 + 0.1822i |
| 0 | −0.3452 + 0.0006i | −0.3418 − 0.1800i | 0.0044 + 0.1198i |

| R4 = | | | |
|---|---|---|---|
| −0.6378 + 0.0000i | −0.1591 + 0.4458i | −0.0476 − 0.1657i | −0.2401 − 0.3144i |
| 0 | 0.4123 + 0.0040i | 0.0746 − 0.0601i | 0.0610 − 0.0011i |

| R5 = | | | |
|---|---|---|---|
| −0.6432 − 0.0000i | −0.1781 − 0.0570i | 0.1364 − 0.1854i | 0.0423 + 0.2173i |
| 0 | 0.4306 − 0.0001i | 0.4172 + 0.1061i | 0.0893 + 0.2658i |

| R6 = | | | |
|---|---|---|---|
| −0.6632 + 0.0000i | 0.4384 + 0.3035i | −0.0847 − 0.0100i | −0.0092 − 0.1174i |
| 0 | −0.4215 + 0.0053i | 0.0001 + 0.1857i | −0.2036 − 0.0319i |

| R7 = | | | |
|---|---|---|---|
| −0.6654 − 0.0000i | −0.2480 − 0.2674i | 0.0158 + 0.1782i | 0.1276 − 0.1723i |
| 0 | 0.4395 + 0.0070i | −0.2319 − 0.2980i | −0.0246 + 0.0990i |

| R8 = | | | |
|---|---|---|---|
| −0.6495 − 0.0000i | 0.0556 − 0.3192i | −0.1041 − 0.0019i | 0.0620 + 0.2609i |
| 0 | −0.4226 + 0.0009i | −0.1935 − 0.0414i | −0.1427 − 0.3902i |

| R9 = | | | |
|---|---|---|---|
| −0.6688 − 0.0000i | 0.0074 − 0.1405i | −0.3589 − 0.1517i | −0.0163 − 0.0336i |
| 0 | 0.4679 + 0.0026i | −0.0983 + 0.1942i | −0.3364 + 0.0146i |

| R10 = | | | |
|---|---|---|---|
| −0.6537 − 0.0000i | −0.0873 + 0.1317i | −0.0478 + 0.2274i | 0.0030 + 0.0827i |
| 0 | −0.3909 + 0.0040i | 0.5260 − 0.2302i | 0.0339 + 0.0562i |

| R11 = | | | |
|---|---|---|---|
| −0.6755 − 0.0000i | 0.2693 − 0.0082i | 0.1523 + 0.2186i | 0.1180 − 0.2156i |
| 0 | 0.4655 + 0.0007i | 0.1993 + 0.1411i | 0.1215 − 0.2205i |

| R12 = | | | |
|---|---|---|---|
| −0.6580 + 0.0000i | −0.0574 − 0.0583i | 0.1719 + 0.0595i | −0.5174 − 0.0821i |
| 0 | −0.3816 + 0.0028i | −0.2375 + 0.2042i | −0.0934 + 0.0186i |

| R13 = | | | |
|---|---|---|---|
| −0.6384 + 0.0000i | 0.0402 − 0.1102i | 0.2611 − 0.4099i | −0.0555 − 0.1533i |
| 0 | −0.3576 − 0.0061i | 0.1214 − 0.1308i | −0.3597 + 0.1638i |

| R14 = | | | |
|---|---|---|---|
| −0.6393 + 0.0000i | 0.1780 − 0.2297i | 0.2053 + 0.3444i | 0.1305 + 0.2129i |
| 0 | −0.3705 − 0.0029i | −0.1000 − 0.0008i | 0.1104 + 0.3525i |

| R15 = | | | |
|---|---|---|---|
| −0.6770 + 0.0000i | 0.0242 + 0.2737i | 0.1951 + 0.1576i | 0.0768 + 0.3534i |
| 0 | 0.4454 + 0.0006i | −0.0893 − 0.1113i | −0.2294 + 0.0332i |

| R16 = | | | |
|---|---|---|---|
| −0.6610 − 0.0000i | −0.1748 + 0.1498i | 0.2070 − 0.1408i | 0.0494 − 0.0035i |
| 0 | −0.4496 + 0.0062i | 0.0824 + 0.0881i | 0.3666 − 0.3065i |

9) When Nt=4, Nr=2, and B=5:

| R1 = | | | |
|---|---|---|---|
| −0.5936 + 0.0000i | −0.1190 + 0.0934i | −0.2344 + 0.4935i | 0.1515 − 0.2759i |
| 0 | −0.3576 + 0.0024i | 0.3008 + 0.0225i | −0.0855 − 0.0329i |

| R2 = | | | |
|---|---|---|---|
| −0.6260 − 0.0000i | 0.2593 + 0.0754i | 0.3880 − 0.1749i | −0.0424 + 0.0991i |
| 0 | 0.4418 − 0.0028i | 0.0501 − 0.3070i | −0.2208 + 0.0432i |

| R3 = | | | |
|---|---|---|---|
| −0.6216 + 0.0000i | −0.1702 + 0.0286i | 0.1565 − 0.2442i | −0.2096 + 0.3638i |
| 0 | 0.3896 + 0.0007i | −0.0701 + 0.3639i | −0.1651 − 0.0843i |

| R4 = | | | |
|---|---|---|---|
| −0.6263 + 0.0000i | 0.2289 − 0.0169i | 0.0435 + 0.3855i | −0.2307 − 0.0411i |
| 0 | 0.4053 + 0.0028i | 0.1878 + 0.2943i | 0.2407 − 0.0746i |

| R5 = | | | |
|---|---|---|---|
| −0.6253 − 0.0000i | 0.3708 − 0.2691i | 0.0920 − 0.0546i | 0.2093 − 0.3458i |
| 0 | −0.4293 − 0.0016i | 0.1411 − 0.0988i | 0.0789 + 0.0645i |

| R6 = | | | |
|---|---|---|---|
| −0.5988 + 0.0000i | −0.0536 + 0.1268i | 0.3396 + 0.1339i | −0.0360 + 0.0101i |
| 0 | −0.4443 + 0.0006i | 0.1667 + 0.0947i | 0.2855 − 0.4150i |

| R7 = | | | |
|---|---|---|---|
| −0.6172 − 0.0000i | 0.0665 − 0.3312i | 0.0070 − 0.0273i | 0.1795 + 0.3510i |
| 0 | 0.4544 + 0.0036i | −0.0987 − 0.1610i | −0.0894 − 0.3140i |

| R8 = | | | |
|---|---|---|---|
| −0.6350 + 0.0000i | −0.0307 + 0.0064i | −0.1273 − 0.1291i | −0.1000 + 0.2844i |
| 0 | 0.4196 − 0.0068i | −0.2750 + 0.0514i | 0.4604 + 0.0752i |

| R9 = | | | |
|---|---|---|---|
| −0.6165 + 0.0000i | 0.1237 − 0.3934i | 0.0507 + 0.1349i | 0.3474 − 0.1284i |
| 0 | 0.3775 + 0.0030i | −0.0039 + 0.1728i | −0.1214 + 0.3237i |

| R10 = | | | |
|---|---|---|---|
| −0.6205 − 0.0000i | 0.2347 + 0.3632i | −0.2391 − 0.0819i | 0.2892 − 0.0970i |
| 0 | 0.4049 − 0.0010i | −0.1809 + 0.1546i | −0.1419 − 0.1743i |

| R11 = | | | |
|---|---|---|---|
| −0.6316 + 0.0000i | 0.0606 − 0.0680i | 0.0374 + 0.4093i | 0.2369 − 0.1758i |
| 0 | −0.3901 + 0.0034i | −0.4224 − 0.0014i | −0.0726 − 0.0313i |

| R12 = | | | |
|---|---|---|---|
| −0.6088 + 0.0000i | 0.1538 + 0.1137i | −0.2997 + 0.0397i | −0.3963 + 0.0408i |
| 0 | −0.4138 + 0.0031i | 0.4005 − 0.0561i | 0.0400 + 0.0796i |

| R13 = | | | |
|---|---|---|---|
| −0.5445 + 0.0000i | 0.5594 + 0.2740i | −0.0094 − 0.1457i | −0.0283 + 0.2112i |
| 0 | −0.1170 − 0.0039i | −0.0743 − 0.1859i | 0.0603 − 0.4375i |

| R14 = | | | |
|---|---|---|---|
| −0.6330 + 0.0000i | −0.0799 + 0.1032i | 0.1931 − 0.2366i | 0.0110 − 0.4234i |
| 0 | 0.4190 − 0.0033i | −0.2377 − 0.1054i | 0.2557 − 0.0351i |

| R15 = | | | |
|---|---|---|---|
| −0.6272 + 0.0000i | 0.2416 + 0.2434i | −0.0250 + 0.3094i | 0.2873 + 0.1062i |
| 0 | 0.4022 + 0.0051i | 0.0271 − 0.1994i | 0.1575 + 0.2678i |

| R16 = | | | |
|---|---|---|---|
| −0.5859 − 0.0000i | −0.2196 + 0.0527i | 0.1385 + 0.0362i | 0.0205 + 0.0664i |
| 0 | −0.4287 + 0.0002i | −0.2326 − 0.3745i | −0.3955 + 0.2140i |

| R17 = | | | |
|---|---|---|---|
| −0.6663 + 0.0000i | 0.0184 + 0.1575i | 0.0864 − 0.1410i | −0.1019 − 0.0873i |
| 0 | −0.3821 − 0.0011i | 0.0268 − 0.4533i | 0.3360 + 0.1430i |

| R18 = | | | |
|---|---|---|---|
| −0.5507 − 0.0000i | −0.5270 + 0.1390i | −0.0836 + 0.0804i | −0.4932 − 0.0644i |
| 0 | −0.2478 + 0.0001i | −0.2495 − 0.0537i | 0.0630 + 0.0915i |

| R19 = | | | |
|---|---|---|---|
| −0.6549 − 0.0000i | 0.0431 − 0.0301i | −0.3152 − 0.0539i | −0.2144 − 0.1166i |
| 0 | 0.3806 + 0.0046i | −0.0169 − 0.1090i | −0.2592 + 0.4271i |

-continued

|  | R20 = |  |  |
|---|---|---|---|
| −0.6201 − 0.0000i | −0.0293 + 0.3231i | 0.2360 − 0.0397i | 0.2972 + 0.1162i |
| 0 | −0.3899 − 0.0002i | 0.2009 + 0.1926i | −0.0483 + 0.3453i |
|  | R21 = |  |  |
| −0.5969 + 0.0000i | −0.2419 − 0.4062i | 0.1419 − 0.0884i | −0.0488 + 0.1242i |
| 0 | −0.3367 + 0.0036i | 0.4523 + 0.0701i | −0.2072 − 0.0928i |
|  | R22 = |  |  |
| −0.6026 + 0.0000i | 0.2481 − 0.0305i | 0.0646 + 0.1149i | −0.4742 − 0.1100i |
| 0 | −0.3941 − 0.0081i | −0.1608 + 0.0924i | −0.3542 − 0.0692i |
|  | R23 = |  |  |
| −0.6341 + 0.0000i | 0.0580 − 0.3146i | −0.3418 − 0.1881i | −0.1116 − 0.2110i |
| 0 | 0.4162 − 0.0078i | 0.1541 − 0.1032i | 0.1268 − 0.2503i |
|  | R24 = |  |  |
| −0.6226 + 0.0000i | −0.1677 − 0.0947i | 0.2480 − 0.4978i | −0.0735 − 0.1733i |
| 0 | −0.4103 − 0.0026i | −0.1020 + 0.1692i | −0.0517 + 0.1430i |
|  | R25 = |  |  |
| −0.6157 + 0.0000i | −0.2341 + 0.1263i | −0.1826 − 0.0815i | 0.2137 − 0.3205i |
| 0 | −0.4095 − 0.0051i | −0.1518 − 0.0377i | −0.1179 − 0.3945i |
|  | R26 = |  |  |
| −0.6191 + 0.0000i | −0.3143 + 0.0818i | −0.0909 − 0.0644i | 0.1694 + 0.1166i |
| 0 | 0.4425 − 0.0046i | 0.4380 − 0.1067i | 0.2396 + 0.0018i |
|  | R27 = |  |  |
| −0.5908 + 0.0000i | 0.0613 − 0.0676i | −0.4150 − 0.3396i | 0.2567 + 0.1869i |
| 0 | −0.4295 + 0.0047i | 0.0317 − 0.1668i | −0.1305 + 0.1545i |
|  | R28 = |  |  |
| −0.5842 − 0.0000i | −0.1688 + 0.1835i | 0.0381 − 0.0016i | −0.0758 − 0.2785i |
| 0 | 0.3981 + 0.0002i | 0.3240 + 0.3223i | −0.3450 − 0.1598i |
|  | R29 = |  |  |
| −0.6107 + 0.0000i | −0.3191 − 0.0011i | 0.0806 + 0.4415i | −0.0485 − 0.0094i |
| 0 | 0.4453 − 0.0045i | −0.2225 − 0.1067i | −0.2099 − 0.1342i |
|  | R30 = |  |  |
| −0.6272 − 0.0000i | 0.3044 − 0.0780i | −0.0979 − 0.0161i | −0.0540 + 0.0174i |
| 0 | −0.4182 − 0.0045i | −0.1689 + 0.4242i | 0.3250 + 0.0762i |
|  | R31 = |  |  |
| −0.6409 + 0.0000i | −0.2660 − 0.0240i | −0.1662 + 0.0681i | 0.0302 + 0.4424i |
| 0 | −0.4321 + 0.0011i | −0.2233 + 0.1343i | −0.0633 − 0.1743i |
|  | R32 = |  |  |
| −0.5974 − 0.0000i | −0.0984 − 0.4409i | 0.2460 + 0.1308i | 0.1436 + 0.2225i |
| 0 | −0.3392 + 0.0083i | −0.0819 − 0.0676i | 0.2603 + 0.3114i |

10) When Nt=4, Nr=2, and B=6:

|  | R1 = |  |  |
|---|---|---|---|
| −0.5822 + 0.0000i | 0.0622 − 0.2351i | −0.3825 − 0.1865i | 0.1938 + 0.2495i |
| 0 | 0.4003 + 0.0031i | −0.1776 + 0.1189i | −0.0684 − 0.3324i |
|  | R2 = |  |  |
| −0.6300 − 0.0000i | 0.1829 − 0.1040i | −0.0068 + 0.1521i | 0.1872 + 0.2135i |
| 0 | 0.3680 + 0.0016i | −0.3773 − 0.3892i | 0.1586 − 0.0229i |
|  | R3 = |  |  |
| −0.5707 − 0.0000i | −0.1690 + 0.1205i | −0.2766 + 0.5485i | 0.1766 − 0.0974i |
| 0 | −0.3589 + 0.0026i | 0.1615 − 0.1591i | −0.1339 + 0.1221i |
|  | R4 = |  |  |
| −0.5537 − 0.0000i | −0.0987 − 0.5698i | 0.0701 + 0.3256i | −0.1092 + 0.2250i |
| 0 | 0.3243 − 0.0026i | 0.0651 + 0.1457i | 0.2083 + 0.1066i |
|  | R5 = |  |  |
| −0.4986 + 0.0000i | −0.0402 + 0.1926i | 0.0049 − 0.3072i | −0.0970 + 0.2898i |
| 0 | −0.2308 + 0.0162i | −0.4494 + 0.1686i | 0.4517 + 0.1923i |

-continued

| | R6 = | | |
|---|---|---|---|
| −0.5977 − 0.0000i | 0.2053 − 0.0980i | −0.1134 − 0.1057i | −0.0123 − 0.3831i |
| 0 | 0.4163 − 0.0005i | 0.1582 + 0.1381i | 0.4383 − 0.1026i |
| | R7 = | | |
| −0.5496 − 0.0000i | 0.1758 + 0.4649i | 0.3657 + 0.0682i | −0.2132 − 0.1859i |
| 0 | 0.2280 − 0.0127i | 0.2687 + 0.2024i | −0.2431 + 0.0899i |
| | R8 = | | |
| −0.5811 + 0.0000i | 0.3527 − 0.1398i | 0.2315 + 0.2896i | 0.1286 − 0.2705i |
| 0 | −0.4768 − 0.0049i | −0.1317 − 0.2126i | −0.0237 − 0.0288i |
| | R9 = | | |
| −0.5412 + 0.0000i | −0.2903 − 0.0934i | −0.3530 − 0.0467i | 0.1715 + 0.0180i |
| 0 | 0.3975 + 0.0057i | −0.4724 − 0.1139i | −0.1695 + 0.1863i |
| | R10 = | | |
| −0.6096 − 0.0000i | 0.2491 − 0.3056i | 0.1972 − 0.2412i | −0.0993 − 0.2194i |
| 0 | 0.3725 + 0.0002i | −0.3941 − 0.0985i | 0.0861 − 0.0816i |
| | R11 = | | |
| −0.5621 + 0.0000i | −0.0388 + 0.2373i | 0.0020 + 0.5632i | −0.0717 − 0.1650i |
| 0 | −0.2712 + 0.0013i | −0.1974 + 0.0562i | 0.4011 + 0.0059i |
| | R12 = | | |
| −0.6046 + 0.0000i | −0.0621 − 0.0043i | −0.0974 − 0.5604i | 0.1309 + 0.1113i |
| 0 | −0.3875 + 0.0067i | 0.1446 + 0.0827i | −0.0712 − 0.3073i |
| | R13 = | | |
| −0.6419 + 0.0000i | −0.0533 − 0.0565i | −0.0030 + 0.1373i | 0.2375 + 0.2551i |
| 0 | 0.4034 + 0.0009i | 0.4939 + 0.1766i | −0.0118 − 0.0594i |
| | R14 = | | |
| −0.5968 − 0.0000i | −0.1720 + 0.0249i | −0.1096 − 0.0623i | −0.3399 − 0.3824i |
| 0 | 0.3688 + 0.0000i | −0.2819 + 0.2410i | −0.1860 − 0.1668i |
| | R15 = | | |
| −0.5793 − 0.0000i | −0.4564 − 0.0349i | 0.0259 + 0.0552i | 0.1300 − 0.0177i |
| 0 | −0.3942 − 0.0005i | 0.1678 + 0.1285i | 0.2857 + 0.3903i |
| | R16 = | | |
| −0.6261 + 0.0000i | −0.3252 − 0.1836i | 0.2514 + 0.0064i | −0.1036 − 0.2891i |
| 0 | −0.3172 + 0.0031i | 0.4039 + 0.0192i | −0.1091 − 0.1871i |
| | R17 = | | |
| −0.6352 + 0.0000i | 0.1780 − 0.1393i | −0.1314 − 0.0691i | −0.0717 − 0.0921i |
| 0 | −0.4121 − 0.0009i | −0.5250 − 0.2401i | −0.0073 − 0.0815i |
| | R18 = | | |
| −0.6116 − 0.0000i | 0.2714 + 0.2408i | −0.1311 − 0.0677i | 0.0102 + 0.1298i |
| 0 | −0.3412 + 0.0022i | 0.2689 − 0.4108i | 0.1403 + 0.2802i |
| | R19 = | | |
| −0.5656 − 0.0000i | 0.3979 + 0.0835i | 0.2146 + 0.1938i | −0.1299 + 0.3366i |
| 0 | 0.4076 − 0.0024i | 0.0973 + 0.0293i | 0.2555 − 0.2436i |
| | R20 = | | |
| −0.5566 − 0.0000i | 0.2136 − 0.1935i | 0.1578 − 0.1144i | −0.5994 + 0.0897i |
| 0 | −0.2573 − 0.0101i | −0.1015 + 0.0714i | 0.3458 − 0.0219i |
| | R21 = | | |
| −0.5935 + 0.0000i | −0.0228 − 0.1171i | −0.2498 − 0.2363i | −0.3087 + 0.3429i |
| 0 | 0.3902 − 0.0013i | 0.1460 + 0.0351i | −0.0085 + 0.3571i |
| | R22 = | | |
| −0.5907 − 0.0000i | −0.1673 + 0.1600i | 0.2401 − 0.4410i | −0.2501 + 0.1243i |
| 0 | 0.3904 + 0.0010i | 0.1984 + 0.1705i | 0.1875 − 0.1072i |
| | R23 = | | |
| −0.5999 − 0.0000i | −0.3303 − 0.2807i | −0.2142 − 0.1370i | 0.0452 − 0.1576i |
| 0 | −0.4332 + 0.0025i | −0.1506 + 0.2942i | 0.1335 − 0.2145i |
| | R24 = | | |
| −0.6037 − 0.0000i | −0.0629 + 0.1738i | 0.2666 − 0.2068i | −0.1735 − 0.4135i |
| 0 | −0.4659 − 0.0095i | 0.1025 − 0.0575i | 0.2170 − 0.0919i |
| | R25 = | | |
| −0.5960 − 0.0000i | −0.2848 − 0.3090i | 0.0941 − 0.2939i | 0.1525 − 0.2025i |
| 0 | 0.4089 + 0.0082i | 0.2300 + 0.0318i | −0.1456 − 0.2574i |

-continued

| R26 = | | | |
|---|---|---|---|
| −0.5317 − 0.0000i | 0.2221 + 0.0135i | −0.3617 + 0.1118i | −0.0595 + 0.0039i |
| 0 | −0.3533 − 0.0134i | 0.5642 + 0.1562i | 0.0131 − 0.2303i |

| R27 = | | | |
|---|---|---|---|
| −0.6017 − 0.0000i | 0.3061 + 0.1790i | −0.1009 − 0.1966i | −0.1387 + 0.0372i |
| 0 | 0.4344 + 0.0069i | −0.1208 + 0.4779i | 0.0630 − 0.0841i |

| R28 = | | | |
|---|---|---|---|
| −0.6295 − 0.0000i | −0.2689 + 0.1026i | 0.1463 + 0.0230i | −0.0946 − 0.1287i |
| 0 | 0.4021 − 0.0050i | 0.0684 − 0.2480i | 0.4657 + 0.1690i |

| R29 = | | | |
|---|---|---|---|
| −0.5663 + 0.0000i | 0.0284 + 0.3048i | −0.4185 − 0.1951i | 0.3884 + 0.0422i |
| 0 | 0.4024 + 0.0048i | 0.0713 − 0.0290i | 0.1843 + 0.1337i |

| R30 = | | | |
|---|---|---|---|
| −0.6019 + 0.0000i | −0.2857 − 0.1008i | 0.0642 + 0.4487i | −0.0721 − 0.2332i |
| 0 | 0.4369 + 0.0012i | 0.0320 + 0.0002i | 0.0510 − 0.2940i |

| R31 = | | | |
|---|---|---|---|
| −0.6015 + 0.0000i | −0.3511 + 0.3498i | −0.1466 + 0.3278i | −0.0362 + 0.2059i |
| 0 | 0.3563 + 0.0067i | 0.1588 − 0.1725i | −0.1948 − 0.0053i |

| R32 = | | | |
|---|---|---|---|
| −0.5318 + 0.0000i | −0.2587 − 0.4758i | −0.0150 + 0.2683i | 0.0612 − 0.0492i |
| 0 | −0.3404 + 0.0054i | −0.3154 − 0.2040i | 0.0854 + 0.2851i |

| R33 = | | | |
|---|---|---|---|
| −0.5805 − 0.0000i | 0.4962 + 0.2421i | 0.1714 − 0.3187i | 0.0142 + 0.0357i |
| 0 | −0.3515 + 0.0044i | 0.1023 + 0.0249i | 0.1514 − 0.2611i |

| R34 = | | | |
|---|---|---|---|
| −0.5164 − 0.0000i | −0.0000 − 0.4498i | −0.2231 − 0.2600i | 0.0717 − 0.3090i |
| 0 | 0.1416 − 0.0007i | 0.2536 − 0.4598i | 0.1174 − 0.0591i |

| R35 = | | | |
|---|---|---|---|
| −0.5468 + 0.0000i | −0.2215 + 0.1963i | 0.0090 − 0.0516i | 0.4358 − 0.1604i |
| 0 | −0.3046 + 0.0076i | 0.3984 − 0.2790i | −0.2444 + 0.0767i |

| R36 = | | | |
|---|---|---|---|
| −0.4493 + 0.0000i | −0.0662 + 0.0374i | 0.4044 − 0.2363i | 0.2904 − 0.1507i |
| 0 | −0.2297 + 0.0017i | −0.1981 + 0.5139i | −0.2542 − 0.2127i |

| R37 = | | | |
|---|---|---|---|
| −0.6191 + 0.0000i | −0.1610 − 0.0216i | −0.2230 + 0.2247i | −0.0906 − 0.1912i |
| 0 | 0.3663 + 0.0065i | 0.1764 + 0.0725i | −0.2570 + 0.4569i |

| R38 = | | | |
|---|---|---|---|
| −0.6008 + 0.0000i | −0.2881 − 0.2686i | −0.0030 + 0.0950i | 0.0204 + 0.1896i |
| 0 | −0.3264 + 0.0004i | −0.0157 − 0.0360i | −0.5394 − 0.1987i |

| R39 = | | | |
|---|---|---|---|
| −0.5658 + 0.0000i | 0.2523 − 0.3210i | 0.0823 + 0.1205i | 0.2263 + 0.3664i |
| 0 | −0.4322 − 0.0051i | 0.1390 + 0.0054i | −0.2856 + 0.1365i |

| R40 = | | | |
|---|---|---|---|
| −0.6187 + 0.0000i | 0.1507 − 0.0952i | −0.0377 + 0.2154i | 0.2473 − 0.1051i |
| 0 | −0.3681 + 0.0010i | −0.2590 + 0.5116i | −0.0164 − 0.0288i |

| R41 = | | | |
|---|---|---|---|
| −0.6039 − 0.0000i | −0.1919 + 0.4475i | 0.0051 − 0.1077i | −0.1077 − 0.1567i |
| 0 | −0.4248 − 0.0075i | −0.1663 + 0.2717i | −0.1045 + 0.2399i |

| R42 = | | | |
|---|---|---|---|
| −0.5658 − 0.0000i | 0.2036 − 0.3201i | 0.0396 − 0.0064i | −0.3289 − 0.1866i |
| 0 | −0.3810 + 0.0047i | 0.2548 + 0.1309i | −0.3774 + 0.1471i |

| R43 = | | | |
|---|---|---|---|
| −0.6309 + 0.0000i | 0.4726 − 0.0377i | −0.1434 + 0.2667i | −0.0931 − 0.1926i |
| 0 | 0.3879 − 0.0022i | −0.1350 − 0.1181i | −0.2117 + 0.1104i |

| R44 = | | | |
|---|---|---|---|
| −0.6123 + 0.0000i | 0.1434 + 0.2174i | −0.1777 + 0.0169i | 0.2160 + 0.1243i |
| 0 | −0.3713 − 0.0041i | −0.2174 − 0.1532i | −0.4993 + 0.0736i |

| R45 = | | | |
|---|---|---|---|
| −0.6334 + 0.0000i | 0.2379 − 0.0189i | 0.1695 + 0.0350i | 0.1789 − 0.0501i |
| 0 | 0.4638 − 0.0027i | 0.0811 + 0.1038i | 0.0510 + 0.4922i |

-continued

| R46 = | | | |
|---|---|---|---|
| −0.5875 + 0.0000i | 0.0643 − 0.0166i | 0.0317 + 0.1807i | 0.5640 − 0.3729i |
| 0 | 0.3501 − 0.0053i | −0.0845 + 0.0692i | −0.0945 − 0.1272i |

| R47 = | | | |
|---|---|---|---|
| −0.6238 + 0.0000i | 0.1267 + 0.1043i | 0.0247 + 0.1349i | 0.0657 − 0.1180i |
| 0 | −0.3193 + 0.0041i | 0.0417 − 0.1523i | 0.1849 − 0.6211i |

| R48 = | | | |
|---|---|---|---|
| −0.6247 + 0.0000i | −0.2291 + 0.2487i | 0.2659 + 0.1501i | 0.1088 + 0.2620i |
| 0 | 0.3301 + 0.0030i | −0.2239 + 0.3878i | −0.0250 + 0.1075i |

| R49 = | | | |
|---|---|---|---|
| −0.5760 + 0.0000i | −0.1147 + 0.4808i | −0.3791 + 0.0606i | 0.0127 − 0.0245i |
| 0 | −0.4427 − 0.0024i | −0.0262 + 0.0254i | 0.0223 − 0.2793i |

| R50 = | | | |
|---|---|---|---|
| −0.6429 − 0.0000i | 0.1495 − 0.1529i | 0.0583 − 0.4344i | 0.1149 − 0.3092i |
| 0 | −0.3820 − 0.0052i | 0.0129 + 0.0503i | −0.0275 + 0.3012i |

| R51 = | | | |
|---|---|---|---|
| −0.6082 − 0.0000i | −0.2688 − 0.0266i | −0.0730 − 0.2242i | −0.2058 + 0.2869i |
| 0 | −0.3097 − 0.0025i | 0.0729 − 0.4774i | 0.1014 − 0.1932i |

| R52 = | | | |
|---|---|---|---|
| −0.6201 + 0.0000i | −0.2685 + 0.1686i | 0.3309 − 0.1042i | 0.2779 + 0.1551i |
| 0 | −0.4016 − 0.0023i | −0.2246 − 0.2197i | 0.0647 + 0.1708i |

| R53 = | | | |
|---|---|---|---|
| −0.5756 + 0.0000i | 0.1796 − 0.3384i | 0.3742 − 0.0685i | 0.2355 + 0.1485i |
| 0 | −0.3716 − 0.0084i | 0.2450 − 0.0750i | 0.3081 − 0.0313i |

| R54 = | | | |
|---|---|---|---|
| −0.6027 − 0.0000i | 0.0044 − 0.1741i | 0.2321 − 0.0499i | 0.0534 + 0.2647i |
| 0 | 0.4480 + 0.0021i | −0.0295 + 0.0899i | −0.5168 + 0.0189i |

| R55 = | | | |
|---|---|---|---|
| −0.5797 − 0.0000i | 0.1916 + 0.2725i | 0.4320 + 0.0205i | −0.1556 + 0.2159i |
| 0 | −0.3942 − 0.0067i | −0.2700 + 0.0374i | −0.2436 − 0.0783i |

| R56 = | | | |
|---|---|---|---|
| −0.5735 − 0.0000i | 0.3466 − 0.2059i | −0.2098 + 0.0160i | 0.0493 + 0.1076i |
| 0 | −0.3746 − 0.0084i | 0.1735 + 0.2677i | 0.3093 + 0.3354i |

| R57 = | | | |
|---|---|---|---|
| −0.5707 − 0.0000i | 0.0202 + 0.1185i | −0.2555 + 0.1419i | −0.4400 − 0.3006i |
| 0 | −0.4068 + 0.0006i | 0.0157 − 0.2249i | −0.1592 + 0.2208i |

| R58 = | | | |
|---|---|---|---|
| −0.6359 + 0.0000i | −0.1130 − 0.1298i | −0.2889 + 0.2771i | 0.2182 + 0.3917i |
| 0 | −0.3320 + 0.0025i | −0.0548 − 0.0011i | 0.2713 − 0.1333i |

| R59 = | | | |
|---|---|---|---|
| −0.5704 − 0.0000i | −0.1142 + 0.0003i | 0.3604 − 0.2640i | −0.1799 − 0.0567i |
| 0 | 0.3180 + 0.0054i | −0.1314 − 0.3532i | −0.2166 + 0.3693i |

| R60 = | | | |
|---|---|---|---|
| −0.5882 − 0.0000i | −0.1026 + 0.1695i | −0.2958 + 0.1791i | −0.2398 + 0.2702i |
| 0 | 0.4045 + 0.0041i | −0.3444 − 0.0186i | 0.1307 − 0.2548i |

| R61 = | | | |
|---|---|---|---|
| −0.6152 + 0.0000i | −0.0776 − 0.0197i | −0.2713 − 0.1962i | −0.3813 + 0.2914i |
| 0 | −0.4017 − 0.0006i | −0.1822 + 0.1815i | −0.1982 + 0.0768i |

| R62 = | | | |
|---|---|---|---|
| −0.6310 + 0.0000i | 0.0830 + 0.1001i | −0.1665 + 0.0168i | −0.3055 − 0.1607i |
| 0 | 0.4434 + 0.0058i | 0.3176 − 0.2865i | −0.1342 − 0.2003i |

| R63 = | | | |
|---|---|---|---|
| −0.5910 + 0.0000i | −0.1086 + 0.2109i | 0.3550 − 0.2380i | 0.3491 + 0.0484i |
| 0 | 0.3932 − 0.0021i | −0.1260 − 0.2461i | −0.0112 − 0.2376i |

| R64 = | | | |
|---|---|---|---|
| −0.5987 − 0.0000i | −0.1590 + 0.0209i | 0.1989 + 0.2168i | −0.3838 + 0.2967i |
| 0 | −0.4122 + 0.0007i | 0.2440 + 0.2539i | 0.0020 − 0.0080i |

11) When Nt=4, Nr=4, and B=2:

| R1 = | | | |
|---|---|---|---|
| −0.6754 − 0.0000i | 0.0069 − 0.0044i | 0.0105 − 0.0005i | −0.0039 − 0.0024i |
| 0 | −0.5760 − 0.0000i | −0.0002 + 0.0039i | 0.0068 + 0.0081i |
| 0 | 0 | 0.4601 − 0.0000i | −0.0073 − 0.0039i |
| 0 | 0 | 0 | −0.0046 + 0.0000i |
| R2 = | | | |
| −0.6753 − 0.0000i | 0.0062 − 0.0068i | 0.0093 + 0.0001i | −0.0060 + 0.0001i |
| 0 | 0.5759 + 0.0000i | −0.0016 − 0.0070i | 0.0004 + 0.0015i |
| 0 | 0 | −0.4604 − 0.0000i | −0.0049 − 0.0041i |
| 0 | 0 | 0 | −0.0070 + 0.0000i |
| R3 = | | | |
| −0.6738 − 0.0000i | −0.0009 − 0.0071i | 0.0068 − 0.0009i | −0.0061 + 0.0045i |
| 0 | 0.5762 − 0.0000i | 0.0021 + 0.0062i | −0.0038 + 0.0048i |
| 0 | 0 | 0.4622 + 0.0000i | −0.0012 + 0.0021i |
| 0 | 0 | 0 | 0.0070 − 0.0000i |
| R4 = | | | |
| −0.6766 + 0.0000i | 0.0047 − 0.0055i | −0.0085 − 0.0076i | 0.0019 − 0.0059i |
| 0 | −0.5732 + 0.0000i | −0.0036 + 0.0111i | −0.0038 − 0.0005i |
| 0 | 0 | −0.4618 − 0.0000i | −0.0015 − 0.0013i |
| 0 | 0 | 0 | −0.0038 − 0.0000i |

12) When Nt=4, Nr=4, and B=3:

| R1 = | | | |
|---|---|---|---|
| −0.6436 − 0.0000i | 0.0118 + 0.0043i | −0.0031 − 0.0163i | −0.0044 + 0.0238i |
| 0 | −0.5476 + 0.0001i | −0.0025 − 0.0102i | 0.0204 + 0.0171i |
| 0 | 0 | −0.4385 − 0.0000i | −0.0029 + 0.0002i |
| 0 | 0 | 0 | −0.3031 − 0.0000i |
| R2 = | | | |
| −0.6467 − 0.0000i | 0.0075 + 0.0018i | −0.0008 + 0.0006i | −0.0139 − 0.0050i |
| 0 | −0.5480 + 0.0001i | 0.0021 + 0.0153i | 0.0100 − 0.0016i |
| 0 | 0 | 0.4407 − 0.0000i | −0.0025 − 0.0061i |
| 0 | 0 | 0 | 0.2943 + 0.0000i |
| R3 = | | | |
| −0.6737 + 0.0000i | −0.0002 − 0.0065i | −0.0036 − 0.0103i | −0.0006 − 0.0052i |
| 0 | 0.5772 − 0.0000i | 0.0037 + 0.0050i | −0.0048 − 0.0033i |
| 0 | 0 | 0.4613 − 0.0000i | −0.0025 + 0.0002i |
| 0 | 0 | 0 | 0.0003 + 0.0000i |
| R4 = | | | |
| −0.6417 − 0.0000i | −0.0056 − 0.0085i | 0.0005 − 0.0019i | −0.0031 − 0.0009i |
| 0 | 0.5565 − 0.0000i | 0.0049 − 0.0114i | −0.0035 − 0.0165i |
| 0 | 0 | −0.4406 + 0.0000i | −0.0056 + 0.0046i |
| 0 | 0 | 0 | 0.2895 + 0.0000i |
| R5 = | | | |
| −0.6376 + 0.0000i | −0.0125 − 0.0020i | −0.0469 − 0.0228i | 0.0105 + 0.0857i |
| 0 | −0.5417 + 0.0000i | 0.0207 − 0.0832i | 0.0364 + 0.0212i |
| 0 | 0 | −0.4252 − 0.0005i | −0.0244 + 0.0277i |
| 0 | 0 | 0 | 0.3138 + 0.0004i |
| R6 = | | | |
| −0.6423 − 0.0000i | −0.0057 + 0.0037i | −0.0029 − 0.0049i | 0.0032 + 0.0000i |
| 0 | −0.5601 − 0.0000i | −0.0007 + 0.0009i | −0.0009 + 0.0070i |
| 0 | 0 | 0.4360 − 0.0000i | 0.0051 − 0.0037i |
| 0 | 0 | 0 | −0.2889 − 0.0000i |
| R7 = | | | |
| −0.6361 − 0.0000i | 0.0097 + 0.0281i | 0.0864 + 0.0558i | −0.0255 − 0.1667i |
| 0 | −0.5358 − 0.0012i | −0.0351 + 0.1383i | −0.0949 − 0.0684i |
| 0 | 0 | −0.4421 + 0.0009i | 0.0421 − 0.0585i |
| 0 | 0 | 0 | 0.1835 + 0.0006i |
| R8 = | | | |
| −0.6448 − 0.0000i | −0.0052 − 0.0021i | −0.0072 − 0.0004i | 0.0006 + 0.0020i |
| 0 | 0.5515 − 0.0000i | 0.0013 − 0.0051i | −0.0058 − 0.0034i |

-continued

| | | | |
|---|---|---|---|
| 0 | 0 | −0.4374 − 0.0000i | −0.0062 + 0.0067i |
| 0 | 0 | 0 | −0.2975 + 0.0000i |

13) When Nt=4, Nr=4, and B=4:

| R1 = | | | |
|---|---|---|---|
| −0.6301 + 0.0000i | −0.1167 + 0.0866i | 0.0113 + 0.0510i | 0.0027 + 0.0510i |
| 0 | 0.5461 − 0.0001i | −0.0005 − 0.0019i | −0.0271 − 0.0421i |
| 0 | 0 | 0.4312 − 0.0001i | −0.0332 − 0.0426i |
| 0 | 0 | 0 | 0.2949 + 0.0001i |

| R2 = | | | |
|---|---|---|---|
| −0.6114 + 0.0000i | −0.0876 − 0.1354i | 0.0422 − 0.0633i | 0.1349 + 0.1029i |
| 0 | −0.5411 − 0.0005i | −0.0049 − 0.0130i | −0.0579 + 0.0974i |
| 0 | 0 | 0.4311 − 0.0003i | 0.0878 + 0.0131i |
| 0 | 0 | 0 | −0.2569 − 0.0005i |

| R3 = | | | |
|---|---|---|---|
| −0.6303 + 0.0000i | −0.0025 − 0.0376i | 0.1009 + 0.0930i | −0.1333 + 0.0727i |
| 0 | −0.5222 + 0.0001i | 0.0781 + 0.0824i | 0.0419 + 0.0222i |
| 0 | 0 | −0.4230 + 0.0004i | −0.0630 − 0.0353i |
| 0 | 0 | 0 | −0.2958 + 0.0002i |

| R4 = | | | |
|---|---|---|---|
| −0.6433 − 0.0000i | −0.0615 − 0.0254i | −0.0900 − 0.1008i | 0.0397 + 0.0047i |
| 0 | −0.5229 − 0.0003i | 0.0278 + 0.0151i | 0.1477 + 0.0280i |
| 0 | 0 | 0.4294 + 0.0002i | −0.0238 − 0.0100i |
| 0 | 0 | 0 | 0.2825 + 0.0001i |

| R5 = | | | |
|---|---|---|---|
| −0.6375 + 0.0000i | −0.0492 + 0.0264i | 0.0074 − 0.0960i | 0.0161 − 0.0697i |
| 0 | 0.5390 + 0.0003i | −0.0739 − 0.0404i | 0.0380 + 0.0582i |
| 0 | 0 | 0.4396 − 0.0003i | −0.0873 + 0.0458i |
| 0 | 0 | 0 | −0.2659 − 0.0003i |

| R6 = | | | |
|---|---|---|---|
| −0.6278 − 0.0000i | 0.0264 − 0.0457i | 0.0908 − 0.1830i | 0.1246 − 0.0740i |
| 0 | −0.5271 + 0.0002i | −0.0976 + 0.0160i | 0.0725 − 0.0856i |
| 0 | 0 | −0.4287 − 0.0001i | −0.0123 + 0.0759i |
| 0 | 0 | 0 | −0.2245 − 0.0002i |

| R7 = | | | |
|---|---|---|---|
| −0.6260 + 0.0000i | 0.1770 − 0.0983i | −0.0253 − 0.0532i | 0.0278 − 0.0964i |
| 0 | 0.5413 − 0.0004i | 0.0160 + 0.0328i | 0.0022 + 0.0587i |
| 0 | 0 | 0.4165 − 0.0003i | 0.0590 + 0.0581i |
| 0 | 0 | 0 | 0.2747 + 0.0002i |

| R8 = | | | |
|---|---|---|---|
| −0.6396 + 0.0000i | −0.0112 − 0.0042i | −0.0061 − 0.0080i | −0.0080 − 0.0069i |
| 0 | 0.5517 − 0.0000i | −0.0040 − 0.0123i | 0.0025 − 0.0135i |
| 0 | 0 | −0.4425 + 0.0001i | −0.0010 + 0.0052i |
| 0 | 0 | 0 | 0.2999 − 0.0000i |

| R9 = | | | |
|---|---|---|---|
| −0.6229 − 0.0000i | 0.0131 + 0.0734i | 0.0566 + 0.0627i | 0.0366 − 0.0274i |
| 0 | −0.5251 + 0.0003i | 0.0729 + 0.0481i | 0.0211 − 0.0343i |
| 0 | 0 | −0.4486 − 0.0002i | 0.1107 + 0.0412i |
| 0 | 0 | 0 | 0.3116 − 0.0005i |

| R10 = | | | |
|---|---|---|---|
| −0.6208 − 0.0000i | 0.0008 − 0.0793i | −0.0960 − 0.0453i | −0.0429 + 0.0716i |
| 0 | −0.5543 − 0.0000i | −0.0712 − 0.0546i | −0.0339 + 0.0437i |
| 0 | 0 | −0.4215 + 0.0003i | −0.1268 − 0.0700i |
| 0 | 0 | 0 | 0.2702 + 0.0000i |

| R11 = | | | |
|---|---|---|---|
| −0.6266 − 0.0000i | 0.0380 − 0.0373i | −0.0045 + 0.1285i | −0.0268 + 0.0660i |
| 0 | 0.5418 + 0.0001i | 0.0730 + 0.0472i | −0.0446 − 0.0705i |
| 0 | 0 | 0.4182 + 0.0000i | 0.0975 − 0.0327i |
| 0 | 0 | 0 | −0.2991 + 0.0001i |

| R12 = | | | |
|---|---|---|---|
| −0.6519 + 0.0000i | −0.0023 + 0.0196i | 0.0106 − 0.0006i | −0.0027 + 0.0093i |
| 0 | 0.5473 + 0.0000i | −0.0092 − 0.0007i | −0.0129 + 0.0025i |
| 0 | 0 | −0.4362 + 0.0000i | −0.0118 + 0.0034i |

-continued

| | | | |
|---|---|---|---|
| 0 | 0 | 0 | −0.2903 − 0.0000i |

R13 =

| | | | |
|---|---|---|---|
| −0.6225 − 0.0000i | −0.0201 + 0.0480i | −0.0136 − 0.0067i | −0.1672 + 0.0451i |
| 0 | −0.5326 − 0.0011i | 0.0843 − 0.1273i | 0.1008 − 0.0558i |
| 0 | 0 | 0.4228 − 0.0005i | −0.0843 + 0.0305i |
| 0 | 0 | 0 | −0.2692 − 0.0000i |

R14 =

| | | | |
|---|---|---|---|
| −0.6173 − 0.0000i | −0.0418 + 0.0689i | −0.1877 + 0.0754i | 0.0480 − 0.0643i |
| 0 | −0.5244 + 0.0001i | 0.0150 − 0.1001i | −0.0856 + 0.0761i |
| 0 | 0 | −0.4370 − 0.0009i | 0.0304 + 0.0207i |
| 0 | 0 | 0 | −0.2727 + 0.0004i |

R15 =

| | | | |
|---|---|---|---|
| −0.6395 − 0.0000i | 0.1130 + 0.0960i | 0.0089 + 0.0529i | 0.0372 − 0.1284i |
| 0 | −0.5258 + 0.0003i | −0.0902 + 0.0977i | −0.0448 − 0.0424i |
| 0 | 0 | 0.4144 − 0.0013i | −0.0076 − 0.0680i |
| 0 | 0 | 0 | −0.2720 − 0.0006i |

R16 =

| | | | |
|---|---|---|---|
| −0.6225 + 0.0000i | 0.0516 + 0.0150i | 0.0649 + 0.0977i | −0.0589 − 0.0072i |
| 0 | −0.5480 + 0.0002i | −0.0324 + 0.0035i | −0.1369 − 0.0212i |
| 0 | 0 | 0.4246 − 0.0005i | 0.0252 + 0.0223i |
| 0 | 0 | 0 | 0.3006 + 0.0003i |

14) When Nt=4, Nr=4, and B=5:

R1 =

| | | | |
|---|---|---|---|
| −0.6018 − 0.0000i | −0.1063 − 0.1108i | −0.1058 − 0.0386i | 0.0130 − 0.1099i |
| 0 | −0.5252 − 0.0006i | −0.1506 − 0.1687i | 0.0819 + 0.0303i |
| 0 | 0 | −0.4262 + 0.0002i | −0.1429 + 0.0095i |
| 0 | 0 | 0 | 0.2294 − 0.0000i |

R2 =

| | | | |
|---|---|---|---|
| −0.5953 − 0.0000i | −0.0008 − 0.0416i | 0.1516 + 0.0385i | 0.0694 − 0.0501i |
| 0 | −0.5355 + 0.0003i | 0.1270 − 0.0415i | −0.0973 + 0.0510i |
| 0 | 0 | 0.4356 − 0.0003i | −0.1319 + 0.0109i |
| 0 | 0 | 0 | −0.2969 − 0.0001i |

R3 =

| | | | |
|---|---|---|---|
| −0.6332 − 0.0000i | 0.0854 + 0.1143i | −0.0747 − 0.0733i | 0.0002 − 0.0179i |
| 0 | 0.5163 + 0.0002i | 0.0556 + 0.0171i | −0.0052 − 0.0201i |
| 0 | 0 | −0.4125 + 0.0006i | −0.2112 − 0.0039i |
| 0 | 0 | 0 | 0.2868 − 0.0000i |

R4 =

| | | | |
|---|---|---|---|
| −0.6331 − 0.0000i | −0.1391 + 0.0527i | 0.0625 + 0.0572i | −0.0067 − 0.0366i |
| 0 | −0.5129 − 0.0015i | −0.1144 − 0.0864i | 0.0370 + 0.2134i |
| 0 | 0 | 0.4089 − 0.0000i | −0.1040 − 0.0335i |
| 0 | 0 | 0 | 0.2423 + 0.0012i |

R5 =

| | | | |
|---|---|---|---|
| −0.6073 − 0.0000i | 0.0192 − 0.0755i | −0.0559 − 0.0101i | −0.0143 + 0.1396i |
| 0 | −0.5139 + 0.0001i | 0.0359 − 0.0307i | 0.0390 − 0.0200i |
| 0 | 0 | −0.4513 + 0.0013i | 0.2329 − 0.0230i |
| 0 | 0 | 0 | 0.2747 + 0.0018i |

R6 =

| | | | |
|---|---|---|---|
| −0.6181 − 0.0000i | −0.0594 + 0.0779i | 0.1368 − 0.0899i | 0.0571 + 0.0991i |
| 0 | −0.5195 − 0.0009i | −0.0405 − 0.1286i | 0.1205 − 0.0495i |
| 0 | 0 | −0.4052 − 0.0001i | −0.1256 + 0.1060i |
| 0 | 0 | 0 | −0.2686 + 0.0001i |

R7 =

| | | | |
|---|---|---|---|
| −0.6149 + 0.0000i | −0.0184 − 0.0836i | 0.0587 + 0.0575i | −0.1198 + 0.1238i |
| 0 | −0.5200 − 0.0008i | −0.0963 + 0.1326i | 0.1191 + 0.0204i |
| 0 | 0 | 0.4196 + 0.0003i | 0.0109 + 0.0997i |
| 0 | 0 | 0 | −0.2830 − 0.0001i |

R8 =

| | | | |
|---|---|---|---|
| −0.6110 + 0.0000i | 0.0618 − 0.0662i | 0.1027 − 0.0157i | −0.0687 + 0.0057i |
| 0 | 0.5409 − 0.0013i | −0.0344 − 0.1544i | −0.0114 + 0.0799i |
| 0 | 0 | −0.4095 + 0.0002i | 0.1493 − 0.0764i |
| 0 | 0 | 0 | 0.2882 − 0.0003i |

-continued

| R9 = | | | |
|---|---|---|---|
| −0.5932 + 0.0000i | −0.0345 + 0.0612i | −0.1275 + 0.0820i | −0.1233 + 0.1172i |
| 0 | 0.5245 − 0.0001i | 0.0655 + 0.0414i | −0.0475 − 0.2015i |
| 0 | 0 | 0.4244 + 0.0014i | −0.0326 − 0.1091i |
| 0 | 0 | 0 | −0.2724 − 0.0001i |

| R10 = | | | |
|---|---|---|---|
| −0.6124 − 0.0000i | 0.0985 − 0.0404i | 0.0947 − 0.0025i | 0.0765 − 0.0305i |
| 0 | −0.5344 − 0.0002i | −0.0620 − 0.0499i | −0.1023 + 0.0198i |
| 0 | 0 | 0.4154 + 0.0007i | 0.1666 − 0.0019i |
| 0 | 0 | 0 | 0.3078 + 0.0007i |

| R11 = | | | |
|---|---|---|---|
| −0.6013 − 0.0000i | −0.0263 − 0.1333i | 0.0025 + 0.0575i | 0.0333 − 0.2226i |
| 0 | 0.5112 + 0.0006i | 0.1193 + 0.0702i | −0.0500 + 0.0412i |
| 0 | 0 | 0.4330 − 0.0004i | 0.0017 + 0.1100i |
| 0 | 0 | 0 | −0.2858 + 0.0006i |

| R12 = | | | |
|---|---|---|---|
| −0.5989 − 0.0000i | −0.0089 + 0.1328i | −0.1336 + 0.1041i | 0.0133 − 0.1790i |
| 0 | −0.5394 + 0.0001i | 0.0336 − 0.0177i | 0.0344 + 0.0128i |
| 0 | 0 | 0.4163 + 0.0006i | 0.1678 − 0.0308i |
| 0 | 0 | 0 | −0.2579 − 0.0006i |

| R13 = | | | |
|---|---|---|---|
| −0.6090 + 0.0000i | −0.0006 − 0.0631i | 0.0369 + 0.0018i | 0.0944 + 0.1570i |
| 0 | 0.5280 + 0.0006i | 0.0375 + 0.1161i | 0.0023 + 0.0448i |
| 0 | 0 | 0.4100 + 0.0003i | 0.0928 − 0.2093i |
| 0 | 0 | 0 | −0.2722 − 0.0000i |

| R14 = | | | |
|---|---|---|---|
| −0.6062 − 0.0000i | 0.0598 + 0.0166i | −0.0670 − 0.0812i | 0.0050 − 0.1616i |
| 0 | 0.5474 + 0.0007i | 0.0013 + 0.0522i | −0.0170 + 0.0682i |
| 0 | 0 | 0.4188 + 0.0010i | 0.0973 − 0.2054i |
| 0 | 0 | 0 | 0.2390 − 0.0006i |

| R15 = | | | |
|---|---|---|---|
| −0.6184 + 0.0000i | −0.1230 + 0.0028i | −0.1573 − 0.0309i | −0.1213 + 0.1393i |
| 0 | −0.5166 − 0.0006i | 0.0142 + 0.1105i | −0.0232 + 0.0573i |
| 0 | 0 | −0.4212 + 0.0004i | −0.0377 − 0.0228i |
| 0 | 0 | 0 | −0.2831 − 0.0006i |

| R16 = | | | |
|---|---|---|---|
| −0.6145 + 0.0000i | 0.0375 − 0.0365i | −0.0756 − 0.1907i | 0.0994 + 0.1123i |
| 0 | −0.5144 − 0.0012i | −0.0991 − 0.0699i | −0.0663 − 0.1139i |
| 0 | 0 | 0.4281 + 0.0005i | −0.0277 − 0.0968i |
| 0 | 0 | 0 | −0.2549 + 0.0000i |

| R17 = | | | |
|---|---|---|---|
| −0.6200 − 0.0000i | 0.0260 + 0.0789i | 0.0336 + 0.0793i | −0.0398 − 0.0792i |
| 0 | 0.5397 + 0.0005i | −0.1736 − 0.0561i | −0.0457 + 0.0668i |
| 0 | 0 | −0.4156 + 0.0001i | −0.0100 + 0.0067i |
| 0 | 0 | 0 | −0.2988 − 0.0007i |

| R18 = | | | |
|---|---|---|---|
| −0.6136 + 0.0000i | −0.0303 − 0.0461i | 0.0374 + 0.0672i | −0.0107 − 0.1939i |
| 0 | −0.5258 − 0.0003i | 0.1206 + 0.0294i | 0.1320 − 0.1157i |
| 0 | 0 | −0.4143 − 0.0008i | 0.0658 − 0.0872i |
| 0 | 0 | 0 | −0.2656 − 0.0003i |

| R19 = | | | |
|---|---|---|---|
| −0.6069 − 0.0000i | −0.0802 + 0.1550i | 0.0842 − 0.0081i | 0.0751 + 0.0248i |
| 0 | −0.5369 + 0.0001i | −0.0668 + 0.0314i | −0.2957 − 0.1013i |
| 0 | 0 | −0.4148 − 0.0010i | 0.0291 − 0.1326i |
| 0 | 0 | 0 | 0.0766 − 0.0030i |

| R20 = | | | |
|---|---|---|---|
| −0.6189 + 0.0000i | −0.0931 + 0.0029i | 0.1125 − 0.0489i | −0.0188 + 0.1716i |
| 0 | 0.5416 + 0.0015i | 0.1018 + 0.0916i | −0.0120 + 0.0343i |
| 0 | 0 | −0.4332 + 0.0001i | −0.0216 − 0.0758i |
| 0 | 0 | 0 | −0.2371 − 0.0007i |

| R21 = | | | |
|---|---|---|---|
| −0.5889 − 0.0000i | −0.0418 + 0.1224i | 0.1280 + 0.0065i | −0.1700 − 0.0240i |
| 0 | 0.5313 + 0.0002i | −0.1027 − 0.0402i | 0.0594 + 0.1780i |
| 0 | 0 | 0.4202 − 0.0001i | −0.0126 − 0.0544i |
| 0 | 0 | 0 | −0.2850 − 0.0007i |

-continued

| R22 = | | | |
|---|---|---|---|
| −0.6312 − 0.0000i | 0.0660 − 0.0753i | −0.1479 − 0.0274i | 0.0644 − 0.0823i |
| 0 | 0.5197 − 0.0006i | 0.1004 − 0.0324i | 0.0881 − 0.0967i |
| 0 | 0 | −0.4127 + 0.0003i | 0.0750 + 0.0629i |
| 0 | 0 | 0 | −0.2824 + 0.0002i |

| R23 = | | | |
|---|---|---|---|
| −0.6027 + 0.0000i | 0.0440 + 0.0684i | −0.0215 − 0.0589i | 0.0485 + 0.2445i |
| 0 | 0.5163 − 0.0019i | 0.0880 − 0.0296i | 0.1181 − 0.1154i |
| 0 | 0 | 0.4221 − 0.0015i | −0.0392 − 0.0560i |
| 0 | 0 | 0 | 0.2806 − 0.0009i |

| R24 = | | | |
|---|---|---|---|
| −0.6071 + 0.0000i | 0.0407 − 0.0763i | −0.1466 − 0.0179i | −0.2509 − 0.0118i |
| 0 | −0.5354 − 0.0008i | 0.0277 + 0.0408i | −0.0030 − 0.0509i |
| 0 | 0 | 0.4182 + 0.0001i | −0.0483 + 0.0361i |
| 0 | 0 | 0 | 0.2624 + 0.0010i |

| R25 = | | | |
|---|---|---|---|
| −0.6194 − 0.0000i | −0.1859 − 0.0212i | −0.0519 + 0.0190i | −0.0925 − 0.0682i |
| 0 | 0.5138 − 0.0002i | −0.0307 − 0.0621i | 0.0899 − 0.0560i |
| 0 | 0 | 0.4156 − 0.0001i | −0.0525 + 0.1334i |
| 0 | 0 | 0 | 0.3029 + 0.0003i |

| R26 = | | | |
|---|---|---|---|
| −0.5966 − 0.0000i | −0.0680 + 0.1170i | −0.0341 − 0.0087i | 0.1158 + 0.0621i |
| 0 | −0.5399 + 0.0004i | 0.1234 + 0.1415i | 0.0395 − 0.1119i |
| 0 | 0 | 0.4398 − 0.0008i | −0.0562 − 0.0017i |
| 0 | 0 | 0 | 0.2642 − 0.0003i |

| R27 = | | | |
|---|---|---|---|
| −0.6189 − 0.0000i | 0.2210 − 0.0142i | −0.0117 + 0.1022i | −0.1400 − 0.0380i |
| 0 | −0.5147 + 0.0003i | −0.0525 + 0.1146i | −0.0516 − 0.1091i |
| 0 | 0 | −0.4118 − 0.0004i | −0.1022 − 0.0457i |
| 0 | 0 | 0 | 0.2424 − 0.0017i |

| R28 = | | | |
|---|---|---|---|
| −0.6200 + 0.0000i | −0.0208 + 0.0784i | 0.1284 − 0.0351i | 0.1388 + 0.0307i |
| 0 | −0.5025 + 0.0007i | 0.1269 + 0.0647i | 0.0552 + 0.1066i |
| 0 | 0 | −0.4096 + 0.0003i | −0.0917 + 0.0728i |
| 0 | 0 | 0 | 0.3200 + 0.0004i |

| R29 = | | | |
|---|---|---|---|
| −0.6198 + 0.0000i | −0.1308 − 0.0520i | −0.0660 + 0.1228i | 0.0919 − 0.0549i |
| 0 | 0.5272 + 0.0001i | −0.0550 + 0.1139i | 0.0131 − 0.0907i |
| 0 | 0 | −0.4312 − 0.0007i | 0.0759 + 0.0817i |
| 0 | 0 | 0 | 0.2539 − 0.0001i |

| R30 = | | | |
|---|---|---|---|
| −0.6092 + 0.0000i | 0.0703 − 0.0082i | −0.0476 − 0.0885i | 0.1792 − 0.0113i |
| 0 | 0.5266 + 0.0000i | −0.1242 − 0.2373i | 0.0581 − 0.0176i |
| 0 | 0 | 0.4037 + 0.0003i | −0.0591 + 0.0546i |
| 0 | 0 | 0 | −0.2436 + 0.0001i |

| R31 = | | | |
|---|---|---|---|
| −0.6217 + 0.0000i | 0.0780 − 0.0590i | 0.1398 + 0.0819i | 0.0106 + 0.0065i |
| 0 | 0.5214 + 0.0008i | 0.0309 + 0.0193i | −0.1639 + 0.0915i |
| 0 | 0 | 0.4341 − 0.0000i | −0.0361 − 0.0870i |
| 0 | 0 | 0 | 0.2678 − 0.0003i |

| R32 = | | | |
|---|---|---|---|
| −0.6027 − 0.0000i | 0.1939 − 0.0212i | 0.0203 + 0.0167i | 0.0565 − 0.0626i |
| 0 | −0.5445 − 0.0013i | −0.0751 + 0.0224i | −0.0903 + 0.1284i |
| 0 | 0 | −0.4157 + 0.0005i | 0.0855 + 0.0581i |
| 0 | 0 | 0 | −0.2831 + 0.0004i |

15) When Nt=4, Nr=4, and B=6:

| R1 = | | | |
|---|---|---|---|
| −0.6007 + 0.0000i | −0.1234 − 0.0982i | 0.0518 − 0.0154i | −0.1389 + 0.0279i |
| 0 | −0.5211 − 0.0029i | 0.0449 − 0.1226i | 0.0680 + 0.1148i |
| 0 | 0 | −0.4074 − 0.0016i | −0.0921 + 0.1658i |
| 0 | 0 | 0 | −0.2880 − 0.0001i |

| | | R2 = | |
|---|---|---|---|
| −0.6081 − 0.0000i | −0.2001 − 0.1027i | 0.0061 − 0.2123i | −0.0242 + 0.0693i |
| 0 | 0.4781 + 0.0006i | −0.0268 + 0.1402i | 0.2023 − 0.0115i |
| 0 | 0 | 0.4224 + 0.0022i | 0.0378 + 0.0409i |
| 0 | 0 | 0 | −0.2400 − 0.0014i |
| | | R3 = | |
| −0.5889 + 0.0000i | 0.0905 − 0.1766i | 0.1325 + 0.0169i | −0.1568 − 0.0099i |
| 0 | 0.5107 + 0.0026i | −0.0298 + 0.1928i | 0.0880 − 0.0722i |
| 0 | 0 | −0.4316 − 0.0018i | −0.0850 − 0.0883i |
| 0 | 0 | 0 | 0.2409 + 0.0005i |
| | | R4 = | |
| −0.6003 − 0.0000i | 0.2704 − 0.1796i | −0.1083 − 0.1333i | −0.0054 + 0.0084i |
| 0 | 0.4785 − 0.0006i | 0.0031 − 0.1275i | 0.0452 + 0.0711i |
| 0 | 0 | 0.4301 + 0.0002i | −0.0137 + 0.0227i |
| 0 | 0 | 0 | 0.2581 − 0.0022i |
| | | R5 = | |
| −0.5984 + 0.0000i | −0.0670 + 0.1383i | 0.2004 − 0.0123i | −0.0084 + 0.0404i |
| 0 | 0.5248 + 0.0016i | −0.0513 + 0.1643i | −0.1764 − 0.1376i |
| 0 | 0 | 0.3776 + 0.0014i | 0.0574 − 0.0755i |
| 0 | 0 | 0 | −0.2639 − 0.0005i |
| | | R6 = | |
| −0.5951 + 0.0000i | −0.2097 + 0.0476i | 0.1603 − 0.1961i | −0.0115 − 0.1357i |
| 0 | 0.5011 − 0.0006i | −0.0571 − 0.0465i | −0.0303 + 0.0091i |
| 0 | 0 | −0.4127 + 0.0007i | 0.0291 − 0.0267i |
| 0 | 0 | 0 | −0.2959 − 0.0000i |
| | | R7 = | |
| −0.5863 − 0.0000i | 0.0442 − 0.0835i | −0.0360 + 0.2661i | 0.0622 + 0.0281i |
| 0 | 0.5388 − 0.0009i | 0.1888 + 0.0488i | −0.0342 + 0.1017i |
| 0 | 0 | 0.3886 − 0.0004i | 0.1321 − 0.0175i |
| 0 | 0 | 0 | 0.2489 + 0.0009i |
| | | R8 = | |
| −0.6225 − 0.0000i | 0.0670 + 0.0014i | −0.0585 − 0.0695i | 0.2344 − 0.0320i |
| 0 | −0.4955 − 0.0015i | −0.1419 + 0.1176i | −0.0451 − 0.0649i |
| 0 | 0 | −0.4119 − 0.0013i | −0.0131 + 0.1751i |
| 0 | 0 | 0 | −0.2400 + 0.0007i |
| | | R9 = | |
| −0.6126 − 0.0000i | 0.0089 + 0.0838i | 0.0169 − 0.0648i | 0.1884 + 0.1593i |
| 0 | 0.5028 − 0.0011i | 0.0252 + 0.0726i | −0.0349 + 0.0624i |
| 0 | 0 | 0.3849 + 0.0007i | −0.2025 − 0.1485i |
| 0 | 0 | 0 | 0.2779 − 0.0017i |
| | | R10 = | |
| −0.5830 + 0.0000i | −0.1274 + 0.1018i | −0.0534 + 0.2267i | 0.0297 − 0.0964i |
| 0 | 0.5028 + 0.0009i | −0.0437 − 0.0626i | −0.1500 − 0.0356i |
| 0 | 0 | −0.4435 − 0.0007i | −0.0769 − 0.1011i |
| 0 | 0 | 0 | 0.2719 + 0.0005i |
| | | R11 = | |
| −0.6019 + 0.0000i | −0.1066 + 0.0077i | 0.0432 − 0.0287i | 0.0877 + 0.1981i |
| 0 | −0.5085 − 0.0003i | −0.0589 + 0.0444i | 0.1092 + 0.1984i |
| 0 | 0 | 0.3978 − 0.0003i | −0.0672 − 0.1254i |
| 0 | 0 | 0 | −0.2878 − 0.0003i |
| | | R12 = | |
| −0.5946 + 0.0000i | 0.1310 − 0.0557i | −0.1254 − 0.1279i | 0.1635 + 0.0015i |
| 0 | −0.5052 + 0.0010i | −0.0816 + 0.0094i | −0.1102 + 0.0202i |
| 0 | 0 | 0.4038 + 0.0005i | 0.0001 + 0.1658i |
| 0 | 0 | 0 | −0.3198 − 0.0009i |
| | | R13 = | |
| −0.6338 − 0.0000i | 0.0675 − 0.0075i | 0.0683 + 0.0146i | 0.1584 − 0.1608i |
| 0 | −0.5184 + 0.0004i | −0.0380 + 0.0415i | 0.1347 + 0.0489i |
| 0 | 0 | 0.3663 + 0.0012i | 0.2582 − 0.0773i |
| 0 | 0 | 0 | 0.1965 − 0.0009i |
| | | R14 = | |
| −0.5913 + 0.0000i | 0.0004 − 0.1550i | 0.2210 − 0.0624i | −0.0190 + 0.0483i |
| 0 | 0.4940 + 0.0001i | 0.0679 − 0.0254i | −0.0788 + 0.1561i |
| 0 | 0 | 0.4389 + 0.0005i | −0.1801 − 0.0650i |
| 0 | 0 | 0 | −0.2487 + 0.0001i |

-continued

| R15 = | | | |
|---|---|---|---|
| −0.6044 + 0.0000i | −0.0247 + 0.0156i | −0.2851 − 0.0153i | 0.0883 − 0.0268i |
| 0 | 0.5137 − 0.0005i | −0.1695 + 0.0888i | 0.1367 − 0.0334i |
| 0 | 0 | −0.4089 + 0.0006i | 0.0650 − 0.0039i |
| 0 | 0 | 0 | 0.2283 − 0.0001i |

| R16 = | | | |
|---|---|---|---|
| −0.6147 − 0.0000i | −0.0773 + 0.0305i | −0.0388 + 0.1321i | 0.0233 − 0.0551i |
| 0 | 0.4843 − 0.0026i | −0.1628 + 0.1867i | 0.0947 + 0.0985i |
| 0 | 0 | 0.4343 − 0.0017i | −0.1618 + 0.0520i |
| 0 | 0 | 0 | 0.2460 − 0.0008i |

| R17 = | | | |
|---|---|---|---|
| −0.6003 − 0.0000i | 0.0135 + 0.1500i | 0.1408 − 0.1637i | −0.0330 + 0.0625i |
| 0 | −0.5012 − 0.0015i | 0.1481 − 0.0985i | −0.1506 + 0.0897i |
| 0 | 0 | 0.4204 + 0.0001i | 0.0347 − 0.0481i |
| 0 | 0 | 0 | 0.2673 + 0.0015i |

| R18 = | | | |
|---|---|---|---|
| −0.6028 + 0.0000i | −0.0863 − 0.0198i | −0.2294 − 0.0177i | −0.0552 + 0.1183i |
| 0 | 0.4609 + 0.0002i | 0.0440 − 0.0776i | 0.0984 + 0.2053i |
| 0 | 0 | −0.4347 − 0.0002i | 0.0594 + 0.0916i |
| 0 | 0 | 0 | −0.2927 + 0.0006i |

| R19 = | | | |
|---|---|---|---|
| −0.5962 + 0.0000i | −0.1014 − 0.1532i | 0.0006 − 0.1873i | −0.1385 + 0.0545i |
| 0 | −0.5162 + 0.0006i | −0.0525 − 0.1418i | −0.0282 − 0.0122i |
| 0 | 0 | 0.3916 + 0.0012i | 0.1794 − 0.1129i |
| 0 | 0 | 0 | −0.2550 + 0.0013i |

| R20 = | | | |
|---|---|---|---|
| −0.5932 − 0.0000i | 0.0034 + 0.0901i | 0.1529 − 0.0442i | −0.1509 − 0.0679i |
| 0 | −0.5223 − 0.0002i | −0.0860 + 0.1693i | 0.0125 − 0.0672i |
| 0 | 0 | −0.4242 + 0.0006i | 0.1017 − 0.0158i |
| 0 | 0 | 0 | −0.2885 + 0.0007i |

| R21 = | | | |
|---|---|---|---|
| −0.5938 + 0.0000i | 0.0293 + 0.0212i | 0.0231 + 0.2206i | −0.1000 + 0.0947i |
| 0 | −0.5244 − 0.0010i | −0.2326 − 0.2072i | 0.0999 − 0.1977i |
| 0 | 0 | 0.3898 + 0.0005i | −0.0201 − 0.0265i |
| 0 | 0 | 0 | −0.0613 + 0.0032i |

| R22 = | | | |
|---|---|---|---|
| −0.6103 − 0.0000i | 0.0039 − 0.0897i | −0.0713 + 0.0727i | 0.2620 + 0.1629i |
| 0 | 0.5089 + 0.0019i | −0.0680 + 0.0625i | 0.0780 + 0.0927i |
| 0 | 0 | 0.3941 + 0.0001i | 0.0036 + 0.0404i |
| 0 | 0 | 0 | −0.2735 + 0.0019i |

| R23 = | | | |
|---|---|---|---|
| −0.6051 − 0.0000i | 0.0608 + 0.1141i | 0.0787 − 0.0584i | 0.0467 + 0.0425i |
| 0 | −0.5378 − 0.0008i | −0.1643 − 0.0390i | 0.0783 − 0.0063i |
| 0 | 0 | −0.3867 + 0.0003i | −0.2114 − 0.0245i |
| 0 | 0 | 0 | 0.2912 + 0.0009i |

| R24 = | | | |
|---|---|---|---|
| −0.5971 + 0.0000i | 0.0370 + 0.0365i | −0.1068 − 0.0677i | −0.1038 + 0.1941i |
| 0 | 0.5306 − 0.0004i | 0.0199 − 0.1772i | −0.0913 − 0.1812i |
| 0 | 0 | −0.4112 + 0.0008i | 0.0963 − 0.0563i |
| 0 | 0 | 0 | −0.2009 − 0.0008i |

| R25 = | | | |
|---|---|---|---|
| −0.6153 + 0.0000i | −0.1567 + 0.0486i | −0.1471 + 0.0780i | −0.0759 − 0.1950i |
| 0 | 0.5170 + 0.0020i | 0.2122 − 0.0697i | 0.0464 + 0.1032i |
| 0 | 0 | 0.3444 + 0.0010i | −0.0003 − 0.0489i |
| 0 | 0 | 0 | −0.2683 + 0.0007i |

| R26 = | | | |
|---|---|---|---|
| −0.5951 + 0.0000i | 0.0619 − 0.0096i | −0.0440 − 0.1294i | −0.0348 + 0.0453i |
| 0 | −0.5192 − 0.0012i | 0.1760 + 0.1559i | 0.1348 + 0.0015i |
| 0 | 0 | −0.4207 + 0.0004i | 0.0470 − 0.1424i |
| 0 | 0 | 0 | 0.2783 − 0.0007i |

| R27 = | | | |
|---|---|---|---|
| −0.5605 − 0.0000i | 0.2260 − 0.0726i | 0.0753 − 0.0201i | −0.2082 − 0.1274i |
| 0 | −0.5267 + 0.0011i | −0.0090 + 0.1137i | 0.0117 + 0.1262i |
| 0 | 0 | 0.4353 + 0.0015i | −0.0086 + 0.0546i |
| 0 | 0 | 0 | −0.2546 + 0.0010i |

-continued

R28 =

| | | | |
|---|---|---|---|
| −0.6028 + 0.0000i | −0.0605 + 0.1125i | −0.0783 − 0.0666i | 0.0734 + 0.0131i |
| 0 | −0.5160 − 0.0011i | −0.1423 + 0.1189i | −0.1225 − 0.1195i |
| 0 | 0 | 0.3975 + 0.0005i | 0.0289 + 0.2097i |
| 0 | 0 | 0 | 0.2671 + 0.0009i |

R29 =

| | | | |
|---|---|---|---|
| −0.6111 − 0.0000i | 0.0334 − 0.0037i | −0.1438 + 0.1347i | −0.3025 + 0.1297i |
| 0 | 0.4989 − 0.0002i | −0.0608 + 0.0411i | 0.1383 − 0.0339i |
| 0 | 0 | 0.3617 + 0.0003i | 0.0553 − 0.0391i |
| 0 | 0 | 0 | −0.2615 − 0.0003i |

R30 =

| | | | |
|---|---|---|---|
| −0.6066 − 0.0000i | 0.0507 − 0.2073i | 0.0126 − 0.0457i | 0.0046 + 0.0099i |
| 0 | −0.5112 + 0.0001i | 0.2063 − 0.0635i | 0.0632 − 0.1456i |
| 0 | 0 | 0.4139 − 0.0007i | −0.0233 + 0.0696i |
| 0 | 0 | 0 | 0.2727 − 0.0001i |

R31 =

| | | | |
|---|---|---|---|
| −0.6066 + 0.0000i | −0.0517 + 0.0240i | −0.0643 + 0.1953i | 0.0325 + 0.0357i |
| 0 | −0.5173 − 0.0007i | −0.0431 + 0.0714i | 0.0415 + 0.1149i |
| 0 | 0 | −0.4179 + 0.0009i | 0.1311 + 0.1241i |
| 0 | 0 | 0 | 0.2959 − 0.0000i |

R32 =

| | | | |
|---|---|---|---|
| −0.6069 − 0.0000i | 0.0538 − 0.2341i | −0.0443 + 0.0206i | −0.0364 − 0.0240i |
| 0 | 0.4905 + 0.0005i | −0.0184 + 0.1184i | −0.1111 − 0.1037i |
| 0 | 0 | −0.4053 − 0.0019i | −0.0389 + 0.0502i |
| 0 | 0 | 0 | −0.3510 + 0.0013i |

R33 =

| | | | |
|---|---|---|---|
| −0.5813 − 0.0000i | −0.0085 − 0.0889i | 0.2437 + 0.0233i | −0.0963 + 0.0196i |
| 0 | 0.5371 + 0.0022i | −0.0291 − 0.0988i | 0.1607 − 0.0793i |
| 0 | 0 | 0.4000 − 0.0011i | −0.0204 − 0.1462i |
| 0 | 0 | 0 | 0.2672 − 0.0016i |

R34 =

| | | | |
|---|---|---|---|
| −0.5937 + 0.0000i | −0.0233 + 0.2696i | −0.1213 − 0.0584i | −0.1091 − 0.0430i |
| 0 | −0.5082 + 0.0007i | 0.1243 + 0.0571i | −0.0062 − 0.0559i |
| 0 | 0 | 0.4355 − 0.0013i | −0.0666 − 0.0059i |
| 0 | 0 | 0 | −0.2609 + 0.0008i |

R35 =

| | | | |
|---|---|---|---|
| −0.5956 + 0.0000i | −0.0771 − 0.1638i | −0.1282 − 0.0070i | −0.1944 − 0.0428i |
| 0 | 0.5172 − 0.0006i | −0.1407 + 0.0762i | −0.1499 − 0.1154i |
| 0 | 0 | 0.3574 − 0.0006i | −0.0997 − 0.0289i |
| 0 | 0 | 0 | 0.2982 + 0.0006i |

R36 =

| | | | |
|---|---|---|---|
| −0.5734 − 0.0000i | 0.2523 + 0.0319i | 0.1111 − 0.0426i | −0.0918 − 0.1762i |
| 0 | 0.5545 + 0.0007i | 0.2032 + 0.0199i | 0.0533 + 0.0703i |
| 0 | 0 | −0.4118 + 0.0008i | 0.0703 + 0.0711i |
| 0 | 0 | 0 | −0.1282 − 0.0010i |

R37 =

| | | | |
|---|---|---|---|
| −0.5903 + 0.0000i | −0.1335 − 0.1372i | 0.0732 + 0.0864i | −0.0089 + 0.1041i |
| 0 | 0.5392 − 0.0012i | −0.1344 − 0.0913i | −0.0739 − 0.0166i |
| 0 | 0 | −0.3733 + 0.0006i | −0.0175 + 0.3117i |
| 0 | 0 | 0 | 0.1772 − 0.0022i |

R38 =

| | | | |
|---|---|---|---|
| −0.5800 − 0.0000i | −0.0148 + 0.1878i | −0.0160 − 0.1966i | −0.0014 + 0.1427i |
| 0 | 0.5320 − 0.0002i | −0.0060 + 0.0006i | 0.0823 + 0.0821i |
| 0 | 0 | −0.4084 − 0.0005i | −0.1272 − 0.2255i |
| 0 | 0 | 0 | 0.1963 + 0.0005i |

R39 =

| | | | |
|---|---|---|---|
| −0.5891 + 0.0000i | 0.1466 − 0.0389i | −0.0801 + 0.1911i | −0.0597 + 0.0102i |
| 0 | −0.5255 + 0.0004i | −0.0886 − 0.0695i | −0.0911 + 0.1515i |
| 0 | 0 | 0.4140 + 0.0006i | −0.0615 + 0.0681i |
| 0 | 0 | 0 | 0.2887 − 0.0004i |

R40 =

| | | | |
|---|---|---|---|
| −0.5843 −0.0000i | −0.1036 − 0.0347i | 0.0333 − 0.1836i | −0.0064 − 0.1190i |
| 0 | 0.5171 + 0.0010i | 0.2701 + 0.1100i | −0.0486 − 0.0233i |
| 0 | 0 | 0.4009 − 0.0005i | 0.0315 + 0.0815i |
| 0 | 0 | 0 | 0.2719 + 0.0010i |

-continued

R41 =

| | | | |
|---|---|---|---|
| −0.6056 + 0.0000i | 0.2487 + 0.1176i | 0.0244 + 0.0519i | 0.0688 + 0.1141i |
| 0 | −0.4851 − 0.0014i | 0.0882 + 0.0432i | 0.0185 − 0.0765i |
| 0 | 0 | 0.4124 − 0.0003i | 0.2468 − 0.0976i |
| 0 | 0 | 0 | −0.2119 − 0.0014i |

R42 =

| | | | |
|---|---|---|---|
| −0.6170 − 0.0000i | −0.1023 + 0.1072i | −0.0516 + 0.1168i | −0.0174 + 0.1311i |
| 0 | −0.5199 − 0.0007i | −0.0062 + 0.0630i | −0.1568 + 0.0982i |
| 0 | 0 | −0.4065 − 0.0004i | −0.1629 − 0.1071i |
| 0 | 0 | 0 | −0.2275 − 0.0015i |

R43 =

| | | | |
|---|---|---|---|
| −0.5998 + 0.0000i | −0.0318 + 0.0557i | 0.0280 − 0.0206i | 0.2367 + 0.1201i |
| 0 | 0.5271 − 0.0023i | 0.1940 + 0.1203i | 0.0291 − 0.0021i |
| 0 | 0 | −0.4002 + 0.0010i | 0.0072 + 0.1446i |
| 0 | 0 | 0 | −0.2292 + 0.0001i |

R44 =

| | | | |
|---|---|---|---|
| −0.5940 + 0.0000i | −0.1103 − 0.1438i | −0.0652 + 0.1174i | −0.0035 − 0.1108i |
| 0 | −0.5109 − 0.0008i | 0.0520 + 0.0233i | 0.1587 − 0.0900i |
| 0 | 0 | 0.4108 − 0.0007i | −0.2088 − 0.0052i |
| 0 | 0 | 0 | −0.2722 + 0.0008i |

R45 =

| | | | |
|---|---|---|---|
| −0.5962 + 0.0000i | −0.0053 − 0.0056i | −0.0580 − 0.0526i | 0.0664 − 0.0276i |
| 0 | 0.5212 + 0.0003i | −0.1259 − 0.2436i | 0.0114 − 0.0470i |
| 0 | 0 | 0.3903 + 0.0011i | 0.0024 − 0.2640i |
| 0 | 0 | 0 | −0.2491 + 0.0004i |

R46 =

| | | | |
|---|---|---|---|
| −0.5889 − 0.0000i | −0.0199 − 0.1874i | −0.0463 − 0.0213i | 0.0660 + 0.1574i |
| 0 | −0.5109 − 0.0009i | 0.0713 − 0.0150i | 0.0481 − 0.0312i |
| 0 | 0 | −0.4164 + 0.0005i | 0.2177 − 0.0905i |
| 0 | 0 | 0 | −0.2956 + 0.0020i |

R47 =

| | | | |
|---|---|---|---|
| −0.5909 − 0.0000i | 0.1496 − 0.0989i | −0.0520 − 0.0525i | 0.0408 + 0.0214i |
| 0 | 0.5093 + 0.0023i | −0.1263 + 0.0843i | −0.1464 + 0.3108i |
| 0 | 0 | −0.3904 − 0.0012i | −0.0035 + 0.0256i |
| 0 | 0 | 0 | 0.2399 + 0.0006i |

R48 =

| | | | |
|---|---|---|---|
| −0.6056 + 0.0000i | 0.0052 − 0.1351i | 0.0559 − 0.0253i | −0.0393 − 0.1270i |
| 0 | −0.5231 + 0.0016i | −0.0413 − 0.0769i | −0.1918 + 0.0632i |
| 0 | 0 | −0.4069 − 0.0007i | 0.0111 − 0.1397i |
| 0 | 0 | 0 | 0.2937 − 0.0003i |

R49 =

| | | | |
|---|---|---|---|
| −0.5719 − 0.0000i | −0.0612 + 0.0061i | 0.0034 + 0.0127i | 0.1327 + 0.0130i |
| 0 | 0.5244 + 0.0006i | −0.1207 − 0.2218i | 0.0054 − 0.0713i |
| 0 | 0 | 0.4224 − 0.0014i | −0.0157 + 0.1990i |
| 0 | 0 | 0 | 0.2985 + 0.0009i |

R50 =

| | | | |
|---|---|---|---|
| −0.5748 − 0.0000i | 0.1289 − 0.0504i | −0.1717 − 0.0117i | −0.0465 − 0.0236i |
| 0 | 0.5217 − 0.0020i | −0.1035 + 0.0353i | −0.2231 − 0.0986i |
| 0 | 0 | 0.4130 − 0.0003i | −0.1633 + 0.1128i |
| 0 | 0 | 0 | −0.2540 + 0.0004i |

R51 =

| | | | |
|---|---|---|---|
| −0.5687 + 0.0000i | 0.2633 − 0.0922i | 0.0999 − 0.0735i | 0.0707 − 0.2365i |
| 0 | 0.5053 − 0.0011i | 0.0365 + 0.1125i | 0.1887 − 0.1174i |
| 0 | 0 | 0.4334 + 0.0003i | −0.0500 − 0.0269i |
| 0 | 0 | 0 | −0.1125 − 0.0018i |

R52 =

| | | | |
|---|---|---|---|
| −0.6119 + 0.0000i | 0.0130 − 0.0347i | −0.0108 + 0.0768i | 0.1162 − 0.0811i |
| 0 | 0.5219 + 0.0008i | −0.1010 − 0.1413i | 0.0921 − 0.0237i |
| 0 | 0 | −0.3961 − 0.0009i | −0.2364 − 0.0688i |
| 0 | 0 | 0 | −0.2626 + 0.0003i |

R53 =

| | | | |
|---|---|---|---|
| −0.6101 − 0.0000i | −0.2133 − 0.0239i | 0.0804 + 0.0753i | 0.1364 − 0.0343i |
| 0 | −0.5046 − 0.0010i | 0.0120 + 0.0046i | −0.1606 − 0.1441i |
| 0 | 0 | 0.3933 − 0.0012i | 0.1524 + 0.0589i |
| 0 | 0 | 0 | −0.2589 + 0.0019i |

-continued

R54 =

| | | | |
|---|---|---|---|
| −0.5726 − 0.0000i | −0.0267 + 0.2444i | 0.0606 + 0.0468i | 0.1118 + 0.0815i |
| 0 | 0.4994 − 0.0005i | 0.1222 − 0.0659i | 0.1079 − 0.0881i |
| 0 | 0 | 0.4602 + 0.0016i | −0.0072 + 0.1680i |
| 0 | 0 | 0 | −0.2420 − 0.0014i |

R55 =

| | | | |
|---|---|---|---|
| −0.6173 + 0.0000i | 0.1439 + 0.0401i | −0.0181 + 0.0001i | 0.0308 − 0.1964i |
| 0 | −0.5195 − 0.0010i | 0.0758 − 0.1472i | 0.0600 − 0.0637i |
| 0 | 0 | −0.4131 − 0.0010i | −0.0411 − 0.1274i |
| 0 | 0 | 0 | −0.2516 − 0.0010i |

R56 =

| | | | |
|---|---|---|---|
| −0.5827 + 0.0000i | 0.0809 + 0.0333i | 0.1457 − 0.0081i | −0.1117 − 0.0697i |
| 0 | 0.5092 + 0.0003i | −0.1054 − 0.0802i | −0.0618 + 0.1596i |
| 0 | 0 | 0.4034 + 0.0009i | 0.2125 + 0.1881i |
| 0 | 0 | 0 | −0.2545 − 0.0010i |

R57 =

| | | | |
|---|---|---|---|
| −0.5943 − 0.0000i | 0.0576 + 0.2765i | −0.0277 − 0.0444i | −0.1140 − 0.0141i |
| 0 | 0.4934 − 0.0001i | −0.0578 − 0.0795i | −0.1329 − 0.0154i |
| 0 | 0 | 0.4303 + 0.0011i | 0.1534 − 0.0790i |
| 0 | 0 | 0 | 0.2553 − 0.0011i |

R58 =

| | | | |
|---|---|---|---|
| −0.5899 − 0.0000i | −0.0372 − 0.0120i | −0.0245 − 0.1508i | 0.0446 − 0.1995i |
| 0 | −0.4868 − 0.0003i | −0.1082 − 0.1193i | 0.1308 + 0.1043i |
| 0 | 0 | 0.4359 − 0.0002i | −0.1538 − 0.0756i |
| 0 | 0 | 0 | 0.2740 + 0.0006i |

R59 =

| | | | |
|---|---|---|---|
| −0.6248 + 0.0000i | −0.0167 + 0.0431i | 0.0324 + 0.0054i | −0.0845 + 0.1003i |
| 0 | −0.5106 − 0.0001i | 0.1429 − 0.0952i | −0.1237 − 0.1942i |
| 0 | 0 | −0.4197 − 0.0002i | 0.0497 + 0.1624i |
| 0 | 0 | 0 | 0.2024 − 0.0016i |

R60 =

| | | | |
|---|---|---|---|
| −0.6018 + 0.0000i | 0.2082 + 0.0010i | 0.0749 + 0.1027i | 0.1297 + 0.1911i |
| 0 | 0.4760 − 0.0009i | 0.1051 − 0.1010i | 0.0205 − 0.0775i |
| 0 | 0 | −0.4172 + 0.0015i | 0.0872 − 0.0708i |
| 0 | 0 | 0 | 0.2899 − 0.0002i |

R61 =

| | | | |
|---|---|---|---|
| −0.6008 + 0.0000i | −0.1294 + 0.1240i | 0.0635 − 0.0336i | −0.0351 − 0.1003i |
| 0 | 0.5064 − 0.0001i | 0.1498 + 0.0146i | 0.1818 − 0.0281i |
| 0 | 0 | −0.4020 − 0.0014i | −0.0339 + 0.1267i |
| 0 | 0 | 0 | 0.3141 + 0.0003i |

R62 =

| | | | |
|---|---|---|---|
| −0.5916 + 0.0000i | 0.0404 + 0.0643i | 0.1026 + 0.2420i | −0.0526 + 0.0147i |
| 0 | 0.5011 − 0.0015i | −0.0938 + 0.0627i | −0.0065 + 0.0195i |
| 0 | 0 | −0.4159 − 0.0003i | 0.1507 − 0.1507i |
| 0 | 0 | 0 | −0.2993 + 0.0004i |

R63 =

| | | | |
|---|---|---|---|
| −0.6198 + 0.0000i | −0.0966 − 0.1283i | 0.0489 − 0.1389i | −0.0380 − 0.1434i |
| 0 | 0.4932 + 0.0001i | 0.1136 − 0.0460i | −0.1366 + 0.0026i |
| 0 | 0 | −0.4145 − 0.0001i | 0.2046 − 0.0362i |
| 0 | 0 | 0 | 0.2333 + 0.0002i |

R64 =

| | | | |
|---|---|---|---|
| −0.6121 − 0.0000i | −0.1469 + 0.0302i | 0.0154 + 0.0890i | −0.1259 + 0.0663i |
| 0 | −0.5127 + 0.0010i | 0.0115 + 0.1427i | 0.0021 − 0.0419i |
| 0 | 0 | 0.4269 + 0.0001i | −0.0698 − 0.1428i |
| 0 | 0 | 0 | 0.2860 − 0.0007i |

(3) When the $k^{th}$ receiver calculates the explicit feedback vector as $h=\mathrm{vec}(H_k^H H_k)$ and uses $v=h/|\mathrm{vec}(H_k^H H_k)|_2$ to generate information associated with the direction of the explicit feedback vector:

A. Discrete Fourier Transform (DFT)-like Codebook

According to some examples, a codebook may be designed based on DFT matrices.

When a DFT codebook $\Upsilon$ includes $2^B$ DFT matrices and a number of transmit antennas of a transmitter is $n_t$, the DFT codebook $\Upsilon$ may be defined as follows:

$$\Upsilon = \{F^{(0)} \ldots F^{(2^B-1)}\}$$

$$F^{(b)} = [f_0^{(b)} \ldots f_{n_t-1}^{(b)}]$$

$$f_m^{(b)} = \frac{1}{\sqrt{n_t}}[f_{0m}^{(b)} \ldots f_{(n_t-1)m}^{(b)}]$$

-continued $$f_{nm}^{(b)} = \frac{1}{\sqrt{n_t}} \exp\left\{j\frac{2\pi n}{n_t}\left(m + \frac{b}{2^B}\right)\right\}.$$

For example, when the number of transmit antennas is four, examples of two matrices may follow:

$$F^{(0)} = \frac{1}{\sqrt{4}}\begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \frac{1}{\sqrt{4}}\begin{bmatrix} 1 & 1 & 1 & 1 \\ 1 & j & -1 & -j \\ 1 & -1 & 1 & -1 \\ 1 & -j & -1 & j \end{bmatrix}$$

$$F^{(1)} = \frac{1}{\sqrt{4}}\begin{bmatrix} 1 & 1 & 1 & 1 \\ e^{j\pi/4} & e^{j3\pi/4} & e^{j5\pi/4} & e^{j7\pi/4} \\ e^{j2\pi/4} & e^{j6\pi/4} & e^{j10\pi/4} & e^{j14\pi/4} \\ e^{j3\pi/4} & e^{j9\pi/4} & e^{j15\pi/4} & e^{j21\pi/4} \end{bmatrix}$$

$$= \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

To obtain a DFT-like codebook based on the DFT codebooks, each of columns included in each of all the DFT matrices $f_m^{(b)}$ may be multiplied by Hermitian $f_m^{(b)H}$ of $f_m^{(b)}$. For example, when $$f_m^{(b)} = \begin{bmatrix} 1 \\ e^{j\theta} \\ e^{j2\theta} \\ e^{j3\theta} \end{bmatrix}, \quad f_m^{(b)} \cdot f_m^{(b)H}$$

may be expressed by:

$$f_m^{(b)} \cdot f_m^{(b)H} = \begin{bmatrix} 1 \\ e^{j\theta} \\ e^{j2\theta} \\ e^{j3\theta} \end{bmatrix} \cdot [1 \quad e^{-j\theta} \quad e^{-j2\theta} \quad e^{-j3\theta}]$$

$$= \begin{bmatrix} 1 & e^{-j\theta} & e^{-j2\theta} & e^{-j3\theta} \\ e^{j\theta} & 1 & e^{-j\theta} & e^{-j2\theta} \\ e^{j2\theta} & e^{j\theta} & 1 & e^{-j\theta} \\ e^{j3\theta} & e^{j2\theta} & e^{j\theta} & 1 \end{bmatrix}.$$

The DFT-like codebook may include a predetermined number of matrices $f_m^{(b)} \cdot f_m^{(b)H}$. $C_{H^HH}^{DFT}$ may also be referred to as the DFT-like codebook.

The DFT-like codebook may also include a predetermined number of matrices $((f_m^{(b)})^T)^H \cdot (f_m^{(b)})^T$.

B. Codebook $C_{H^HH}$ where $C_{H^HH}^{Lloyd}$ and $C_{H^HH}^{DFT}$ are Merged $C_{H^HH}^{Lloyd}$ is assumed as a codebook for an explicit feedback based on a well-known a Lloyd algorithm. In this example, a portion of elements of $C_{H^HH}^{Lloyd}$ may be replaced using $C_{H^HH}^{DFT}$ based on a chordal distance between $C_{H^HH}^{Lloyd}$ and $C_{H^HH}^{DFT}$. In particular, the codebook $C_{H^HH}$ where $C_{H^HH}^{Lloyd}$ and $C_{H^HH}^{DFT}$ are merged with each other may be designed to maximize a minimum distance between $C_{H^HH}^{Lloyd}$ and $C_{H^HH}^{DFT}$. In this example, an $i^{th}$ entry of $C_{H^HH}$ may be expressed by $V_{H^HH}^{(i)}$, and $C_{H^HH}$ may be expressed by $$C_{H^HH} = \{V_{H^HH}^{(1)} \ldots V_{H^HH}^{(2^B)}\}.$$

C. EXAMPLES

Hereinafter, specific examples of the codebook $C_{H^HH}$ for the explicit feedback will be given by:

a) When B=4:

| codebook(:, :, 1) = | | | |
|---|---|---|---|
| 0.3619 − 0.0000i | −0.0330 + 0.0459i | −0.0086 + 0.0784i | 0.2117 − 0.1303i |
| −0.0330 − 0.0459i | 0.2544 − 0.0000i | 0.0367 − 0.0216i | −0.0945 − 0.0395i |
| −0.0086 − 0.0784i | 0.0367 + 0.0216i | 0.2781 − 0.0000i | −0.1043 − 0.1147i |
| 0.2117 + 0.1303i | −0.0945 + 0.0395i | −0.1043 + 0.1147i | 0.7155 − 0.0000i |
| codebook(:, :, 2) = | | | |
| 0.4010 − 0.0000i | 0.0946 + 0.2070i | 0.1189 − 0.1145i | −0.0579 − 0.0356i |
| 0.0946 − 0.2070i | 0.5647 − 0.0000i | −0.1010 − 0.2073i | −0.0682 + 0.0524i |
| 0.1189 + 0.1145i | −0.1010 + 0.2073i | 0.3988 − 0.0000i | −0.0271 − 0.0552i |
| −0.0579 + 0.0356i | −0.0682 − 0.0524i | −0.0271 + 0.0552i | 0.2555 + 0.0000i |
| codebook(:, :, 3) = | | | |
| 0.2934 − 0.0000i | 0.0247 − 0.1425i | −0.0511 + 0.0008i | 0.0495 − 0.0900i |
| 0.0247 + 0.1425i | 0.5505 − 0.0000i | −0.0506 − 0.1248i | 0.2836 + 0.0785i |
| −0.0511 − 0.0008i | −0.0506 + 0.1248i | 0.2870 − 0.0000i | −0.0724 + 0.0914i |
| 0.0495 + 0.0900i | 0.2836 − 0.0785i | −0.0724 − 0.0914i | 0.4731 − 0.0000i |
| codebook(:, :, 4) = | | | |
| 0.5727 + 0.0000i | −0.2498 − 0.0541i | 0.1629 − 0.0846i | 0.0915 − 0.0325i |
| −0.2498 + 0.0541i | 0.4483 + 0.0000i | −0.1198 + 0.0989i | −0.0750 + 0.0538i |
| 0.1629 + 0.0846i | −0.1198 − 0.0989i | 0.3398 − 0.0000i | 0.0712 + 0.0079i |
| 0.0915 + 0.0325i | −0.0750 − 0.0538i | 0.0712 − 0.0079i | 0.2513 − 0.0000i |

-continued

| codebook(:, :, 5) = | | | |
|---|---|---|---|
| 0.5102 − 0.0000i | −0.1691 + 0.1568i | −0.1296 + 0.1145i | −0.1019 − 0.1056i |
| −0.1691 − 0.1568i | 0.4611 − 0.0000i | 0.1698 − 0.0031i | 0.0109 + 0.1344i |
| −0.1296 − 0.1145i | 0.1698 + 0.0031i | 0.3307 − 0.0000i | 0.0074 + 0.0954i |
| −0.1019 + 0.1056i | 0.0109 − 0.1344i | 0.0074 − 0.0954i | 0.3101 + 0.0000i |
| codebook(:, :, 6) = | | | |
| 0.2620 + 0.0000i | −0.0549 − 0.1234i | −0.0345 + 0.0104i | −0.0253 + 0.0716i |
| −0.0549 + 0.1234i | 0.7260 + 0.0000i | 0.0339 − 0.0882i | −0.2057 − 0.1527i |
| −0.0345 − 0.0104i | 0.0339 + 0.0882i | 0.2598 + 0.0000i | 0.0155 − 0.0529i |
| −0.0253 − 0.0716i | −0.2057 + 0.1527i | 0.0155 + 0.0529i | 0.3619 + 0.0000i |
| codebook(:, :, 7) = | | | |
| 0.4209 − 0.0000i | −0.0693 + 0.0953i | 0.0923 + 0.1210i | 0.0599 + 0.2232i |
| −0.0693 − 0.0953i | 0.3079 + 0.0000i | 0.0242 − 0.1000i | 0.1081 − 0.1179i |
| 0.0923 − 0.1210i | 0.0242 + 0.1000i | 0.3654 − 0.0000i | 0.1695 + 0.0791i |
| 0.0599 − 0.2232i | 0.1081 + 0.1179i | 0.1695 − 0.0791i | 0.5209 − 0.0000i |
| codebook(:, :, 8) = | | | |
| 0.2973 + 0.0000i | 0.0197 − 0.0575i | 0.0863 − 0.1260i | 0.0476 + 0.1078i |
| 0.0197 + 0.0575i | 0.2987 + 0.0000i | 0.1506 + 0.0355i | −0.0703 + 0.0855i |
| 0.0863 + 0.1260i | 0.1506 − 0.0355i | 0.5957 + 0.0000i | −0.1411 + 0.2151i |
| 0.0476 − 0.1078i | −0.0703 − 0.0855i | −0.1411 − 0.2151i | 0.4255 + 0.0000i |
| codebook(:, :, 9) = | | | |
| 0.2500 | 0.2500 | 0.2500 | 0.2500 |
| 0.2500 | 0.2500 | 0.2500 | 0.2500 |
| 0.2500 | 0.2500 | 0.2500 | 0.2500 |
| 0.2500 | 0.2500 | 0.2500 | 0.2500 |
| codebook(:, :, 10) = | | | |
| 0.2500 | 0.0000 − 0.2500i | −0.2500 − 0.0000i | −0.0000 + 0.2500i |
| 0.0000 + 0.2500i | 0.2500 | 0.0000 − 0.2500i | −0.2500 − 0.0000i |
| −0.2500 + 0.0000i | 0.0000 + 0.2500i | 0.2500 | 0.0000 − 0.2500i |
| −0.0000 − 0.2500i | −0.2500 + 0.0000i | 0.0000 + 0.2500i | 0.2500 |
| codebook(:, :, 11) = | | | |
| 0.2500 | −0.2500 − 0.0000i | 0.2500 + 0.0000i | −0.2500 − 0.0000i |
| −0.2500 + 0.0000i | 0.2500 | −0.2500 − 0.0000i | 0.2500 + 0.0000i |
| 0.2500 − 0.0000i | −0.2500 + 0.0000i | 0.2500 | −0.2500 − 0.0000i |
| −0.2500 + 0.0000i | 0.2500 + 0.0000i | −0.2500 + 0.0000i | 0.2500 |
| codebook(:, :, 12) = | | | |
| 0.2500 | −0.0000 + 0.2500i | −0.2500 − 0.0000i | 0.0000 − 0.2500i |
| −0.0000 − 0.2500i | 0.2500 | −0.0000 + 0.2500i | −0.2500 − 0.0000i |
| −0.2500 + 0.0000i | −0.0000 − 0.2500i | 0.2500 | −0.0000 + 0.2500i |
| 0.0000 + 0.2500i | −0.2500 − 0.0000i | −0.0000 − 0.2500i | 0.2500 |
| codebook(:, :, 13) = | | | |
| 0.2500 | 0.1768 − 0.1768i | 0.0000 − 0.2500i | −0.1768 − 0.1768i |
| 0.1768 + 0.1768i | 0.2500 − 0.0000i | 0.1768 − 0.1768i | −0.0000 − 0.2500i |
| 0.0000 + 0.2500i | 0.1768 + 0.1768i | 0.2500 | 0.1768 − 0.1768i |
| −0.1768 + 0.1768i | −0.0000 + 0.2500i | 0.1768 + 0.1768i | 0.2500 + 0.0000i |
| codebook(:, :, 14) = | | | |
| 0.2500 | −0.1768 − 0.1768i | −0.0000 + 0.2500i | 0.1768 − 0.1768i |
| −0.1768 + 0.1768i | 0.2500 + 0.0000i | −0.1768 − 0.1768i | −0.0000 − 0.2500i |
| −0.0000 − 0.2500i | −0.1768 + 0.1768i | 0.2500 | −0.1768 − 0.1768i |
| 0.1768 + 0.1768i | −0.0000 + 0.2500i | −0.1768 + 0.1768i | 0.2500 − 0.0000i |
| codebook(:, :, 15) = | | | |
| 0.2500 | −0.1768 + 0.1768i | 0.0000 − 0.2500i | 0.1768 + 0.1768i |
| −0.1768 − 0.1768i | 0.2500 − 0.0000i | −0.1768 − 0.1768i | 0.0000 − 0.2500i |
| 0.0000 + 0.2500i | −0.1768 + 0.1768i | 0.2500 | −0.1768 + 0.1768i |
| 0.1768 − 0.1768i | 0.0000 + 0.2500i | −0.1768 − 0.1768i | 0.2500 + 0.0000i |
| codebook(:, :, 16) = | | | |
| 0.2500 | 0.1768 + 0.1768i | −0.0000 + 0.2500i | −0.1768 + 0.1768i |
| 0.1768 − 0.1768i | 0.2500 + 0.0000i | 0.1768 + 0.1768i | 0.0000 + 0.2500i |
| −0.0000 − 0.2500i | 0.1768 − 0.1768i | 0.2500 | 0.1768 + 0.1768i |
| −0.1768 − 0.1768i | 0.0000 − 0.2500i | 0.1768 − 0.1768i | 0.2500 − 0.0000i | b) When B=6:

| codebook(:, :, 1) = | | | |
|---|---|---|---|
| 0.3603 − 0.0000i | −0.2493 + 0.1193i | −0.0580 + 0.1438i | −0.0737 − 0.0862i |
| −0.2493 − 0.1193i | 0.5870 − 0.0000i | 0.1506 − 0.1594i | 0.0173 + 0.1459i |
| −0.0580 − 0.1438i | 0.1506 + 0.1594i | 0.2912 − 0.0000i | −0.0475 + 0.0677i |
| −0.0737 + 0.0862i | 0.0173 − 0.1459i | −0.0475 − 0.0677i | 0.2474 − 0.0000i |
| codebook(:, :, 2) = | | | |
| 0.2819 − 0.0000i | 0.0722 − 0.0240i | 0.1878 + 0.1114i | −0.1321 + 0.0372i |
| 0.0722 + 0.0240i | 0.2482 − 0.0000i | 0.1145 + 0.1207i | −0.1175 − 0.0141i |
| 0.1878 − 0.1114i | 0.1145 − 0.1207i | 0.6009 − 0.0000i | −0.1762 + 0.1937i |
| −0.1321 − 0.0372i | −0.1175 − 0.0141i | −0.1762 − 0.1937i | 0.3643 − 0.0000i |
| codebook(:, :, 3) = | | | |
| 0.5673 − 0.0000i | 0.2094 − 0.0003i | −0.2742 + 0.0515i | −0.1510 − 0.0214i |
| 0.2094 + 0.0003i | 0.2992 − 0.0000i | −0.1589 + 0.0257i | −0.0853 − 0.0193i |
| −0.2742 − 0.0515i | −0.1589 − 0.0257i | 0.4031 − 0.0000i | 0.1016 + 0.0210i |
| −0.1510 + 0.0214i | −0.0853 + 0.0193i | 0.1016 − 0.0210i | 0.2183 − 0.0000i |
| codebook(:, :, 4) = | | | |
| 0.2492 + 0.0000i | −0.0392 − 0.1072i | 0.0665 − 0.1598i | −0.0890 + 0.1024i |
| −0.0392 + 0.1072i | 0.3331 + 0.0000i | 0.1513 + 0.1583i | −0.0754 − 0.1343i |
| 0.0665 + 0.1598i | 0.1513 − 0.1583i | 0.5309 + 0.0000i | −0.2482 − 0.1005i |
| −0.0890 − 0.1024i | −0.0754 + 0.1343i | −0.2482 + 0.1005i | 0.3683 + 0.0000i |
| codebook(:, :, 5) = | | | |
| 0.2898 + 0.0000i | −0.1329 − 0.0096i | −0.2010 − 0.0755i | 0.0028 − 0.0499i |
| −0.1329 + 0.0096i | 0.3699 + 0.0000i | 0.2647 + 0.1396i | 0.0197 + 0.0667i |
| −0.2010 + 0.0755i | 0.2647 − 0.1396i | 0.6264 − 0.0000i | 0.0852 + 0.0500i |
| 0.0028 + 0.0499i | 0.0197 − 0.0667i | 0.0852 − 0.0500i | 0.2142 − 0.0000i |
| codebook(:, :, 6) = | | | |
| 0.8103 − 0.0000i | −0.1740 − 0.0938i | 0.0039 − 0.1905i | −0.1029 + 0.0311i |
| −0.1740 + 0.0938i | 0.2596 − 0.0000i | 0.0193 + 0.0659i | 0.0179 − 0.0308i |
| 0.0039 + 0.1905i | 0.0193 − 0.0659i | 0.2272 − 0.0000i | −0.0034 − 0.0430i |
| −0.1029 − 0.0311i | 0.0179 + 0.0308i | −0.0034 + 0.0430i | 0.1870 − 0.0000i |
| codebook(:, :, 7) = | | | |
| 0.6717 − 0.0000i | −0.1314 + 0.2852i | 0.0299 − 0.0033i | 0.1896 + 0.0618i |
| −0.1314 − 0.2852i | 0.3870 − 0.0000i | −0.0087 − 0.0188i | −0.0209 − 0.1195i |
| 0.0299 + 0.0033i | −0.0087 + 0.0188i | 0.1785 − 0.0000i | 0.0113 + 0.0203i |
| 0.1896 − 0.0618i | −0.0209 + 0.1195i | 0.0113 − 0.0203i | 0.2392 − 0.0000i |
| codebook(:, :, 8) = | | | |
| 0.2318 + 0.0000i | 0.0178 + 0.0773i | −0.0977 + 0.0303i | −0.1318 + 0.0825i |
| 0.0178 − 0.0773i | 0.2948 + 0.0000i | 0.0104 + 0.1817i | 0.0925 + 0.1941i |
| −0.0977 − 0.0303i | 0.0104 − 0.1817i | 0.4103 + 0.0000i | 0.2653 − 0.0949i |
| −0.1318 − 0.0825i | 0.0925 − 0.1941i | 0.2653 − 0.0949i | 0.5400 + 0.0000i |
| codebook(:, :, 9) = | | | |
| 0.3708 + 0.0000i | −0.0438 + 0.1728i | −0.1760 + 0.1182i | 0.0546 + 0.1632i |
| −0.0438 − 0.1728i | 0.3592 − 0.0000i | 0.1329 + 0.1604i | 0.1642 − 0.0757i |
| −0.1760 − 0.1182i | 0.1329 − 0.1604i | 0.4109 − 0.0000i | 0.0407 − 0.1935i |
| 0.0546 − 0.1632i | 0.1642 + 0.0757i | 0.0407 + 0.1935i | 0.3488 − 0.0000i |
| codebook(:, :, 10) = | | | |
| 0.3784 + 0.0000i | 0.1844 − 0.1851i | −0.0648 + 0.0963i | 0.0732 + 0.1820i |
| 0.1844 + 0.1851i | 0.4977 − 0.0000i | −0.1251 + 0.0210i | −0.0786 + 0.2328i |
| −0.0648 − 0.0963i | −0.1251 − 0.0210i | 0.2343 − 0.0000i | 0.0661 − 0.0855i |
| 0.0732 − 0.1820i | −0.0786 − 0.2328i | 0.0661 + 0.0855i | 0.3708 + 0.0000i |
| codebook(:, :, 11) = | | | |
| 0.2229 + 0.0000i | 0.0029 + 0.0909i | 0.0905 + 0.0065i | −0.0814 + 0.0415i |
| 0.0029 − 0.0909i | 0.4130 − 0.0000i | −0.0252 − 0.2736i | 0.0459 + 0.2213i |
| 0.0905 − 0.0065i | −0.0252 + 0.2736i | 0.4570 − 0.0000i | −0.2481 + 0.0243i |
| −0.0814 − 0.0415i | 0.0459 − 0.2213i | −0.2481 − 0.0243i | 0.3792 + 0.0000i |
| codebook(:, :, 12) = | | | |
| 0.2790 + 0.0000i | 0.0271 − 0.2347i | 0.0955 − 0.0077i | 0.0239 − 0.0647i |
| 0.0271 + 0.2347i | 0.6912 − 0.0000i | 0.0439 + 0.2387i | 0.1167 + 0.0887i |
| 0.0955 + 0.0077i | 0.0439 − 0.2387i | 0.2975 − 0.0000i | 0.0410 − 0.0432i |
| 0.0239 + 0.0647i | 0.1167 − 0.0887i | 0.0410 + 0.0432i | 0.2205 − 0.0000i |
| codebook(:, :, 13) = | | | |
| 0.1617 − 0.0000i | −0.0668 + 0.0174i | −0.0399 + 0.0032i | 0.0273 + 0.0302i |
| −0.0668 − 0.0174i | 0.6268 − 0.0000i | 0.2592 + 0.0105i | −0.1551 − 0.2301i |
| −0.0399 − 0.0032i | 0.2592 − 0.0105i | 0.3138 − 0.0000i | −0.1016 − 0.1169i |
| 0.0273 − 0.0302i | −0.1551 + 0.2301i | −0.1016 + 0.1169i | 0.3604 − 0.0000i |

-continued

| codebook(:, :, 14) = | | | |
|---|---|---|---|
| 0.1685 + 0.0000i | 0.0121 − 0.0079i | −0.0260 + 0.0090i | 0.0113 + 0.0016i |
| 0.0121 + 0.0079i | 0.3287 + 0.0000i | −0.2007 − 0.1616i | −0.1327 − 0.0944i |
| −0.0260 − 0.0090i | −0.2007 + 0.1616i | 0.6241 + 0.0000i | 0.2793 − 0.0174i |
| 0.0113 − 0.0016i | −0.1327 + 0.0944i | 0.2793 + 0.0174i | 0.3596 + 0.0000i |

| codebook(:, :, 15) = | | | |
|---|---|---|---|
| 0.4364 − 0.0000i | 0.0057 + 0.0498i | −0.1847 − 0.3155i | −0.0215 + 0.0266i |
| 0.0057 − 0.0498i | 0.1821 − 0.0000i | −0.0646 − 0.0054i | −0.0085 − 0.0153i |
| −0.1847 + 0.3155i | −0.0646 + 0.0054i | 0.6714 − 0.0000i | −0.0091 − 0.0475i |
| −0.0215 − 0.0266i | −0.0085 + 0.0153i | −0.0091 + 0.0475i | 0.1933 − 0.0000i |

| codebook(:, :, 16) = | | | |
|---|---|---|---|
| 0.1759 + 0.0000i | −0.0073 − 0.0295i | 0.0506 + 0.0938i | −0.0056 − 0.0009i |
| −0.0073 + 0.0295i | 0.2468 + 0.0000i | −0.1440 + 0.1450i | 0.0573 + 0.0190i |
| 0.0506 − 0.0938i | −0.1440 − 0.1450i | 0.8491 + 0.0000i | −0.0401 − 0.1083i |
| −0.0056 + 0.0009i | 0.0573 − 0.0190i | −0.0401 + 0.1083i | 0.2123 + 0.0000i |

| codebook(:, :, 17) = | | | |
|---|---|---|---|
| 0.3226 − 0.0000i | 0.0099 − 0.0260i | 0.1670 − 0.0469i | 0.1860 − 0.1596i |
| 0.0099 + 0.0260i | 0.1902 − 0.0000i | 0.0212 + 0.0514i | 0.0544 + 0.0368i |
| 0.1670 + 0.0469i | 0.0212 − 0.0514i | 0.3853 − 0.0000i | 0.2663 − 0.1011i |
| 0.1860 + 0.1596i | 0.0544 − 0.0368i | 0.2663 + 0.1011i | 0.5936 − 0.0000i |

| codebook(:, :, 18) = | | | |
|---|---|---|---|
| 0.2391 + 0.0000i | 0.0666 + 0.0501i | −0.0088 − 0.0068i | −0.1892 + 0.0076i |
| 0.0666 − 0.0501i | 0.3156 + 0.0000i | 0.0168 − 0.0075i | −0.2143 + 0.1714i |
| −0.0088 + 0.0068i | 0.0168 + 0.0075i | 0.1718 + 0.0000i | −0.0179 − 0.0000i |
| −0.1892 − 0.0076i | −0.2143 − 0.1714i | −0.0179 − 0.0000i | 0.7589 + 0.0000i |

| codebook(:, :, 19) = | | | |
|---|---|---|---|
| 0.4223 + 0.0000i | 0.0652 + 0.1820i | 0.1513 + 0.0966i | −0.0312 − 0.2382i |
| 0.0652 − 0.1820i | 0.3431 + 0.0000i | 0.1095 − 0.1156i | −0.1894 − 0.0353i |
| 0.1513 − 0.0966i | 0.1095 + 0.1156i | 0.3114 + 0.0000i | −0.1082 − 0.1371i |
| −0.0312 + 0.2382i | −0.1894 + 0.0353i | −0.1082 + 0.1371i | 0.4079 + 0.0000i |

| codebook(:, :, 20) = | | | |
|---|---|---|---|
| 0.2539 + 0.0000i | 0.0308 + 0.0632i | −0.0797 + 0.0028i | −0.0696 − 0.2072i |
| 0.0308 − 0.0632i | 0.2412 + 0.0000i | −0.0775 + 0.0564i | −0.1762 − 0.0469i |
| −0.0797 − 0.0028i | −0.0775 − 0.0564i | 0.3060 + 0.0000i | 0.1038 + 0.2167i |
| −0.0696 + 0.2072i | −0.1762 + 0.0469i | 0.1038 − 0.2167i | 0.6821 + 0.0000i |

| codebook(:, :, 21) = | | | |
|---|---|---|---|
| 0.3721 − 0.0000i | 0.0793 − 0.2481i | 0.0645 + 0.1222i | −0.1676 + 0.0623i |
| 0.0793 + 0.2481i | 0.4841 − 0.0000i | −0.1156 + 0.1023i | −0.1457 − 0.2011i |
| 0.0645 − 0.1222i | −0.1156 − 0.1023i | 0.2548 − 0.0000i | 0.0064 + 0.1186i |
| −0.1676 − 0.0623i | −0.1457 + 0.2011i | 0.0064 − 0.1186i | 0.3540 − 0.0000i |

| codebook(:, :, 22) = | | | |
|---|---|---|---|
| 0.3326 − 0.0000i | −0.2619 − 0.0012i | 0.0145 − 0.1557i | −0.1016 − 0.0173i |
| −0.2619 + 0.0012i | 0.5938 − 0.0000i | 0.0147 + 0.2407i | 0.1498 + 0.0049i |
| 0.0145 + 0.1557i | 0.0147 − 0.2407i | 0.3272 − 0.0000i | 0.0011 − 0.0845i |
| −0.1016 + 0.0173i | 0.1498 − 0.0049i | 0.0011 + 0.0845i | 0.2164 − 0.0000i |

| codebook(:, :, 23) = | | | |
|---|---|---|---|
| 0.3835 + 0.0000i | −0.1724 − 0.2663i | −0.1148 − 0.0703i | 0.0929 + 0.0275i |
| −0.1724 + 0.2663i | 0.6262 + 0.0000i | 0.1666 − 0.0684i | −0.0833 + 0.0755i |
| −0.1148 + 0.0703i | 0.1666 + 0.0684i | 0.2416 + 0.0000i | −0.0259 + 0.0245i |
| 0.0929 − 0.0275i | −0.0833 − 0.0755i | −0.0259 − 0.0245i | 0.2310 + 0.0000i |

| codebook(:, :, 24) = | | | |
|---|---|---|---|
| 0.2646 − 0.0000i | 0.0848 − 0.0325i | −0.0633 − 0.1726i | 0.0969 − 0.1039i |
| 0.0848 + 0.0325i | 0.2599 − 0.0000i | −0.0002 − 0.1707i | 0.1390 − 0.0425i |
| −0.0633 + 0.1726i | −0.0002 + 0.1707i | 0.5328 − 0.0000i | 0.1065 + 0.2851i |
| 0.0969 + 0.1039i | 0.1390 + 0.0425i | 0.1065 − 0.2851i | 0.4103 − 0.0000i |

| codebook(:, :, 25) = | | | |
|---|---|---|---|
| 0.4282 + 0.0000i | −0.0072 + 0.2068i | 0.2277 − 0.1921i | 0.0231 − 0.0092i |
| −0.0072 − 0.2068i | 0.3566 + 0.0000i | −0.1646 − 0.1763i | 0.0155 − 0.0240i |
| 0.2277 + 0.1921i | −0.1646 + 0.1763i | 0.5210 + 0.0000i | 0.0072 + 0.0264i |
| 0.0231 + 0.0092i | 0.0155 + 0.0240i | 0.0072 − 0.0264i | 0.1849 + 0.0000i |

| codebook(:, :, 26) = | | | |
|---|---|---|---|
| 0.4122 − 0.0000i | −0.2882 − 0.0245i | 0.0390 + 0.0339i | −0.1038 + 0.1732i |
| −0.2882 + 0.0245i | 0.5362 − 0.0000i | −0.0538 − 0.0449i | 0.1122 − 0.2342i |
| 0.0390 − 0.0339i | −0.0538 + 0.0449i | 0.1689 − 0.0000i | 0.0075 + 0.0491i |
| −0.1038 − 0.1732i | 0.1122 + 0.2342i | 0.0075 − 0.0491i | 0.3320 − 0.0000i |

-continued codebook(:, :, 27) =

| 0.2965 + 0.0000i | 0.0137 − 0.0165i | −0.1720 + 0.1359i | 0.0623 − 0.1435i |
| 0.0137 + 0.0165i | 0.1801 + 0.0000i | −0.0667 − 0.0370i | 0.0587 − 0.0115i |
| −0.1720 − 0.1359i | −0.0667 + 0.0370i | 0.5937 + 0.0000i | −0.2651 + 0.1668i |
| 0.0623 + 0.1435i | 0.0587 + 0.0115i | −0.2651 − 0.1668i | 0.4077 + 0.0000i | codebook(:, :, 28) =

| 0.4130 + 0.0000i | −0.1669 − 0.0154i | −0.0353 + 0.1855i | 0.1434 + 0.2048i |
| −0.1669 + 0.0154i | 0.2589 + 0.0000i | 0.0185 − 0.1175i | −0.1152 − 0.1733i |
| −0.0353 − 0.1855i | 0.0185 + 0.1175i | 0.3300 + 0.0000i | 0.1364 − 0.1332i |
| 0.1434 − 0.2048i | −0.1152 + 0.1733i | 0.1364 + 0.1332i | 0.4619 + 0.0000i | codebook(:, :, 29) =

| 0.2506 + 0.0000i | 0.0665 + 0.1543i | 0.1039 + 0.0032i | 0.1047 + 0.0796i |
| 0.0665 − 0.1543i | 0.5682 + 0.0000i | 0.0961 − 0.1563i | 0.2615 − 0.1193i |
| 0.1039 − 0.0032i | 0.0961 + 0.1563i | 0.2590 + 0.0000i | 0.1161 + 0.0702i |
| 0.1047 − 0.0796i | 0.2615 + 0.1193i | 0.1161 − 0.0702i | 0.4066 + 0.0000i | codebook(:, :, 30) =

| 0.3234 + 0.0000i | −0.0583 − 0.1119i | 0.0620 − 0.0355i | −0.2302 − 0.1256i |
| −0.0583 + 0.1119i | 0.2731 + 0.0000i | −0.0268 + 0.0815i | 0.2072 − 0.1034i |
| 0.0620 + 0.0355i | −0.0268 − 0.0815i | 0.2368 + 0.0000i | −0.0885 − 0.1327i |
| −0.2302 + 0.1256i | 0.2072 + 0.1034i | −0.0885 + 0.1327i | 0.6421 + 0.0000i | codebook(:, :, 31) =

| 0.2501 − 0.0000i | −0.0630 + 0.0906i | 0.0758 + 0.1672i | 0.0182 + 0.0169i |
| −0.0630 − 0.0906i | 0.3373 − 0.0000i | 0.1823 − 0.2543i | 0.0061 − 0.0381i |
| 0.0758 − 0.1672i | 0.1823 + 0.2543i | 0.7014 − 0.0000i | 0.0560 − 0.0351i |
| 0.0182 − 0.0169i | 0.0061 + 0.0381i | 0.0560 + 0.0351i | 0.1764 − 0.0000i | codebook(:, :, 32) =

| 0.5666 − 0.0000i | 0.0453 − 0.0543i | 0.3020 − 0.0668i | −0.1904 − 0.1375i |
| 0.0453 + 0.0543i | 0.1860 − 0.0000i | 0.0412 + 0.0140i | −0.0060 − 0.0483i |
| 0.3020 + 0.0668i | 0.0412 − 0.0140i | 0.4146 − 0.0000i | −0.1030 − 0.1314i |
| −0.1904 + 0.1375i | −0.0060 + 0.0483i | −0.1030 + 0.1314i | 0.3107 − 0.0000i | codebook(:, :, 33) =

| 0.2619 + 0.0000i | −0.0700 + 0.0904i | 0.0924 − 0.1150i | −0.0875 − 0.1536i |
| −0.0700 − 0.0904i | 0.4034 + 0.0000i | −0.2166 − 0.0130i | −0.1103 + 0.1996i |
| 0.0924 + 0.1150i | −0.2166 + 0.0130i | 0.3972 + 0.0000i | 0.1101 − 0.2113i |
| −0.0875 + 0.1536i | −0.1103 − 0.1996i | 0.1101 + 0.2113i | 0.4088 + 0.0000i | codebook(:, :, 34) =

| 0.2267 + 0.0000i | 0.0261 − 0.0814i | 0.0086 − 0.0059i | 0.1375 − 0.0501i |
| 0.0261 + 0.0814i | 0.4055 + 0.0000i | 0.0645 − 0.0212i | 0.1988 + 0.2809i |
| 0.0086 + 0.0059i | 0.0645 + 0.0212i | 0.2001 + 0.0000i | 0.0183 + 0.0779i |
| 0.1375 + 0.0501i | 0.1988 − 0.2809i | 0.0183 − 0.0779i | 0.6540 + 0.0000i | codebook(:, :, 35) =

| 0.4826 + 0.0000i | −0.2267 + 0.0761i | −0.0792 − 0.0951i | 0.0839 − 0.2671i |
| −0.2267 − 0.0761i | 0.3360 + 0.0000i | 0.0165 + 0.0959i | −0.1149 + 0.1875i |
| −0.0792 + 0.0951i | 0.0165 − 0.0959i | 0.2227 + 0.0000i | 0.0747 + 0.0676i |
| 0.0839 + 0.2671i | −0.1149 − 0.1875i | 0.0747 − 0.0676i | 0.4085 + 0.0000i | codebook(:, :, 36) =

| 0.4366 − 0.0000i | −0.1392 − 0.1154i | −0.1073 + 0.0352i | −0.1819 − 0.1933i |
| −0.1392 + 0.1154i | 0.3437 − 0.0000i | 0.0783 − 0.0834i | 0.2460 + 0.0323i |
| −0.1073 − 0.0352i | 0.0783 + 0.0834i | 0.2458 − 0.0000i | 0.0752 + 0.1179i |
| −0.1819 + 0.1933i | 0.2460 − 0.0323i | 0.0752 − 0.1179i | 0.4590 + 0.0000i | codebook(:, :, 37) =

| 0.2757 − 0.0000i | 0.1660 + 0.1378i | −0.1206 − 0.0303i | 0.0274 + 0.0764i |
| 0.1660 − 0.1378i | 0.6484 − 0.0000i | −0.2345 + 0.0949i | 0.1516 + 0.0771i |
| −0.1206 + 0.0303i | −0.2345 − 0.0949i | 0.3208 − 0.0000i | −0.0625 − 0.0904i |
| 0.0274 − 0.0764i | 0.1516 − 0.0771i | −0.0625 + 0.0904i | 0.2313 − 0.0000i | codebook(:, :, 38) =

| 0.2838 − 0.0000i | −0.0340 − 0.1111i | −0.1003 − 0.1768i | 0.1328 + 0.0418i |
| −0.0340 + 0.1111i | 0.2906 − 0.0000i | 0.1995 − 0.0757i | −0.1008 + 0.1391i |
| −0.1003 + 0.1768i | 0.1995 + 0.0757i | 0.5395 − 0.0000i | −0.2064 + 0.1332i |
| 0.1328 − 0.0418i | −0.1008 − 0.1391i | −0.2064 − 0.1332i | 0.3532 − 0.0000i | codebook(:, :, 39) =

| 0.3699 − 0.0000i | 0.0437 + 0.0610i | −0.0622 + 0.1337i | 0.2436 − 0.1309i |
| 0.0437 − 0.0610i | 0.1773 − 0.0000i | 0.0078 + 0.0576i | 0.0297 − 0.0810i |
| −0.0622 − 0.1337i | 0.0078 − 0.0576i | 0.2798 − 0.0000i | −0.1911 − 0.1445i |
| 0.2436 + 0.1309i | 0.0297 + 0.0810i | −0.1911 + 0.1445i | 0.6398 − 0.0000i |

-continued codebook(:, :, 40) =

| 0.4141 − 0.0000i | −0.1246 − 0.1174i | 0.2088 − 0.1597i | 0.1497 + 0.1195i |
| --- | --- | --- | --- |
| −0.1246 + 0.1174i | 0.2880 − 0.0000i | −0.0360 + 0.1748i | −0.1229 + 0.0203i |
| 0.2088 + 0.1597i | −0.0360 − 0.1748i | 0.4567 − 0.0000i | 0.0702 + 0.1823i |
| 0.1497 − 0.1195i | −0.1229 − 0.0203i | 0.0702 − 0.1823i | 0.3094 − 0.0000i | codebook(:, :, 41) =

| 0.7398 − 0.0000i | 0.1285 − 0.1128i | 0.0273 − 0.1547i | 0.1365 − 0.2215i |
| --- | --- | --- | --- |
| 0.1285 + 0.1128i | 0.2525 − 0.0000i | 0.0417 − 0.0164i | 0.0671 − 0.0236i |
| 0.0273 + 0.1547i | 0.0417 + 0.0164i | 0.2064 − 0.0000i | 0.0645 + 0.0282i |
| 0.1365 + 0.2215i | 0.0671 + 0.0236i | 0.0645 − 0.0282i | 0.2812 − 0.0000i | codebook(:, :, 42) =

| 0.5751 − 0.0000i | −0.0423 − 0.1379i | −0.3163 + 0.1432i | 0.0895 + 0.0242i |
| --- | --- | --- | --- |
| −0.0423 + 0.1379i | 0.2478 − 0.0000i | −0.0160 − 0.1294i | −0.0123 + 0.0272i |
| −0.3163 − 0.1432i | −0.0160 + 0.1294i | 0.4702 + 0.0000i | −0.0565 − 0.0643i |
| 0.0895 − 0.0242i | −0.0123 − 0.0272i | −0.0565 + 0.0643i | 0.1906 − 0.0000i | codebook(:, :, 43) =

| 0.2887 − 0.0000i | −0.0338 − 0.0113i | 0.0663 + 0.1414i | −0.0777 + 0.2050i |
| --- | --- | --- | --- |
| −0.0338 + 0.0113i | 0.1867 − 0.0000i | −0.0485 − 0.0309i | 0.0173 − 0.0490i |
| 0.0663 − 0.1414i | −0.0485 + 0.0309i | 0.4336 − 0.0000i | 0.2052 + 0.2497i |
| −0.0777 − 0.2050i | 0.0173 + 0.0490i | 0.2052 − 0.2497i | 0.5705 − 0.0000i | codebook(:, :, 44) =

| 0.5551 + 0.0000i | 0.1680 + 0.0286i | −0.1514 − 0.1070i | 0.2123 + 0.1941i |
| --- | --- | --- | --- |
| 0.1680 − 0.0286i | 0.2375 − 0.0000i | −0.0713 − 0.0342i | 0.1286 + 0.0707i |
| −0.1514 + 0.1070i | −0.0713 + 0.0342i | 0.2555 − 0.0000i | −0.1400 − 0.0430i |
| 0.2123 − 0.1941i | 0.1286 − 0.0707i | −0.1400 + 0.0430i | 0.4236 − 0.0000i | codebook(:, :, 45) =

| 0.4404 − 0.0000i | 0.3117 + 0.0135i | 0.0990 − 0.1721i | 0.0169 + 0.0787i |
| --- | --- | --- | --- |
| 0.3117 − 0.0135i | 0.4934 − 0.0000i | 0.1004 − 0.1900i | 0.0267 + 0.0924i |
| 0.0990 + 0.1721i | 0.1004 + 0.1900i | 0.3381 − 0.0000i | −0.0364 − 0.0368i |
| 0.0169 − 0.0787i | 0.0267 − 0.0924i | −0.0364 − 0.0368i | 0.2134 − 0.0000i | codebook(:, :, 46) =

| 0.5558 − 0.0000i | −0.0237 + 0.2891i | −0.0173 − 0.1126i | −0.2468 + 0.0055i |
| --- | --- | --- | --- |
| −0.0237 − 0.2891i | 0.3857 + 0.0000i | −0.0670 + 0.0105i | 0.0458 + 0.1809i |
| −0.0173 + 0.1126i | −0.0670 − 0.0105i | 0.2011 − 0.0000i | 0.0028 − 0.0695i |
| −0.2468 − 0.0055i | 0.0458 − 0.1809i | 0.0028 + 0.0695i | 0.3119 − 0.0000i | codebook(:, :, 47) =

| 0.2939 − 0.0000i | 0.1968 + 0.0779i | −0.0518 + 0.0529i | 0.0723 − 0.1322i |
| --- | --- | --- | --- |
| 0.1968 − 0.0779i | 0.5446 − 0.0000i | −0.0380 + 0.1159i | 0.0610 − 0.3108i |
| −0.0518 − 0.0529i | −0.0380 − 0.1159i | 0.2388 − 0.0000i | −0.0907 + 0.0061i |
| 0.0723 + 0.1322i | 0.0610 + 0.3108i | −0.0907 − 0.0061i | 0.4088 − 0.0000i | codebook(:, :, 48) =

| 0.5777 + 0.0000i | 0.0480 − 0.1318i | −0.0034 − 0.1164i | −0.1656 + 0.3077i |
| --- | --- | --- | --- |
| 0.0480 + 0.1318i | 0.2562 − 0.0000i | 0.0583 − 0.0346i | −0.1072 − 0.0066i |
| −0.0034 + 0.1164i | 0.0583 + 0.0346i | 0.1855 − 0.0000i | −0.0734 − 0.0415i |
| −0.1656 − 0.3077i | −0.1072 + 0.0066i | −0.0734 + 0.0415i | 0.4572 + 0.0000i | codebook(:, :, 49) =

| 0.2500 | 0.2500 | 0.2500 | 0.2500 |
| --- | --- | --- | --- |
| 0.2500 | 0.2500 | 0.2500 | 0.2500 |
| 0.2500 | 0.2500 | 0.2500 | 0.2500 |
| 0.2500 | 0.2500 | 0.2500 | 0.2500 | codebook(:, :, 50) =

| 0.2500 | 0.0000 − 0.2500i | −0.2500 − 0.0000i | −0.0000 + 0.2500i |
| --- | --- | --- | --- |
| 0.0000 + 0.2500i | 0.2500 | 0.0000 − 0.2500i | −0.2500 − 0.0000i |
| −0.2500 + 0.0000i | 0.0000 + 0.2500i | 0.2500 | 0.0000 − 0.2500i |
| −0.0000 − 0.2500i | −0.2500 + 0.0000i | 0.0000 + 0.2500i | 0.2500 | codebook(:, :, 51) =

| 0.2500 | −0.2500 − 0.0000i | 0.2500 + 0.0000i | −0.2500 − 0.0000i |
| --- | --- | --- | --- |
| −0.2500 − 0.0000i | 0.2500 | −0.2500 − 0.0000i | 0.2500 + 0.0000i |
| 0.2500 − 0.0000i | −0.2500 + 0.0000i | 0.2500 | −0.2500 − 0.0000i |
| −0.2500 + 0.0000i | 0.2500 − 0.0000i | −0.2500 − 0.0000i | 0.2500 | codebook(:, :, 52) =

| 0.2500 | −0.0000 + 0.2500i | −0.2500 − 0.0000i | 0.0000 − 0.2500i |
| --- | --- | --- | --- |
| −0.0000 − 0.2500i | 0.2500 | −0.0000 + 0.2500i | −0.2500 − 0.0000i |
| −0.2500 + 0.0000i | −0.0000 − 0.2500i | 0.2500 | −0.0000 + 0.2500i |
| 0.0000 + 0.2500i | −0.2500 + 0.0000i | −0.0000 − 0.2500i | 0.2500 |

-continued codebook(:, :, 53) =

| 0.2500 | 0.2310 − 0.0957i | 0.1768 − 0.1768i | 0.0957 − 0.2310i |
| 0.2310 + 0.0957i | 0.2500 − 0.0000i | 0.2310 − 0.0957i | 0.1768 − 0.1768i |
| 0.1768 + 0.1768i | 0.2310 + 0.0957i | 0.2500 − 0.0000i | 0.2310 − 0.0957i |
| 0.0957 + 0.2310i | 0.1768 + 0.1768i | 0.2310 + 0.0957i | 0.2500 − 0.0000i | codebook(:, :, 54) =

| 0.2500 | −0.0957 − 0.2310i | −0.1768 + 0.1768i | 0.2310 + 0.0957i |
| −0.0957 + 0.2310i | 0.2500 + 0.0000i | −0.0957 − 0.2310i | −0.1768 + 0.1768i |
| −0.1768 − 0.1768i | −0.0957 + 0.2310i | 0.2500 − 0.0000i | −0.0957 − 0.2310i |
| 0.2310 − 0.0957i | −0.1768 − 0.1768i | −0.0957 + 0.2310i | 0.2500 − 0.0000i | codebook(:, :, 55) =

| 0.2500 | −0.2310 + 0.0957i | 0.1768 − 0.1768i | −0.0957 + 0.2310i |
| −0.2310 − 0.0957i | 0.2500 − 0.0000i | −0.2310 − 0.0957i | 0.1768 − 0.1768i |
| 0.1768 + 0.1768i | −0.2310 − 0.0957i | 0.2500 − 0.0000i | −0.2310 − 0.0957i |
| −0.0957 − 0.2310i | 0.1768 + 0.1768i | −0.2310 − 0.0957i | 0.2500 + 0.0000i | codebook(:, :, 56) =

| 0.2500 | 0.0957 + 0.2310i | −0.1768 + 0.1768i | −0.2310 − 0.0957i |
| 0.0957 − 0.2310i | 0.2500 + 0.0000i | 0.0957 + 0.2310i | −0.1768 + 0.1768i |
| −0.1768 − 0.1768i | 0.0957 − 0.2310i | 0.2500 − 0.0000i | 0.0957 + 0.2310i |
| −0.2310 + 0.0957i | −0.1768 − 0.1768i | 0.0957 − 0.2310i | 0.2500 − 0.0000i | codebook(:, :, 57) =

| 0.2500 | 0.1768 − 0.1768i | 0.0000 − 0.2500i | −0.1768 − 0.1768i |
| 0.1768 + 0.1768i | 0.2500 − 0.0000i | 0.1768 − 0.1768i | −0.0000 − 0.2500i |
| 0.0000 + 0.2500i | 0.1768 + 0.1768i | 0.2500 | 0.1768 − 0.1768i |
| −0.1768 + 0.1768i | −0.0000 + 0.2500i | 0.1768 + 0.1768i | 0.2500 + 0.0000i | codebook(:, :, 58) =

| 0.2500 | −0.1768 − 0.1768i | −0.0000 + 0.2500i | 0.1768 − 0.1768i |
| −0.1768 + 0.1768i | 0.2500 + 0.0000i | −0.1768 − 0.1768i | −0.0000 + 0.2500i |
| −0.0000 − 0.2500i | −0.1768 + 0.1768i | 0.2500 | −0.1768 − 0.1768i |
| 0.1768 + 0.1768i | −0.0000 − 0.2500i | −0.1768 + 0.1768i | 0.2500 − 0.0000i | codebook(:, :, 59) =

| 0.2500 | −0.1768 + 0.1768i | 0.0000 − 0.2500i | 0.1768 + 0.1768i |
| −0.1768 − 0.1768i | 0.2500 − 0.0000i | −0.1768 + 0.1768i | 0.0000 − 0.2500i |
| 0.0000 + 0.2500i | −0.1768 − 0.1768i | 0.2500 | −0.1768 + 0.1768i |
| 0.1768 − 0.1768i | 0.0000 + 0.2500i | −0.1768 − 0.1768i | 0.2500 + 0.0000i | codebook(:, :, 60) =

| 0.2500 | 0.1768 + 0.1768i | −0.0000 + 0.2500i | −0.1768 + 0.1768i |
| 0.1768 − 0.1768i | 0.2500 + 0.0000i | 0.1768 + 0.1768i | 0.0000 + 0.2500i |
| −0.0000 − 0.2500i | 0.1768 − 0.1768i | 0.2500 | 0.1768 + 0.1768i |
| −0.1768 − 0.1768i | 0.0000 − 0.2500i | 0.1768 − 0.1768i | 0.2500 − 0.0000i | codebook(:, :, 61) =

| 0.2500 | 0.0957 − 0.2310i | −0.1768 − 0.1768i | −0.2310 + 0.0957i |
| 0.0957 + 0.2310i | 0.2500 − 0.0000i | 0.0957 − 0.2310i | −0.1768 − 0.1768i |
| −0.1768 + 0.1768i | 0.0957 + 0.2310i | 0.2500 + 0.0000i | 0.0957 − 0.2310i |
| −0.2310 − 0.0957i | −0.1768 + 0.1768i | 0.0957 + 0.2310i | 0.2500 − 0.0000i | codebook(:, :, 62) =

| 0.2500 | −0.2310 − 0.0957i | 0.1768 + 0.1768i | −0.0957 − 0.2310i |
| −0.2310 + 0.0957i | 0.2500 − 0.0000i | −0.2310 − 0.0957i | 0.1768 + 0.1768i |
| 0.1768 − 0.1768i | −0.2310 + 0.0957i | 0.2500 + 0.0000i | −0.2310 − 0.0957i |
| −0.0957 + 0.2310i | 0.1768 − 0.1768i | −0.2310 + 0.0957i | 0.2500 − 0.0000i | codebook(:, :, 63) =

| 0.2500 | −0.0957 + 0.2310i | −0.1768 − 0.1768i | 0.2310 − 0.0957i |
| −0.0957 − 0.2310i | 0.2500 − 0.0000i | −0.0957 + 0.2310i | −0.1768 − 0.1768i |
| −0.1768 + 0.1768i | −0.0957 − 0.2310i | 0.2500 + 0.0000i | −0.0957 + 0.2310i |
| 0.2310 + 0.0957i | −0.1768 + 0.1768i | −0.0957 − 0.2310i | 0.2500 − 0.0000i | codebook(:, :, 64) =

| 0.2500 | 0.2310 + 0.0957i | 0.1768 + 0.1768i | 0.0957 + 0.2310i |
| 0.2310 − 0.0957i | 0.2500 − 0.0000i | 0.2310 + 0.0957i | 0.1768 + 0.1768i |
| 0.1768 − 0.1768i | 0.2310 − 0.0957i | 0.2500 + 0.0000i | 0.2310 + 0.0957i |
| 0.0957 − 0.2310i | 0.1768 − 0.1768i | 0.2310 − 0.0957i | 0.2500 + 0.0000i |

The aforementioned codebooks may be stored in a memory installed in each of a receiver and a transmitter. The receiver may provide feedback information to the transmitter using a corresponding codebook. The transmitter may reconfigure the explicit feedback vector, or the explicit channel matrix or the processed explicit channel matrix based on the codebook and the received feedback information.

Figure 3:
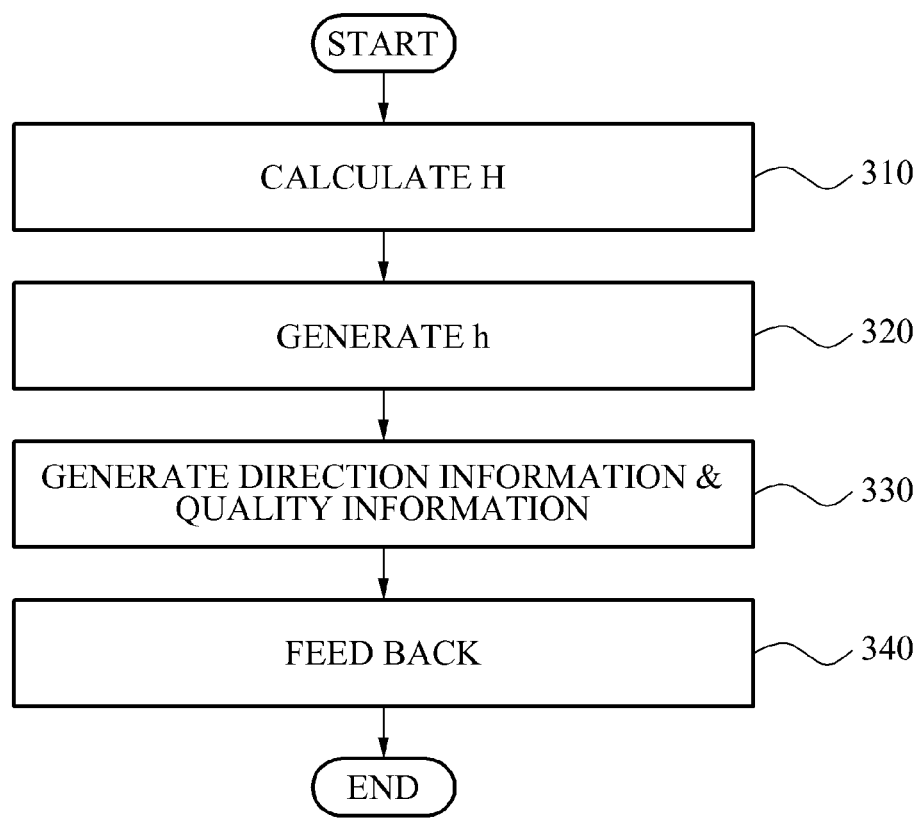
FIG. 3 is a flowchart illustrating an example of a method of operating a receiver using an explicit feedback in a base mode.

FIG. 3 illustrates an example of a method of operating a receiver using an explicit feedback in a base mode.

In operation 310, the receiver calculates an explicit channel matrix H between the receiver and a transmitter.

In operation 320, the receiver generates an explicit feedback vector h. In this example, the explicit feedback vector h may be defined by one of h=vec($H_k$), h=vec($H_k^H H_k$), h=vec (uppertriang($H_k^H H_k$)), h=vec(R), and h=vec($V_k$). For example, the receiver may generate the explicit feedback vector h by vectorizing an explicit channel matrix $H_k$, a covariance $H_k^H H_k$ of the explicit channel matrix $H_k$, an upper triangular matrix uppertriang($H_k^H H_k$) of the covariance $H_k^H H_k$, an R matrix obtained by performing QR decomposition of the explicit channel matrix $H_k$, or $V_k$ of $H_k^H H_k = V_k L_k V_k^H$.

In operation 330, the receiver generates information associated with a direction and a quality of the explicit feedback vector h. For example, the receiver may generate information associated with the direction of the explicit feedback vector h based on one of v=h/|vec($H_k$)|$_2$, v=h/|vec($H_k^H H_k$)|$_2$, v=h/|vec (uppertriang($H_k^H H_k$))|$_2$, v=h/|vec(R)|$_2$ (v=$h_{reduced}$/|vec(R)|$_2$), and v=h/|vec($V_k$)|$_2$. In particular, index information of a codeword most suitable for v from a predefined codebook may be utilized as information associated with the direction of the explicit feedback vector h. Information associated with the direction and the quality of the explicit feedback vector h may be given by:

$$|vec(H_k)|_2 = \|H_k\|_F \text{ or } \frac{|vec(H_k)|_2}{|I+N|} = \frac{\|H_k\|_F}{|I+N|},$$

$$|vec(H_k^H H_k)|_2 = \|H_k^H H_k\|_F \text{ or } \frac{|vec(H_k^H H_k)|_2}{|I+N|} = \frac{\|H_k^H H_k\|_F}{|I+N|},$$

$$|vec(uppertriang(H_k^H H_k))|_2 = \|uppertriang(H_k^H H_k)\|_F \text{ or }$$

$$\frac{|vec(uppertriang(H_k^H H_k))|_2}{|I+N|} = \frac{\|uppertriang(H_k^H H_k)\|_F}{|I+N|}$$

$$|vec(R)|_2 = \|R\|_F \text{ or } \frac{|vec(R)|_2}{|I+N|} = \frac{\|R\|_F}{|I+N|},$$

$$|vec(V_k)|_2 = \|V_k\|_F \text{ or } \frac{|vec(V_k)|_2}{|I+N|} = \frac{\|V_k\|_F}{|I+N|}.$$

In operation 340, the receiver feeds back, to the transmitter, information associated with the direction and the quality of the explicit feedback vector h.

Since the transmitter has the same codebook as a codebook stored in the receiver, the transmitter may verify information associated with the direction of the explicit feedback vector h from the codebook. Accordingly, the transmitter may reconfigure the explicit feedback vector h and may also reconfigure the explicit channel matrix $H_k$, the covariance $H_k^H H_k$ of the explicit channel matrix $H_k$, the upper triangular matrix uppertriang($H_k^H H_k$) of the covariance $H_k^H H_k$, the R matrix obtained by performing QR decomposition of the explicit channel matrix $H_k$, and $V_k$ of $H_k^H H_k = V_k L_k V_k^H$.

Figure 4:
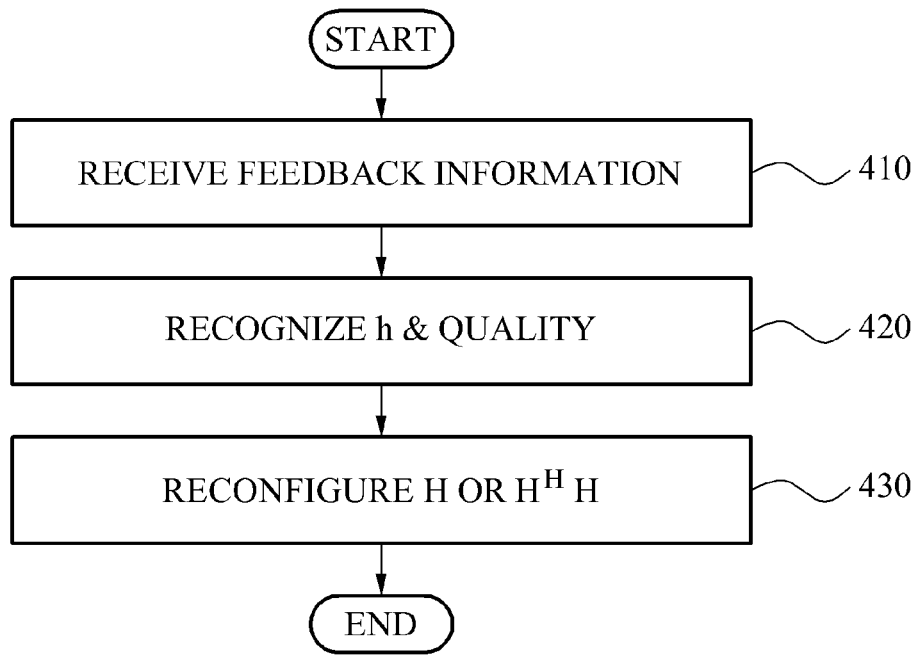
FIG. 4 is a flowchart illustrating an example of a method of operating a transmitter corresponding to a receiver using an explicit feedback in a base mode.

FIG. 4 illustrates an example of a method of operating a transmitter corresponding to a receiver using an explicit feedback in a base mode.

In operation 410, the transmitter receives feedback information from the receiver. The transmitter may receive information associated with a direction and a quality of the explicit feedback vector h.

In operation 420, the transmitter recognizes the explicit feedback vector h and the quality of the explicit feedback vector h based on the feedback information.

In operation 430, the transmitter reconfigures an explicit channel matrix or a processed explicit channel matrix based on the explicit feedback vector h and the quality of the explicit feedback vector h. The processed explicit channel matrix may correspond to one of the explicit channel matrix $H_k$, the covariance $H_k^H H_k$ of the explicit channel matrix $H_k$, the upper triangular matrix uppertriang($H_k^H H_k$) of the covariance $H_k^H H_k$, the R matrix obtained by performing QR decomposition of the explicit channel matrix $H_k$, and $V_k$ of $H_k^H H_k = V_k L_k V_k^H$.

Although the transmitter is not shown in FIG. 4, it may be possible to retrieve an optimal transmission mode, an optimal precoding matrix, an optimal transmission rank, and the like based on the explicit channel matrix or the processed explicit channel matrix.

Adaptive Mode (Transformation Mode)

Channels between the transmitter and the receiver may vary in real time. When the transmitter and the receiver use a fixed codebook, it may be difficult to adapt to the varying channels. In particular, the fixed codebook quantizes the whole space and thus has a relatively large quantization error. The quantization error may deteriorate a performance of a communication system.

However, the transmitter and the receiver may operate in the adaptive mode. In this example, the adaptive mode may also be referred to as the transformation mode. The transmitter and the receiver may transform a previous codebook to another codebook based on statuses of previous channels in a spatially correlated channel environment. The transformed codebook quantizes a space smaller than the fixed codebook and thus may have a relatively small quantization error.

An operation of the transmitter and the receiver in the adaptive mode may vary depending on whether the transmitter and the receiver use multi-polarized antennas. Hereinafter, with respect to each of a case where the transmitter and the receiver use single-polarized antennas, and a case where the transmitter and the receiver use the multi-polarized antennas, particularly, dual-polarized antennas, an operation of the transmitter and the receiver in the adaptive mode is described:

(1) When the transmitter and the receiver use the single-polarized antennas:

Feedback of $$\frac{H}{\|H\|_F}:$$

When the transmitter and the receiver use the single-polarized antennas, the explicit channel matrix H between the transmitter and the receiver may be modeled to $$H = \begin{bmatrix} H_1 \\ H_2 \end{bmatrix} = H_w R^{1/2}.$$

In this example, R denotes a correlation matrix of the explicit channel matrix H and, and $H_w$ denotes a matrix about an identically independent distribution (iid) channel.

The codebook in the base mode may be expressed by $W_k$ where k=1, 2, 3 ... N.

In the adaptive mode, the transmitter and the receiver may generate, using $W_k$ and $R^X$ where X=1 and ½, a transformed codebook $T(R, W_k)$ as follows:

$$T(R, W_k) = \frac{W_k R^X}{\|W_k R^X\|_F}$$

$$(k = 1, 2, 3, ... N).$$

In this example, $R=E\{H^H H\}=E\{H_1^H H_1\}=E\{H_2^H H_2\}$.

When the transformed codebook $T(R, W_k)$ is generated, the receiver may calculate a direction of the explicit feedback matrix H $$\frac{H}{\|H\|_F}.$$

In this example, the explicit feedback matrix H may correspond to information that the receiver desires to feed back to the transmitter. The explicit feedback matrix H expresses the explicit channel matrix H and thus may be in one of a vector form and a matrix form based on a number of receive antennas of the receiver. In the adaptive mode, it is possible to selectively use a vectorization process with respect to the explicit channel matrix H. Conversely, when the vectorization process is not used, the explicit feedback matrix H may be fed back.

In this example, the receiver may select a codeword $W_s$ closest to $$\frac{H}{\|H\|_F}.$$

among codewords included in the transformed codebook $T(R, W_k)$. The receiver may feed back, to the transmitter, index information of the codeword $W_s$, $\|H\|_F=|vec(H)|_2$, and information associated with R. The receiver may also feed back $$\frac{\|H\|_F}{|I+N|} \text{ or } \frac{\|H\|_F}{|N|}.$$

The transmitter may generate the transformed codebook $T(R, W_k)$ based on $W_k$ and R, and may reconfigure the explicit channel matrix H based on the transformed codebook $T(R, W_k)$ and the feedback information.

Feedback of $$\frac{vec(H)}{|vec(H)|_2}:$$

When the transmitter and the receiver use the single-polarized antennas, the explicit channel matrix H between the transmitter and the receiver may be modeled to $$H = \begin{bmatrix} H_1 \\ H_2 \end{bmatrix} = H_w R^{1/2}.$$

In this example, R denotes a correlation matrix of the explicit channel matrix H and, and $H_w$ denotes a matrix about an identically independent distribution (iid) channel. In this example, $R=E\{H^H H\}=E\{H_1^H H_1\}=E\{H_2^H H_2\}$.

In its vectorized form $Vec(H)=vec(H_w R^{1/2})$ which can be re-written as $Vec(H)=kron(R^{T/2},I) vec(H_w)$ with I an identity matrix whose size is Nt×Nt with Nt the number of transmit antennas. Let us define $Rkron=kron(R^{T/2},I)$.

The codebook in the base mode may be expressed by $W_{k,kron}$ where k=1, 2, 3 ... N. $W_{k,kron}$ are vectors used to quantize Vec(H). Note that $W_{k,kron}$ do not have to be confused with Wk in previous bullet related to the feedback of $$\frac{H}{\|H\|_F}.$$

The dimension of $W_{k,kron}$ and Wk are completely different

In the adaptive mode, the transmitter and the receiver may generate, using $W_{k,kron}$ and $R_{kron}^X$ where X=1 and ½, a transformed codebook $T(Rkron, W_{k,kron})$ as follows:

$$T(R_{kron}, W_{k,kron}) = \frac{R_{kron}^X W_{k,kron}}{\|R_{kron}^X W_{k,kron}\|_F}$$

$$(k = 1, 2, 3, ... N).$$

When the transformed codebook $T(Rkron, W_{k,kron})$ is generated, the receiver may calculate a direction of the explicit feedback vector vec(H) as $$\frac{vec(H)}{|vec(H)|_2}.$$

In this example, the explicit feedback vector vec(H) may correspond to information that the receiver desires to feed back to the transmitter. The explicit feedback vector vec(H) is generated by vectorizing the explicit channel matrix H and thus may be in a vector form. In the adaptive mode, it is possible to selectively use a vectorization process with respect to the explicit channel matrix H. When the vectorization process is used, the explicit feedback vector vec(H) may be fed back.

In this example, the receiver may select a codeword $W_s$ closest to $$\frac{vec(H)}{|vec(H)|_2}$$

among codewords included in the transformed codebook $T(Rkron, W_{k,kron})$. The receiver may feed back, to the transmitter, index information of the codeword $W_s$, $\|H\|_F=|vec(H)|_2$, and information associated with Rkron (the feedback of R may be sufficient given the direct relationship between Rkron and R). The receiver may also feed back $$\frac{\|H\|_F}{|I+N|} \text{ or } \frac{\|H\|_F}{|N|}.$$

The transmitter may generate the transformed codebook T(Rkron, $W_{k,kron}$) based on $W_{k,kron}$ and R,kron, and may reconfigure the explicit channel matrix H based on the transformed codebook T(Rkron, $W_{k,kron}$) and the feedback information.

Feedback of $H^HH$:

The receiver may feed back the explicit feedback matrix $H^HH$.

The receiver may calculate the direction of the explicit feedback matrix $H^HH$ as $$\frac{H^HH}{\|H^HH\|_F},$$

and then may select, from the transformed codebook T(R, $W_k$), the codeword closest to $$\frac{H^HH}{\|H^HH\|_F}.$$

When the element in the base codebook is $W_k$, the transformed codebook T(R, $W_k$) may be expressed by:

$$T(R, W_k) = \frac{(R^X)^H W_k R^X}{\|(R^X)^H W_k R^X\|_F}$$

$(k = 1, 2, 3, \ldots N)$.

The receiver may select the codeword $W_s$ closest to $$\frac{H^HH}{\|H^HH\|_F}$$

from codewords included in the transformed codebook T(R, $W_k$). The receiver may feed back, to the transmitter, index information of the codeword $W_s$, $\|H^HH\|_F = |vec(H^HH)|_2$, and information associated with R. The receiver may also feed back $$\frac{\|H^HH\|_F}{|I+H|} \text{ or } \frac{\|H^HH\|_F}{|N|}.$$

The transmitter may generate the transformed codebook T(R, $W_k$) based on $W_k$ and R, and may reconfigure $H^HH$ based on the transformed codebook T(R, $W_k$) and the feedback information.

Feedback of $vec(H^HH)$:

The receiver may feed back the explicit feedback vector $vec(H^HH)$.

The receiver may calculate the direction of the explicit feedback vector $vec(H^HH)$ as $$\frac{vec(H^HH)}{vec|H^HH|_2},$$

and then may select, from the transformed codebook T($R_{KRON}$, $W_{k,KRON}$), the codeword closest to $$\frac{vec(H^HH)}{vec|H^HH|_2}.$$

Since a definition is made by $vec(ABC)=kron(C^T, A)vec(B)$, $vec(R^H W_k R)=kron((R)^T, R^H)vec(W_k)$ a transformed codebook T($R_{KRON}$, $W_{k,KRON}$) may be easily obtained $$T(R_{KRON}, W_{k,KRON}) = \frac{(R_{KRON})^X W_{k,KRON}}{\|(R_{KRON})^X W_{k,KRON}\|}$$

$(k = 1, 2, 3, \ldots N)$ where $R_{KRON}$ and $W_{k,KRON}$ could be $$R_{KRON}=kron((R)^T, R^H)$$

$$W_{k,KRON}=vec(W_k)$$

The receiver may select the codeword $W_s$ closest to $$\frac{vec(H^HH)}{vec|H^HH|_2}$$

from codewords included in the transformed codebook T(R, $W_k$). The receiver may feed back, to the transmitter, index information of the codeword $W_s$, $\|H^HH\|_F=|vec(H^HH)|_2$, and information associated with R. The receiver may also feed back $$\frac{\|H^HH\|_F}{|I+H|} \text{ or } \frac{\|H^HH\|_F}{|N|}.$$

The transmitter may generate the transformed codebook T($R_{KRON}$, $W_{k,KRON}$) based on $W_{k,KRON}$ and $R_{KRON}$, and may reconfigure $vec(H^HH)$ based on the transformed codebook T($R_{KRON}$, $W_{k,KRON}$) and the feedback information.

(2) When the transmitter and the receiver use dual-polarized antennas:

When the transmitter and the receiver use the dual-polarized antennas, the explicit channel matrix H between the transmitter and the receiver may be modeled to $$H = \begin{bmatrix} H_1 \\ H_2 \end{bmatrix} = \begin{bmatrix} H_{w,1} & R_1^{1/2} \\ H_{w,2} & R_2^{1/2} \end{bmatrix}.$$

In the explicit feedback, information associated with $H^HH=R_1^{H/2}H_{w,1}^H H_{w,1}R_1^{1/2}+R_2^{H/2}H_{w,2}^H H_{w,2}R_2^{1/2}$ may be fed back. In this example, $R_1=E\{h_1^H H_1\}$, $R_2=E\{H_2^H H_2\}$.

The transformed codebook $T(R_1, R_2, W_k)$ may be given by $$T(R_1, R_2, W_k) = \frac{(R_1^X)^H W_k R_1^X + (R_2^X)^H W_k R_2^X}{\|(R_1^X)^H W_k R_1^X + (R_2^X)^H W_k R_2^X\|_F}.$$

The receiver may select, from codewords included in the transformed codebook $T(R_1, R_2, W_k)$, the codeword $W_s$ closest to $$\frac{H^H H}{\|H^H H\|_F}$$

that is a direction of the explicit feedback matrix $H^H H$, or to $$\frac{vec(H^H H)}{vec|H^H H|_2}$$

that is a direction of the explicit feedback vector $vec(H^H H)$. The receiver may feed back, to the transmitter, index information of the codeword $W_s$, $\|H^H H\|_F = |vec(H^H H)|_2$, and information associated with $R_1$ and $R_2$. The receiver may also feed back $$\frac{\|H^H H\|_F}{|I + H|} \text{ or } \frac{\|H^H H\|_F}{|N|}.$$

The transmitter may generate the transformed codebook $T(R_1, R_2, W_k)$ based on $W_k$, $R_1$, and $R_2$, and may also reconfigure $vec(H^H H)$ or $H^H H$ based on the transformed codebook $T(R_1, R_2, W_k)$ and the feedback information.

In this example, $W_k$ may be given by $$W_k = \begin{bmatrix} w_{k,11} & w_{k,12} \\ w_{k,21} & w_{k,22} \end{bmatrix}.$$

When $W_k$ is designed based on the following criteria, a performance may be enhanced:

1. A distance between codewords $W_k$(k=1, 2, 3, ..., N) may need to increase.
2. A distance between codewords $W_{k,11}$(k=1, 2, 3, ..., N) may need to increase.
3. A distance between codewords $W_{k,22}$(k=1, 2, 3, ..., N) may need to increase.

Figure 5:
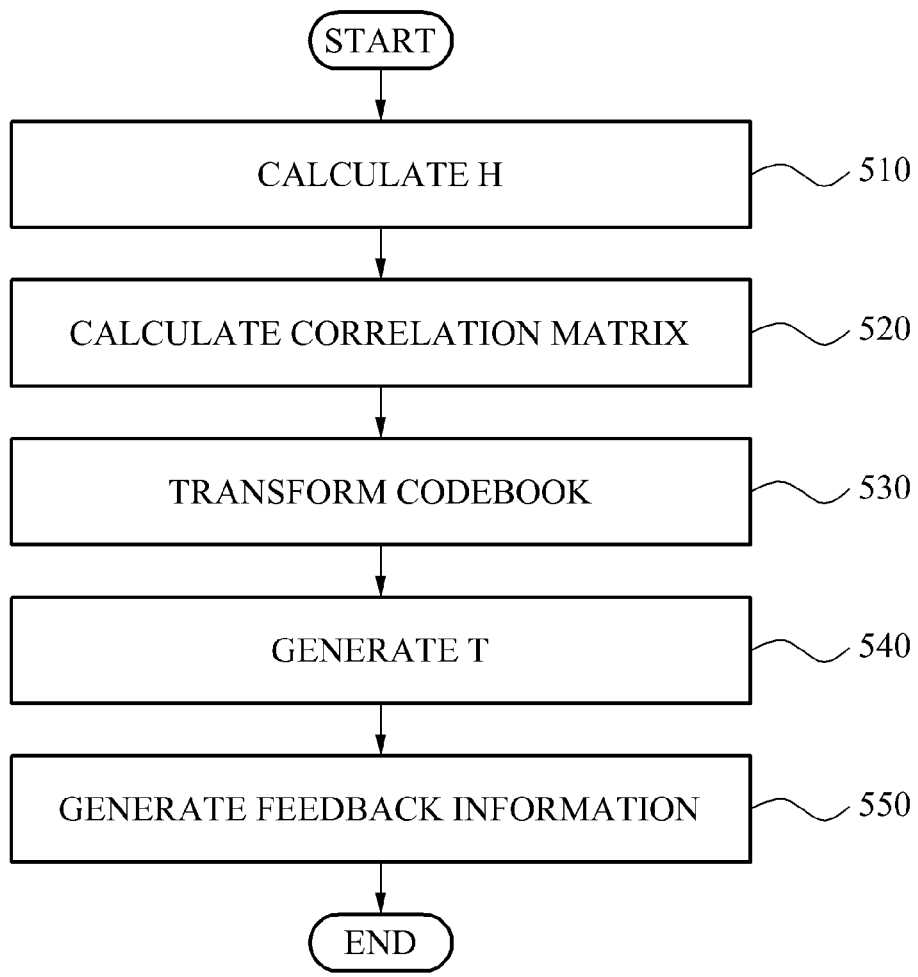
FIG. 5 is a flowchart illustrating an example of a method of operating a receiver using an explicit feedback in an adaptive mode.

FIG. 5 illustrates an example of a method of operating a receiver using an explicit feedback in an adaptive mode.

In operation 510, the receiver calculates an explicit channel matrix H. The receiver calculates a correlation matrix R in operation 520, and generates a transformed codebook $T(R, W_k)$ or $T(R_1, R_2, W_k)$ based on a previous codebook $W_k$ and R.

In operation 540, the receiver generates an explicit feedback vector or an explicit feedback matrix based on the explicit channel matrix H. In operation 540, the receiver generates feedback information based on the transformed codebook $T(R, W_k)$. In this example, the explicit feedback vector and the explicit feedback matrix are indicated as T.

The aforementioned description related to the adaptive mode may be applicable as is to the receiver operation method of FIG. 5 and thus further detailed description related thereto to will be omitted here.

Figure 6:
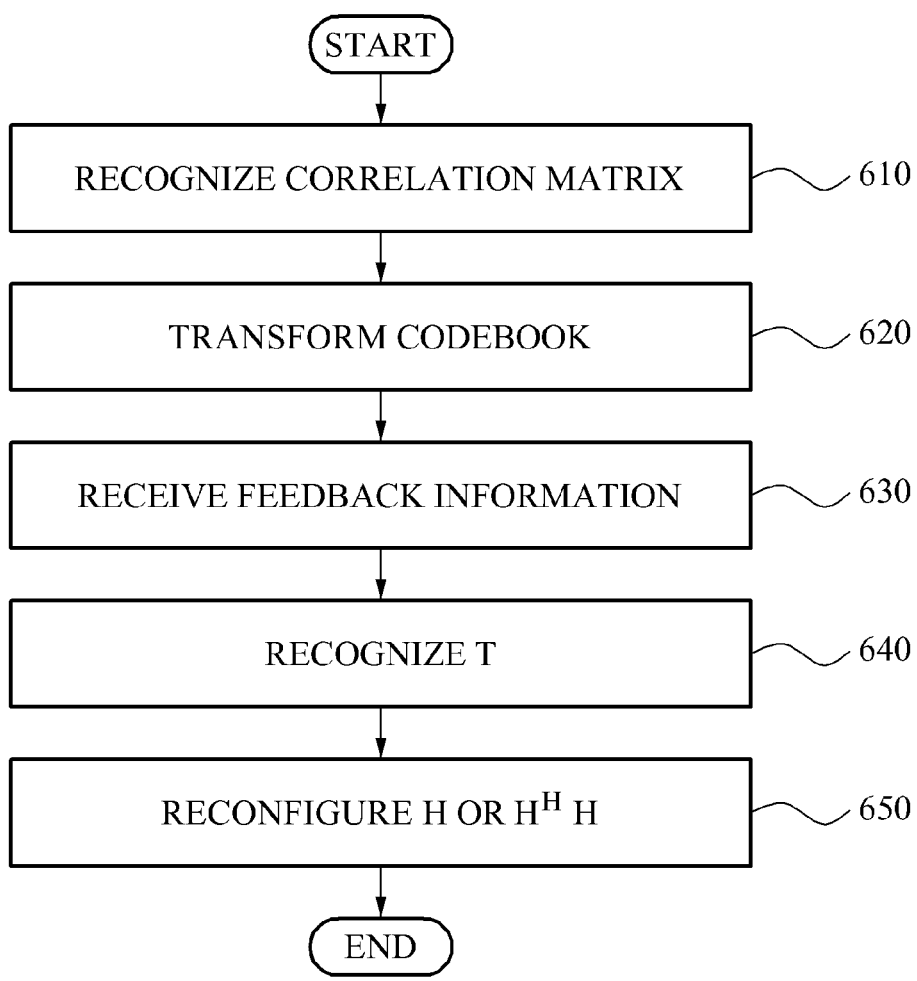
FIG. 6 is a flowchart illustrating an example of a method of operating a transmitter corresponding to a receiver using an explicit feedback in an adaptive mode.

FIG. 6 illustrates an example of a method of operating a transmitter corresponding to a receiver using an explicit feedback in an adaptive mode.

In operation 610, the transmitter recognizes a correlation matrix. The transmitter may recognize a correlation matrix R with respect to a single-polarized antenna system case and may also recognize correlation matrices $R_1$ and $R_2$ with respect to a dual-polarized antenna system case.

In operation 620, the transmitter generates a transformed codebook based on a previous codebook $W_k$ and the correlation matrix.

In operation 630, the transmitter receives feedback information from the receiver.

In operation 640, the transmitter recognizes the explicit feedback vector or the explicit feedback matrix based on the transformed codebook and the feedback information. In operation 650, the transmitter reconfigures an explicit channel matrix H or a covariance $H^H H$. As described above, T denotes the explicit feedback vector or the explicit feedback matrix.

The processes, functions, methods, and/or software described above including a receiver/transmitter operating method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer readable codes or program instructions may be stored and executed in a decentralized manner.

Figure 7:
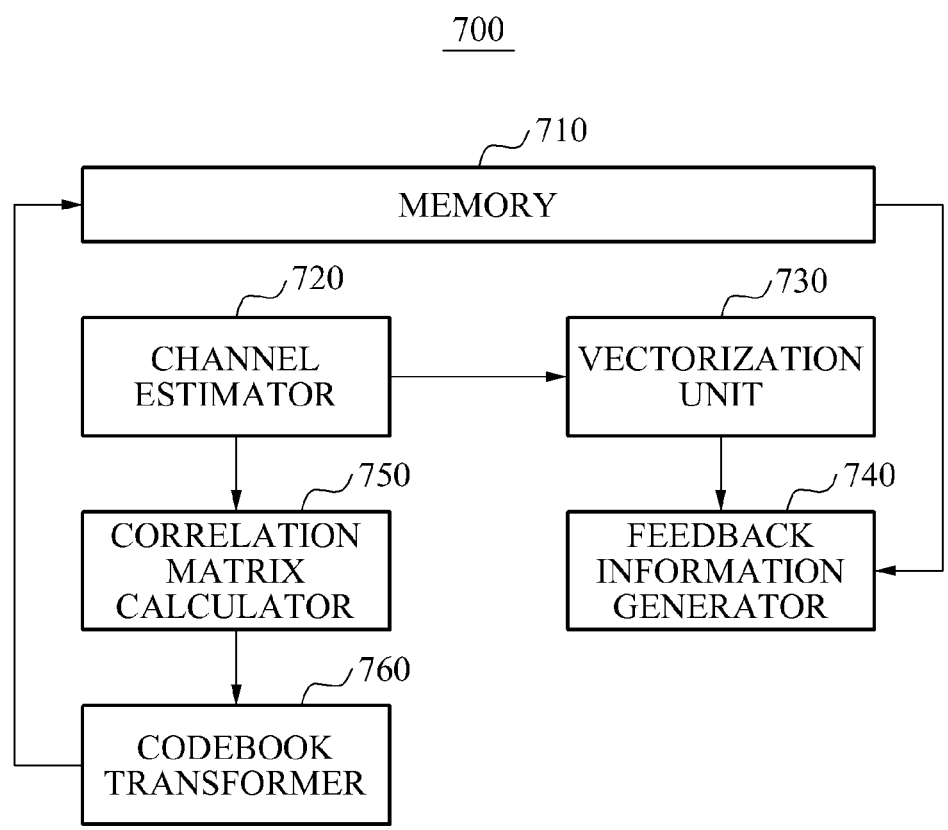
FIG. 7 is a diagram illustrating an example of a receiver.

FIG. 7 illustrates an example of a receiver 700.

The receiver 700 includes a memory 710, a channel estimator 720, a vectorization unit 730, a feedback information generator 740, a correlation matrix calculator 750, and a codebook transformer 760.

The memory 710 may store a fixed codebook for a base mode, or a transformed codebook generated in real time in an adaptive mode.

The channel estimator 720 may calculate an explicit channel matrix between the receiver 700 and a transmitter (not shown). The vectorization unit 730 may generate an explicit feedback vector by vectorizing the explicit channel matrix or the processed explicit channel matrix. The feedback information generator 740 may generate, as feedback information, information associated with a direction and a quality of the explicit feedback vector based on the fixed codebook or the transformed codebook.

The correlation matrix calculator 750 and the codebook transformer 760 correspond to units for an adaptive mode.

The correlation matrix calculator 750 may calculate a correlation matrix of the explicit channel matrix, and the codebook transformer 760 may generate the transformed codebook based on the correlation matrix.

In the adaptive mode, a vectorization with respect to the explicit channel matrix or the processed explicit channel matrix may be selectively performed. When the vectorization is performed, the explicit feedback vector may be generated. Conversely, when the vectorization is not performed, the explicit feedback matrix may be generated. The feedback information generator 740 may generate, as feedback information, information associated with the direction and the quality of one of the explicit vector and the explicit feedback matrix.

Figure 8:
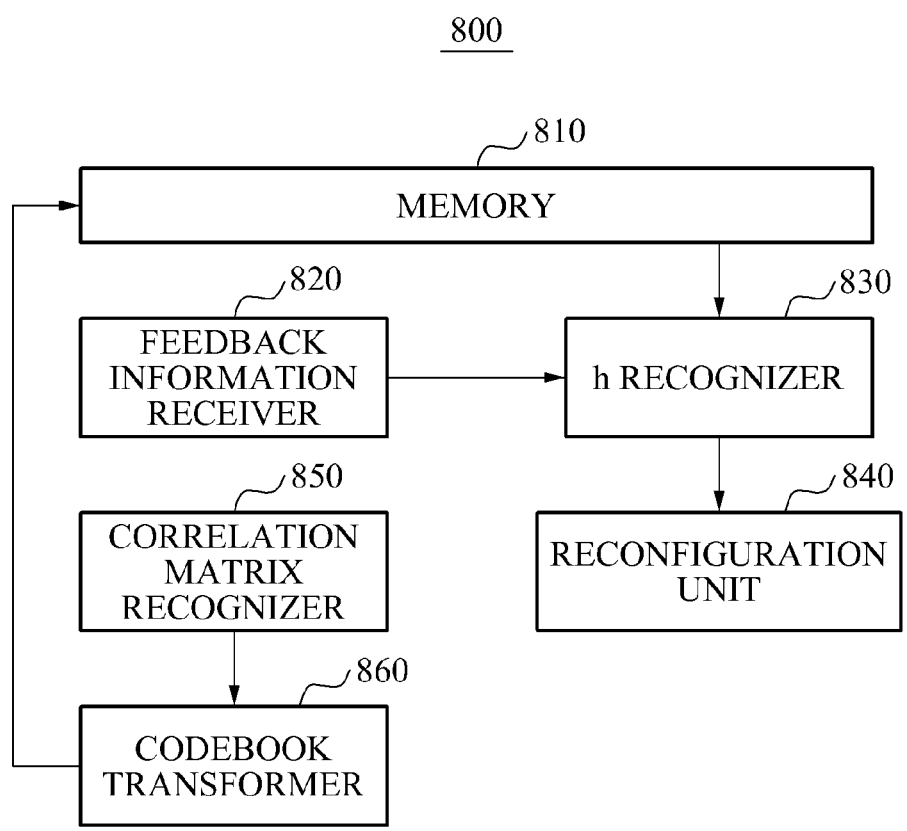
FIG. 8 is a diagram illustrating an example of a transmitter.

FIG. 8 illustrates an example of a transmitter 800.

The transmitter 800 includes a memory 810, a feedback information receiver 820, an h recognizer 830, a reconfiguration unit 840, a correlation matrix recognizer 850, and a codebook transformer 860.

The memory 810 may store a fixed codebook for a base mode, or a transformed codebook generated in real time in an adaptive mode.

The feedback information receiver 820 may receive feedback information fed back from a receiver (not shown).

The h recognizer 830 may verify information associated with a direction and a quality of an explicit feedback vector based on the feedback information, and reconfigure the explicit feedback vector. As described above, since the receiver may selectively perform a vectorization in the adaptive mode, the h recognizer 830 may reconfigure the explicit feedback vector and the explicit feedback matrix.

The reconfiguration unit 840 may reconfigure the explicit channel matrix or the processed explicit channel matrix based on the explicit feedback vector or the explicit feedback matrix.

The correlation matrix recognizer 850 and the codebook transformer 860 correspond to units for the adaptive mode. The correlation matrix recognizer 850 may verify a correlation matrix of the explicit channel matrix, and the codebook transformer 860 may generate the transformed codebook based on the correlation matrix.

For reference, $C_{H^H H}^{Lloyd}$ will be described. Various samples may be generated with respect to a number of receive antennas of the receiver, for example, 1, 2, 3, and 4 in order to generate $C_{H^H H}^{Lloyd}$. For example, when the number of receive antennas is one, 1×4 vectors may be generated as samples. When the number of receive antennas is two, 2×4 vectors may be generated as samples. When the number of receive antennas is three, 3×4 vectors may be generated as samples. When the number of receive antennas is four, 4×4 vectors may be generated as samples.

When the well-known Lloyd algorithm is performed based on the above samples, codebooks representing the number of receive antennas, for example, 1, 2, 3, and 4 may be induced. 4×4 matrices may be generated by calculating a covariance of each of samples included in each of the codebooks, and $C_{H^H H}^{Lloyd}$ may be generated by appropriately combining the 4×4 matrices.

Numerical values of an integrated codebook $C_{H^H H}$, generated based on $C_{H^H H}^{Lloyd}$, may follow as. For reference, $C_{H^H H}$ corresponding to all available transmission ranks may be generated by selecting columns corresponding to a transmission rank in each of the following matrices:

4 bits:
codebook(:, :, 1) =

| 0.2500 | 0.2500 | 0.2500 | 0.2500 |
| 0.2500 | 0.2500 | 0.2500 | 0.2500 |
| 0.2500 | 0.2500 | 0.2500 | 0.2500 |
| 0.2500 | 0.2500 | 0.2500 | 0.2500 | codebook(:, :, 2) =

| 0.2500 | 0.0000 + 0.2500i | −0.2500 + 0.0000i | −0.0000 − 0.2500i |
| 0.0000 − 0.2500i | 0.2500 | 0.0000 + 0.2500i | −0.2500 + 0.0000i |
| −0.2500 − 0.0000i | 0.0000 − 0.2500i | 0.2500 | 0.0000 + 0.2500i |
| −0.0000 + 0.2500i | −0.2500 − 0.0000i | 0.0000 − 0.2500i | 0.2500 | codebook(:, :, 3) =

| 0.2500 | −0.2500 + 0.0000i | 0.2500 − 0.0000i | −0.2500 + 0.0000i |
| −0.2500 − 0.0000i | 0.2500 | −0.2500 + 0.0000i | 0.2500 − 0.0000i |
| 0.2500 + 0.0000i | −0.2500 − 0.0000i | 0.2500 | −0.2500 + 0.0000i |
| −0.2500 − 0.0000i | 0.2500 + 0.0000i | −0.2500 − 0.0000i | 0.2500 | codebook(:, :, 4) =

| 0.2500 | −0.0000 − 0.2500i | −0.2500 + 0.0000i | 0.0000 + 0.2500i |
| −0.0000 + 0.2500i | 0.2500 | −0.0000 − 0.2500i | −0.2500 + 0.0000i |
| −0.2500 − 0.0000i | −0.0000 + 0.2500i | 0.2500 | −0.0000 − 0.2500i |
| 0.0000 − 0.2500i | −0.2500 − 0.0000i | −0.0000 + 0.2500i | 0.2500 | codebook(:, :, 5) =

| 0.2500 | 0.1768 + 0.1768i | 0.0000 + 0.2500i | −0.1768 + 0.1768i |
| 0.1768 − 0.1768i | 0.2500 + 0.0000i | 0.1768 + 0.1768i | −0.0000 + 0.2500i |
| 0.0000 − 0.2500i | 0.1768 − 0.1768i | 0.2500 | 0.1768 + 0.1768i |
| −0.1768 − 0.1768i | −0.0000 − 0.2500i | 0.1768 − 0.1768i | 0.2500 − 0.0000i | codebook(:, :, 6) =

| 0.2500 | −0.1768 + 0.1768i | −0.0000 − 0.2500i | 0.1768 + 0.1768i |
| −0.1768 − 0.1768i | 0.2500 − 0.0000i | −0.1768 + 0.1768i | −0.0000 − 0.2500i |
| −0.0000 + 0.2500i | −0.1768 − 0.1768i | 0.2500 | −0.1768 + 0.1768i |
| 0.1768 − 0.1768i | −0.0000 + 0.2500i | −0.1768 − 0.1768i | 0.2500 + 0.0000i |

-continued codebook(:, :, 7) =

| | | | |
|---|---|---|---|
| 0.2500 | −0.1768 − 0.1768i | 0.0000 + 0.2500i | 0.1768 − 0.1768i |
| −0.1768 + 0.1768i | 0.2500 + 0.0000i | −0.1768 − 0.1768i | 0.0000 + 0.2500i |
| 0.0000 − 0.2500i | −0.1768 + 0.1768i | 0.2500 | −0.1768 − 0.1768i |
| 0.1768 + 0.1768i | 0.0000 − 0.2500i | −0.1768 + 0.1768i | 0.2500 − 0.0000i | codebook(:, :, 8) =

| | | | |
|---|---|---|---|
| 0.2500 | 0.1768 − 0.1768i | −0.0000 − 0.2500i | −0.1768 − 0.1768i |
| 0.1768 + 0.1768i | 0.2500 − 0.0000i | 0.1768 − 0.1768i | 0.0000 − 0.2500i |
| −0.0000 + 0.2500i | 0.1768 + 0.1768i | 0.2500 | 0.1768 − 0.1768i |
| −0.1768 + 0.1768i | 0.0000 + 0.2500i | 0.1768 + 0.1768i | 0.2500 + 0.0000i | codebook(:, :, 9) =

| | | | |
|---|---|---|---|
| 0.4613 + 0.0000i | −0.0050 − 0.0842i | 0.1725 + 0.0092i | −0.0124 − 0.3721i |
| −0.0050 + 0.0842i | 0.3550 − 0.0000i | 0.0503 − 0.1777i | −0.0190 − 0.0591i |
| 0.1725 − 0.0092i | 0.0503 + 0.1777i | 0.2020 − 0.0000i | 0.0116 − 0.2022i |
| −0.0124 + 0.3721i | −0.0190 + 0.0591i | 0.0116 + 0.2022i | 0.3337 + 0.0000i | codebook(:, :, 10) =

| | | | |
|---|---|---|---|
| 0.3763 − 0.0000i | 0.1006 + 0.1308i | −0.2759 − 0.1110i | −0.2357 − 0.0486i |
| 0.1006 − 0.1308i | 0.3298 − 0.0000i | −0.1649 + 0.2111i | −0.0292 + 0.1164i |
| −0.2759 + 0.1110i | −0.1649 − 0.2111i | 0.3273 − 0.0000i | 0.2035 − 0.0721i |
| −0.2357 + 0.0486i | −0.0292 − 0.1164i | 0.2035 + 0.0721i | 0.1726 + 0.0000i | codebook(:, :, 11) =

| | | | |
|---|---|---|---|
| 0.1115 + 0.0000i | 0.1417 − 0.1086i | 0.0179 − 0.0067i | 0.0071 − 0.0007i |
| 0.1417 + 0.1086i | 0.5872 − 0.0000i | 0.2943 − 0.2374i | 0.1450 + 0.0212i |
| 0.0179 + 0.0067i | 0.2943 + 0.2374i | 0.4375 − 0.0000i | 0.1077 + 0.1242i |
| 0.0071 + 0.0007i | 0.1450 − 0.0212i | 0.1077 − 0.1242i | 0.0620 − 0.0000i | codebook(:, :, 12) =

| | | | |
|---|---|---|---|
| 0.5933 + 0.0000i | 0.2181 + 0.0181i | 0.1887 − 0.0895i | −0.1294 + 0.0565i |
| 0.2181 − 0.0181i | 0.1014 − 0.0000i | 0.1152 − 0.0057i | −0.0183 − 0.0602i |
| 0.1887 + 0.0895i | 0.1152 + 0.0057i | 0.2397 − 0.0000i | −0.1200 − 0.2443i |
| −0.1294 − 0.0565i | −0.0183 + 0.0602i | −0.1200 + 0.2443i | 0.4180 − 0.0000i | codebook(:, :, 13) =

| | | | |
|---|---|---|---|
| 0.2181 − 0.0000i | 0.0151 − 0.1942i | 0.0748 + 0.0416i | 0.1007 + 0.0847i |
| 0.0151 + 0.1942i | 0.2803 − 0.0000i | −0.1362 + 0.2315i | −0.0273 − 0.1042i |
| 0.0748 − 0.0416i | −0.1362 − 0.2315i | 0.3828 − 0.0000i | −0.2940 + 0.1430i |
| 0.1007 − 0.0847i | −0.0273 + 0.1042i | −0.2940 − 0.1430i | 0.4702 + 0.0000i | codebook(:, :, 14) =

| | | | |
|---|---|---|---|
| 0.6964 + 0.0000i | −0.0257 − 0.1997i | −0.0443 + 0.0380i | −0.1495 + 0.2964i |
| −0.0257 + 0.1997i | 0.1568 + 0.0000i | −0.0391 − 0.0191i | −0.1300 − 0.0618i |
| −0.0443 − 0.0380i | −0.0391 + 0.0191i | 0.2048 − 0.0000i | −0.0553 + 0.0792i |
| −0.1495 − 0.2964i | −0.1300 + 0.0618i | −0.0553 − 0.0792i | 0.2762 − 0.0000i | codebook(:, :, 15) =

| | | | |
|---|---|---|---|
| 0.5571 + 0.0000i | −0.1704 − 0.1079i | −0.1467 + 0.1985i | −0.1503 − 0.1199i |
| −0.1704 + 0.1079i | 0.1878 + 0.0000i | 0.0302 − 0.0879i | 0.1047 + 0.0466i |
| −0.1467 − 0.1985i | 0.0302 + 0.0879i | 0.5080 − 0.0000i | −0.1514 − 0.0500i |
| −0.1503 + 0.1199i | 0.1047 − 0.0466i | −0.1514 + 0.0500i | 0.1571 − 0.0000i | codebook(:, :, 16) =

| | | | |
|---|---|---|---|
| 0.5000 | 0 | 0 | 0 |
| 0 | 0.5000 | 0 | 0 |
| 0 | 0 | 0.5000 | 0 |
| 0 | 0 | 0 | 0.5000 |

6 bits:

codebook(:, :, 1) =

| | | | |
|---|---|---|---|
| 0.2500 | 0.2500 | 0.2500 | 0.2500 |
| 0.2500 | 0.2500 | 0.2500 | 0.2500 |
| 0.2500 | 0.2500 | 0.2500 | 0.2500 |
| 0.2500 | 0.2500 | 0.2500 | 0.2500 | codebook(:, :, 2) =

| | | | |
|---|---|---|---|
| 0.2500 | 0.0000 + 0.2500i | −0.2500 + 0.0000i | −0.0000 − 0.2500i |
| 0.0000 − 0.2500i | 0.2500 | 0.0000 + 0.2500i | −0.2500 − 0.0000i |
| −0.2500 − 0.0000i | 0.0000 − 0.2500i | 0.2500 | 0.0000 + 0.2500i |
| −0.0000 + 0.2500i | −0.2500 − 0.0000i | 0.0000 − 0.2500i | 0.2500 | codebook(:, :, 3) =

| | | | |
|---|---|---|---|
| 0.2500 | −0.2500 + 0.0000i | 0.2500 − 0.0000i | −0.2500 + 0.0000i |
| −0.2500 − 0.0000i | 0.2500 | −0.2500 − 0.0000i | 0.2500 + 0.0000i |
| 0.2500 + 0.0000i | −0.2500 − 0.0000i | 0.2500 | −0.2500 + 0.0000i |
| −0.2500 − 0.0000i | 0.2500 + 0.0000i | −0.2500 − 0.0000i | 0.2500 |

-continued codebook(:, :, 4) =

| 0.2500 | −0.0000 − 0.2500i | −0.2500 + 0.0000i | 0.0000 + 0.2500i |
| --- | --- | --- | --- |
| −0.0000 + 0.2500i | 0.2500 | −0.0000 − 0.2500i | −0.2500 + 0.0000i |
| −0.2500 − 0.0000i | −0.0000 + 0.2500i | 0.2500 | −0.0000 − 0.2500i |
| 0.0000 − 0.2500i | −0.2500 − 0.0000i | −0.0000 + 0.2500i | 0.2500 | codebook(:, :, 5) =

| 0.2500 | 0.2310 + 0.0957i | 0.1768 + 0.1768i | 0.0957 + 0.2310i |
| --- | --- | --- | --- |
| 0.2310 − 0.0957i | 0.2500 + 0.0000i | 0.2310 + 0.0957i | 0.1768 + 0.1768i |
| 0.1768 − 0.1768i | 0.2310 − 0.0957i | 0.2500 + 0.0000i | 0.2310 + 0.0957i |
| 0.0957 − 0.2310i | 0.1768 − 0.1768i | 0.2310 − 0.0957i | 0.2500 + 0.0000i | codebook(:, :, 6) =

| 0.2500 | −0.0957 + 0.2310i | −0.1768 − 0.1768i | 0.2310 − 0.0957i |
| --- | --- | --- | --- |
| −0.0957 − 0.2310i | 0.2500 − 0.0000i | −0.0957 + 0.2310i | −0.1768 − 0.1768i |
| −0.1768 + 0.1768i | −0.0957 − 0.2310i | 0.2500 + 0.0000i | −0.0957 + 0.2310i |
| 0.2310 + 0.0957i | −0.1768 + 0.1768i | −0.0957 − 0.2310i | 0.2500 + 0.0000i | codebook(:, :, 7) =

| 0.2500 | −0.2310 − 0.0957i | 0.1768 + 0.1768i | −0.0957 − 0.2310i |
| --- | --- | --- | --- |
| −0.2310 + 0.0957i | 0.2500 + 0.0000i | −0.2310 − 0.0957i | 0.1768 + 0.1768i |
| 0.1768 − 0.1768i | −0.2310 − 0.0957i | 0.2500 + 0.0000i | −0.2310 − 0.0957i |
| −0.0957 + 0.2310i | 0.1768 − 0.1768i | −0.2310 − 0.0957i | 0.2500 − 0.0000i | codebook(:, :, 8) =

| 0.2500 | 0.0957 − 0.2310i | −0.1768 − 0.1768i | −0.2310 + 0.0957i |
| --- | --- | --- | --- |
| 0.0957 + 0.2310i | 0.2500 − 0.0000i | 0.0957 − 0.2310i | −0.1768 − 0.1768i |
| −0.1768 + 0.1768i | 0.0957 + 0.2310i | 0.2500 + 0.0000i | 0.0957 − 0.2310i |
| −0.2310 − 0.0957i | −0.1768 + 0.1768i | 0.0957 + 0.2310i | 0.2500 + 0.0000i | codebook(:, :, 9) =

| 0.2500 | 0.1768 + 0.1768i | 0.0000 + 0.2500i | −0.1768 + 0.1768i |
| --- | --- | --- | --- |
| 0.1768 − 0.1768i | 0.2500 + 0.0000i | 0.1768 + 0.1768i | −0.0000 + 0.2500i |
| 0.0000 − 0.2500i | 0.1768 − 0.1768i | 0.2500 | 0.1768 + 0.1768i |
| −0.1768 − 0.1768i | −0.0000 − 0.2500i | 0.1768 − 0.1768i | 0.2500 − 0.0000i | codebook(:, :, 10) =

| 0.2500 | −0.1768 + 0.1768i | −0.0000 − 0.2500i | 0.1768 + 0.1768i |
| --- | --- | --- | --- |
| −0.1768 − 0.1768i | 0.2500 − 0.0000i | −0.1768 + 0.1768i | −0.0000 − 0.2500i |
| −0.0000 + 0.2500i | −0.1768 − 0.1768i | 0.2500 | −0.1768 + 0.1768i |
| 0.1768 − 0.1768i | −0.0000 + 0.2500i | −0.1768 − 0.1768i | 0.2500 + 0.0000i | codebook(:, :, 11) =

| 0.2500 | −0.1768 − 0.1768i | 0.0000 + 0.2500i | 0.1768 − 0.1768i |
| --- | --- | --- | --- |
| −0.1768 + 0.1768i | 0.2500 + 0.0000i | −0.1768 − 0.1768i | 0.0000 + 0.2500i |
| 0.0000 − 0.2500i | −0.1768 + 0.1768i | 0.2500 | −0.1768 − 0.1768i |
| 0.1768 + 0.1768i | 0.0000 − 0.2500i | −0.1768 + 0.1768i | 0.2500 + 0.0000i | codebook(:, :, 12) =

| 0.2500 | 0.1768 − 0.1768i | −0.0000 − 0.2500i | −0.1768 − 0.1768i |
| --- | --- | --- | --- |
| 0.1768 + 0.1768i | 0.2500 − 0.0000i | 0.1768 − 0.1768i | 0.0000 − 0.2500i |
| −0.0000 + 0.2500i | 0.1768 + 0.1768i | 0.2500 | 0.1768 − 0.1768i |
| −0.1768 + 0.1768i | 0.0000 + 0.2500i | 0.1768 + 0.1768i | 0.2500 + 0.0000i | codebook(:, :, 13) =

| 0.2500 | 0.0957 + 0.2310i | −0.1768 + 0.1768i | −0.2310 − 0.0957i |
| --- | --- | --- | --- |
| 0.0957 − 0.2310i | 0.2500 + 0.0000i | 0.0957 + 0.2310i | −0.1768 + 0.1768i |
| −0.1768 − 0.1768i | 0.0957 − 0.2310i | 0.2500 + 0.0000i | 0.0957 + 0.2310i |
| −0.2310 + 0.0957i | −0.1768 − 0.1768i | 0.0957 − 0.2310i | 0.2500 + 0.0000i | codebook(:, :, 14) =

| 0.2500 | −0.2310 + 0.0957i | 0.1768 − 0.1768i | −0.0957 + 0.2310i |
| --- | --- | --- | --- |
| −0.2310 − 0.0957i | 0.2500 + 0.0000i | −0.2310 + 0.0957i | 0.1768 − 0.1768i |
| 0.1768 + 0.1768i | −0.2310 − 0.0957i | 0.2500 + 0.0000i | −0.2310 + 0.0957i |
| −0.0957 − 0.2310i | 0.1768 + 0.1768i | −0.2310 − 0.0957i | 0.2500 + 0.0000i | codebook(:, :, 15) =

| 0.2500 | −0.0957 − 0.2310i | −0.1768 + 0.1768i | 0.2310 + 0.0957i |
| --- | --- | --- | --- |
| −0.0957 + 0.2310i | 0.2500 − 0.0000i | −0.0957 − 0.2310i | −0.1768 + 0.1768i |
| −0.1768 − 0.1768i | −0.0957 + 0.2310i | 0.2500 + 0.0000i | −0.0957 − 0.2310i |
| 0.2310 − 0.0957i | −0.1768 − 0.1768i | −0.0957 + 0.2310i | 0.2500 + 0.0000i | codebook(:, :, 16) =

| 0.2500 | 0.2310 − 0.0957i | 0.1768 − 0.1768i | 0.0957 − 0.2310i |
| --- | --- | --- | --- |
| 0.2310 + 0.0957i | 0.2500 + 0.0000i | 0.2310 − 0.0957i | 0.1768 − 0.1768i |
| 0.1768 + 0.1768i | 0.2310 + 0.0957i | 0.2500 − 0.0000i | 0.2310 − 0.0957i |
| 0.0957 + 0.2310i | 0.1768 + 0.1768i | 0.2310 + 0.0957i | 0.2500 − 0.0000i |

-continued codebook(:, :, 17) =

| 0.2545 + 0.0000i | 0.3786 − 0.1370i | 0.0450 − 0.1230i | −0.0775 + 0.0668i |
| 0.3786 + 0.1370i | 0.6370 − 0.0000i | 0.1331 − 0.1587i | −0.1512 + 0.0576i |
| 0.0450 + 0.1230i | 0.1331 + 0.1587i | 0.0674 + 0.0000i | −0.0459 − 0.0256i |
| −0.0775 − 0.0668i | −0.1512 − 0.0576i | −0.0459 + 0.0256i | 0.0411 + 0.0000i | codebook(:, :, 18) =

| 0.2944 − 0.0000i | −0.1442 − 0.0657i | −0.0269 − 0.3002i | −0.2132 + 0.2152i |
| −0.1442 + 0.0657i | 0.0852 + 0.0000i | 0.0801 + 0.1410i | 0.0564 − 0.1529i |
| −0.0269 + 0.3002i | 0.0801 − 0.1410i | 0.3086 − 0.0000i | −0.2000 − 0.2371i |
| −0.2132 − 0.2152i | 0.0564 + 0.1529i | −0.2000 + 0.2371i | 0.3117 − 0.0000i | codebook(:, :, 19) =

| 0.0391 − 0.0000i | 0.0338 + 0.1678i | −0.0080 + 0.0117i | −0.0126 + 0.0891i |
| 0.0338 − 0.1678i | 0.7490 − 0.0000i | 0.0433 + 0.0445i | 0.3711 + 0.1309i |
| −0.0080 − 0.0117i | 0.0433 − 0.0445i | 0.0052 + 0.0000i | 0.0292 − 0.0145i |
| −0.0126 − 0.0891i | 0.3711 − 0.1309i | 0.0292 + 0.0145i | 0.2068 + 0.0000i | codebook(:, :, 20) =

| 0.6231 + 0.0000i | −0.1629 + 0.2504i | 0.1309 − 0.1694i | −0.2929 − 0.1183i |
| −0.1629 − 0.2504i | 0.1432 + 0.0000i | −0.1023 − 0.0083i | 0.0290 + 0.1486i |
| 0.1309 + 0.1694i | −0.1023 + 0.0083i | 0.0736 − 0.0000i | −0.0294 − 0.1045i |
| −0.2929 + 0.1183i | 0.0290 − 0.1486i | −0.0294 + 0.1045i | 0.1601 − 0.0000i | codebook(:, :, 21) =

| 0.0316 − 0.0000i | 0.0531 − 0.0427i | 0.0611 − 0.0980i | 0.1044 + 0.0413i |
| 0.0531 + 0.0427i | 0.1468 − 0.0000i | 0.2351 − 0.0821i | 0.1197 + 0.2104i |
| 0.0611 + 0.0980i | 0.2351 + 0.0821i | 0.4223 − 0.0000i | 0.0740 + 0.4039i |
| 0.1044 − 0.0413i | 0.1197 − 0.2104i | 0.0740 − 0.4039i | 0.3993 − 0.0000i | codebook(:, :, 22) =

| 0.2632 + 0.0000i | 0.1770 + 0.0874i | 0.1669 − 0.0247i | −0.2136 − 0.2844i |
| 0.1770 − 0.0874i | 0.1480 − 0.0000i | 0.1040 − 0.0720i | −0.2381 − 0.1203i |
| 0.1669 + 0.0247i | 0.1040 + 0.0720i | 0.1081 + 0.0000i | −0.1087 − 0.2004i |
| −0.2136 + 0.2844i | −0.2381 + 0.1203i | −0.1087 + 0.2004i | 0.4807 − 0.0000i | codebook(:, :, 23) =

| 0.2290 − 0.0000i | −0.2813 + 0.0790i | 0.0867 − 0.1705i | −0.0768 − 0.2207i |
| −0.2813 − 0.0790i | 0.3727 − 0.0000i | −0.1653 + 0.1796i | 0.0182 + 0.2976i |
| 0.0867 + 0.1705i | −0.1653 − 0.1796i | 0.1598 − 0.0000i | 0.1353 − 0.1407i |
| −0.0768 + 0.2207i | 0.0182 − 0.2976i | 0.1353 + 0.1407i | 0.2385 + 0.0000i | codebook(:, :, 24) =

| 0.1386 − 0.0000i | 0.2182 + 0.0634i | 0.0317 − 0.0361i | 0.0543 + 0.2500i |
| 0.2182 − 0.0634i | 0.3725 − 0.0000i | 0.0334 − 0.0714i | 0.1999 + 0.3687i |
| 0.0317 + 0.0361i | 0.0334 + 0.0714i | 0.0167 − 0.0000i | −0.0528 + 0.0713i |
| 0.0543 − 0.2500i | 0.1999 − 0.3687i | −0.0528 − 0.0713i | 0.4722 + 0.0000i | codebook(:, :, 25) =

| 0.4661 + 0.0000i | −0.2066 − 0.1351i | −0.3790 + 0.0729i | 0.1840 − 0.0715i |
| −0.2066 + 0.1351i | 0.1308 + 0.0000i | 0.1469 − 0.1422i | −0.0609 − 0.0850i |
| −0.3790 − 0.0729i | 0.1469 + 0.1422i | 0.3196 − 0.0000i | −0.1608 + 0.0293i |
| 0.1840 + 0.0715i | −0.0609 − 0.0850i | −0.1608 − 0.0293i | 0.0836 − 0.0000i | codebook(:, :, 26) =

| 0.1860 − 0.0000i | −0.0286 − 0.0420i | 0.2597 − 0.2463i | 0.0022 − 0.1438i |
| −0.0286 + 0.0420i | 0.0139 + 0.0000i | 0.0156 + 0.0965i | 0.0321 + 0.0226i |
| 0.2597 + 0.2463i | 0.0156 − 0.0965i | 0.6889 − 0.0000i | 0.1936 − 0.1979i |
| 0.0022 + 0.1438i | 0.0321 − 0.0226i | 0.1936 + 0.1979i | 0.1113 − 0.0000i | codebook(:, :, 27) =

| 0.6841 − 0.0000i | 0.0563 − 0.0135i | 0.4005 − 0.2104i | −0.0254 − 0.0861i |
| 0.0563 + 0.0135i | 0.0049 − 0.0000i | 0.0371 − 0.0094i | −0.0004 − 0.0076i |
| 0.4005 + 0.2104i | 0.0371 + 0.0094i | 0.2992 − 0.0000i | 0.0116 − 0.0583i |
| −0.0254 + 0.0861i | −0.0004 + 0.0076i | 0.0116 + 0.0583i | 0.0118 + 0.0000i | codebook(:, :, 28) =

| 0.2435 + 0.0000i | 0.2776 + 0.0270i | 0.0371 + 0.1922i | −0.1416 − 0.2192i |
| 0.2776 − 0.0270i | 0.3194 − 0.0000i | 0.0636 + 0.2150i | −0.1857 − 0.2342i |
| 0.0371 − 0.1922i | 0.0636 − 0.2150i | 0.1574 − 0.0000i | −0.1946 + 0.0784i |
| −0.1416 + 0.2192i | −0.1857 + 0.2342i | −0.1946 − 0.0784i | 0.2797 + 0.0000i | codebook(:, :, 29) =

| 0.1148 − 0.0000i | −0.0743 − 0.0258i | −0.0643 + 0.0025i | −0.0119 − 0.3020i |
| −0.0743 + 0.0258i | 0.0539 + 0.0000i | 0.0411 − 0.0161i | 0.0756 + 0.1928i |
| −0.0643 − 0.0025i | 0.0411 + 0.0161i | 0.0361 + 0.0000i | 0.0000 + 0.1694i |
| −0.0119 + 0.3020i | 0.0756 − 0.1928i | 0.0000 − 0.1694i | 0.7951 + 0.0000i |

-continued codebook(:, :, 30) =

| 0.1377 − 0.0000i | −0.0063 + 0.1203i | −0.1939 + 0.0094i | 0.2576 + 0.0117i |
| −0.0063 − 0.1203i | 0.1054 + 0.0000i | 0.0171 + 0.1691i | −0.0015 − 0.2257i |
| −0.1939 − 0.0094i | 0.0171 − 0.1691i | 0.2739 − 0.0000i | −0.3621 − 0.0341i |
| 0.2576 − 0.01171 | −0.00i5 + 0.2257i | −0.3621 + 0.0341i | 0.4830 − 0.0000i | codebook(:, :, 31) =

| 0.4420 − 0.0000i | −0.0341 + 0.3900i | −0.0798 + 0.2258i | 0.0532 − 0.1822i |
| −0.0341 − 0.3900i | 0.3467 + 0.0000i | 0.2054 + 0.0530i | −0.1649 − 0.0329i |
| −0.0798 − 0.2258i | 0.2054 − 0.0530i | 0.1297 + 0.0000i | −0.1027 + 0.0057i |
| 0.0532 + 0.1822i | −0.1649 + 0.0329i | −0.1027 − 0.0057i | 0.0815 + 0.0000i | codebook(:, :, 32) =

| 0.0909 + 0.0000i | −0.0296 + 0.0266i | −0.0714 + 0.2264i | −0.1104 + 0.1119i |
| −0.0296 − 0.0266i | 0.0174 − 0.0000i | 0.0895 − 0.0529i | 0.0687 − 0.0042i |
| −0.0714 − 0.2264i | 0.0895 + 0.0529i | 0.6200 − 0.0000i | 0.3653 + 0.1869i |
| −0.1104 − 0.1119i | 0.0687 + 0.0042i | 0.3653 − 0.1869i | 0.2717 − 0.0000i | codebook(:, :, 33) =

| 0.3803 + 0.0000i | 0.1336 − 0.0116i | −0.1200 + 0.0337i | 0.3640 + 0.2639i |
| 0.1336 + 0.0116i | 0.0473 + 0.0000i | −0.0432 + 0.0082i | 0.1198 + 0.1038i |
| −0.1200 − 0.0337i | −0.0432 − 0.0082i | 0.0408 + 0.0000i | −0.0914 − 0.1155i |
| 0.3640 − 0.2639i | 0.1198 − 0.1038i | −0.0914 + 0.1155i | 0.5316 − 0.0000i | codebook(:, :, 34) =

| 0.1645 − 0.0000i | −0.1132 + 0.1728i | 0.3037 − 0.0176i | −0.0245 + 0.0399i |
| −0.1132 − 0.1728i | 0.2595 − 0.0000i | −0.2275 − 0.3070i | 0.0587 − 0.0017i |
| 0.3037 + 0.0176i | −0.2275 + 0.3070i | 0.5627 + 0.0000i | −0.0495 + 0.0710i |
| −0.0245 − 0.0399i | 0.0587 + 0.0017i | −0.0495 − 0.0710i | 0.0133 − 0.0000i | codebook(:, :, 35) =

| 0.3017 + 0.0000i | 0.3323 + 0.0561i | −0.0684 − 0.1027i | −0.0703 − 0.2773i |
| 0.3323 − 0.0561i | 0.3765 − 0.0000i | −0.0944 − 0.1004i | −0.1290 − 0.2924i |
| −0.0684 + 0.1027i | −0.0944 + 0.1004i | 0.0505 − 0.0000i | 0.1104 + 0.0389i |
| −0.0703 + 0.2773i | −0.1290 + 0.2924i | 0.1104 − 0.0389i | 0.2713 − 0.0000i | codebook(:, :, 36) =

| 0.0538 − 0.0000i | 0.0066 − 0.0427i | −0.1295 − 0.0020i | 0.1545 + 0.0916i |
| 0.0066 + 0.0427i | 0.0348 + 0.0000i | −0.0144 − 0.1031i | −0.0537 + 0.1340i |
| −0.1295 + 0.0020i | −0.0144 + 0.1031i | 0.3117 − 0.0000i | −0.3754 − 0.2146i |
| 0.1545 − 0.0916i | −0.0537 − 0.1340i | −0.3754 + 0.2146i | 0.5998 + 0.0000i | codebook(:, :, 37) =

| 0.0413 − 0.0000i | 0.0382 + 0.1168i | 0.0815 − 0.0357i | 0.0721 + 0.1068i |
| 0.0382 − 0.1168i | 0.3654 − 0.0000i | −0.0253 − 0.2634i | 0.3684 − 0.1050i |
| 0.0815 + 0.0357i | −0.0253 + 0.2634i | 0.1916 + 0.0000i | 0.0501 + 0.2729i |
| 0.0721 − 0.1068i | 0.3684 + 0.1050i | 0.0501 − 0.2729i | 0.4017 − 0.0000i | codebook(:, :, 38) =

| 0.0800 + 0.0000i | −0.0962 + 0.0411i | −0.0918 − 0.1676i | −0.1537 − 0.0501i |
| −0.0962 − 0.0411i | 0.1368 − 0.0000i | 0.0242 + 0.2487i | 0.1591 + 0.1393i |
| −0.0918 + 0.1676i | 0.0242 − 0.2487i | 0.4564 − 0.0000i | 0.2814 − 0.2646i |
| −0.1537 + 0.0501i | 0.1591 − 0.1393i | 0.2814 + 0.2646i | 0.3269 + 0.0000i | codebook(:, :, 39) =

| 0.1044 − 0.0000i | −0.0466 − 0.1040i | 0.1639 + 0.1395i | 0.1849 − 0.0017i |
| −0.0466 + 0.1040i | 0.1245 − 0.0000i | −0.2121 + 0.1009i | −0.0809 + 0.1850i |
| 0.1639 − 0.1395i | −0.2121 − 0.1009i | 0.4435 − 0.0000i | 0.2880 − 0.2497i |
| 0.1849 + 0.0017i | −0.0809 − 0.1850i | 0.2880 + 0.2497i | 0.3276 − 0.0000i | codebook(:, :, 40) =

| 0.3537 + 0.0000i | 0.1649 + 0.2784i | −0.1082 − 0.1210i | −0.2813 − 0.1358i |
| 0.1649 − 0.2784i | 0.2960 − 0.0000i | −0.1456 + 0.0287i | −0.2380 + 0.1581i |
| −0.1082 + 0.1210i | −0.1456 − 0.0287i | 0.0745 − 0.0000i | 0.1325 − 0.0547i |
| −0.2813 + 0.1358i | −0.2380 − 0.1581i | 0.1325 + 0.0547i | 0.2758 − 0.0000i | codebook(:, :, 41) =

| 0.2515 − 0.0000i | 0.0838 + 0.1962i | −0.1609 − 0.2054i | 0.0467 − 0.2433i |
| 0.0838 − 0.1962i | 0.2721 − 0.0000i | −0.2358 − 0.0520i | −0.0842 − 0.0133i |
| −0.1609 + 0.2054i | −0.2358 + 0.0520i | 0.2763 + 0.0000i | 0.1415 + 0.1738i |
| 0.0467 + 0.2433i | −0.0842 + 0.0133i | 0.1415 − 0.1738i | 0.4525 + 0.0000i | codebook(:, :, 42) =

| 0.4281 + 0.0000i | −0.0022 + 0.1178i | −0.0078 + 0.1888i | −0.3065 + 0.2741i |
| −0.0022 − 0.1178i | 0.1206 − 0.0000i | −0.0547 + 0.0723i | 0.1451 + 0.0963i |
| −0.0078 − 0.1888i | −0.0547 − 0.0723i | 0.2698 + 0.0000i | 0.0549 + 0.0589i |
| −0.3065 − 0.2741i | 0.1451 − 0.0963i | 0.0549 − 0.0589i | 0.4495 + 0.0000i |

-continued codebook(:, :, 43) =

| 0.2098 + 0.0000i | −0.2278 − 0.0158i | 0.0540 − 0.2355i | 0.1721 − 0.0710i |
| −0.2278 + 0.0158i | 0.4243 + 0.0000i | −0.0350 + 0.3289i | −0.1310 − 0.0437i |
| 0.0540 + 0.2355i | −0.0350 − 0.3289i | 0.3056 − 0.0000i | 0.0731 + 0.1506i |
| 0.1721 + 0.0710i | −0.1310 + 0.0437i | 0.0731 − 0.1506i | 0.2816 − 0.0000i | codebook(:, :, 44) =

| 0.6414 + 0.0000i | 0.1142 − 0.0404i | 0.2251 + 0.1638i | −0.2196 + 0.2216i |
| 0.1142 + 0.0404i | 0.1100 − 0.0000i | 0.0342 − 0.0487i | −0.0953 + 0.1065i |
| 0.2251 − 0.1638i | 0.0342 + 0.0487i | 0.2184 + 0.0000i | −0.1081 + 0.0933i |
| −0.2196 − 0.2216i | −0.0953 − 0.1065i | −0.1081 − 0.0933i | 0.2473 + 0.0000i | codebook(:, :, 45) =

| 0.2044 − 0.0000i | −0.0492 − 0.1608i | −0.1140 + 0.0184i | −0.1246 − 0.2249i |
| −0.0492 + 0.1608i | 0.2078 + 0.0000i | −0.0012 + 0.0965i | 0.2764 − 0.0272i |
| −0.1140 − 0.0184i | −0.0012 − 0.0965i | 0.5912 − 0.0000i | 0.0809 − 0.0573i |
| −0.1246 + 0.2249i | 0.2764 + 0.0272i | 0.0809 + 0.0573i | 0.3969 − 0.0000i | codebook(:, :, 46) =

| 0.0675 + 0.0000i | 0.0045 + 0.0798i | 0.0542 + 0.0011i | 0.0155 + 0.0818i |
| 0.0045 − 0.0798i | 0.5259 − 0.0000i | 0.1542 − 0.2634i | −0.2873 − 0.1123i |
| 0.0542 − 0.0011i | 0.1542 + 0.2634i | 0.1874 − 0.0000i | −0.0736 − 0.1471i |
| 0.0155 − 0.0818i | −0.2873 + 0.1123i | −0.0736 + 0.1471i | 0.4696 + 0.0000i | codebook(:, :, 47) =

| 0.1253 + 0.0000i | −0.1269 − 0.1674i | −0.2257 + 0.0237i | −0.0263 + 0.1010i |
| −0.1269 + 0.1674i | 0.4343 − 0.0000i | 0.1815 − 0.3028i | −0.1535 − 0.1098i |
| −0.2257 − 0.0237i | 0.1815 + 0.3028i | 0.4199 − 0.0000i | 0.0825 − 0.1696i |
| −0.0263 − 0.1010i | −0.1535 + 0.1098i | 0.0825 + 0.1696i | 0.1212 + 0.0000i | codebook(:, :, 48) =

| 0.3778 + 0.0000i | −0.0268 + 0.0422i | 0.3545 + 0.0804i | 0.0346 − 0.2636i |
| −0.0268 − 0.0422i | 0.0529 − 0.0000i | 0.0374 − 0.0787i | −0.0808 + 0.0590i |
| 0.3545 − 0.0804i | 0.0374 + 0.0787i | 0.4359 − 0.0000i | −0.1123 − 0.2390i |
| 0.0346 + 0.2636i | −0.0808 − 0.0590i | −0.1123 + 0.2390i | 0.2813 − 0.0000i | codebook(:, :, 49) =

| 0.5345 + 0.0000i | 0.1344 − 0.0100i | 0.2680 − 0.3264i | −0.1600 − 0.1066i |
| 0.1344 + 0.0100i | 0.1428 + 0.0000i | 0.1000 − 0.0613i | −0.1018 − 0.0475i |
| 0.2680 + 0.3264i | 0.1000 + 0.0613i | 0.3424 + 0.0000i | −0.0331 − 0.1463i |
| −0.1600 + 0.1066i | −0.1018 + 0.0475i | −0.0331 + 0.1463i | 0.1092 + 0.0000i | codebook(:, :, 50) =

| 0.3111 + 0.0000i | 0.0180 − 0.1385i | 0.2447 + 0.0239i | −0.0511 − 0.1324i |
| 0.0180 + 0.1385i | 0.6046 + 0.0000i | −0.0437 + 0.1104i | 0.3152 + 0.0227i |
| 0.2447 − 0.0239i | −0.0437 − 0.1104i | 0.1984 − 0.0000i | −0.0729 − 0.1048i |
| −0.0511 + 0.1324i | 0.3152 − 0.0227i | −0.0729 + 0.1048i | 0.1940 + 0.0000i | codebook(:, :, 51) =

| 0.2547 − 0.0000i | −0.1432 − 0.1050i | 0.0099 + 0.0250i | 0.1963 − 0.2837i |
| −0.1432 + 0.1050i | 0.3747 − 0.0000i | −0.0615 − 0.1901i | −0.0080 + 0.0585i |
| 0.0099 − 0.0250i | −0.0615 + 0.1901i | 0.1404 + 0.0000i | 0.1129 − 0.0077i |
| 0.1963 + 0.2837i | −0.0080 − 0.0585i | 0.1129 + 0.0077i | 0.6000 − 0.0000i | codebook(:, :, 52) =

| 0.6450 + 0.0000i | 0.1297 − 0.1167i | −0.2017 + 0.2335i | 0.1933 + 0.1540i |
| 0.1297 + 0.1167i | 0.1963 + 0.0000i | −0.0344 + 0.0398i | 0.1005 + 0.1576i |
| −0.2017 − 0.2335i | −0.0344 − 0.0398i | 0.1692 + 0.0000i | 0.0425 − 0.1060i |
| 0.1933 − 0.1540i | 0.1005 − 0.1576i | 0.0425 + 0.1060i | 0.2047 − 0.0000i | codebook(:, :, 53) =

| 0.1805 + 0.0000i | −0.0547 − 0.0061i | 0.0635 + 0.1064i | −0.2952 − 0.1064i |
| −0.0547 + 0.0061i | 0.1996 − 0.0000i | 0.0725 − 0.0458i | 0.2214 − 0.0992i |
| 0.0635 − 0.1064i | 0.0725 + 0.0458i | 0.1361 + 0.0000i | −0.0893 + 0.0842i |
| −0.2952 + 0.1064i | 0.2214 + 0.0992i | −0.0893 − 0.0842i | 0.7161 + 0.0000i | codebook(:, :, 54) =

| 0.4809 + 0.0000i | −0.2075 − 0.0016i | −0.1828 − 0.0925i | 0.0197 − 0.1719i |
| −0.2075 + 0.0016i | 0.6677 − 0.0000i | −0.0583 + 0.0351i | 0.1419 − 0.0075i |
| −0.1828 + 0.0925i | −0.0583 − 0.0351i | 0.1200 − 0.0000i | −0.0095 + 0.0897i |
| 0.0197 + 0.1719i | 0.1419 + 0.0075i | −0.0095 − 0.0897i | 0.1127 + 0.0000i | codebook(:, :, 55) =

| 0.2016 + 0.0000i | −0.1168 − 0.0834i | 0.1309 − 0.1085i | 0.0833 + 0.1042i |
| −0.1168 + 0.0834i | 0.2643 + 0.0000i | 0.1569 + 0.2793i | −0.2082 − 0.0956i |
| 0.1309 + 0.1085i | 0.1569 − 0.2793i | 0.5233 + 0.0000i | −0.2071 + 0.1486i |
| 0.0833 − 0.1042i | −0.2082 + 0.0956i | −0.2071 − 0.1486i | 0.2024 + 0.0000i |

-continued codebook(:, :, 56) =

| | | | |
|---|---|---|---|
| 0.4453 − 0.0000i | 0.0502 + 0.0747i | 0.0173 + 0.0794i | 0.1254 − 0.0156i |
| 0.0502 − 0.0747i | 0.2105 − 0.0000i | −0.0721 + 0.0320i | −0.1878 + 0.2057i |
| 0.0173 − 0.0794i | −0.0721 − 0.0320i | 0.4282 − 0.0000i | 0.0084 + 0.0172i |
| 0.1254 + 0.0156i | −0.1878 − 0.2057i | 0.0084 − 0.0172i | 0.5868 − 0.0000i | codebook(:, :, 57) =

| | | | |
|---|---|---|---|
| 0.4988 + 0.0000i | −0.0937 + 0.0638i | −0.1197 − 0.0186i | 0.0372 + 0.4277i |
| −0.0937 − 0.0638i | 0.1164 + 0.0000i | −0.0322 − 0.0081i | 0.0335 − 0.1175i |
| −0.1197 + 0.0186i | −0.0322 + 0.0081i | 0.1369 − 0.0000i | −0.0591 − 0.1411i |
| 0.0372 − 0.4277i | 0.0335 + 0.1175i | −0.0591 + 0.1411i | 0.4651 + 0.0000i | codebook(:, :, 58) =

| | | | |
|---|---|---|---|
| 0.2538 + 0.0000i | 0.1692 − 0.0652i | −0.1896 + 0.0734i | −0.0002 + 0.0393i |
| 0.1692 + 0.0652i | 0.3961 − 0.0000i | −0.1287 − 0.1316i | −0.0340 − 0.0208i |
| −0.1896 − 0.0734i | −0.1287 + 0.1316i | 0.6443 − 0.0000i | 0.2356 − 0.0889i |
| −0.0002 − 0.0393i | −0.0340 + 0.0208i | 0.2356 + 0.0889i | 0.1199 + 0.0000i | codebook(:, :, 59) =

| | | | |
|---|---|---|---|
| 0.4137 + 0.0000i | 0.0268 + 0.0478i | 0.1675 + 0.1819i | 0.2105 + 0.0286i |
| 0.0268 − 0.0478i | 0.1669 + 0.0000i | 0.1515 − 0.1072i | −0.0271 + 0.0381i |
| 0.1675 − 0.1819i | 0.1515 + 0.1072i | 0.4631 + 0.0000i | 0.1877 + 0.0946i |
| 0.2105 − 0.0286i | −0.0271 − 0.0381i | 0.1877 − 0.0946i | 0.4544 − 0.0000i | codebook(:, :, 60) =

| | | | |
|---|---|---|---|
| 0.1623 + 0.0000i | −0.0809 − 0.1042i | 0.1452 + 0.0219i | −0.1156 − 0.0066i |
| −0.0809 + 0.1042i | 0.5672 + 0.0000i | −0.1277 + 0.1931i | −0.2278 − 0.1299i |
| 0.1452 − 0.0219i | −0.1277 − 0.1931i | 0.3652 + 0.0000i | −0.1793 + 0.0560i |
| −0.1156 + 0.0066i | −0.2278 + 0.1299i | −0.1793 − 0.0560i | 0.3140 + 0.0000i | codebook(:, :, 61) =

| | | | |
|---|---|---|---|
| 0.3918 + 0.0000i | −0.0550 − 0.2434i | 0.0624 − 0.0330i | −0.1025 − 0.2157i |
| −0.0550 + 0.2434i | 0.5680 + 0.0000i | 0.1534 + 0.0901i | 0.2101 − 0.1278i |
| 0.0624 + 0.0330i | 0.1534 − 0.0901i | 0.2123 + 0.0000i | 0.0457 − 0.0447i |
| −0.1025 + 0.2157i | 0.2101 + 0.1278i | 0.0457 + 0.0447i | 0.1942 − 0.0000i | codebook(:, :, 62) =

| | | | |
|---|---|---|---|
| 0.3249 − 0.0000i | −0.1983 + 0.1079i | 0.1154 + 0.1776i | 0.2078 − 0.0776i |
| −0.1983 − 0.1079i | 0.3854 − 0.0000i | −0.0920 + 0.0201i | −0.1631 − 0.0439i |
| 0.1154 − 0.1776i | −0.0920 − 0.0201i | 0.3008 + 0.0000i | 0.0832 − 0.1129i |
| 0.2078 + 0.0776i | −0.1631 + 0.0439i | 0.0832 + 0.1129i | 0.5013 − 0.0000i | codebook(:, :, 63) =

| | | | |
|---|---|---|---|
| 0.2224 + 0.0000i | 0.1530 − 0.0407i | −0.0439 − 0.1850i | 0.1342 + 0.1983i |
| 0.1530 + 0.0407i | 0.4671 + 0.0000i | −0.1164 − 0.0668i | −0.0984 − 0.0087i |
| −0.0439 + 0.1850i | −0.1164 + 0.0668i | 0.4207 − 0.0000i | −0.1775 + 0.1083i |
| 0.1342 − 0.1983i | −0.0984 + 0.0087i | −0.1775 − 0.1083i | 0.4198 + 0.0000i | codebook(:, :, 64) =

| | | | |
|---|---|---|---|
| 0.5000 | 0 | 0 | 0 |
| 0 | 0.5000 | 0 | 0 |
| 0 | 0 | 0.5000 | 0 |
| 0 | 0 | 0 | 0.5000 |

As a non-exhaustive illustration only, the terminal device or receiver described herein may refer to mobile devices such as a cellular phone, a personal digital assistant (PDA), a digital camera, a portable game console, and an MP3 player, a portable/personal multimedia player (PMP), a handheld e-book, a portable laptop and/or tablet personal computer (PC), a global positioning system (GPS) navigation, and devices such as a desktop PC, a high definition television (HDTV), an optical disc player, a set top box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of operating a receiver, the method comprising:
    calculating an explicit channel matrix between a transmitter and the receiver;
    vectorizing the explicit channel matrix or an explicit channel matrix processed using a predefined function, to generate an explicit feedback vector; and
    generating feedback information based on the explicit feedback vector and a predefined codebook.

2. The method of claim 1, wherein:
    the predefined codebook comprises a plurality of codewords as candidates with respect to the explicit feedback vector, and
    the generating of feedback information comprises selecting, from the plurality of codewords, a codeword corresponding to the explicit feedback vector to generate the feedback information.

3. The method of claim 1, wherein the vectorizing comprises vectorizing at least one of: the explicit channel matrix, a covariance of the explicit channel matrix, an upper triangular matrix of the covariance, an R matrix obtained by performing QR decomposition of the explicit channel matrix, and eigen vectors of the covariance.

4. The method of claim 1, wherein the calculating of the explicit channel matrix comprises calculating the explicit channel matrix using a signal transmitted from the transmitter.

5. The method of claim 1, wherein the generating of feedback information comprises generating the feedback information including information associated with a direction of the explicit feedback vector and information associated with a quality of the explicit feedback vector.

6. The method of claim 5, wherein information associated with the quality of the explicit feedback vector is generated based on interference or noise occurring in the receiver.

7. The method of claim 1, wherein the vectorizing comprises stacking up, into a single vector form, column vectors or row vectors included in the explicit channel matrix.

8. A non-transitory computer-readable storage medium storing a program to implement the method of claim 1.

9. A method of operating a transmitter, the method comprising:
    receiving feedback information from a receiver;
    recognizing, based on the feedback information and a predefined codebook, an explicit feedback vector that is generated by vectorizing an explicit channel matrix between the transmitter and the receiver or an explicit channel matrix processed using a predefined function; and
    reconfiguring, from the explicit feedback vector, the explicit channel matrix or the processed explicit channel matrix.

10. The method of claim 9, wherein:
    the predefined codebook comprises a plurality of codewords as candidates with respect to the explicit feedback vector; and
    the feedback information is generated based on a codeword corresponding to the explicit feedback vector among the plurality of codewords.

11. The method of claim 9, wherein the explicit feedback vector is generated by vectorizing at least one of: the explicit channel matrix, a covariance of the explicit channel matrix, an upper triangular matrix of the covariance, an R matrix obtained by performing QR decomposition of the explicit channel matrix, and eigen vectors of the covariance.

12. A method of operating a receiver, the method comprising:
    calculating a correlation matrix based on an explicit channel matrix between a transmitter and the receiver;
    transforming a first codebook to a second codebook based on the correlation matrix; and
    generating feedback based on the second codebook and the explicit channel matrix.

13. The method of claim 11, further comprising at least one of:
    generating an explicit feedback vector by vectorizing the explicit channel matrix or an explicit channel matrix processed using a predefined function; and
    determining, as an explicit feedback matrix, the explicit channel matrix or the processed explicit channel matrix,
    wherein the generating of the feedback information comprises generating the feedback information including information associated with a direction and a quality of the explicit feedback vector, or information associated with a direction and a quality of the explicit feedback matrix.

14. The method of claim 12, further comprising:
    providing, by the receiver to the transmitter, information used to verify the correlation matrix.

15. The method of claim 13, wherein the generating of the explicit feedback vector comprises generating the explicit feedback vector by vectorizing at least one of: the explicit channel matrix, a covariance of the explicit channel matrix, an upper triangular matrix of the covariance, an R matrix obtained by performing QR decomposition of the explicit channel matrix, and eigen vectors of the covariance.

16. The method of claim 12, wherein:
    the calculating of the correlation matrix comprises calculating at least two correlation matrices corresponding to at least two subchannel matrices included in the explicit channel matrix, and
    the transforming of the first codebook to the second codebook comprises transforming the first codebook to the second codebook based on the at least two correlation matrices.

17. A method of operating a transmitter, the method comprising:
    recognizing a correlation matrix corresponding to an explicit channel matrix between a receiver and the transmitter;
    transforming a first codebook to a second codebook based on the correlation matrix;
    receiving feedback information from the receiver; and
    reconfiguring the explicit channel matrix or an explicit channel matrix processed using a predefined function, based on the feedback information and the second codebook.

18. The method of claim 17, wherein:
    the recognizing of the correlation matrix comprises recognizing at least two correlation matrices corresponding to at least two subchannel matrices included in the explicit channel matrix, and
    the transforming of the first codebook to the second codebook comprises transforming the first codebook to the second codebook based on the at least two correlation matrices.

* * * * *